May 10, 1960  G. B. GREENE ET AL  2,936,118
ELECTRONIC DIGITAL COMPUTERS
Filed Sept. 27, 1954  48 Sheets-Sheet 1
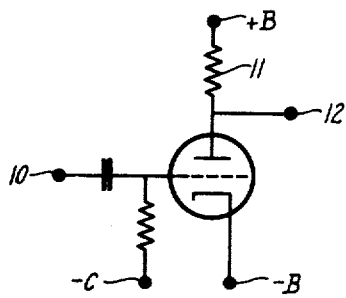
FIG_1_
FIG_2_
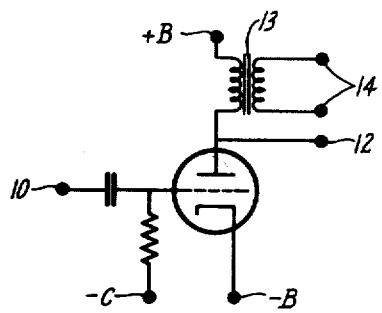
FIG_3_
FIG_4_
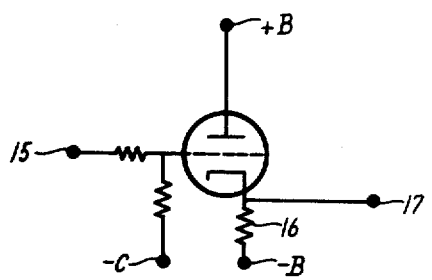
FIG_5_
FIG_6_
INVENTORS.
George B. Greene.
Charles M. Hill.
Eugene P. Hamilton.
William B. Bennett.
William P. Steed.
BY
Robert W. Hampton INVENTORS.
George B. Greene.
Charles M. Hill.
Eugene P. Hamilton.
William B. Bennett.
William P. Steed.
BY
Robert W. Hampton INVENTORS.
George B. Greene.
Charles M. Hill.
Eugene P. Hamilton.
William B. Bennett.
William P. Steed.
BY
Robert W. Hampton

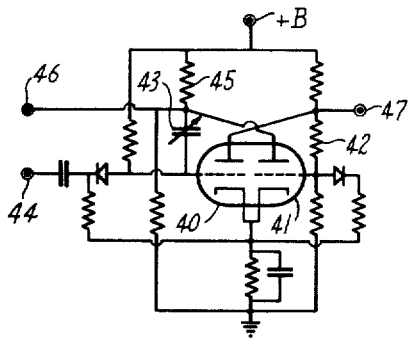
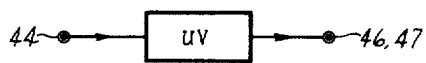
FIG.22.    FIG.23.
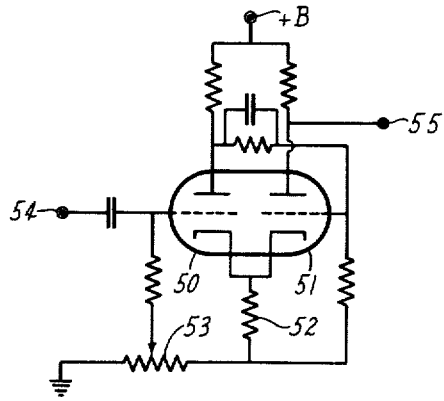
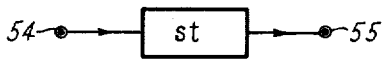
FIG.24.    FIG.25.
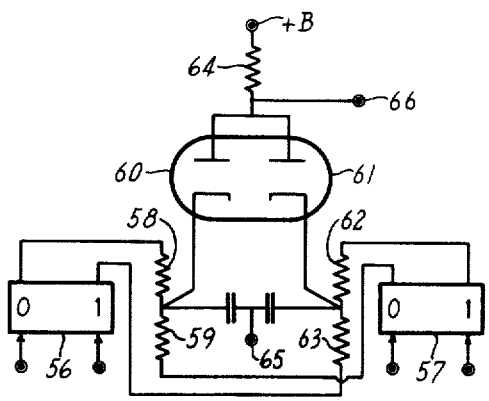
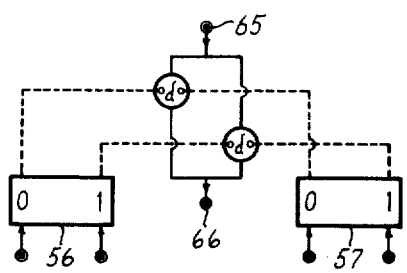
FIG.26.    FIG.27.
INVENTORS.
George B. Greene
Charles M. Hill
Eugene P. Hamilton
William B. Bennett
William P. Steed.
BY
Robert W. Hampton

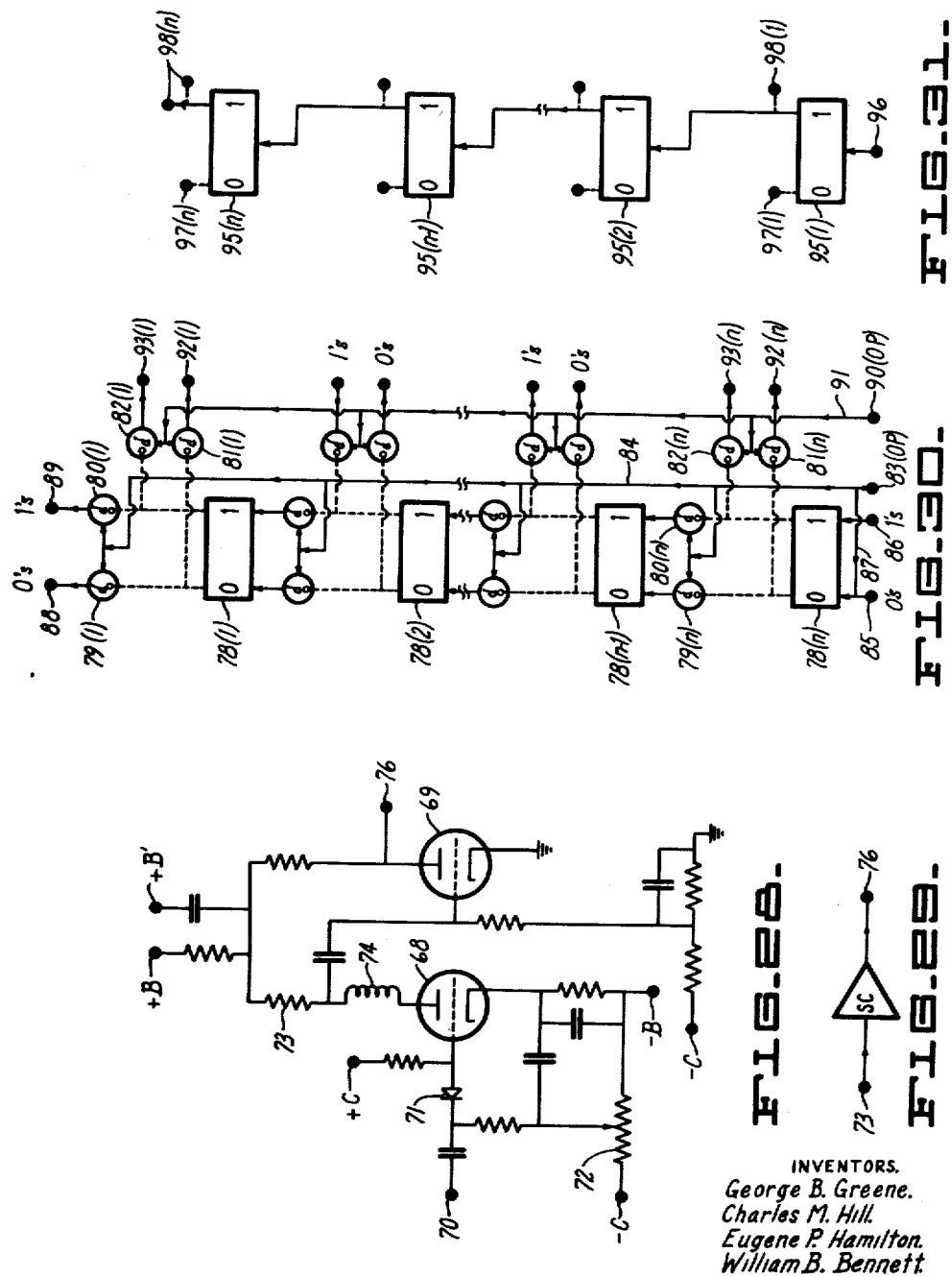

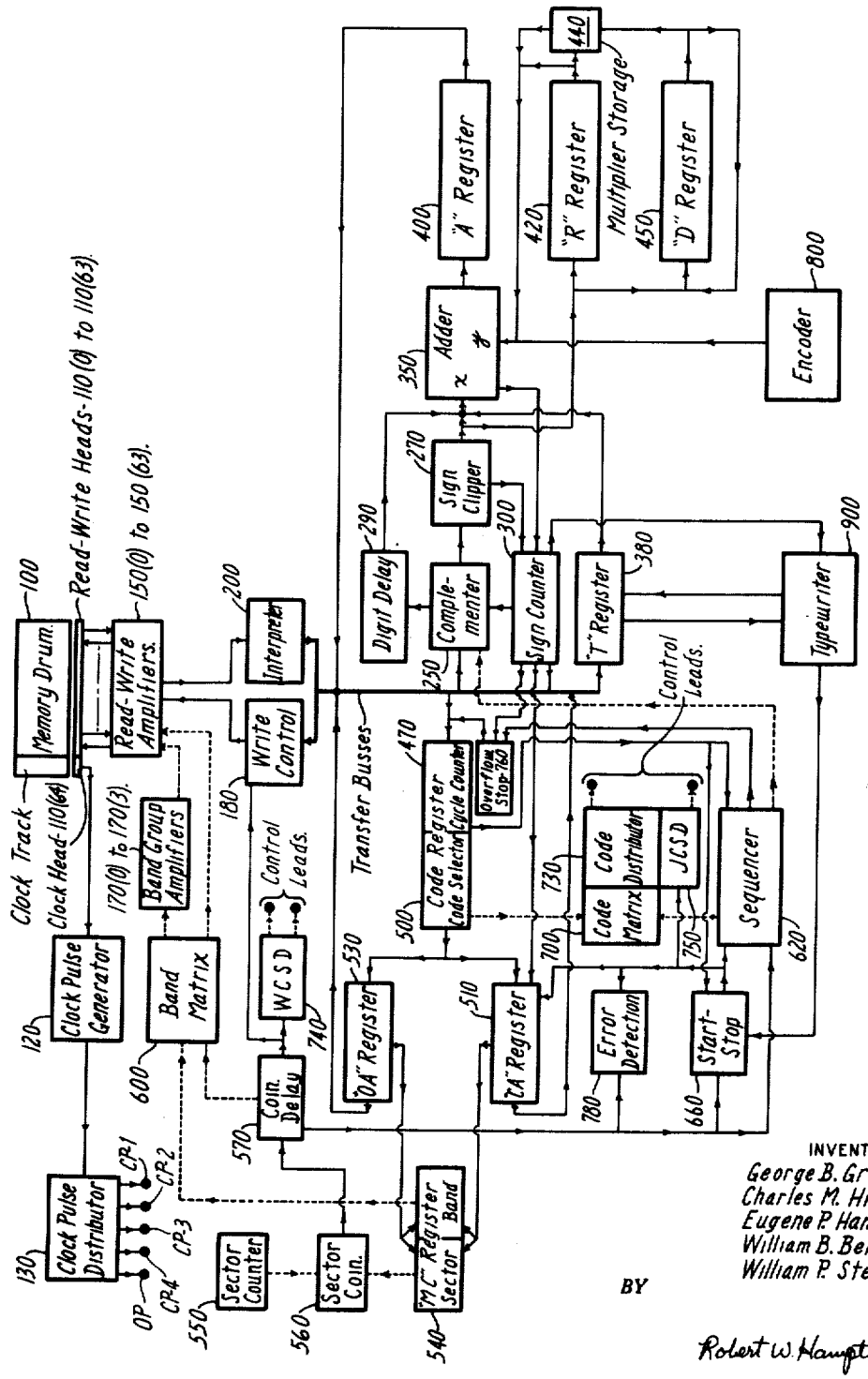

May 10, 1960     G. B. GREENE ET AL     2,936,118

ELECTRONIC DIGITAL COMPUTERS

Filed Sept. 27, 1954     48 Sheets—Sheet 7

INVENTORS.
George B. Greene.
Charles M. Hill.
Eugene P. Hamilton.
William B. Bennett.
William P. Steed.
BY
Robert W. Hampton

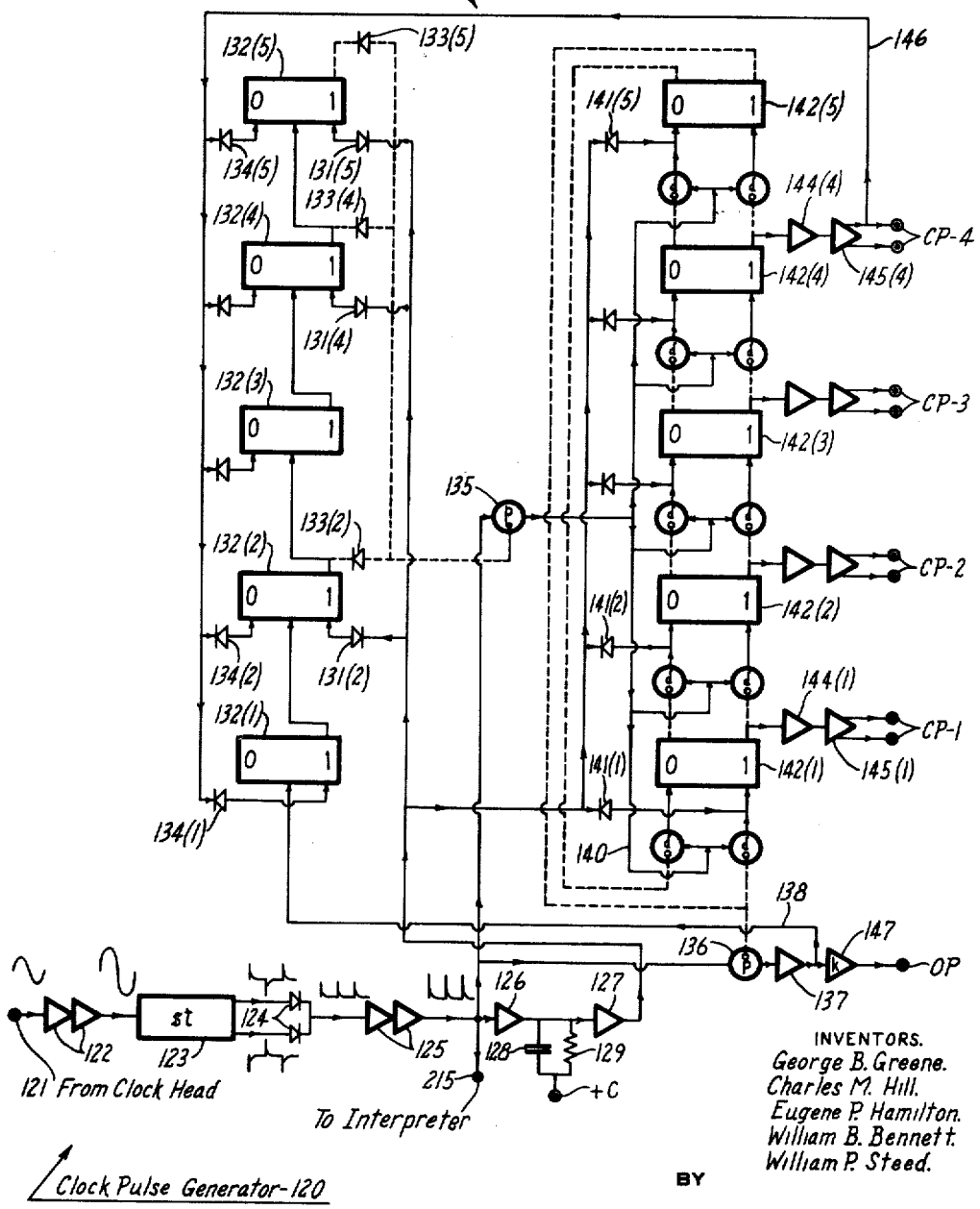

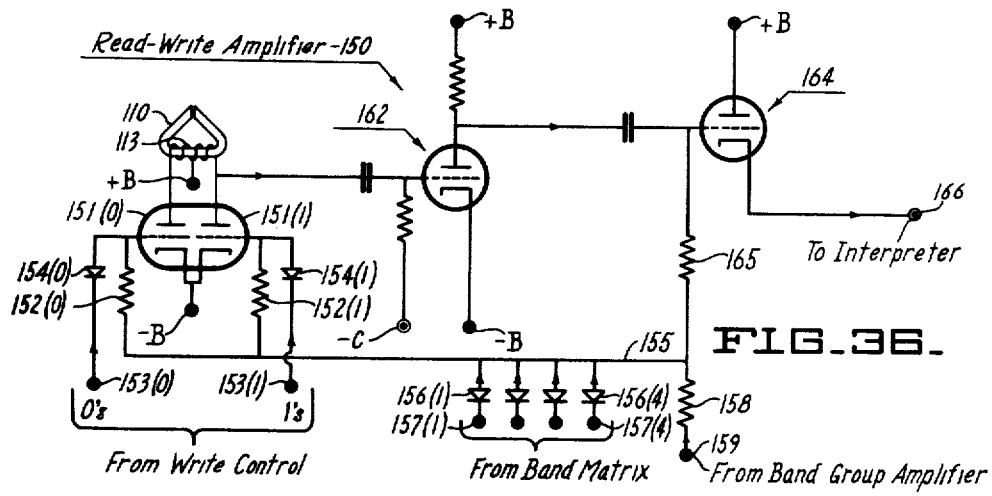
FIG_36_
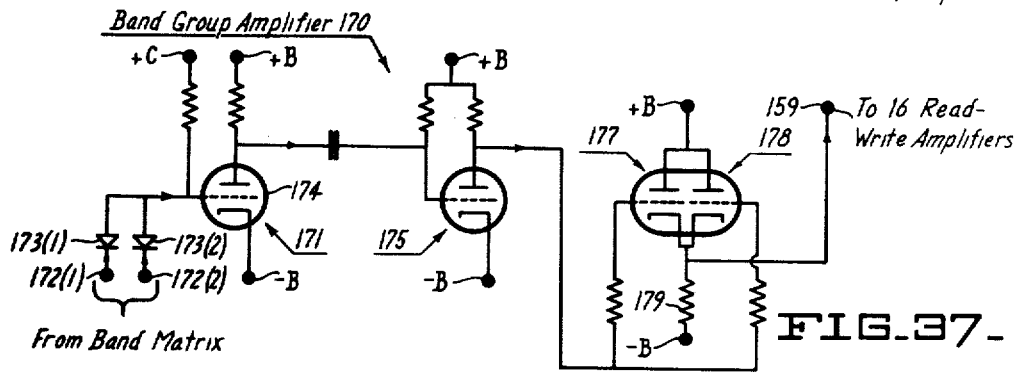
FIG_37_
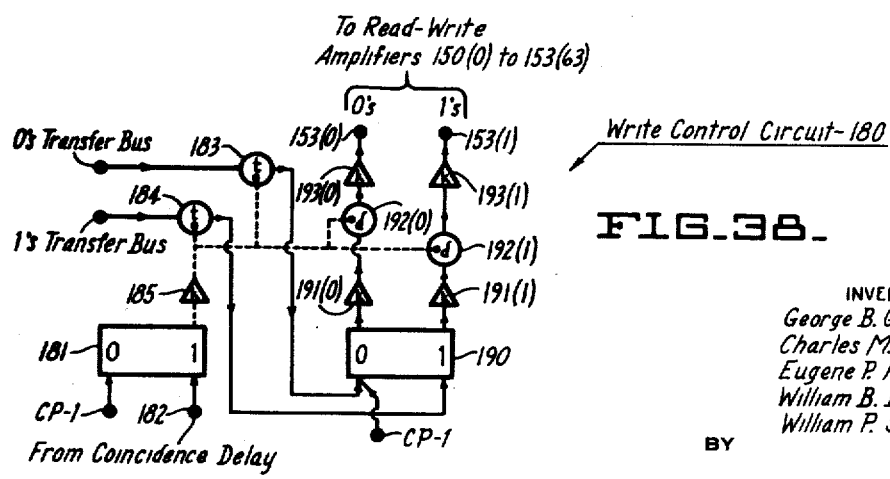
FIG_38_
INVENTORS.
George B. Greene.
Charles M. Hill.
Eugene P. Hamilton.
William B. Bennett.
William P. Steed.
BY
Robert W. Hampton

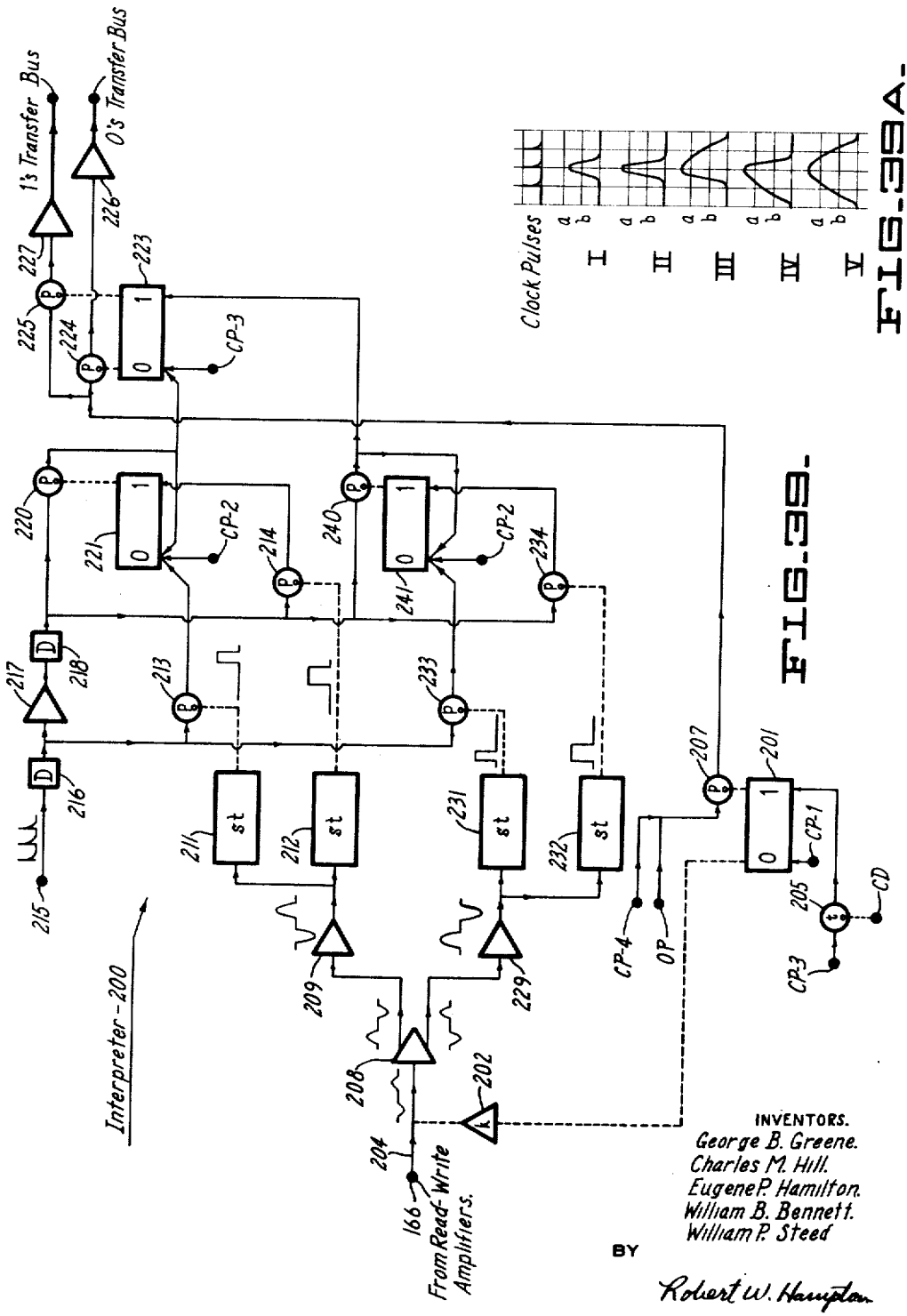

FIG. 40.

May 10, 1960　　　G. B. GREENE ET AL　　　2,936,118
ELECTRONIC DIGITAL COMPUTERS
Filed Sept. 27, 1954　　　　　　　　　　　48 Sheets-Sheet 14

INVENTORS.
George B. Greene.
Charles M. Hill.
Eugene P. Hamilton.
William B. Bennett.
William P. Steed.
BY
Robert W. Hampton INVENTORS.
George B. Greene.
Charles M. Hill.
Eugene P. Hamilton.
William B. Bennett.
William P. Steed.

BY

Robert W. Hampton

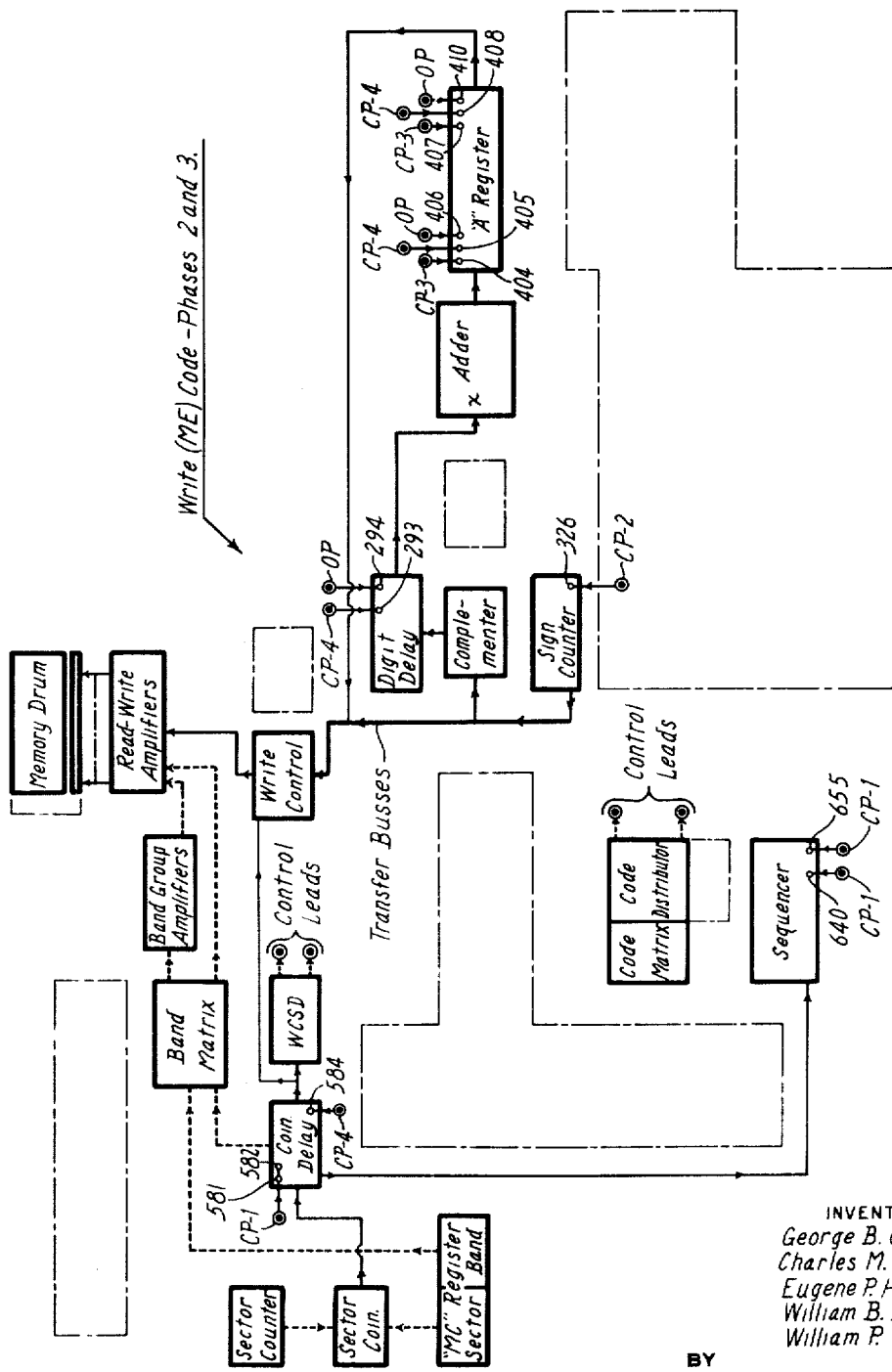

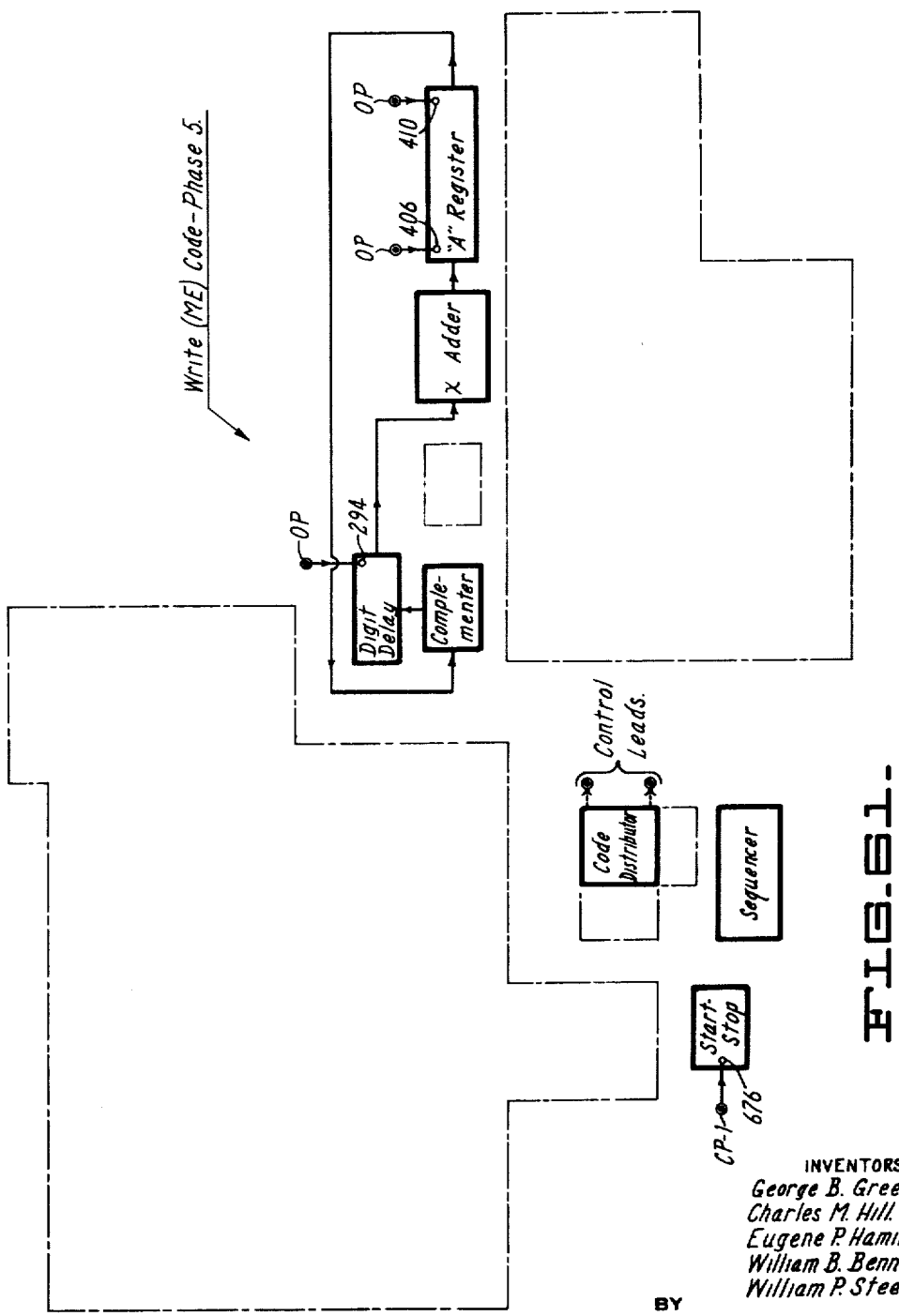

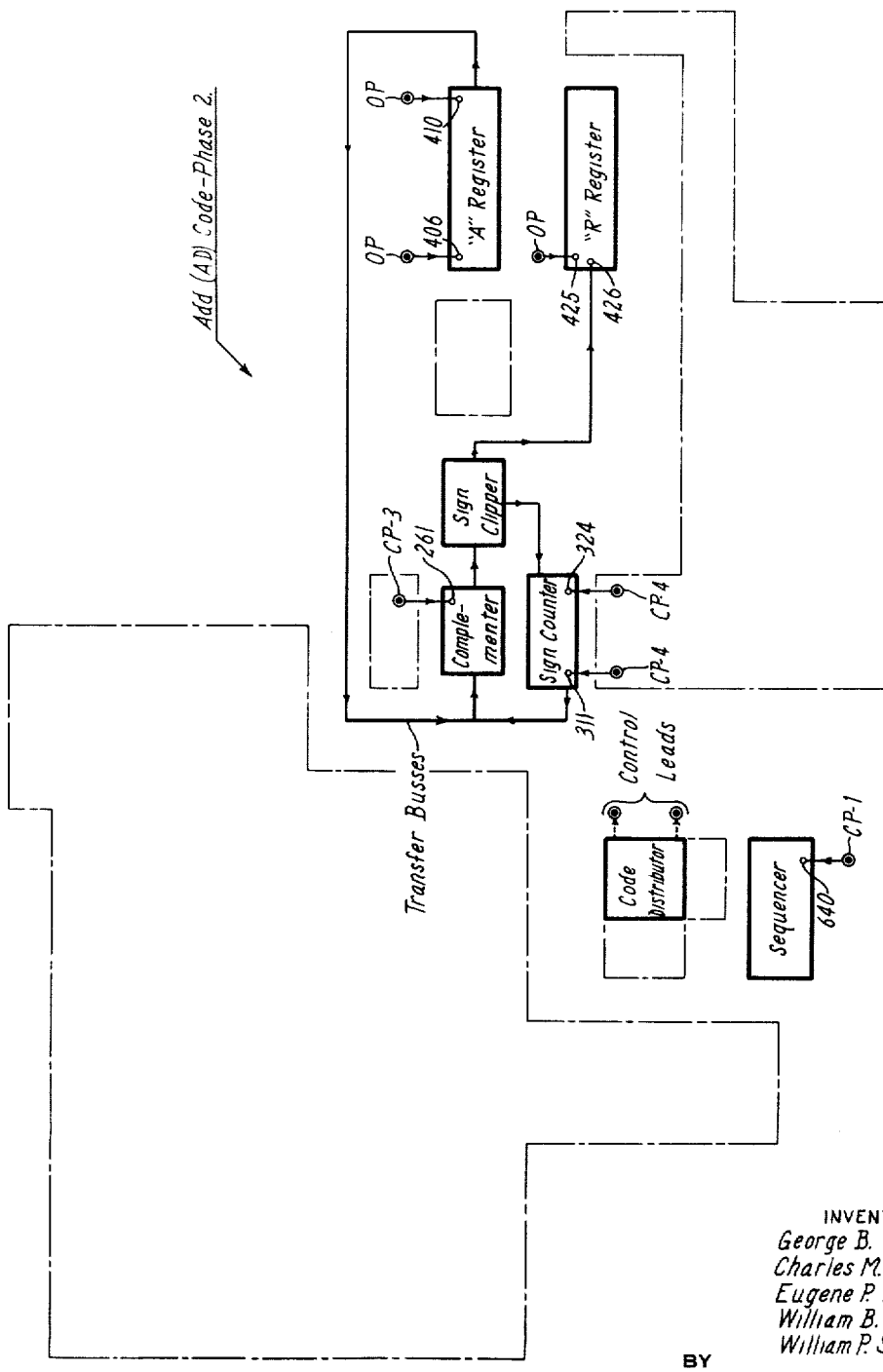

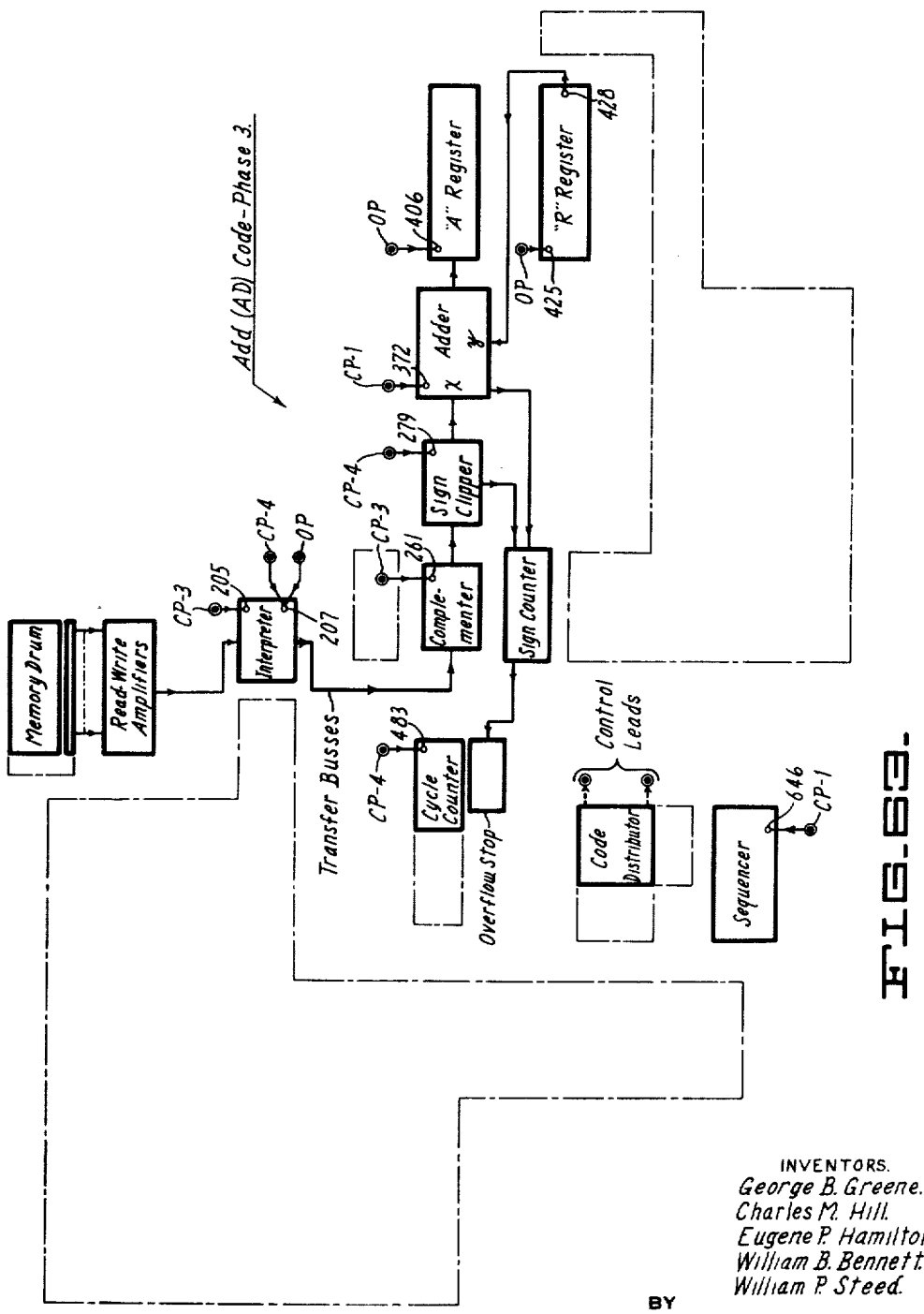

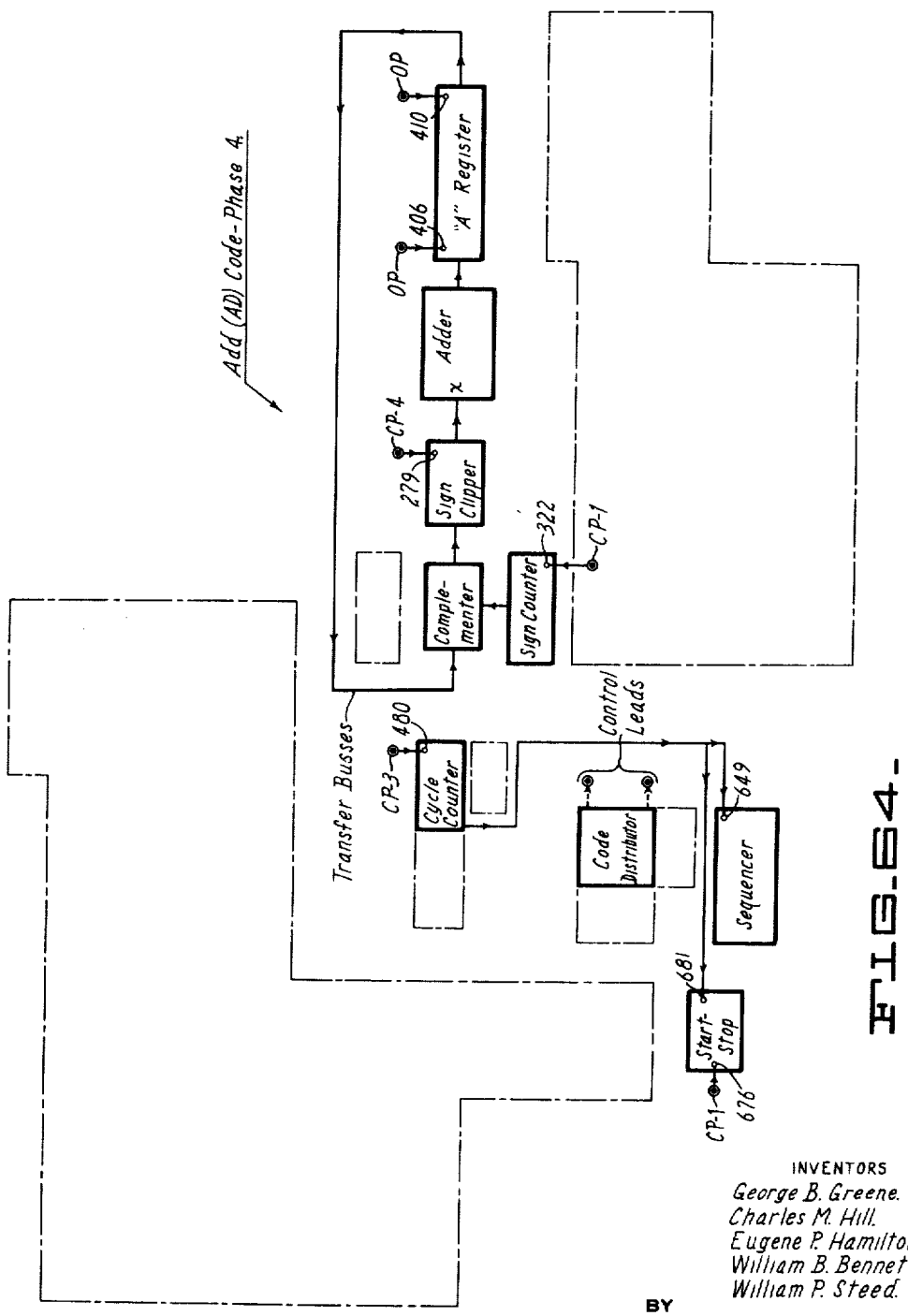

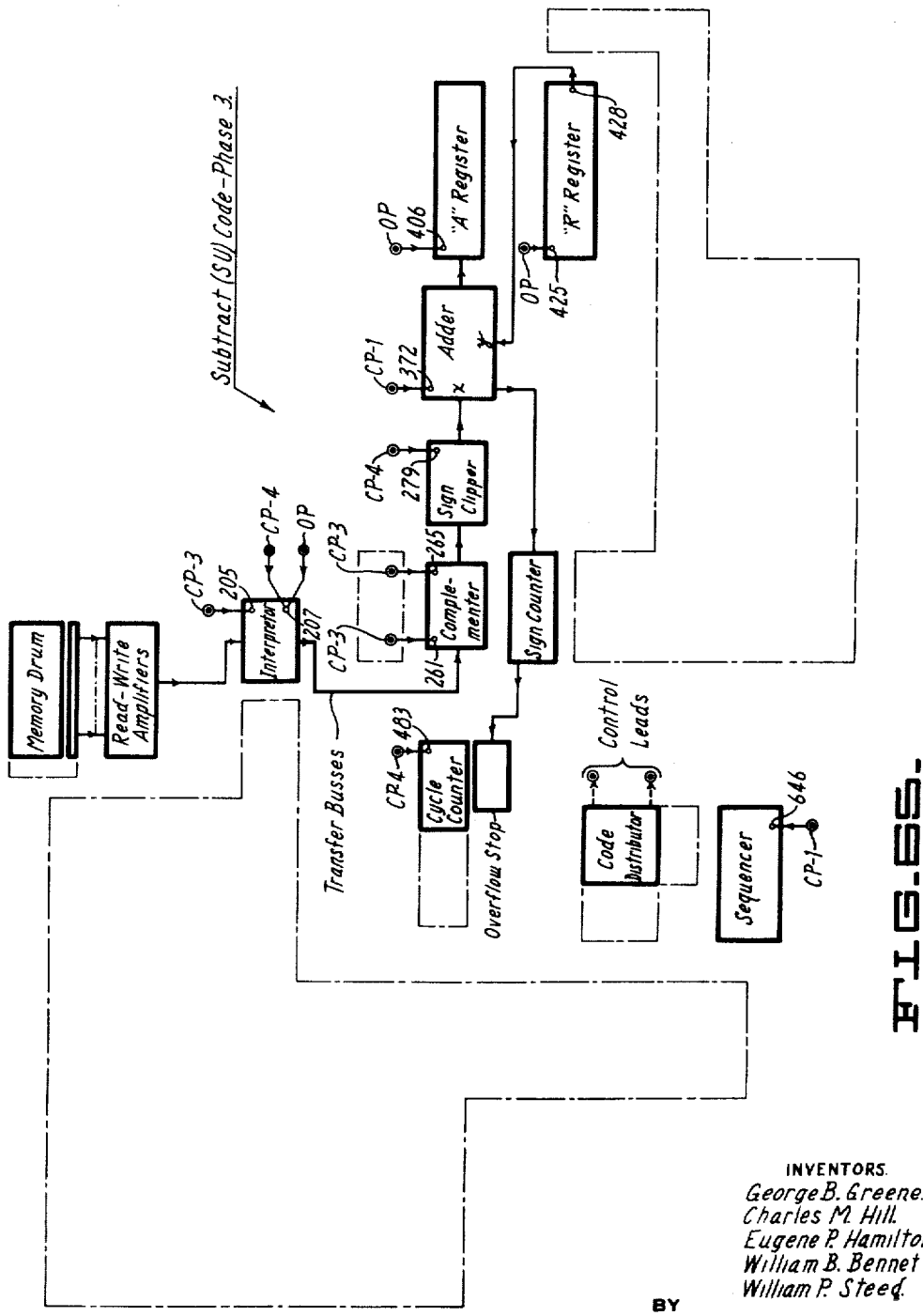

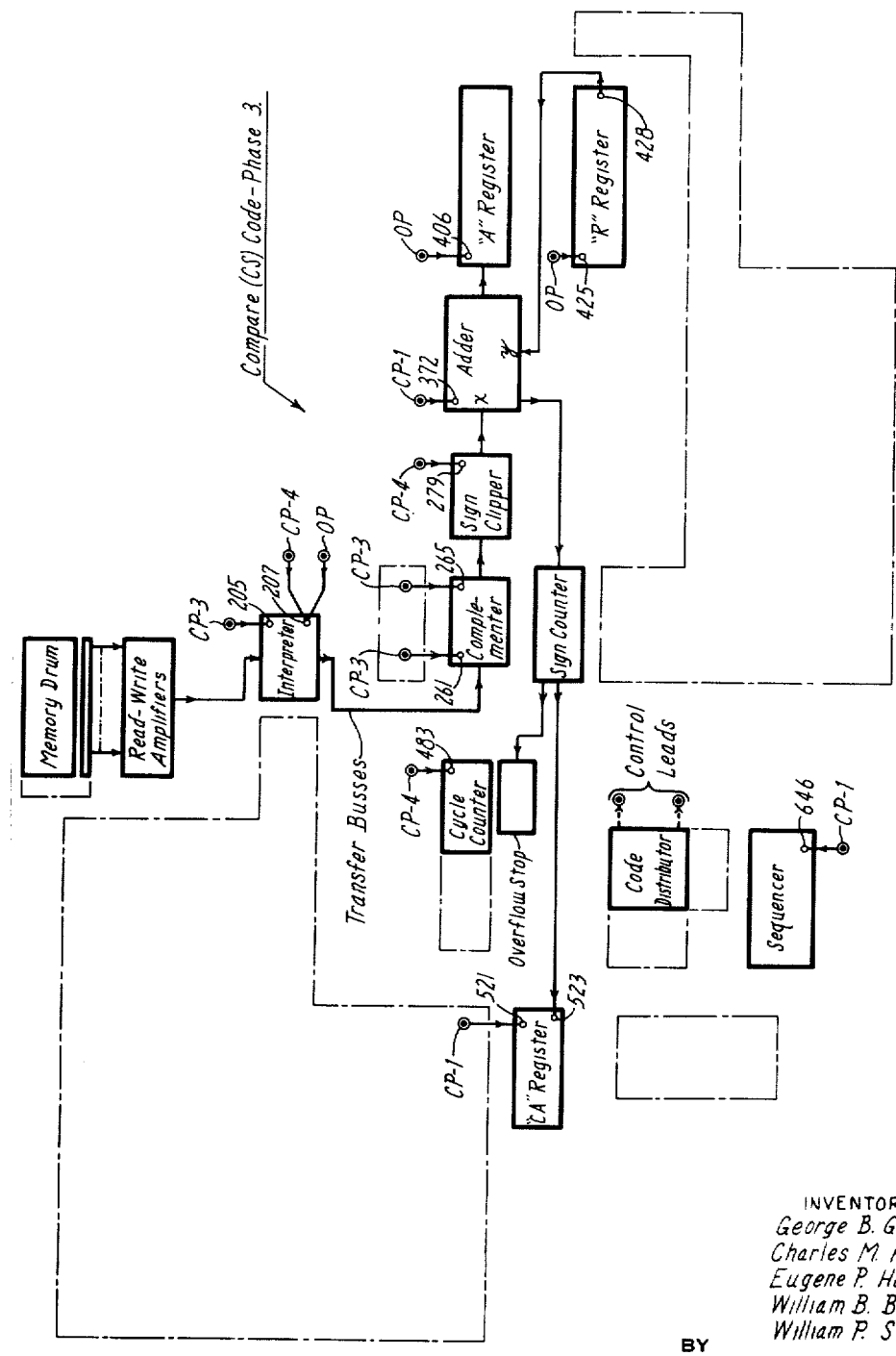

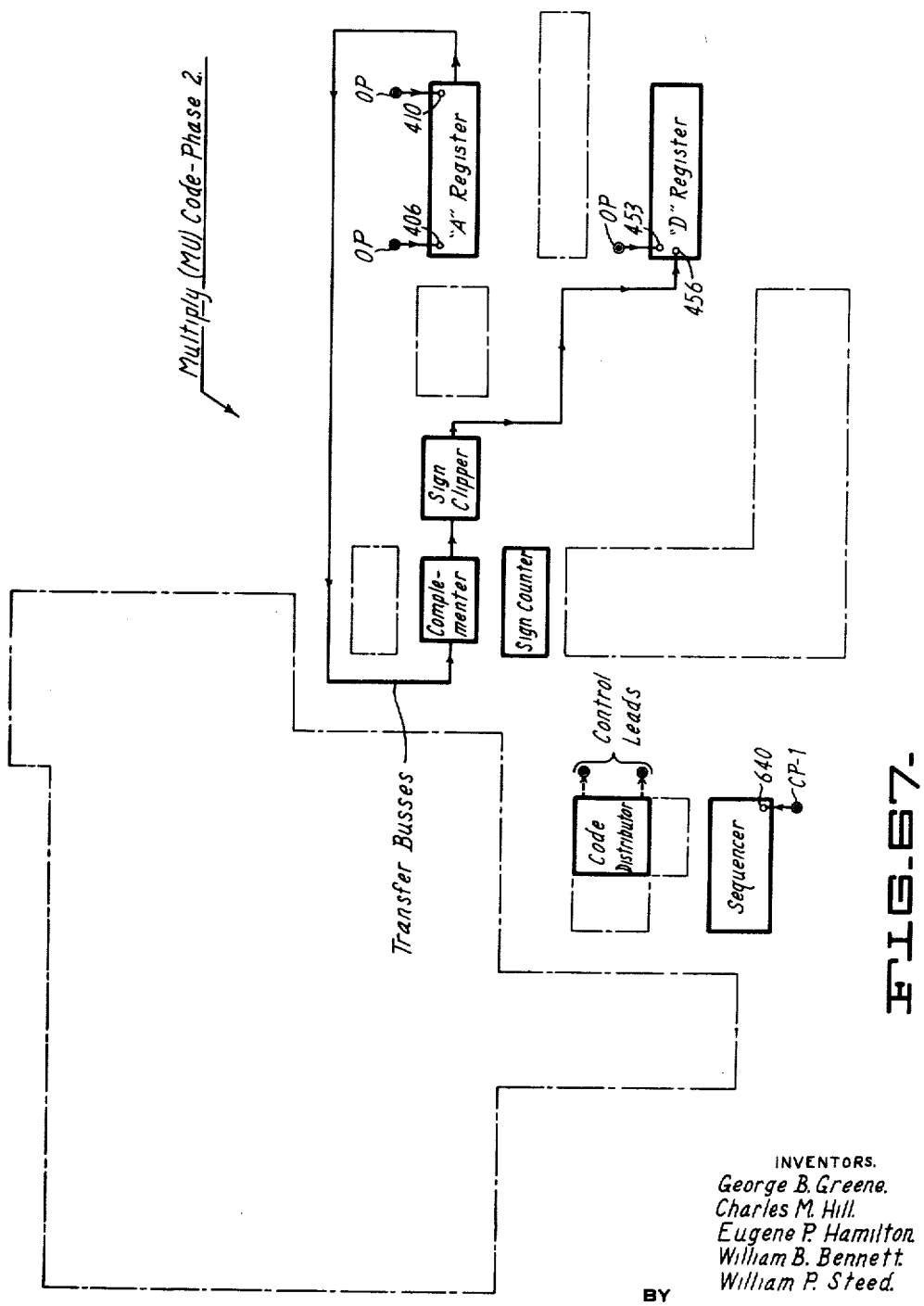

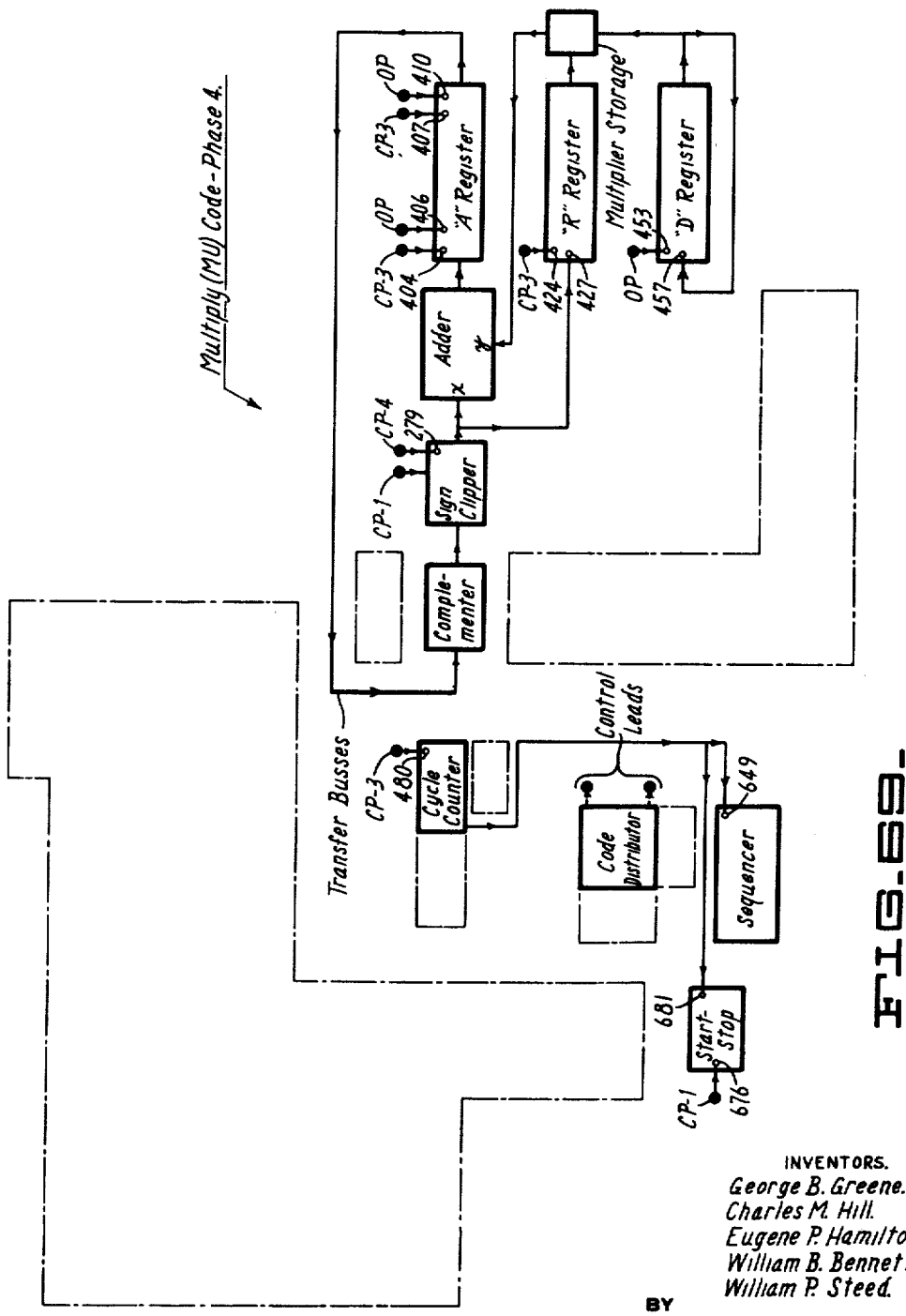

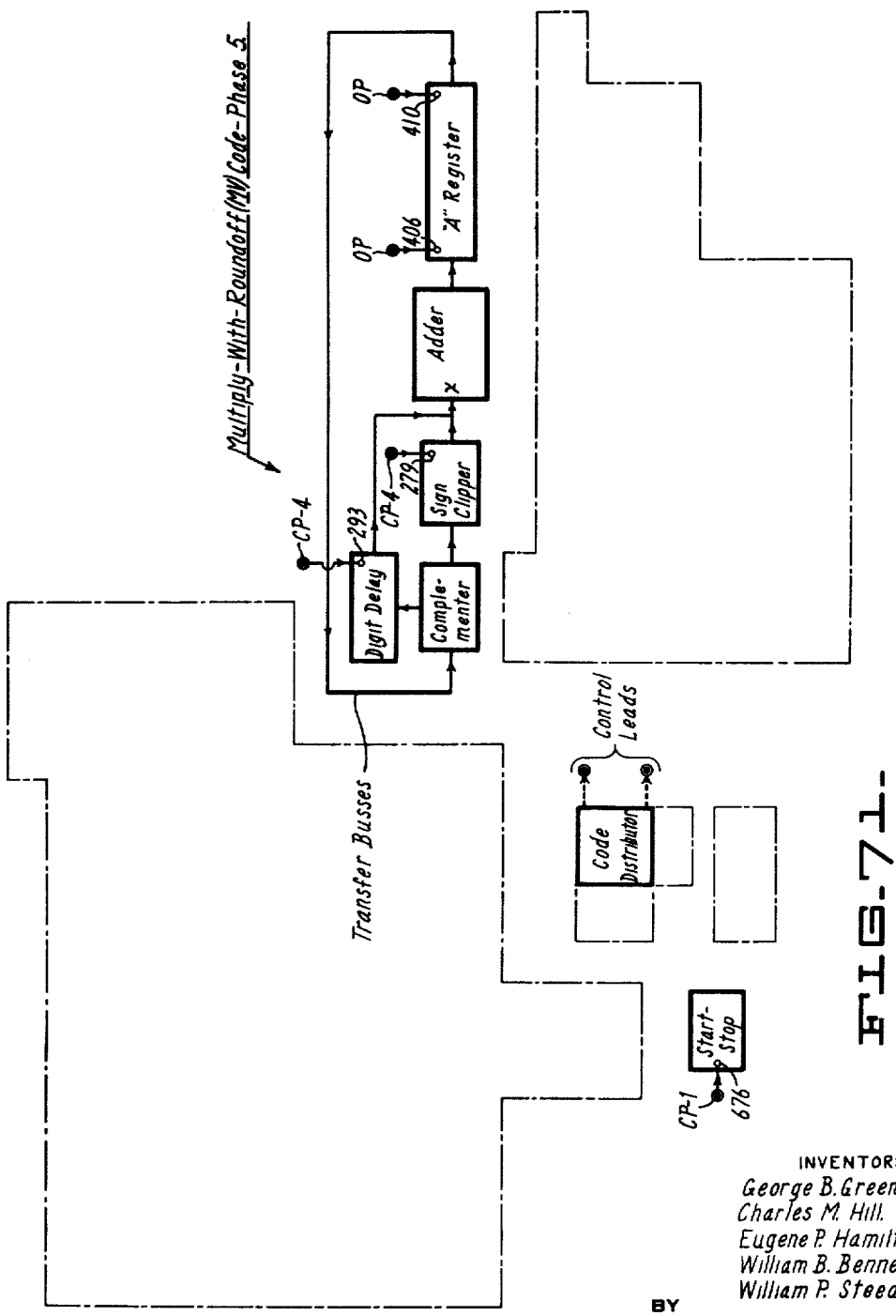

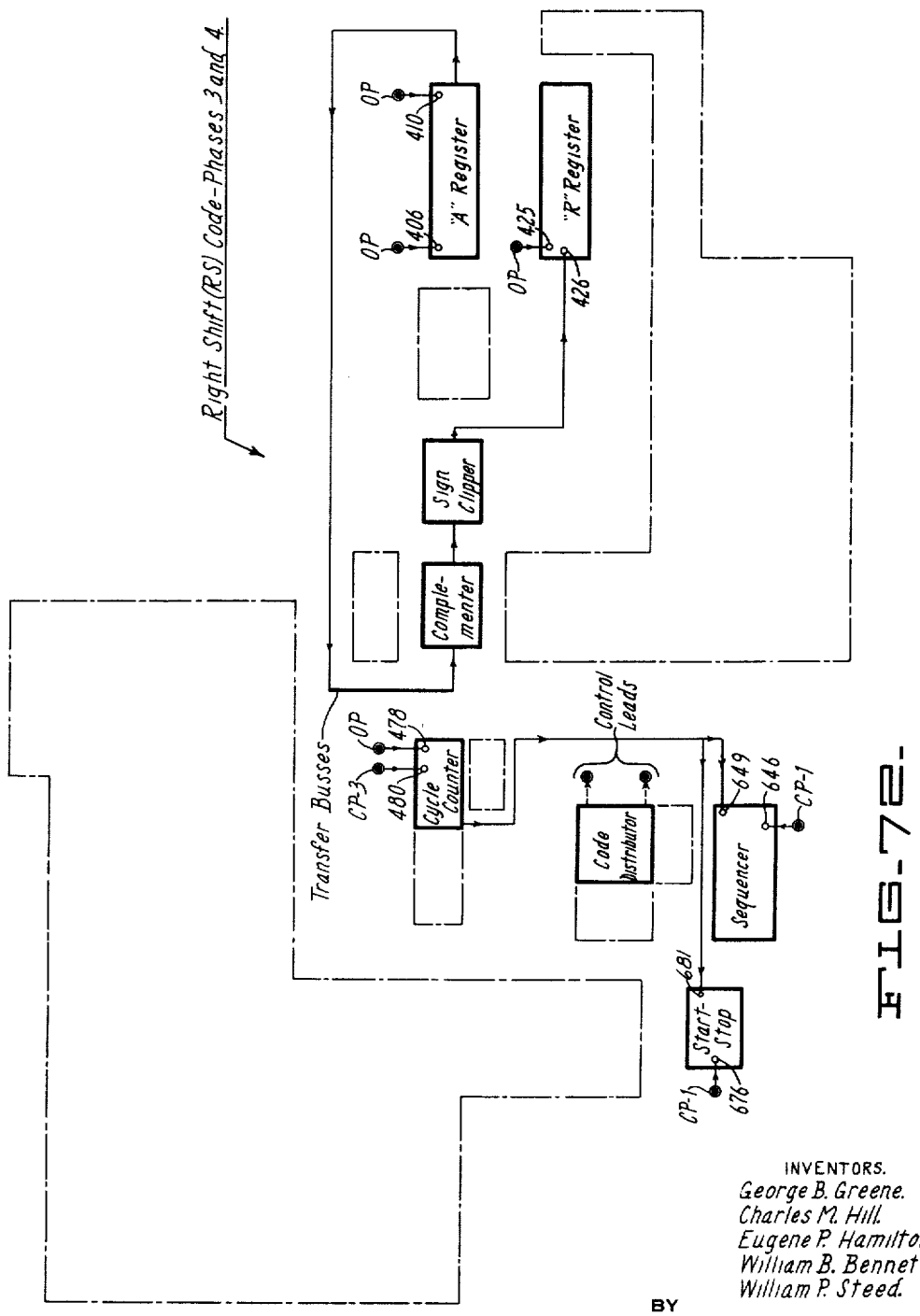

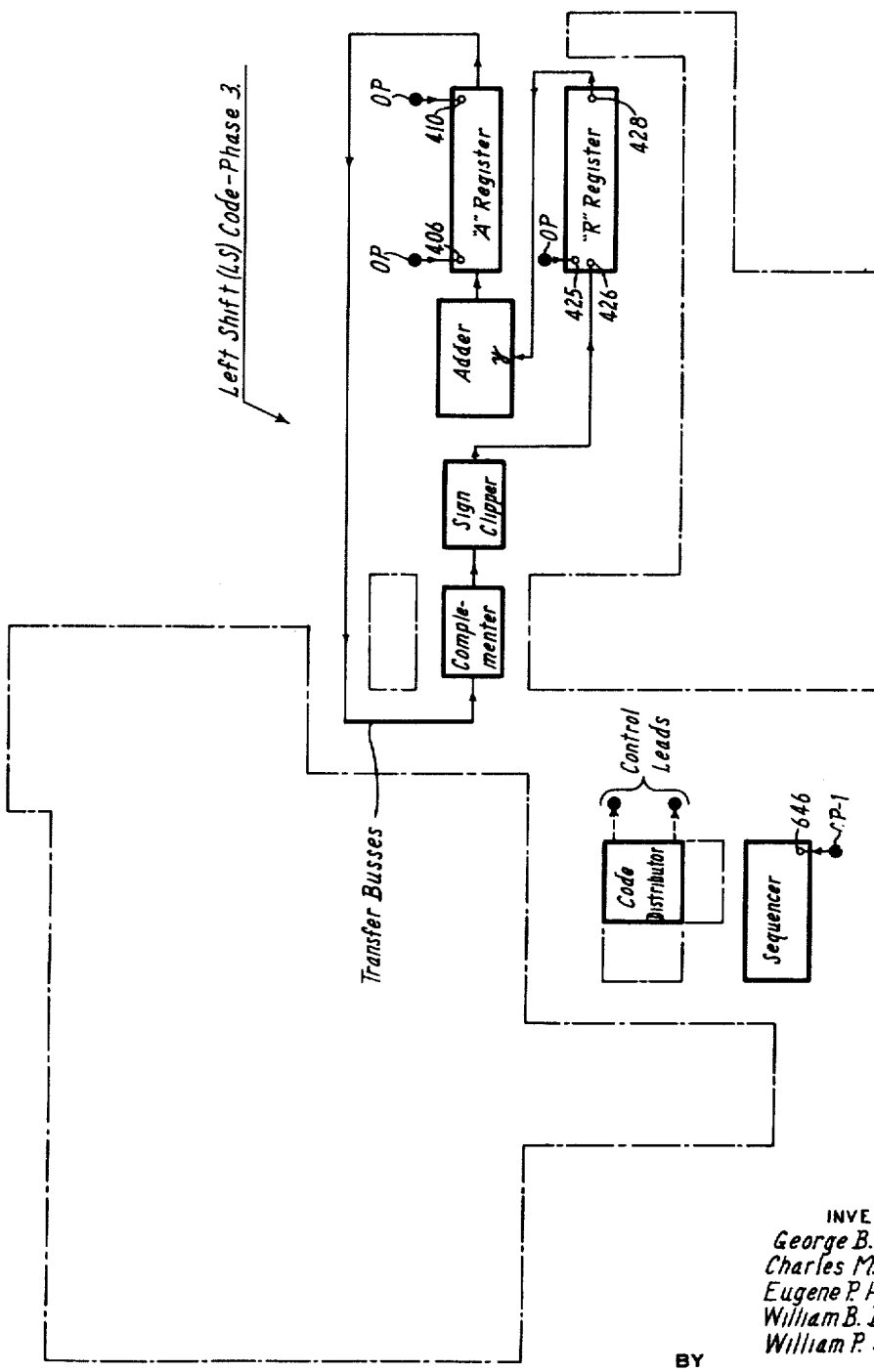

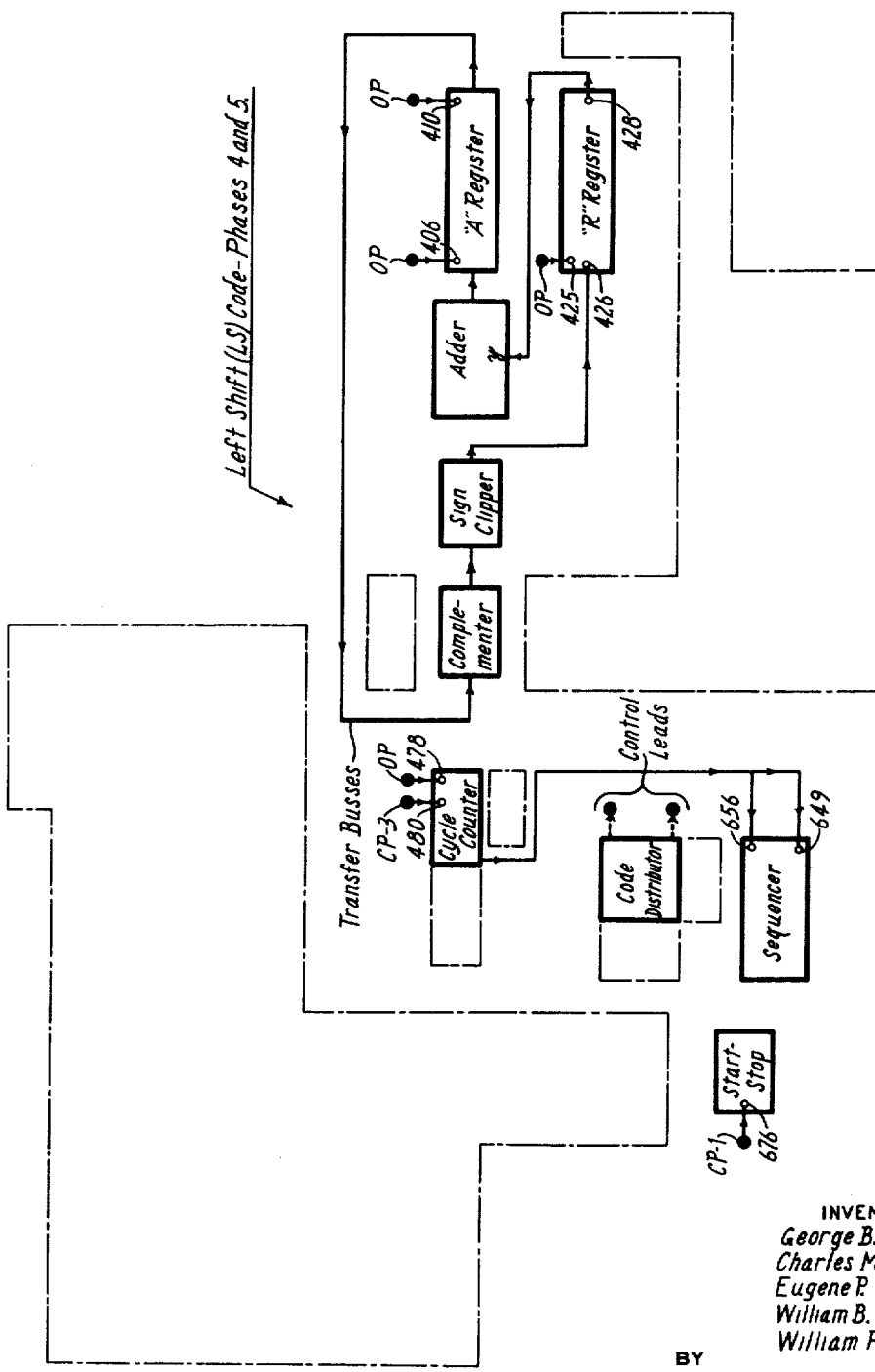

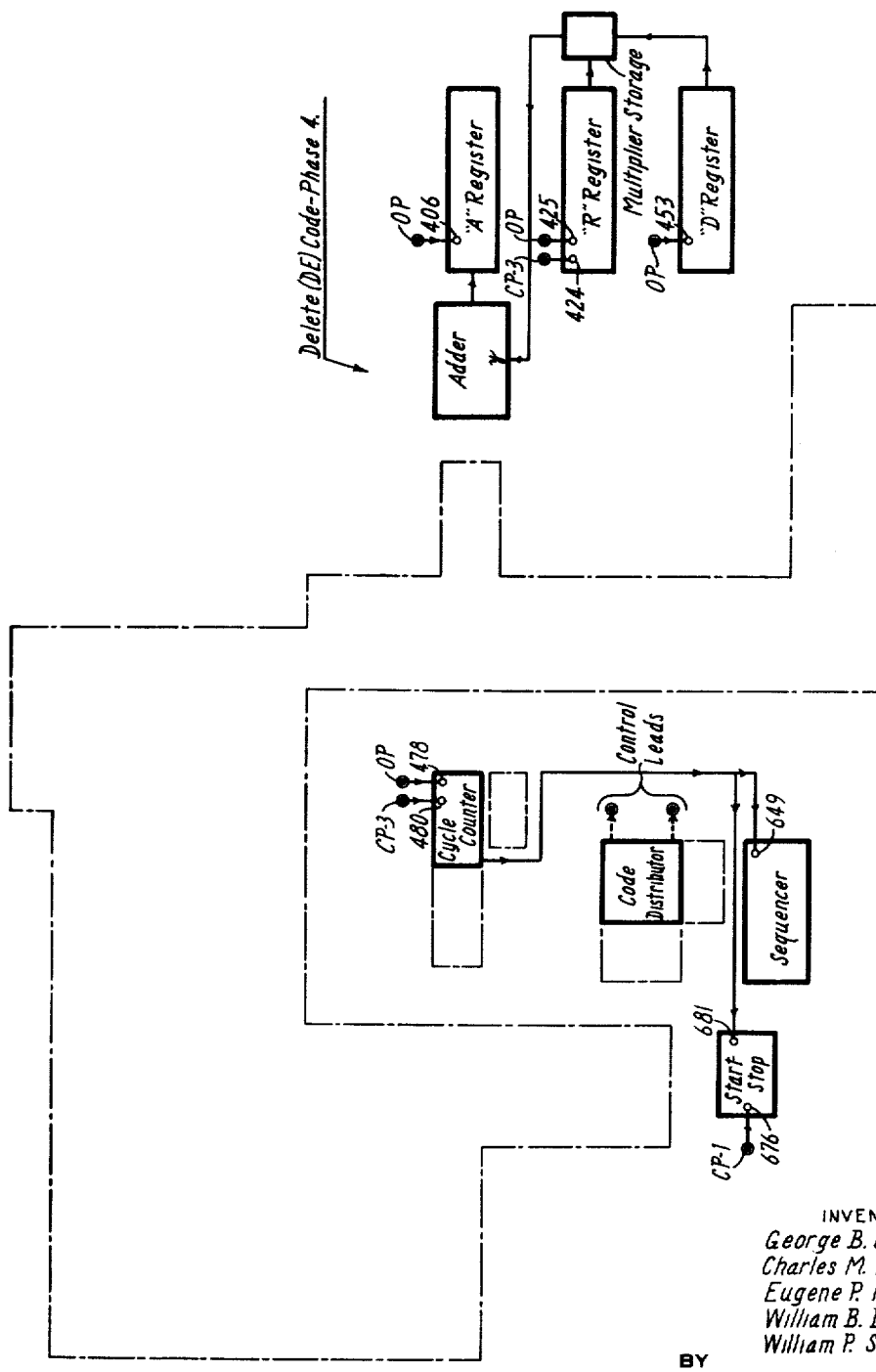

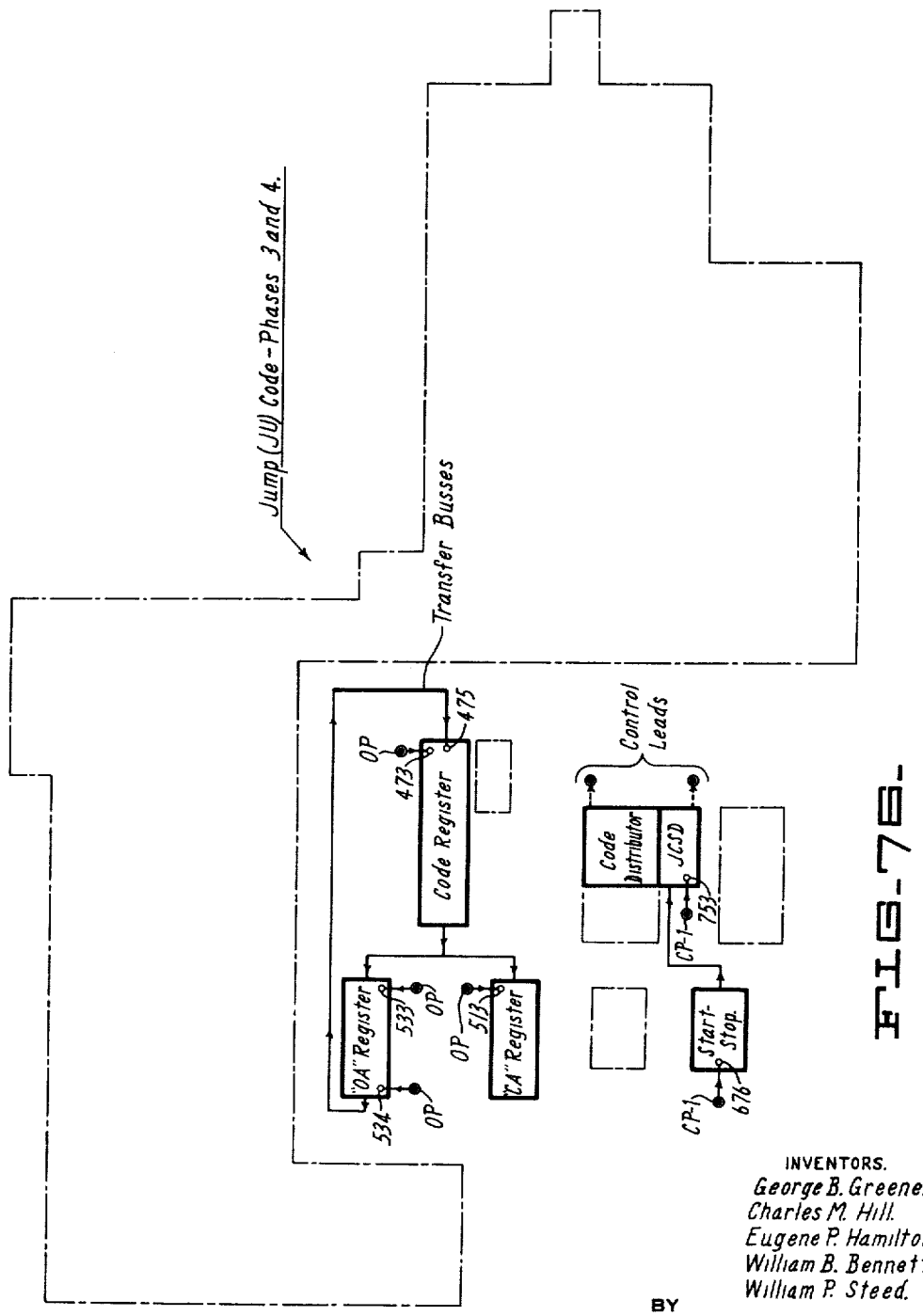

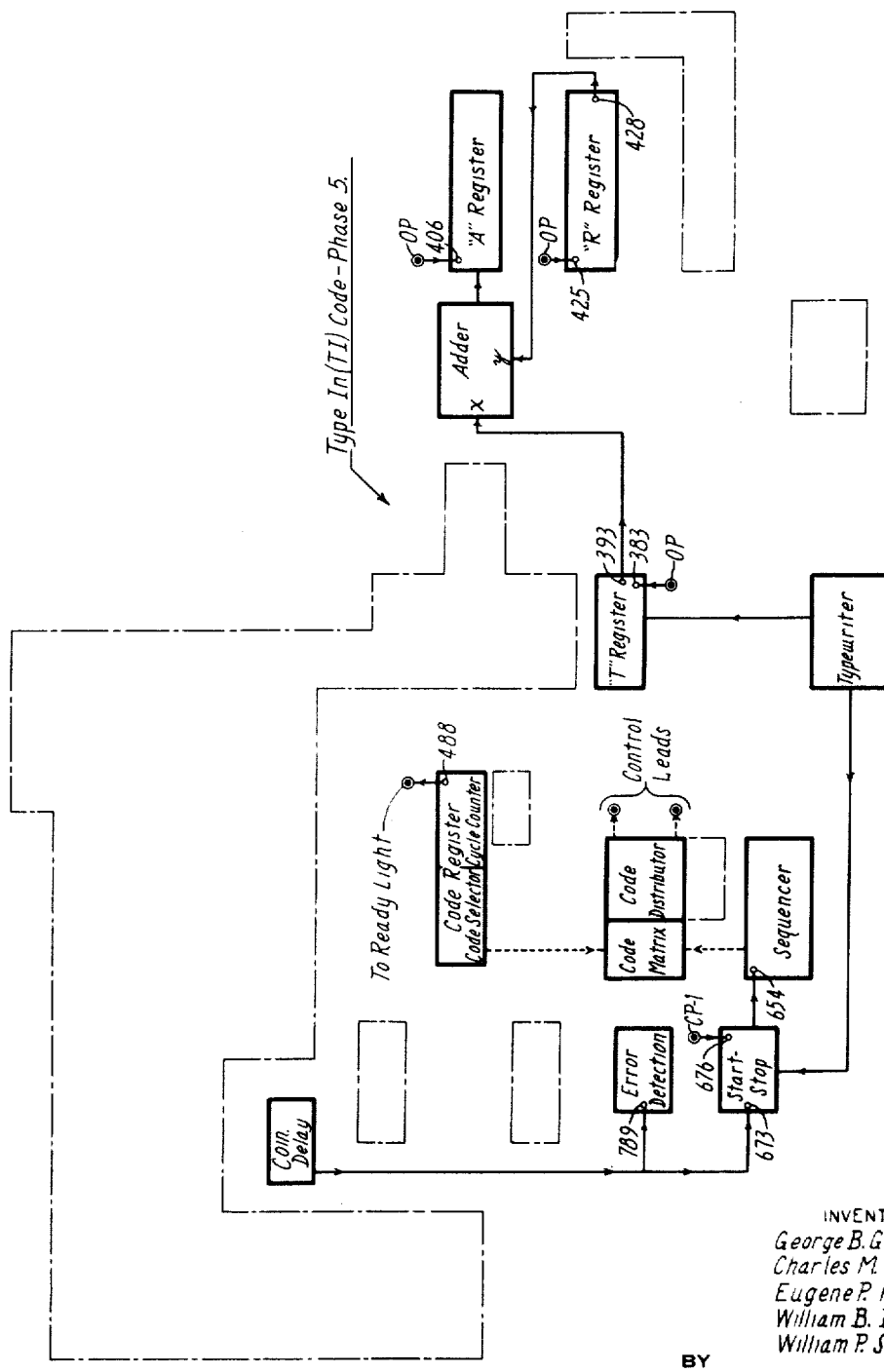

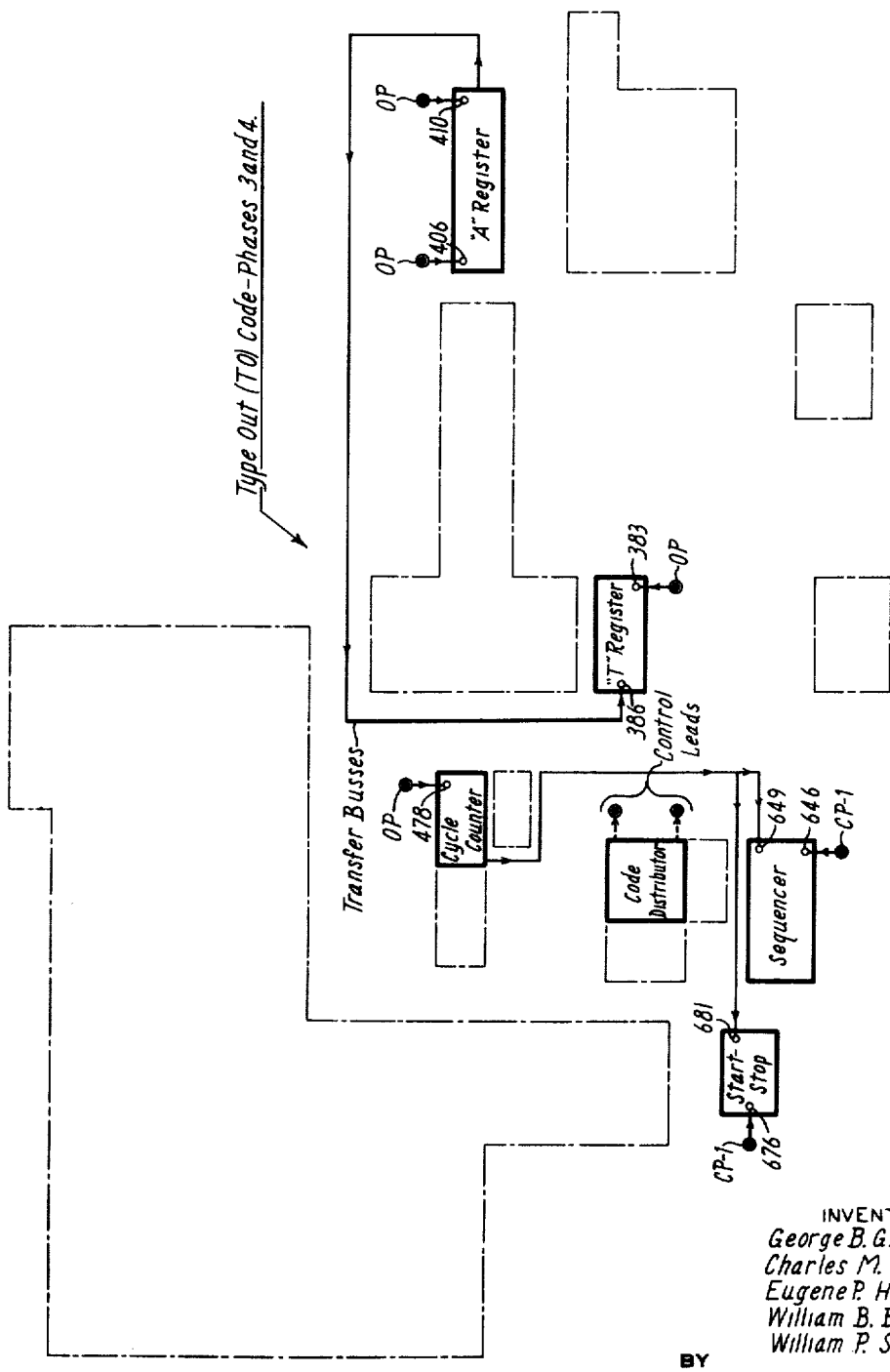

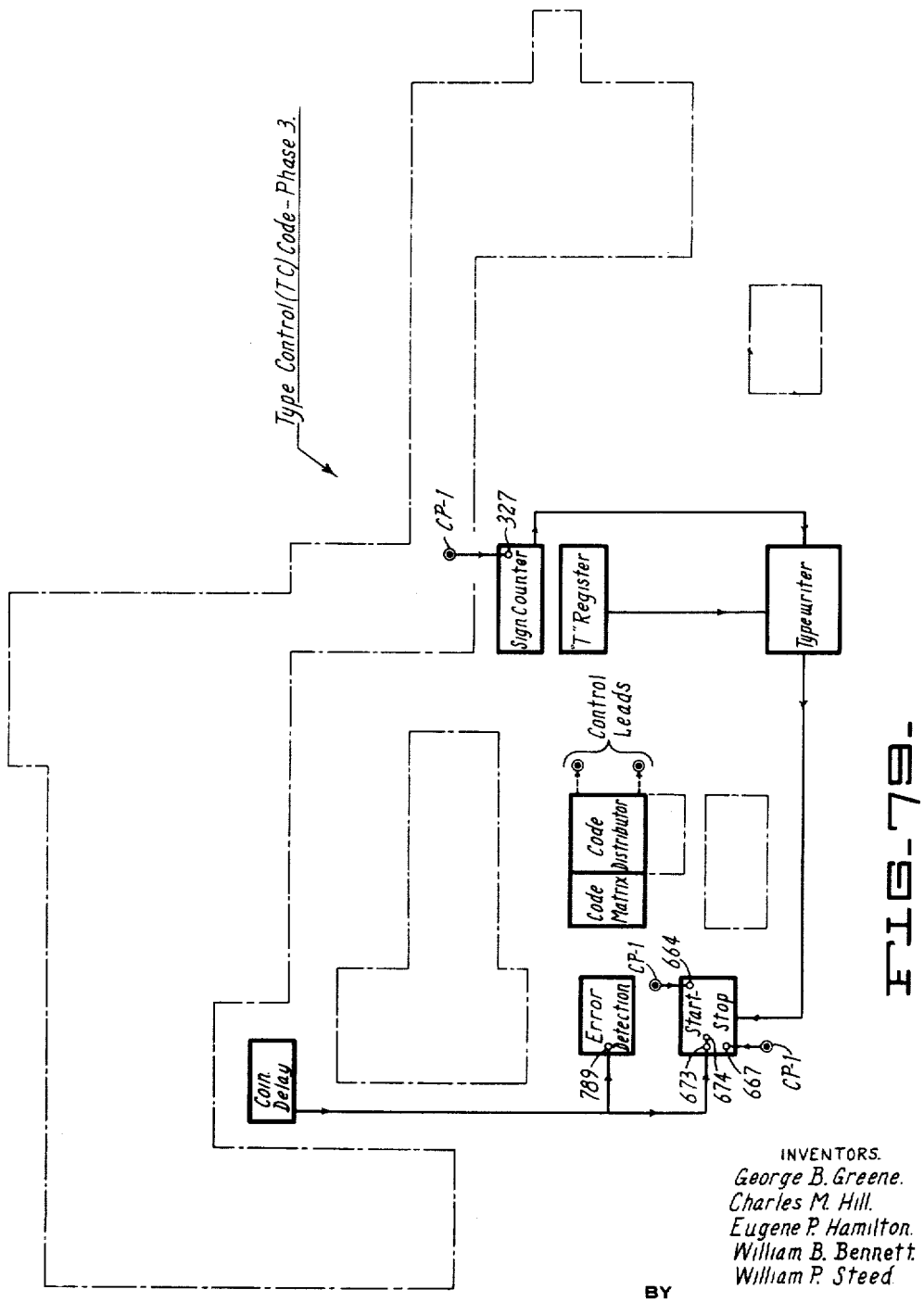

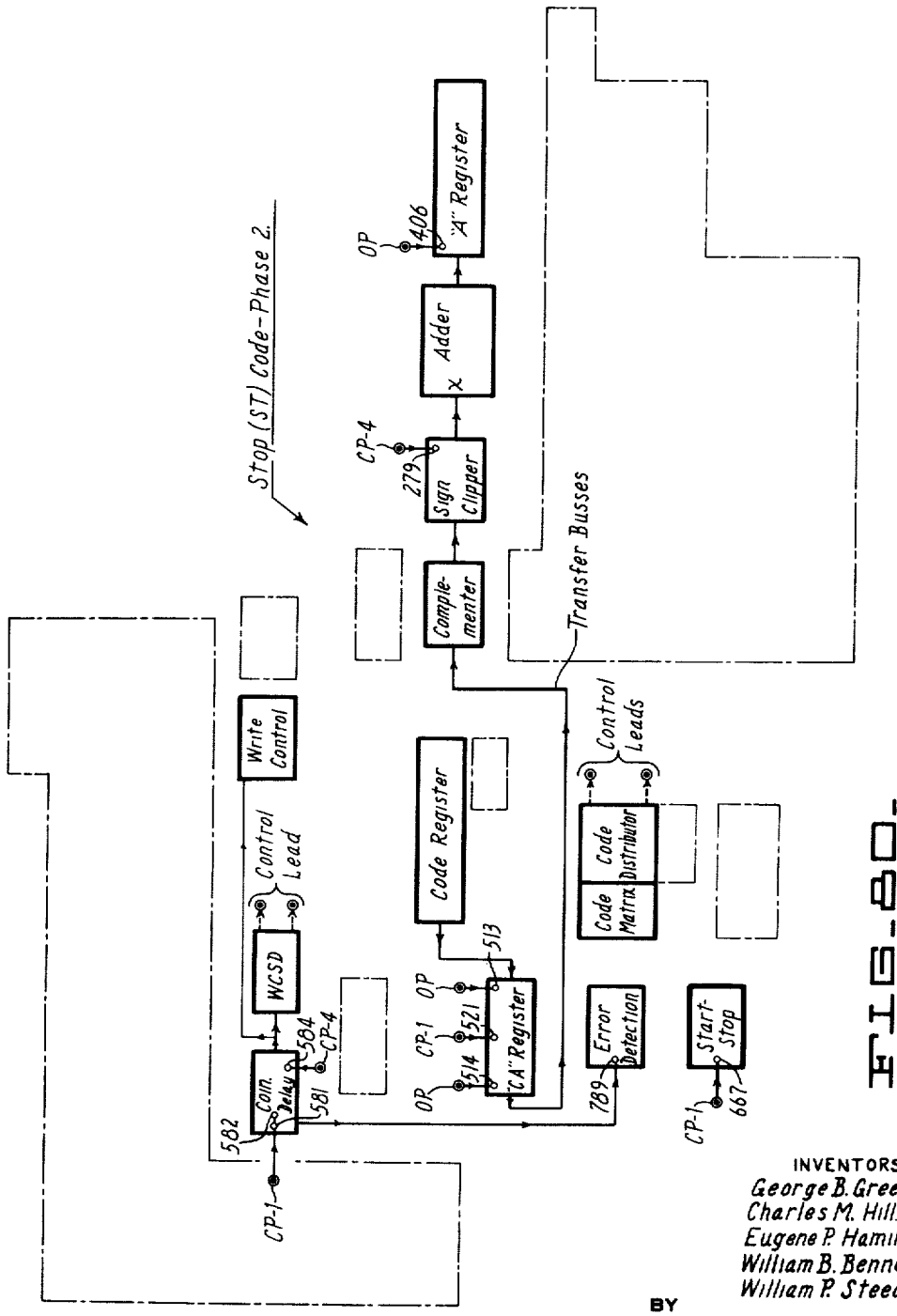

2,936,118

ELECTRONIC DIGITAL COMPUTERS

George B. Greene, Berkeley, Charles M. Hill, Piedmont, Eugene P. Hamilton, Richmond, and William B. Bennett, Berkeley, Calif., and William P. Steed, Philadelphia, Pa., assignors to Marchant Research, Inc., a corporation of California Application September 27, 1954, Serial No. 458,473

11 Claims. (Cl. 235—167)

Table of contents

| | Column |
|---|---|
| Number system | 5 |
| Binary value representations | 5 |
| Series operation | 6 |
| Timing | 6 |
| Circuit elements | 7 |
|   In general | 7 |
|   Triode amplifier | 7 |
|   Phase inverter | 7 |
|   Cathode follower | 7 |
|   Diode gate | 8 |
|   Triode gate | 8 |
|   Cathode follower gate | 9 |
|   Pentode gate | 9 |
|   "And" gate | 9 |
|   Delay circuit | 9 |
|   Bistable circuit | 9 |
|   Univibrator | 10 |
|   Schmidt trigger | 11 |
|   Coincidence gate | 12 |
|   Sector coincidence amplifier | 12 |
|   Shift register | 12 |
|   Binary counter | 13 |
| General description | 14 |
|   Computer sections | 14 |
|   Memory section | 14 |
|   Timing section | 14 |
|   Transfer section | 15 |
| Arithmetic section | 15 |
|   Address section | 18 |
|   Program section | 20 |
| Memory section | 22 |
|   Memory drum | 22 |
|   Read-write heads | 23 |
| Timing section | 23 |
|   Clock pulse generator | 23 |
|   Clock pulse distributor | 24 |
| Transfer section | 25 |
|   Read-write amplifiers | 25 |
|   Band group amplifiers | 27 |
|   Write control circuit | 27 |
|   Interpreter | 28 |
| Arithmetic section | 33 |
|   Complementer | 33 |
|   Sign clipper | 35 |
|   Digit delay circuit | 35 |
|   Sign counter | 36 |
|     In general | 36 |
|     Delayed sign count | 37 |
|     Overflow and non-overflow input | 37 |
|     Sign count of 0 | 38 |
|     Sign count of 1 | 38 |
|     Sign count of 2 | 39 |
|     Result complementing control | 39 |
|     Sign digit readout | 40 |
|     Typewriter control and sign | 40 |
|   Adder | 40 |
|   "T" register | 42 |
|   Arithmetic registers | 43 |
|     In general | 43 |
|     "A" register | 43 |
|     "R" register | 43 |
|     "D" register | 43 |
|   Multiplier storage circuit | 44 |
| Address section | 44 |
|   Code register | 44 |
|   Command address register | 44 |
|   Operand address register | 46 |
|   Memory control register | 46 |
|   Sector counter | 46 |
|   Sector coincidence circuit | 47 |
|   Coincidence delay circuit | 47 |
|   Band matrix | 48 |
| Program section | 49 |
|   Cycle counter | 49 |
|   Code selector | 51 |
|   Sequencer | 51 |
|   Start-stop circuit | 53 |
|   Code matrix | 55 |
|   Code distributor | 57 |
|   Write code supplementary distributor | 57 |
|   Jump code supplementary distributor | 58 |
|   Overflow stop circuit | 58 |
|   Error detection circuit | 59 |

| | Column |
|---|---|
| Codes | 60 |
|   In general | 60 |
|   Phase 1 (all codes) | 60 |
|   Read (AR) code | 61 |
|     In general | 61 |
|     Phase 3 | 61 |
|     Manual stop | 62 |
|   Write (ME) code | 62 |
|     In general | 62 |
|     Phase 2 | 62 |
|     Phase 3 | 63 |
|     Phase 5 | 64 |
|   Add (AD) code | 64 |
|     In general | 64 |
|     Phase 2 | 64 |
|     Phase 3 | 65 |
|     Phase 4 | 65 |
|   Subtract (SU) code | 66 |
|   Compare (CS) code | 66 |
|   Multiply (MU) code | 67 |
|     In general | 67 |
|     Phase 2 | 67 |
|     Phase 3 | 67 |
|     Phase 4 | 67 |
|   Multiply-with roundoff (MV) code | 68 |
|     In general | 68 |
|     Phase 5 | 69 |
|   Roundoff (RO) code | 69 |
|   Right shift (RS) code | 69 |
|     In general | 69 |
|     Phase 3 | 70 |
|     Phase 4 | 70 |
|   Left shift (LS) code | 70 |
|     In general | 70 |
|     Phase 3 | 71 |
|     Phase 4 | 71 |
|     Phase 5 | 71 |
|   Delete (DE) code | 71 |
|     In general | 71 |
|     Phase 4 | 72 |
|   Jump (JU) code | 72 |
|     In general | 72 |
|     Phase 3 | 73 |
|     Phase 4 | 73 |
|   Type in (TI) code | 73 |
|     In general | 73 |
|     Phase 5 | 73 |
|   Alternate type in code | 74 |
|   Type out (TO) code | 74 |
|     In general | 74 |
|     Phase 3 | 74 |
|     Phase 4 | 75 |
|   Type control (TC) code | 75 |
|     In general | 75 |
|     Phase 3 | 75 |
|   Stop (ST) code | 76 |
|     In general | 76 |
|     Phase 2 | 76 |
|   Director subroutine | 77 |

The present invention relates to computers, and more particularly concerns an electronic digital computer.

Large-scale digital computers which are known in the art process and store large quantities of data which can be represented in digital form. Such computers are bulky and expensive, they consume a large amount of electrical power, and they employ so many components that they must be repaired often and are therefore frequently unavailable for operation.

Smaller, less complex digital computers have been designed to overcome some of the above difficulties, but these are generally too slow in operation to be of comparable value in processing large quantities of data, and many of the smaller computers are disproportionately expensive and unreliable.

It is therefore a primary object of the present invention to provide a relatively small and simple electronic digital computer which is reliable and fast in operation.

Other objects of the invention are:

To introduce decimal values into a binary-operation computer by converting each successive decimal digit to its equivalent binary values, and adding the converted values in their proper ordinal relationship.

To provide an improved gated amplifier circuit for cooperation with a magnetic transducing head.

To provide an improved circuit for shaping writing pulses which are employed for driving a magnetic transducing head.

To provide an improved circuit for complementing conventional binary values expressed as serial pulse trains.

To provide improved means for counting machine cycles during a computer operation for controlling the continued progress of said operation.

To provide an improved circuit for selecting a computer operation.

To provide an improved circuit for locating addresses in a computer memory.

To provide an improved circuit for sequencing the operations of a computer.

To select a computer operation for the duration of a predetermined time interval, and to initiate a plurality of seriatim control phases during said time interval for producing unique sets of control signals during each control phase.

To provide an improved circuit for automatically starting a second computer operation in response to the termination of a first computer operation.

To selectively set up any of a plurality of machine operations in a computer, and to generate a signal indicating the setting up of a predetermined one of said operations.

To provide an improved circuit for distributing control voltages in a computer.

To provide an improved circuit for detecting an overflow or non-overflow condition in a computer register and for stopping or continuing the computer operation in response to said overflow or non-overflow condition as required by the mathematical significance of such an overflow or non-overflow condition.

To provide an improved error-detection circuit in a computer.

To provide, in a serial, single-address digital computer, means for transferring from the computer memory to a predetermined single register, the first operand in any of a plurality of mathematical operations.

Other objects of the invention will appear from the following description, reference being made to the accompanying drawings, in which:

Fig. 1 is a schematic diagram of a typical triode amplifier;

Fig. 2 is a block diagram employed to represent the triode amplifier shown in Fig. 1;

Fig. 3 is a schematic diagram of a typical phase inverter;

Fig. 4 is a block diagram employed to represent the phase inverter shown in Fig. 3;

Fig. 5 is a schematic diagram of a typical cathode follower;

Fig. 6 is a block diagram employed to represent the cathode follower shown in Fig. 5;

Fig. 22 is a schematic diagram of a typical univibrator;

Fig. 23 is a block diagram employed to represent the univibrator shown in Fig. 22;

Fig. 24 is a schematic diagram of a typical Schmidt trigger;

Fig. 25 is a block diagram employed to represent the Schmidt trigger shown in Fig. 24;

Fig. 26 is a schematic diagram of a typical coincidence gate;

Fig. 27 is a block diagram employed to represent the coincidence gate shown in Fig. 26;

Fig. 28 is a schematic diagram of the sector coincidence amplifier;

Fig. 29 is a block diagram employed to represent the sector coincidence amplifier shown in Fig. 28;

Fig. 30 is a block diagram of a typical shift register;

Fig. 31 is a block diagram of a typical cascade binary counter;

Fig. 32 is an overall block diagram if the computer;

Fig. 35 is a block diagram of the Clock Pulse Generator and Clock Pulse Distributor;

Fig. 36 is a schematic diagram of a typical Read-Write Amplifier;

Fig. 37 is a schematic diagram of a typical Band Group Amplifier;

Fig. 38 is a block diagram of the Write Control Circuit;

Fig. 39 is a block diagram of the interpreter;

Fig. 39A is a diagram of certain wave forms in the Interpreter;

Fig. 40 is a block diagram showing the Complementer, the Sign Clipper, the Digit Delay Circuit, and the Sign Counter;

Fig. 43 is a drawing layout illustrating the manner in which

Fig. 44 is a drawing layout illustrating the manner in which

Fig. 45 is a block diagram of the Cycle Counter;

Fig. 46 is a block diagram of the Code Selector;

Fig. 52 is a partially schematic and partially block diagram of the Code Matrix;

Fig. 53 is a partially schematic and partially block diagram of a first part of the Code Distributor;

Fig. 54 is a partially schematic and partially block diagram of the remaining part of the Code Distributor;

Fig. 60 is a partial block diagram of the computer illustrating Phases 2 and 3 of the Write Code;

Fig. 61 is a partial block diagram of the computer illustrating Phase 5 of the Write Code;

Fig. 62 is a partial block diagram of the computer illustrating Phase 2 of the Add, Subtract and Compare Codes;

Fig. 63 is a partial block diagram of the computer illustrating Phase 3 of the Add Code;

Fig. 64 is a partial block diagram of the computer illustrating Phase 4 of the Add Code;

Fig. 65 is a partial block diagram of the computer illustrating Phase 3 of the Subtract Code;

Fig. 67 is a partial block diagram of the computer illustrating Phase 2 of the Multiply, Multiply-With-Roundoff, and Compare Codes;

Fig. 68 is a partial block diagram of the computer illustrating Phase 3 of the Multiply, Multiply-With-Roundoff, and Compare Codes;

Fig. 69 is a partial block diagram of the computer illustrating Phase 4 of the Multiply Code;

Fig. 71 is a partial block diagram of the computer illustrating Phase 5 of the Multiply-With-Roundoff Code;

Fig. 72 is a partial block diagram if the computer illustrating Phases 3 and 4 of the Right Shift Code;

Fig. 73 is a partial block diagram of the computer illustrating Phase 3 of the Left Shift Code;

Fig. 74 is a partial block diagram of the computer illustrating Phases 4 and 5 of the Left Shift Code;

Fig. 75 is a partial block diagram of the computer illustrating Phase 4 of the Delete Code;

Fig. 76 is a partial block diagram of the computer illustrating Phases 3 and 4 of the Jump Code;

Fig. 77 is a partial block diagram of the computer illustrating Phase 5 of the Type In Code;

Fig. 78 is a partial block diagram of the computer illustrating Phases 3 and 4 of the Type Out Code;

Fig. 79 is a partial block diagram of the computer illustrating Phase 3 of the Type Control Code; and Fig. 80 is a partial block diagram of the computer illustrating Phase 2 of the Stop Code.

Figure 7:
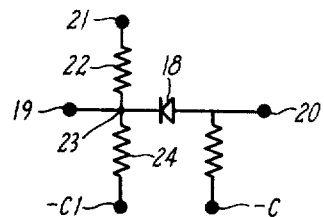
Fig. 7 is a schematic diagram of a typical diode gate.

Although the following description of a specific embodiment of the invention often refers to exact values, as regards numbers of stages in a register, pulse repetition rates and the like, it is to be understood that these values are merely illustrative. Such values may be varied, thereby adapting the computer to specific requirements, without departing from the scope of the invention.

NUMBER SYSTEM

The computer hereinafter described is a digital computer, as opposed to an analog computer, i.e., it processes and stores representations of discrete digital values. These values are expressed, in the computer, in various representations of the conventional binary system of notation. The conventional binary system employs only the digits 0 and 1, any ordinal digit 0 having an equivalent decimal value of 0 and any ordinal digit 1 having an equivalent decimal value of $2^{n-1}$, where $n$ is the order number. For ease of understanding, binary values stored or processed in the computer will often be referred to as their decimal equivalents in the following description.

BINARY VALUE REPRESENTATIONS

Binary values are represented in the present computer in any of four forms. A first form is employed on the Memory Drum, on which a selected area of a continuous magnetic medium is saturated in one direction of magnetization to represent a digit 0 and in the opposite direction to represent a digit 1. A multidigit binary number is represented by a series of such areas. All of the magnetized areas that are employed to represent a given multidigit number are successively contiguous; therefore, a change in the direction of magnetization occurs only where there is a change in value as between two successive digits.

A second form of value representation is employed in the Read-Write Amplifiers, wherein a positive pulse represents a change in digital value from 0 to 1, as between two successive digits, and a negative pulse represents a change in digital value from 1 to 0. Obviously, the polarities of these two pulses may be reversed, as long as they remain opposite each other.

A third form of value representation is employed in the Transfer Busses wherein a pulse on a first bus represents a 0 and a pulse on a second bus represents a 1. These pulses may be either positive or negative, depending on the polarity of pulses required for operating a particular computer circuit.

Some of the circuit units which receive information from the Transfer Busses are adapted to respond to a fourth form of value representation, wherein the presence of a pulse represents a 1 and the absence of a pulse (at a time and place where a digit is being operated upon) represents a 0. Circuit units of this nature therefore receive pulses from only the 1's Transfer Bus. It is obvious that a reverse arrangement is possible wherein the presence of a pulse represents a 0 and the absence of a pulse represents a 1.

For convenience of description, the pulses which represent individual binary digits, and the groups of pulses which represent multidigit binary numbers, will often be referred to hereinafter as the respective digits or multidigit numbers themselves.

SERIES OPERATION

The digital computer which embodies the present invention is primarily a "serial" computer, i.e., successive digits of a multidigit binary number are expressed seriatim while they are being transferred between circuit units of the computer. There are a few transferring operations, hereinafter described, wherein all digits of a multidigit number are transferred between two circuit units simultaneously, or "in parallel."

TIMING

The computer of the present invention is timed by a special Memory section which is designated the "Clock Track," and which generates periodic timing signals. These signals ultimately control a Clock Pulse Distributor which, along with the Clock Track of Memory, will be described in detail hereinafter. The output of the Clock Pulse Distributor comprises four sequential control pulses, designated "CP–1," "CP–2," "CP–3" and "CP–4," respectively, followed by a train of twenty-six pulses, designated "operating pulses" or "OP's." The pulse pattern of four CP's followed by twenty-six OP's is repeated cyclically throughout the computer operation. Each of the four CP's is transmitted on a separate output lead from the Clock Pulse Distributor to the various computer circuits which require a control pulse at that time for any of a number of control operations, described hereinafter. Each train of OP's is transmitted on a fifth output lead from the Clock Pulse Distributor to various computer circuits for causing shifting operations or the like.

The successive pulses in a train of OP's may be gated to represent the respective digits of a multidigit binary number, in which case the resulting number contains twenty-six digits and is designated a "word." A word may constitute an operand, and the sign of that operand is represented by a twenty-seventh digit which is coincident with the CP–4 preceding the word. A minus sign is represented by a digit 1 and a plus sign is represented by a digit 0. Alternatively, a word may represent a "command" which has no sign digit. A command includes an "address" in Memory (comprising the twelve least significant digits), a "code" (comprising the next six digits), and eight additional digits which may be used for certain counting operations, hereinafter described.

The time interval between two successive digits of a word is designated a "digit interval," and has a duration of approximately five microseconds. Because of various delays employed in the computer circuits, a pulse representing a digit may occur at any time during its related digit interval. The expression "word interval" will be used to designate a time period embracing the thirty digit intervals which include each set of four CP's and the related train of twenty-six OP's.

CIRCUIT ELEMENTS

In general

The following circuit elements are intended to illustrate the types of basic elements which are employed as "building blocks" in the present computer. The specific elements shown and described are by no means the only ones of their types that can be incorporated successfully into the computer circuits, but each element described has been found to operate reliably in the circuits where it is used.

Triode amplifier

One of the circuit elements employed in the present invention is a triode amplifier, an example of which is shown in Fig. 1. Input signals are applied to the grid of the amplifier through a terminal 10. The grid is connected through a terminal —C to a source of bias potential. The potential of terminal —C can be chosen low enough to normally bias the tube below cutoff for class B or class C operation in which case only positive input pulses are amplified. Alternatively, the potential of terminal —C can be chosen high enough to normally bias the tube to conduction for class A operation, in which case both positive and negative input pulses are amplified. Output signals from the amplifier are derived across a resistive anode impedance 11 through an output terminal 12. It is well known that the output signal from such an amplifier is reversed in polarity from the input signal. Fig. 2 illustrates the block representation of the triode amplifier, as shown in the drawings of the computer circuits.

Phase inverter

A modification of the triode amplifier is a phase inverter, an example of which is shown in Fig. 3. The phase inverter is identical to the triode amplifier except its output signals are taken from a pair of terminals 14 which are connected to opposite ends of the secondary winding of a transformer 13. The primary winding of transformer 13 constitutes the anode impedance of the triode. By connecting a selected one of the terminals 14 to a reference potential, the remaining terminal 14 may be employed for delivering an output signal either of the same polarity as the input signal or of opposite polarity, depending upon which terminal 14 is connected to the reference potential. If a terminal 14 is used for delivering a signal of the same polarity as the input signal, a terminal 12 connected directly to the anode may be used for delivering an output signal of opposite polarity. Alternatively, the second winding of transformer 13 may be center-tapped to a reference potential, and both terminals 14 may then be employed, thereby providing two output signals of opposite polarity. Fig. 4 illustrates a block diagram of the phase inverter as shown in the drawings of the computer circuits.

Cathode follower

A further circuit element employed in the present invention is a cathode follower, an example of which is shown in Fig. 5. The cathode follower is a triode current amplifier which receives input signals applied to its grid through an input terminal 15, and which delivers output signals, in phase with the input signals, across a cathode impedance 16. The cathode follower, like the triode amplifier, can be biased for either class A operation or for class B or C operation, depending on the value of a bias potential which may be applied to the grid through a terminal —C. Fig. 6 illustrates the block diagram of the cathode follower as shown in the drawings of the computer circuits.

Diode gate

A first type of gating circuit employed in the present invention is a diode gate, an example of which is shown in Fig. 7. This gate includes a diode 18 which is oriented to transmit only negative pulses from an input terminal 19 to an output terminal 20. In order for a diode to transmit a negative pulse, however, the potential of its cathode must fall below the potential of its anode for the duration of the pulse. Therefore, negative input pulses may be prevented from passing through a diode by maintaining the potential of its cathode higher than that of its anode by an amount at least equal to the amplitude of the input pulses. The diode gate shown in Fig. 7 is adapted for selectively blocking or passing negative pulses by maintaining the anode of diode 18 at a fixed bias potential —C and by applying a selectively high or low bias potential to its cathode through a potential divider comprising an arming terminal 21 in series with a first resistor 22, a junction 23 connected to the cathode, a second resistor 24 and a source of bias potential —$C_1$. A selectively high or low potential may be applied to the arming terminal 21 by any of several means, such as by connecting it to one anode of a flip-flop circuit, hereinafter described. When terminal 21 is at its high potential, junction 23 is at a potential which is sufficiently high for blocking the negative input pulses applied to terminal 19, and the diode gate is said to be "closed." When terminal 21 is at its low potential, junction 23 is at a potential which is sufficiently low for transmitting the negative input pulses, and the gate is said to be "armed."

Figure 8:
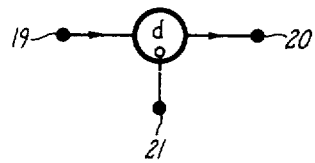
Fig. 8 is a block diagram employed to represent the diode gate shown in Fig. 7.

Fig. 8 shows the block form of the diode gate as used in the computer circuit diagrams. In Fig. 8, as well as in the remaining block diagrams, a control lead is shown as a broken line and a pulse lead is shown as a solid line. Therefore, in Fig. 8 the arming lead connected to terminal 21 is shown as a broken line, and the input and output leads are shown as solid lines. It is noted that the diode gate, as well as the cathode follower gate hereinafter described, can be employed for gating D.C. potential levels as well as pulses. In such cases, the input and output leads are shown as broken lines in the block representations of the gates. For the purposes of the present invention, a square gating pulse of relatively long duration will be treated as an adjustable D.C. gating potential.

Triode gate

Figure 9:
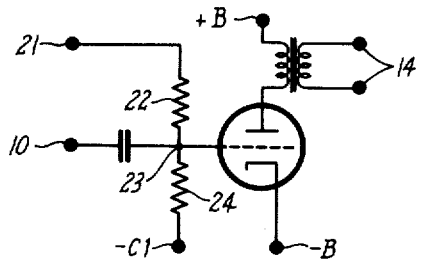
Fig. 9 is a schematic diagram of a typical triode gate.
Figure 10:
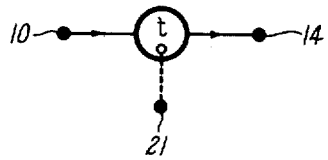
Fig. 10 is a block diagram employed to represent the triode gate shown in Fig. 9.

A second type of gate employed in the invention is a triode gate, an example of which is shown in Fig. 9. This gate comprises a simple triode amplifier of the type previously described in connection with Fig. 1, having its control grid biased through the potential divider including arming terminal 21 (Fig. 9), resistor 22, junction 23, resistor 24 and terminal —$C_1$. The triode gate is adapted to selectively pass or block positive signals applied to its input terminal 10. The bias potential —$C_1$ and the arming potentials applied to terminal 21 are chosen such that when terminal 21 is at its low potential, the grid potential of the amplifier is below cutoff level by an amount exceeding the amplitude of the positive signals applied to terminal 10, and the gate is closed. When terminal 21 is at its high potential, the grid potential of the amplifier is slightly below cutoff, thereby arming the gate for amplifying positive signals applied to terminal 10. Fig. 10 shows the block representation of the triode gate, as employed in the computer circuit diagrams.

Cathode follower gate

Figure 11:
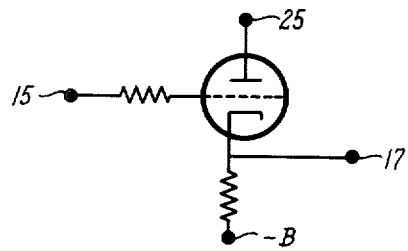
Fig. 11 is a schematic diagram of a typical cathode follower gate.
Figure 12:
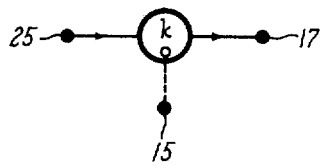
Fig. 12 is a block diagram employed to represent the cathode follower gate shown in Fig. 11.

A third type of gate employed in the present invention is a cathode follower gate, an example of which is shown in Fig. 11. This gate includes a cathode follower of the type described in relation to Fig. 5. The cathode follower gate is armed or closed by a relatively high or low potential applied to its grid through terminal 15 (Fig. 11), and receives input signals applied to its anode through a terminal 25. The cathode follower conducts and produces an output signal at terminal 17 only when both input terminals 15 and 25 are at relatively high potentials. Fig. 12 illustrates the block form of the cathode follower gate, as employed in the computer circuit diagrams.

Pentode gate

Figure 13:
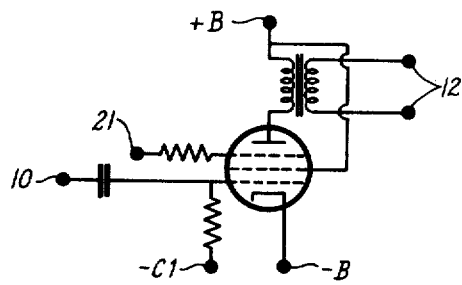
Fig. 13 is a schematic diagram of a typical pentode gate.
Figure 14:
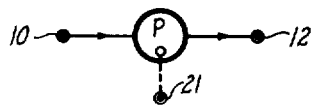
Fig. 14 is a block diagram employed to represent the pentode gate shown in Fig. 13.

A fourth type of gate employed in the present invention is a pentode gate, an example of which is shown in Fig. 13. In this gate, the arming terminal 21 is connected to the suppressor grid of a pentode, and positive input pulses are applied through the input terminal 10 to the control grid. The gate is normally closed by maintaining terminal 21 at its low potential, and a positive pulse applied to terminal 10 fails to cause the pentode to conduct. On the other hand, if terminal 21 is at its high potential, the gate is armed and the positive pulse applied to terminal 10 is amplified in the pentode to produce an output signal as previously described in relation to Figs. 1 and 3. Fig. 14 illustrates the block form of pentode gate, as employed in the computer circuit diagrams.

"And" gate

Any of the previously described gates can be modified to form an "and" gate, which is identical to its related diode, triode or pentode gate except for the arming circuit which provides for two or more arming inputs. All of the arming inputs of the "and" gate must be at a high potential in order to arm the gate.

Figure 15:
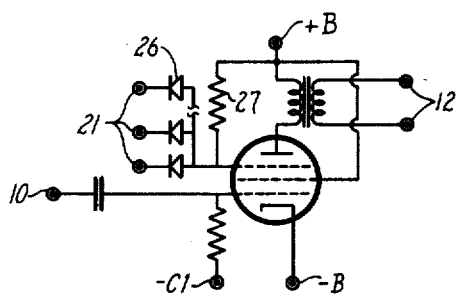
Fig. 15 is a schematic diagram of a typical "and" gate.
Figure 16:
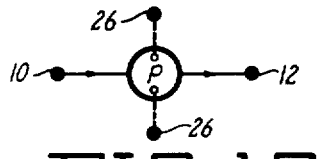
Fig. 16 is a first form of block diagram employed to represent the "and" gate shown in Fig. 15.
Figure 17:
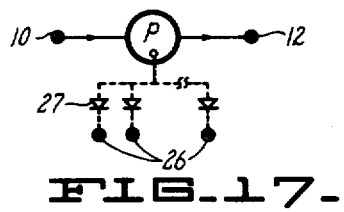
Fig. 17 is a second form of block diagram employed to represent the "and" gate shown in Fig. 15.

Fig. 15 shows a pentode gate modified to form an "and" gate. The arming circuit has two or more input terminals 21, each of which is connected through a respected diode 26 to the suppressor grid of the pentode. The suppressor grid is connected to +B through a resistor 27; therefore, if any terminal 21 is at a low potential, it receives current through its related diode 26 and the resistor 27, thereby causing a potential drop across resistor 27. This maintains the suppressor grid at a low potential and the gate is closed. If all of the arming terminals 21 are maintained at a high potential, there is substantially no current flow through resistor 27 and the suppressor grid is at a high potential, thereby arming the gate. Figs. 16 and 17 illustrate two forms of block diagrams which are employed in the drawings of the computer circuits to represent an "and" gate.

Delay circuit

Figure 18:
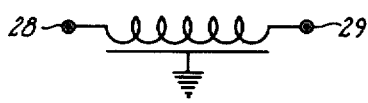
Fig. 18 is a schematic diagram of a typical delay circuit.
Figure 19:
Fig. 19 is a block diagram employed to represent the delay circuit shown in Fig. 18.

A further circuit element employed in the invention is a delay circuit, an example of which is shown schematically in Fig. 18 as a distributed parameter delay line of the type disclosed in Fig. 5 of U. S. Patent No. 2,467,857, issued April 19, 1949, to J. H. Rubel, et al., to which reference is made for a full description. It is to be understood that other delay circuits, such as lumped parameter delay lines may be employed. Pulses applied to an input terminal 28 of the delay line are delayed a few microseconds or a fraction of a microsecond, and appear at an output terminal 29. The block representation of a delay circuit is shown in Fig. 19.

Bistable circuit

A further element employed in the present invention is a bistable circuit such as the well-known Eccles-Jordan trigger circuit, or "flip-flop," described in "Theory and Application of Electron Tubes" by H. J. Reich. In one of its simplest forms, a flip-flop comprises two triode vacuum tubes with the grid of each tube cross-coupled to the anode of the other tube through a respective network comprising a resistor in parallel with a capacitor. One of the two tubes is always conducting while its companion tube is nonconducting, thereby providing a circuit having two stable operating states.

Figure 20:
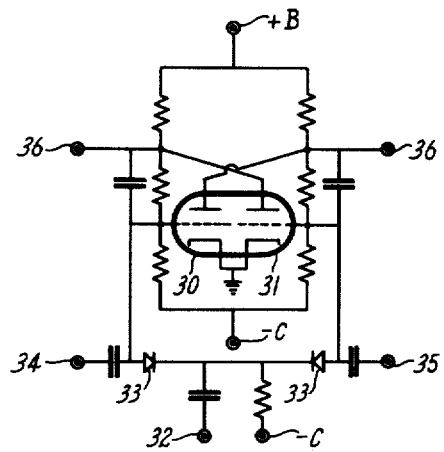
Fig. 20 is a schematic diagram of a typical flip-flop circuit.

A modification of the Eccles-Jordan circuit is shown in Fig. 20, and comprises two triodes 30 and 31, shown for convenience as the two sides of a twin triode. When the left hand section 30, hereinafter referred to as the "0 side," is conducting, the flip-flop is said to be "reset"; when the right hand section 31, hereinafter referred to as the "1 side," is conducting, the flip-flop is said to be "set." Negative pulses may be applied through a "symmetrical" input terminal 32 and a respective diode 33 to the grid of each section 30 and 31. Each symmetrically applied input pulse reverses the state of operation of the flip-flop in a manner well known in the art. If the orientation of each diode 33 is reversed, the flip-flop can be made to respond to positive, rather than negative pulses. Alternatively, an input pulse may be applied through a "set" input terminal 34 or a "reset" input terminal 35. A negative pulse through terminal 34 sets the flip-flop if it does not already stand at 1, while a negative pulse through terminal 35 resets the flip-flop if it is not already standing at 0. On the other hand, a positive pulse applied to terminal 34 or 35 causes the flip-flop to be reset or set, respectively. A diode (not shown) may be inserted in series with each terminal 34 or 35. If each such diode is oriented to transmit only negative pulses to the grid of its related flip-flop section, then terminals 34 or 35 are designated the "reset" and "set" terminals, respectively, in accordance with the previously described effects of negative pulses applied to these terminals.

The flip-flop is adapted to control or operate other devices by means of the changing potential levels on the anodes of its two sections. When the flip-flop stands at 0, the potential of the anode of section 30 is relatively low while the potential of the other anode is relatively high, the converse being true when the flip-flop stands at 1. The change of anode potentials of a flip-flop may be employed for controlling any of the previously described gates by connecting the appropriate anode of the flip-flop to the arming terminal of the gate through a flip-flop output terminal 36. It is also noted that when a flip-flop is reversed from one of its states to the other, a potential rise appears at one of its output terminals 36 and a potential drop appears at the other. These potential changes may be employed for operating other flip-flops or the like.

Figure 21:
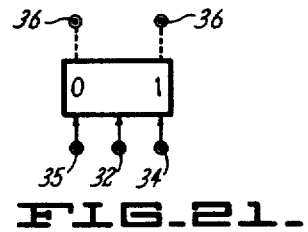
Fig. 21 is a block diagram employed to represent the flip-flop circuit shown in Fig. 20.

In the block diagrams and in the descriptions of the computer circuits, the following convention is adhered to regarding the flip-flop output terminals 36: a gate which is armed by the "0 side," or through the "0 side output terminal" of a flip-flop, has its arming terminal connected to that terminal 36 whose potential is appropriate for arming the gate when the flip-flop stands at 0. A similar convention is used in relation to a gate which is armed by the "1 side," or through the "1 side output terminal" of a flip-flop. If a signal from the "0 side output terminal" is employed for operating a next flip-flop, the output signal is understood to be taken from that terminal 36 which delivers a voltage change in the appropriate direction for operating the next flip-flop when the first flip-flop is reversed from 0 to 1. A similar convention is used in relation to a flip-flop which is operated in response to a change of state, from 1 to 0, of a previous flip-flop. The block representation of a flip-flop is shown in Fig. 21.

Univibrator

A further element employed in the invention is a one-shot multivibrator, or "univibrator," an example of which is shown in Fig. 22. This circuit is employed for producing square pulses of either polarity, but of equal width, in response to receiving input pulses of varying duration. The univibrator is fully described in the aforementioned publication by Reich.

Briefly, the univibrator comprises a pair of triode vacuum tubes 40 and 41, shown for convenience as the two sections of a twin triode. The anode of section 40 is cross-coupled to the grid of section 41 by a resistor 42, while the anode of section 41 is cross-coupled to the grid of section 40 by a variable capacitor 43. The circuit parameters are chosen such that section 40 is normally conducting and section 41 is normally nonconducting. By virtue of the cross-coupling circuits, only one section may be conducting at a time, the arrangement being similar in this respect to that of the flip-flop previously described.

A negative triggering pulse may be applied to the grid of section 40 through an input terminal 44, and cuts off section 40, thereby causing section 41 to conduct. The conduction of section 41 reduces the charge on capacitor 43, but this capacitor is recharged through a resistor 45. When capacitor 43 has recharged to a value which is determined by the circuit parameters, section 40 is caused to reconduct and section 41 is cut off. The reversing of sections 40 and 41 from conduction to nonconduction and vice versa occurs rapidly, and the anode potentials of these sections rise and fall sharply. Consequently, the output from the anode of section 41 is a substantially square negative pulse which may be applied to any desired circuit through an output terminal 46, and the output from the anode of section 40 is a substantially square positive pulse which may be applied to other circuits through an output terminal 47. The width of the output pulses may be controlled by varying the value of capacitor 43 to thereby vary the amount of time required to recharge that capacitor to the extent necessary for causing section 40 to reconduct. Fig. 23 illustrates the block diagram which is employed to represent a univibrator in the drawings of the computer circuits.

Schmidt trigger

Another element employed in the invention is a Schmidt trigger, an example of which is shown in Fig. 24. This circuit, like the univibrator previously described, is employed as a pulse generator; but unlike the univibrator, the Schmidt trigger produces an output pulse having a duration which depends upon the duration of the input signal.

Referring to Fig. 24, the Schmidt trigger comprises two triode vacuum tubes 50 and 51, which are shown for convenience as the two sections of a twin triode. The anode of section 50 is cross-coupled to the grid of section 51, and both cathodes are returned to a source of reference potential through a single pair of resistors 52 and 53 arranged in series. Section 51 is normally biased to conduction, while section 50 is normally biased to nonconduction. Positive input signals are applied to the grid of section 50 through an input terminal 54. Whenever the amplitude of the input signal is sufficiently high to bias section 50 to conduction, the anode voltage of section 50 drops, thereby coupling a negative pulse to the grid of section 51 for cutting off the latter section. When the amplitude of the input signal again drops below the cutoff potential for section 50, that section is cut off and its rising anode potential causes section 51 to again conduct. The changes from conduction to nonconduction, and vice versa, of section 51 are rapid, and the anode potential of that section therefore rises and falls sharply, producing a substantially square positive pulse at an output terminal 55. The block representation of the Schmidt trigger is shown in Fig. 25.

Coincidence gate

A further circuit employed in the invention is a coincidence gate which is adapted to pass an input pulse when both of two related flip-flops stand either at 0 or at 1.

Referring to Fig. 26, the coincidence gate comprises a pair of "and" gates, one "and" gate for detecting a 0 condition in both of two flip-flops 56 and 57, and the other "and" gate for detecting a 1 condition in both of the two flip-flops. The 0 side output terminals of the two flip-flops are connected to opposite ends of a first voltage divider comprising a pair of resistors 58 and 59, and the 1 side output terminals of the flip-flops are connected to opposite ends of a second voltage divider comprising a pair of resistors 62 and 63. The midpoint of each voltage divider is connected to the cathode of a respective diode 60 or 61, shown for convenience as the two sections of a twin diode. The anodes of both diodes are connected to +B through a single resistor 64. An input terminal 65 is capacitively coupled to the midpoint of each voltage divider, and an output terminal 66 is connected to the anodes of both diodes. If both flip-flops stand at 0, then both ends of the voltage divider comprising resistors 58 and 59 are at a low potential, and a negative pulse applied to the input terminal 65 lowers the midpoint voltage of that voltage divider sufficiently to cause section 60 to conduct, thereby producing a negative output pulse at terminal 66. Similarly, if both flip-flops stand at 1, a negative input pulse causes section 61 to conduct, also producing a negative output pulse at terminal 66. If, on the other hand, one flip-flop circuit stands at 0 and the other stands at 1, one end of each potential divider is at a relatively high potential and the midpoint of each potential divider is therefore at a relatively high potential, thereby preventing a negative input pulse applied to terminal 65 from causing either section 60 or 61 to conduct, and no output signal appears at terminal 66. The block diagram of the coincidence gate is shown in Fig. 27.

Sector coincidence amplifier

A further element employed in the invention is a sector coincidence amplifier shown in Fig. 28. This amplifier comprises two triode stages 68 and 69, stage 68 being normally biased to conduction through a terminal +C which is connected to a first source of bias potential, and stage 69 being normally biased below cutoff through a terminal —C which is connected to a second source of bias potential. Negative input pulses of various amplitudes are applied to the control grid of stage 68 through an input terminal 70 and a diode 71. The diode 71 is employed as an amplitude gate, its righthand side (as shown in Fig. 28) being biased through the terminal +C, and its lefthand side being biased through a potential divider 72. The potentials supplied to the two sides of diode 71 are such that only negative pulses having more than a perdetermined minimum amplitude are passed through the diode to stage 68. Each pulse which is applied in this manner to stage 68 reduces the conduction of that stage for the duration of the pulse. The anode circuit of stage 68 includes a load resistor 73 and also includes an inductor 74 which "peaks" each output pulse from stage 68. The output from stage 68 is capacitively coupled from a junction between resistor 73 and inductor 74 to the control grid of stage 69. Stage 69 is a class B or class C amplifier which responds to each positive pulse from stage 68 to produce a negative output pulse at a terminal 76. The block symbol for the sector coincidence amplifier is shown in Fig. 29.

Shift register

A further element employed in the computer is a shift register, an example of which is shown in Fig. 30. This register comprises a plurality of value-storing flip-flop stages 78(1) to 78(n), the number of stages being determined by the number of digits in the longest binary word that is to be stored in the register. The stages are arranged in the drawing with the least significant stage at the top and the most significant stage at the bottom. The register is adapted to receive a binary word, digit-by-digit, into the most significant stage, to shift the word digit-by-digit through the successively less significant stages, and to transmit the word digit-by-digit from the least significant stage to any desired unit of the computer. All digits of a word standing in the register may also be shifted simultaneously, or in "parallel," to other units of the computer.

Referring to Fig. 30, each flip-flop 78 controls a pair of serial shift gates 79 and 80, and a pair of parallel shift gates 81 and 82. Each gate 79 and 81 is armed when its related stage stands at 0, while each gate 80 and 82 is armed when its related stage stands at 1. For serial shifting, consecutive OP's are applied through a terminal 83 to a serial shift bus 84 which transmits the OP's to the input of each serial shift gate 79 and 80. Each armed gate 79 or 80 transmits each OP to the next stage and sets or resets that stage accordingly. Values may be entered into the shift register from a 0's input terminal 85 and a 1's input terminal 86 which are connected, respectively, to the reset and set input terminals of the most significant stage. Alternatively, values may be entered into the register through the 1's input terminal 86 alone, in which case the serial shift terminal 83 is connected to the reset input of stage 78($n$) by a lead 87 for resetting that stage to 0 during any digit interval in which no 1's input pulse is received at terminal 86. The word standing in the register may be shifted out of the last register stage, i.e., stage 78(1), through a 0's output terminal 88 and a 1's output terminal 89 which constitute the output terminals of the last stage serial shift gates 79(1) and 80(1), respectively. For parallel shifting, CP's or OP's are applied through an input terminal 90 and a parallel shift bus 91 to the input of each parallel shift gate 81 and 82. The armed parallel shift gate 81 or 82 of each stage then transmits a pulse through a related output terminal 92 or 93, respectively, to any desired circuit of the computer.

In the description of the computer circuits and their operations, the term "right shift," as applied to a word standing in a shift register will be employed to designate a shifting of the entire word toward the less significant end of the register, i.e., a serial shift in the direction for which serial shifting is provided in the register shown in Fig. 30. If a binary word is right-shifted by "$s$" binary places, the effect is equivalent to dividing the word by the value $2^s$. The term "left shift" will be employed to designate a shift toward the more significant end of a register. Since no provision is made, in the register shown in Fig. 30, for left shifting a word, this operation must be accomplished by recirculating the word from the register output back into the register input and employing $n—s$ shift pulses, where "$n$" is the number of stages in the register, and "$s$" is the number of binary places through which the word is to be left shifted. A left shift of $s$ binary places is equivalent to a multiplication by $2^s$.

*Binary counter*

A final element employed in the present invention is a multi-stage binary counter, an example of which is shown in Fig. 31. The binary counter comprises a plurality of flip-flop stages 95(1) to 95($n$). Input pulses are applied symmetrically to the least significant stage, i.e., stage 95(1), through a terminal 96, and each input pulse reverses stage 95(1). Each stage has a 0 side output terminal 97 and a 1 side output terminal 98 by means of which the stages are connected in binary cascade, i.e., one of the output terminals 97 or 98 of each flip-flop stage except the last is connected to the symmetrical input of the next stage. In the circuit shown in Fig. 31, the 1 side output terminal 98 of each stage is connected to the symmetrical input of the next stage; therefore, when each stage reverses from its 1 state to its 0 state, a sharp negative potential change is transmitted from that stage to the symmetrical input of the next stage, thereby reversing the state of the latter. Through this arrangement, the input pulses are counted in increasing order, and the circuit operates as an "up-count" binary counter. By connecting the 0 side output terminal 97 of each stage to the symmetrical input terminal of the next stage, the circuit can be made to operate as a "downcount" binary counter, i.e., each input pulse applied to stage 95(1) reduces by unity the value standing in the circuit. The output terminals 97 and 98 of each stage may also be employed to control gates in the manner hereinbefore described.

GENERAL DESCRIPTION

*Computer sections*

The computer which embodies the present invention may be considered for convenience of description, as comprising six principal sections, as follows:

(1) Memory section;
(2) Timing section;
(3) Transfer section;
(4) Arithmetic section;
(5) Address section; and
(6) Program section.

*Memory section*

Referring to the overall block diagram of the computer, shown in Fig. 32, the Memory Section includes a continuously rotating Memory Drum 100. The Drum 100 has a continuous magnetizable surface which, due to the location of sixty-four transducing heads adjacent the Drum and spaced along its axis, may be regarded as having sixty-four circumferential "Information Bands" spaced along the drum axis. Each Information Band cooperates with a respective Read-Write Head 110(0) to 110(63) for receiving writing signals from and transmitting reading signals to the Transfer Section, hereinafter described. Each Information Band is divided into sixty-four "sectors" which are spaced in the direction of drum rotation, and each sector is divided into thirty "cells" which also are spaced in the direction of drum rotation. A cell constitutes a unit storage area which can be magnetized with one polarity to represent a digit 0 or with the opposite polarity to represent a digit 1. The thiry cells in each sector correspond to a series of four CP's followed by a train of twenty-six OP's. Therefore, each sector is adapted to receive a sign digit followed by a twenty-six-digit word, and three of the thirty cells in each sector remain unused.

Each Information Band has a single gap in its otherwise continuous array of cells, and the gaps in all bands pass simultaneously under their related Read-Write Heads. The gaps constitute an index position of the Memory Drum from which the sectors in each Information Band are numbered.

*Timing section*

The Timing Section includes the previously-mentioned Clock Track, which is an auxiliary band on the Memory Drum 100. The Clock Track contains a number of cells equal to the total number of cells in each Information Band, viz., 64×30=1920 cells. The clock cells are evenly spaced along the Clock Track, and there is a single gap corresponding to the gap on each Information Band. The clock cells are permanently magnetized in a predetermined pattern, hereinafter described, and cooperate with an auxiliary transducing head 110(64), designated the "Clock Head," to energize the latter for producing a repetitive timing signal. The timing signal is transmitted to a Clock Pulse Generator 120 which generates a sharp "clock pulse" at the beginning of each digit interval and an "index pulse" during the single gap in the Clock Track cells. The clock pulses and index pulse are transmitted to a Clock Pulse Distributor 130, the output of which comprises a repetitive cycle of four CP's followed by a train of twenty-six OP's, for timing the computer operations.

*Transfer section*

The Transfer Section includes a respective Read-Write Amplifier 150(0) to 150(63) for cooperation with each of the Read-Write Heads 110(0) to 110(63). Each Read-Write Amplifier is repetitively energized by the signals stored in the related Memory band and, except during a writing operation, amplifies these signals. The amplified reading signals are ordinary blocked, but during a reading operation the reading signals from a selected Read-Write Amplifier 150(0) to 150(63) are gated to an Interpreter 200.

The Interpreter has two primary functions. First, the reading signals that it receives are of varying duration and amplitude. The Interpreter shapes these signals and times them with the proper clock pulses. The shaping and timing operation requires a period of two digit intervals; therefore, the output from the Interpreter is delayed by two digit intervals from the input. In order for the Interpreter output to be timed properly with the CP's and OP's, it is necessary for each of its input signals to be received two digit intervals prior to the generation of the related clock pulse. To accomplish this, all digits of a word written into Memory are written two digit intervals ahead of their related OP's, by means hereinafter described. Therefore, the sign digit is written coincident with CP-2, rather than CP-4, the first two digits of the word are written coincident with CP-3 and CP-4, respectively, the last twenty-four digits of the word are written coincident with the first twenty-four OP's of the related train, and the last three cells in each Memory Sector remain unused.

The second function of the Interpreter 200 is to change the form of the reading signal. It is recalled that a reading signal from Memory occurs only when there is a change in value from 0 to 1, or vice versa, as between two successive cells in a band. This form of signal is converted by the Interpreter into a second form wherein a discrete pulse represents each digit 0 to 1. The 0's and 1's pulses are transmitted by the Interpreter to the appropriate 0's or 1's Transfer Busses.

The Transfer Section also includes a Write Control Circuit 180 which receives discrete digit pulses from the Transfer Busses and converts them into a writing signal which changes only when a change in value occurs, as previously described. During a writing operation, the writing signal is transmitted to all of the Read-Write Amplifiers 150(0) to 150(63), a selected one of which is armed by the Address Section, and the writing signal causes the appropriate word to be written in a selected sector, or "address" in Memory.

For the purpose of selecting a Memory band for reading or writing, the sixty-four Information Bands are divided into four groups of sixteen bands each. A respective one of four Band Group Amplifiers 170(0) to 170(3) is adapted, when energized, to partially arm the sixteen Read-Write Amplifiers which are associated with each group of bands. When a particular band is selected, the Address Section energizes the Band Group Amplifier which is related to the group containing the selected band. The Address Section also partially arms one Read-Write Amplifier in each of the four groups. Therefore, only the selected one of the sixty-four Read-Write Amplifiers is partially armed by the selected Band Group Amplifier 170, and also partially armed by the Address Section directly. Only the selected Read-Write Amplifier is fully armed and is effective during a reading or writing operation.

*Arithmetic section*

The Arithmetic Section includes three arithmetic registers, designated the "A," "R," and "D" Registers, respectively, each being adapted to receive, store, and transmit a twenty-six digit word.

The "A" Register is employed for temporarily storing the first of each pair of operands, regardless of the arithmetic operation to be performed. The "A" Register is also employed for receiving the sum in addition, the difference in subtraction, and the twenty-six most significant digits of the product in multiplication. A sum or difference standing tin the "A" Register as the result of one arithmetic operation can be employed as the first operand in a next arithmetic operation. The "R" Register is employed, during addition and subtraction, for receiving the first operand from the "A" Register after that operand has been stored in the "A" Register as described above. The "R" Register is also employed during multiplication, first for receiving a multiplier operand, and for subsequently receiving the twenty-six least significant digits of the product. The "D" Register is employed during multiplication for receiving the multiplicand.

The Arithmetic Section also includes: a Complementer for complementing operands under certain predetermined conditions; a Sign Clipper which separates each sign digit from its related operand for proper routing; an Adder for combining operands; a Sign Counter which stores sign digits for controlling other computer circuits such as the Complementer; a Digit Delay Circuit employed in writing and roundoff operations; and a Multiplier Storage Circuit which receives each successive digit of a multiplier word from the "R" Register and thereby controls entry of the multiplicand word from the "D" Register into the Adder.

Referring to Fig. 32, each operand word (and its preceding sign digit) received from the Transfer Busses enters the Arithmetic Section through the Complementer 250 where the operand is complemented under certain conditions relating to the sign digit of the operand and the arithmetic operation being performed. The sign digit and operand are transmitted by the Complementer to the Sign Clipper 270 which routes the sign digit to the Sign Counter 300 and then routes the operand word to one of three places, viz: (1) through the Adder 350 to the "A" Register 400; or (2) to the "R" Register 420; or (3) to the "D" Register 450. If the operand is the first operand of an addition or subtraction, and it does not already stand in the "A" Register, it is first routed through the Adder and into the "A" Register; later, it is routed back through the Transfer Busses, the Complementer, and the Sign Clipper into the "R" Register. If the operand is a multiplicand which does not already stand in the "A" Register, it is first routed through the Adder and into the "A" Register; later, it is routed back through the Transfer Busses, the Complementer, and the Sign Clipper into the "D" Register. If the operand is a multiplier, it is routed directly into the "R" Register, which subsequently receives the twenty-six least significant digits of the product.

One form of adder which can be employed in the present invention is disclosed and claimed in the copending application Serial No. 344,025, filed March 23, 1953, by George B. Greene, now abandoned. The adder 350 has two inputs, designated "x" and "y," respectively, through each of which it receives one of two operands that are to be arithmetically combined. Each digit of a "y" operand is delayed a fraction of a digit interval from the corresponding digit of the "x" operand to prevent interference between the two digits in the Adder. An output from the Sign Clipper is connected to the "x," or undelayed, Adder input for entering "x" operands into the Adder.

During addition, the output of the "R" Register (which contains one of the operands) is transmitted directly into the Adder as a "y" operand. During multiplication, one digit of the multiplier operand standing in "R" Register is shifted into the Multiplier Storage Circuit 440 at the beginning of each word interval. The output of the "D" Register is connected to another input of the Multiplier Storage Circuit, the arrangement being such that if the shifted multiplier digit is a 1, then the entire multiplicand word is shifted through the Multiplier Storage Circuit and into the Adder as a "y" operand. Each time the multiplicand is shifted out of the "D" Register, it is also shifted back into the same register is preparation for the next word interval of the multiplication.

The Adder 350 may receive "y" operands from one or more sources other than the "R" Register and the Multiplier Storage Circuit. For example, an additional input may be received from an Encoder 800 or other device which converts an analog signal into a digital signal. An example of an encoder which can be employed for producing a "y" input for the Adder 350 is disclosed and claimed in the copending application Serial No. 415,004, filed March 19, 1954, by George B. Greene and Gunnar Wahlstrom, now Patent No. 2,867,797.

The Adder may also receive "x" operands from sources other than the Sign Clipper 270. For example, the Adder may receive an "x" operand from the Transfer Busses through the Digit Delay Circuit 290, which is employed during writing and roundoff operations as follows.

The Digit Delay Circuit comprises a single bistable stage that "follows" the Complementer input from the Transfer Busses, i.e., it is reset to 0 or set to 1 in response to each 0 or 1 input, respectively, to the Complementer. A word that is to be written in Memory may stand in the "A" Register. When the word is routed through the Transfer Busses for writing, it is also routed back into the "A" Register for further use as an operand, if necessary. However, it is recalled that each digit of a word is written in Memory two digit intervals ahead of its corresponding OP. This is accomplished by shifting the word out of the "A" Register and onto the Transfer Busses in response to CP-3, CP-4 and the first twenty-four OP's of the related train of OP's. If a word shifted out of the "A" Register in this manner were circulated through the Transfer Busses, the Complementer, the Sign Clipper, and the Adder back into the "A" Register, then CP-3, CP-4 and the first twenty-four OP's would shift the word back into its original and proper position in the "A" Register, and the last two OP's would erroneously right shift the word by two places. Therefore, the word is returned to the "A" Register through the Digit Delay Circuit, rather than through the Complementer. The Digit Delay Circuit, in effect becomes a twenty-seventh stage of the "A" Register. The CP-3, CP-4 and the OP train constitute twenty-eight shift pulses which operate on the twenty-seven-stage register to return the word to a position wherein it stands right shifted only one binary place from its proper position. A final correction is made by again circulating the word through the Digit Delay Circuit and back into the "A" Register, but using only the OP train for shift pulses. Therefore, twenty-six shift pulses operate on a twenty-seven-stage register and effect a left shift of one binary place, returning the word to its proper position in the "A" Register.

During a roundoff operation, a word whose first $n$ digits are to be rounded off, has its $(n+1)$st digit detected to control the roundoff operation. If the $(n+1)$st digit is a 0, then the digits that are to be dropped constitute a value less than one-half the value of the first $n$ digits, and if the $(n+1)$st digit is a 1, then the digits that are to be dropped constitute a value equal to or greater than one-half the value of the first $n$ digits. To prepare the word for roundoff, its $(n+1)$st digit is routed through the Complementer and the Sign Clipper into the "R" Register. The Digit Delay Circuit "follows" the value of the $(n+1)$st digit in the manner hereinbefore described. Therefore, after the $(n+1$st) digit has passed through the Complementer, the Digit Delay Circuit contains a 0 or a 1, representing the value of that digit. The 0 or 1 standing in the Digit Delay Circuit is then entered into the Adder as a first operand, and the first $n$ digits of the word are routed through the Complementer and the Sign Clipper, and are entered into the Adder as a second operand, thereby increasing the $n$th digit of the word by unity if a 1 had been stored in the Digit Delay Circuit.

Another "x" input to the Adder may be received from a Typewriter 900 or other external decimal input device, through an input register designated the "T" Register. The "T" Register is provided for receiving a parallel input of four binary digits from the Typewriter 900 or any other device which is adapted, in a manner well known in the art, for transmitting a four-digit binary code representing each of a series of selected decimal digits. It will be obvious that the "T" Register may be adapted to receive a larger number of binary digits to provide for alphabetical as well as for numerical coding. The "T" Register is also adapted to receive a serial input from the Transfer Busses. A parallel output from "T" Register may be connected to the Typewriter 900 for typing out values from the Transfer Busses. A serial output from the "T" Register is connected, as described above, to the "x" input of the Adder.

The details of the Typewriter are not included in the present description, since there are commercially available several modified electric typewriters, such as the "Flexowriter," for receiving and transmitting input and output signals as described above. Such typewriters are also commonly provided with means for generating a signal for initiating a computer operation. Typewriter 900, shown in Fig. 32 in block form, is connected to the Program Section for this purpose, as hereinafter described. Typewriter 900 also has an input from the Sign Counter 300 for receiving a signal which indicates the sign of each word that is typed out.

An output from the Adder 350 is connected to the Sign Counter 300 for transmitting to the latter an indication of the overflow or non-overflow condition of the Adder following the combining of two operands in the Adder. The overflow or non-overflow signal from the Adder is gated by the Sign Counter, in accordance with its state of operation, and is transmitted, if appropriate, to the Program Section for stopping the computer, or to the Address Section for controlling the latter under certain conditions during a comparing operation, hereinafter described.

It will be recalled that when a word is read out of Memory, its sign digit is also read out of Memory and appears on the Transfer Busses coincident with the CP-4 preceding the related OP train. However, when a word is shifted out of the "A" Register and onto the Transfer Busses, its sign digit, which is stored in the Sign Counter rather than in the "A" Register, must also be shifted onto the Transfer Busses. The Sign Counter has an output connected to the Transfer Busses for this purpose.

*Address section*

The Address Section is provided for locating commands and operands at various addresses in Memory. An address representation comprises twelve binary digits, the six most significant digits representing the number of the Memory band 0—63 which contains the address, and the six least significant digits representing the number of a particular sector in that band.

The first operation of the Address Section during each computing cycle is the location of the address of a command. The command contains the further address of either an operand or a new command, and the latter address is then located and any necessary routing and computing is performed on the operand under control of the Program Section. The operation of the Program Section is initiated by the Address Section when an address is located.

Referring again to Fig. 32, the Address Section includes a Command Address, or "CA" Register 510 which is adapted to receive, store, and increase by unity, a twelve-digit word representing the address in Memory of each consecutive command. The "CA" Register is initially set by manual control to all 0's, or to any other value representing the address in Memory where the first command is stored. During each computing cycle, the word standing in the "CA" Register is increased by unity to represent the address of the next command, the commands being intentionally stored in consecutive addresses of Memory. Since the six least significant digits of an address represent the sector number, the increasing of the address value by unity effectively increases the sector number of unity. Therefore, consecutive addresses comprise consecutive sectors of a given band, and the next address after sector 63 of one band is sector 0 of the next band. Obviously, the band number could constitute the six least significant digits of each address, in which case consecutive addresses would comprise the same sector number in consecutive bands. Certain address arrangements are possible for reducing Memory access time; for example, consecutive addresses may be located on opposite sides of the Memory Drum in the same band.

During certain operations, it is desirable to locate a command at an address other than the next consecutive address in Memory. In such cases, a new address is shifted into the "CA" Register from the Transfer Busses through a Code Register which is divided into two serially connected registers designated the Cycle Counter 470 and the Code Selector 500. The cycle Counter and Code Selector are employed as such in the Program Section, hereinafter described, but for the purposes of the Address Section, they constitute merely a continuous register through which addresses are shifted.

During a comparing operation, it is sometimes desirable to skip one address in Memory, in which case the word standing in the "CA" Register is increased by an extra count of unity by the Sign Counter 300 in the Arithmetic Section.

When the address whose value stands in the "CA" Register is to be located in Memory, the address value is shifted, in parallel, from the "CA" Register to a twelve-stage Memory Control, or "MC" Register 540. The "MC" Register has two sections, each of six stages, for receiving the sector number and the band number, respectively, of an address. The sector section of the "MC" Register cooperates with a six-stage Sector Counter 550 and a six-stage Sector Coincidence Circuit 560. The Sector Counter maintains a continuous count of the number, 0 to 63, of the sector which is currently cooperating with each Read-Write Head, this sector number being the same in each Memory band. When the six-digit value standing in the sector section of the "MC" Register is matched by the six-digit value in the Sector Counter, the match is detected by the Sector Coincidence Circuit which thereupon generates a "sector coincidence pulse," hereinafter designated an "SC" pulse.

The SC pulse is transmitted to a Coincidence Delay Circuit 570 which immediately transmits that pulse to a normally disabled Band Matrix 600 for enabling the latter. The Band Matrix cooperates with the band section of the "MC" Register and, when enabled, partially arms one of the sixteen Read-Write Amplifiers 150 in each of the four groups, as previously described. The Band Matrix also energizes one of the four Band Group Amplifiers 170(0) to 170(3), and the energized Band Group Amplifier partially arms a group of sixteen Read-Write Amplifiers, as previously described, so that one and only one Read-Write Amplifier is fully armed for a reading or writing operation which follows.

The reading or writing operation is initiated by the Program Section, in the later description of which it will be shown that the Program Section also receives the SC pulse and initiates the reading or writing operation in response to that pulse. However, since the SC pulse also energizes the Band Matrix, as previously described, it is necessary to delay its transmission to the Program Section, because a short period of time is required for the Band Matrix to reach an operating condition when it is energized, and errors may result if a reading or writing operation is initiated as soon as the Band Matrix is energized. The Coincidence Delay Circuit therefore delays the SC pulse one word interval and then transmits the delayed pulse to the Program Section. It is recalled that the SC pulse was transmitted immediately to the Band Matrix. Therefore, a full word interval is allowed for energizing the Band Matrix before a reading or writing operation is initiated. During a writing operation, a pulse that is one digit interval prior to the delayed SC pulse is transmitted by the Coincidence Delay Circuit for enabling the Write Control Circuit. Since the Coincidence Delay Circuit delays initiation of a reading or writing operation one word interval following sector coincidence, a given sector on the Drum is numbered to correspond to the sector number that stands in the Sector Counter one word interval before the given sector passes adjacent its related Read-Write Head 110.

When the twenty-six-digit command has been located and read out of Memory, the first twelve digits of the command are transferred from the Transfer Busses through the Cod Register and into a twelve-stage Operand Address, or "OA" Register 530. The last fourteen digits of the Command remain in the Code Register for purposes hereinafter described in relation to the Program Section. The twelve-digit word shifted into the "OA" Register reresents the address of either an operand or a new command. If it is the address of an operand, then one word interval after the delayed SC pulse is transmitted to the Program Section (as the result of locating the address of the present command), the operand address standing in the "OA" Register is shifted, in parallel, to the "MC" Register, and the operand is located in Memory in the manner previously described. If the word standing in the "OA" Register is the address of a new command, it is shifted out of the "OA" Register onto the Transfer Busses, and back through the Code Register into the "CA" Register, where it is thereafter processed as an address of a new command.

During stopping operations, it is often desirable to write in Memory the address standing in the "CA" Register, in order to facilitate restarting of the computer. Therefore, the "CA" Register has an output connected to the Transfer Busses.

*Program section*

The Program Section is the control section of the computer, which is provided for: (1) starting and stopping the computer under appropriate conditions; (2) opening and closing various gates throughout the computer to route operands, commands, and control signals during selected computer operations; and (3) detecting certain types of operational errors.

Referring again to Fig. 32, the Program Section includes a Code Distributor 730 for arming various sets of gates throughout the computer for predetermined periods of time, in accordance with the requirements of each operation. Arming voltages are applied to the Code Distributor through a Code Matrix 700 during such time as the latter concurrently receives groups of control signals from each of two sources.

The first source of control signals for the Code Matrix is the previously mentioned Code Selector 500. It is recalled from the description of the Address Section, that each twenty-six-digit command from Memory is shifted into the "OA" Register, the Code Selector and the Cycle Counter, the first twelve digits thereafter standing in the "OA" Register to represent the address of either an operand or a new command. The next six digits of the command stand in the Code Selector and represent the computer operation, or "code" that is to be performed in relation to the operand or command whose address stands in the "OA" Register. Each code value standing in the Code Selector causes the latter to transmit a unique combination of control signals to a first input of the Code Matrix.

The second control input to the Code Matrix is from a Sequencer 620. The Sequencer is energized by the delayed SC pulse from the Coincidence Delay Circuit 570, and is adapted to thereupon initiate from three to five sequential "control phases" of the codes. During each control phase, a unique control signal is transmitted to the second input of the Code Matrix. During Phase 1, which is common to all codes, the Sequencer causes the Code Matrix to supply arming potential, through the Code Distributor, to a fixed set of gates throughout the computer, regardless of which code value stands in the Code Selector. During Phases 2 to 5, the Code Matrix combines the inputs from the Code Selector and Sequencer, and supplies arming potential through the Code Distributor to a set of gates, the identity of which is determined both by the selected code and by the current control phase.

Phase 1 is initiated during every code, as mentioned above, and has a duration of one word interval. This control phase is initiated by the Sequencer in response to the delayed SC pulse that occurs when the address of a next command is located. In other words, Phase 1 is initiated one word interval after location of the address which formerly stood in the "CA" Register and which currently stands in the "MC" Register. During Phase 1, the located command is shifted from Memory into the Cycle Counter, the Code Selector and the "OA" Register. Phase 1 therefore places a new code value in the Code Selector, which thereafter cooperates with the Sequencer to control the Code Matrix.

Phase 2 is always initiated by the Sequencer in response to the termination of Phase 1, and also lasts for one word interval. Phase 2 occurs while the Address Section is locating the address (formerly in the "OA" Register and currently in the "MC" Register) of the operand. During Phase 2, various transferring operations occur in the Arithmetic Section, if required. For example, an operand may be shifted from the "A" Register through the Tranfer Busses, the Complementer, and the Sign Clipper into the "D" Register as a multiplicand.

Phase 3 is always initiated by the Sequencer in response to the next delayed SC pulse, i.e., the delayed SC pulse which is generated when the operand is located in Memory. Phase 3 has a duration of one word interval, and is usually employed to transfer a word from Memory to the Arithmetic Section, or vice versa.

Phase 4 is initiated by the Sequencer during only certain ones of the codes. Its initiation is determined by the Code Distributor during Phase 3, and occurs, if at all, in response to the termination of Phase 3. Phase 4 has a duration which varies from a few digit intervals to a number of word intervals, depending on the purpose for which it is employed in a particular code. During multiplication, for example, Phase 4 has a duration of twenty-six word intervals.

Phase 5, like Phase 4, is initiated by the Sequencer during only certain ones of the codes. Its initiation is usually determined by the Code Distributor during Phase 4 and therefore usually occurs in response to the termination of Phase 4. Phase 5 has a duration of one word interval or less, and is employed to control miscellaneous functions which terminate certain codes.

The Program Section also includes a Write Code Supplementary Distributor 740 and a Jump Code Supplementary Distributor 750, hereinafter designated the "WCSD" and "JCSD," respectively. The WCSD and JCSD provide sources of operation control signals alternate to those provided by the Code Distributor. During the Write and Stop Codes, the WCSD is energized by the Coincidence Delay Circuit 570. When the WCSD is energized, it disables transmission of words from the Complementer to the Sign Clipper, and arms a first predetermined set of gates throughout the computer. During the Jump Code, the JCSD is energized by the Code Distributor 730, and arms a second predetermined set of gates. The specific functions of the WCSD and JCSD will be described in detail hereinafter.

The previously mentioned Cycle Counter 470 also forms a part of the Program Section. The Cycle Counter receives the eight most significant digits of each command shifted out of Memory. These eight digits may represent a cycle-counting value, or they may be all 0's. Provision is made, as hereinafter described, for setting certain cycle-counting values into the Cycle Counter if all 0's have been shifted into that unit. During Phase 4 of some codes, it is desirable to recycle words through units of the Arithmetic Section, as hereinbefore described. A cycle-counting value standing in the Cycle Counter provides for the continuation of Phase 4, in such cases, until the necessary recycling is accomplished. During each digit interval or word interval of Phase 4, depending on the current operation, the value standing in the Cycle Counter is reduced by unity, and when it has been reduced to 0, the Cycle Counter transmits a signal to the Sequencer for terminating Phase 4, and for initiating Phase 5 if the latter control phase is required during the current operation. The output signal from the Cycle Counter is also transmitted to a Start-Stop Circuit 660, hereinafter described.

The Program Section also includes a Start-Stop Circuit 660 which receives each delayed SC pulse from the Coincidence Delay Circuit 570, and in response to the first such pulse in a computer operation, generates a "Start" pulse under control of a "Ready" pulse from the Typewriter 900, or under control of a "Start" switch on the computer. Thereafter, at the end of each code, the Code Distriubtor, the JCSD, or the previously described output pulse from the Cycle Counter, controls the Start-Stop Circuit for automatically generating a Start pulse. The Start pulse is employed for: (1) resetting the Sequencer to prepare it for initiating the next series of control phases; (2) parallel shifting the contents of the "CA" Register into the "MC" Register for locating the address of the next command; (3) disabling the JCSD; and (4) energizing an Error Detection Circuit 780, hereinafter described.

A further unit of the Program Section is an Overflow Stop Circuit 760 which turns on an "Overflow" light if the computer is stopped due to an overflow digit standing in the Adder 350. The previously described output signal from the Complementer 250 in response to an overflow condition is received by the Overflow Stop Circuit to turn on the Overflow light.

When the computer must be stopped because of an overflow condition, this is done by entering a command of all 1's into the "OA" Register and the Code Register, thereby initiating the Stop Code, as hereinafter described. For this purpose, the Overflow Stop Circuit causes a series of twenty-six 1's to be transmitted to the Code Register input when an overflow signal has been received. The Overflow Stop Circuit is also adapted to enter a command of all 1's into the "OA" and Code Registers in response to manual operation of a "Stop" switch that is located, for example, at the Typewriter 900.

The final unit of the Program Section is the previously mentioned Error Detection Circuit 780. This circuit turns on an "Error" light if it fails to receive a periodic Start pulse from the Start-Stop Circuit. However, when the computer is waiting for typed information or is intentionally stopped, no Start pulse is transmitted to the Error Detection Circuit, even though the computer operation is normal. To prevent the Error light from being turned on at such times, each delayed SC pulse is transmitted to the Error Detection Circuit and causes the latter to operate as if a Start pulse had been received.

MEMORY SECTION

Memory drum

Figure 33:
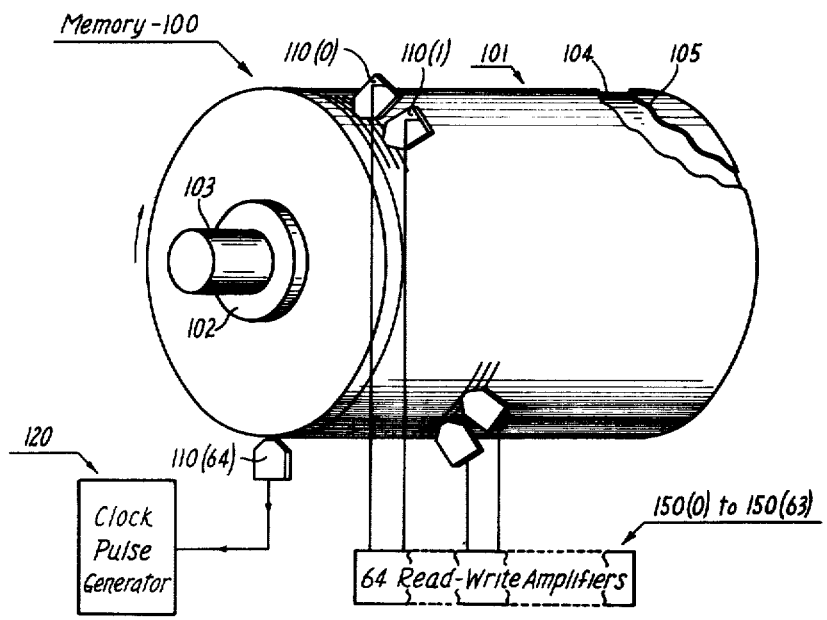
Fig. 33 is a schematic drawing of the Memory Drum.

The Memory, shown schematically in Fig. 33, comprises a drum 101 which is mounted by hubs such as 102 on a shaft 103, the shaft being driven by a motor (not shown). The drum comprises a main body 104 which may be formed of aluminum or other rigid material, and which is covered by a thin coating 105 of magnetizable material, such as magnetic iron oxide invested in a plastic base.

The magnetizable drum surface may be considered as comprising sixty-five circumferential bands spaced along the drum axis, one band constituting the Clock Track and the remaining sixty-four bands constituting the Information Bands. As previously described, each band may be considered as comprising sixty-four substantially equal sectors spaced in the direction of drum rotation, with each sector divided into thirty cells also arranged in the direction of drum rotation. Each band, including the Clock Track, has a single gap in its otherwise continuous series of cells. The gaps in all bands simultaneously pass their related Read-Write Heads or Clock Head, and the sectors in each band may be conveniently counted by starting from the gap.

Each cell in the Information Bands may be magnetized to saturation in either of two opposite directions, thereby representing the respective binary digits 0 and 1. The entire Clock Track is permanently magnetized in a pattern representing alternate 0's and 1's, for reasons hereinafter described. The Clock Head 110(64) is located adjacent the path of the Clock Track and is energized by the magnetized pattern of the Clock Track for transmitting to the Clock Pulse Generator 120 (Fig. 35) a timing signal when the leading edge of each cell on the Clock Track passes the Clock Head 110(64) (Fig. 33). A respective Read-Write Head 110(0) to 110(63) cooperates with each Information Band on the drum and is connected to a respective Read-Write Amplifier 150(0) to 150(63).

Read-write heads

Figure 34:
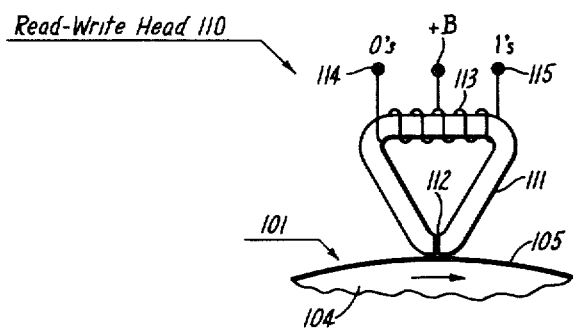
Fig. 34 is a schematic diagram of a typical transducing head.

A typical Read-Write Head 110 is shown in Fig. 34. The Head comprises a magnetic core 111 which is substantially triangular in shape and which has a gap 112 located at one corner of the triangle. A magnetizing coil 113 is wound on that leg of the core which is opposite gap 112. The coil 113 has a center tap connected to +B and a pair of end terminals 114 and 115 which are connected to a related Read-Write Amplifier 150. The gap 112 is located adjacent the path of the related band of drum 101 (see also Fig. 33) for cooperation therewith. A particular cell is magnetized to a 0 state or a 1 state, or transmits a reading signal, only when it underlies gap 112. In order to write a 0, current is caused to flow from +B through the left half of winding 113 and through terminal 114 to the related Read-Write Amplifier, in a manner hereinafter described. Similarly, in order to write a 1, current is caused to flow from +B through the right half of winding 113 and through terminal 115 to the related Read-Write Amplifier. Current flowing from +B through the left or right half of coil 113 establishes magnetic flux throughout a path which includes the core 111 and that cell of drum surface 105 which underlies gap 112. The magnetic material of the cell is thereby magnetized to saturation either in the direction of rotation of the drum or in the opposite direction, depending upon the direction of current flow through coil 113.

An improved Read-Write Head, which may be employed in the present invention, is disclosed and claimed in the copending application Serial No. 297,441, filed July 7, 1952, by George B. Greene, now Patent No. 2,839,613.

TIMING SECTION

Clock pulse generator

The Clock Pulse Generator receives timing signals from the Clock Head 110(64) (Fig. 33), and amplifies these signals to form clock pulses. The clock pulses are employed to generate an index signal which, together with the clock pulses, is transmitted to the Clock Pulse Distributor.

The timing signals from the Clock Head are received by the Clock Pulse Generator 120 (Fig. 35) at a terminal 121. Even though a substantially square wave (alternate 0's and 1's) is employed for writing the Clock Track, and therefore the signal output of the clock head would ideally be the derivative of a square wave, i.e., alternate positive and negative pulses, the resolution properties of most commercially available clock heads are such that the clock signals received at terminal 121 may be substantially sinusoidal. The clock signals are transmitted through a two-stage amplifier 122 to the input of a Schmidt trigger 123. Trigger 123 may be of the type shown in Fig. 24, except that it has a transformer output impedance which differentiates the square wave output signals. The output from one transformer terminal of the Schmidt trigger is therefore a series of alternating positive and negative pulses, and the output from the other terminal of the transformer is a complementary series of alternating negative and positive pulses. Each of the two outputs from the Schmidt trigger 123 (Fig. 35) is transmitted through a respective diode 124 which is oriented to pass only positive pulses. The outputs of the two diodes 124 are joined, their combined signal output comprising a series of positive pulses. There are two output pulses from diodes 124 during each complete cycle of the timing signal from the Clock Head, i.e., one positive pulse corresponding to each cell of the Clock Track. The combined output of diodes 124 is amplified in a two-stage amplifier 125, the output pulses of amplifier 125 constituting the clock pulses which are employed in the present computer. The clock pulses from amplifier 125 are transmitted through a terminal 215 to the Interpreter (Fig. 32), and are also applied to the inputs of a pair of gates 135 and 136 (Fig. 35), hereinafter described.

The clock pulses from amplifier 125 are also transmitted through a pair of amplifiers 126 and 127, arranged in series. The input to amplifier 127 is connected to a source +C of positive grid bias potential through a capacitor 128 in parallel with a resistor 129. The positive clock pulses from the output of amplifier 125 are inverted by amplifier 126 and charge capacitor 128 negatively for maintaining amplifier 127 normally nonconducting. However, when the previously described gap in the Clock Track passes the Clock Head, the generation of clock pulses is discontinued for a short time, and capacitor 128 discharges through resistor 129, thereby applying +C potential to the input grid of amplifier 127 and causing the latter to conduct. When the generation of clock pulses is recontinued, capacitor 128 is again charged negatively, and cuts off amplifier 127. The output from amplifier 127 is therefore a square negative pulse, hereinafter designated an "index" pulse, since it is generated once during each rotation of the Memory Drum and at a time when the latter is at an index position.

Clock pulse distributor

The index pulse from the output of amplifier 127 (Fig. 35) is transmitted through a diode 131(2) to the "set" input of a flip-flop 132(2), constituting the second stage of a five-stage binary counter which may be of the type shown in Fig. 31. The index pulse is also transmitted through each of a pair of diodes 131(4) and 131(5) (Fig. 35) to the respective "set" inputs of the fourth and fifth stage flip-flops 132(4) and 132(5) of the counter. Therefore, the index pulse sets the binary counter to the value 11010 which is equivalent to the decimal value "26." The previously mentioned gate 135, which is interrogated by the clock pulses from amplifier 125, is an "and" gate which is armed through a series of diodes 133(2), 133(4) and 133(5) by the concurrent 1 states of flip-flops 132(2), 132(4) and 132(5). Therefore, gate 135 is armed when the index pulse sets the second, fourth, and fifth stages of the counter to 1, and the first clock pulse which is generated following the index pulse is transmitted through gate 135.

The output of gate 135 is connected to the serial shift bus 140 of a five-stage shift register which may be of the type shown in Fig. 30. Each stage of the shift register comprises a respective flip-flop 142(1) to 142(5) (Fig. 35). The output of the last stage of the shift register is connected to the input of the first stage, so that any word standing in the shift register may be recirculated. The index pulse from the output of amplified 127 is also transmitted through a diode 141(1) to the set input of shift register stage 142(1), and through a series of diodes 141(2) to 141(5) to the reset inputs of stages 142(2) to 142(5) of the shift register. Therefore, the index pulse enters the binary word 10000 into the shift register. The first clock pulse which is transmitted through gate 135 to shift bus 140, following the index index pulse, shifts the digit 1 from stage 142(1) to 142(2), and each stage except stage 142(2) receives a 0 from its preceding stage. The 1 side output terminal of stage 142(1) is connected through an amplifier 144(1) and a phase inverter 145(1) to a pair of output terminals CP-1. When stage 142(1) is reversed from 1 to 0 in response to the first clock pulse following the index pulse, the voltage change of its 1 side output terminal is transmitted through amplifier 144(1) and phase inverter 145(1), and pulses of opposite polarity appear at the two output terminals CP-1. Therefore, the first clock pulse which follows each index pulse generates both a positive and a negative output pulse at terminals CP-1, and either of these pulses, depending upon the polarity desired, may be employed as CP-1. Each terminal in the various computer circuits which receives CP-1 is labeled as such in the circuit diagrams.

The second clock pulse following the index pulse is also transmitted through gate 135 to shift bus 140, thereby causing the digit 1 standing in stage 142(2) to be shifted to stage 142(3), and the consequent voltage change in the 1 side output terminal of stage 142(2) generates the second control pulse CP-2 in the same manner as CP-1. Similarly, the third and fourth clock pulses, following each index pulse, are employed for shifting the digit 1 standing in stage 142(3) to stages 142(4) and 142(5), in turn, thereby generating third and fourth control pulses CP-3 and CP-4, respectively.

CP-4 is transmitted through a lead 146 and a series of diodes 134(1) to 134(5) to the set input of counter stage 132(1) and to the reset inputs of the remaining counter stages 132(2) to 132(5). CP-4 thereby sets the counter to the value 00001, closing gate 135 to prevent subsequent clock pulses from being transmitted by that gate to the shift bus 140. Therefore, after the fourth clock pulse following each index pulse, the value 1 stands in stage 142(5) and is not shifted out of that stage by subsequent clock pulses.

The previously mentioned gate 136, which is interrogated by each clock pulse from the output of amplifier 125, is armed by the 1 side of stage 142(5), and is therefore armed following the generation of CP-4. The output of gate 136 is connected through an amplifier 137 and a lead 138 to the symmetrical input of the first stage 132(1) in the binary counter. Therefore, after the first four clock pulses, following each index pulse, have been employed to generate control pulses, subsequent clock pulses are transmitted through gate 136, amplifier 137 and lead 138 to the symmetrical input of the first counter stage 132(1), the counter having been preset to the value 00001 as previously described. When twenty-five clock pulses have in this manner been introduced into the symmetrical input of stage 132(1), the counter stands at the value 11010 which, as previously described, causes the counter to arm gate 135. The twenty-sixth pulse which is entered into the counter advances its count to the binary equivalent of 27, and is also transmitted through gate 135 to shift bus 140, thereby shifting the digit 1 from stage 142(5) to stage 142(1); therefore, the next clock pulse initiates a new word interval by generating CP-1 in the manner previously described. When the digit 1 is shifted from stage 142(5) to stage 142(1), gate 136 is closed. It is noted, however, that gate 136 was armed during a period in which it transmitted twenty-six clock pulses to amplifier 137. The output of amplifier 137, in addition to being connected to the symmetrical input of counter stage 132(1), is also connected through a cathode follower 147 to an output terminal OP. Therefore, twenty-six pulses are transmitted to terminal OP during each word interval, and the train of twenty-six pulses is employed in various units of the computer as operating pulses. Each terminal in the computer which receives operating pulses is designated "OP" in the circuit diagram.

It is noted that although the index pulse is employed for initiating a first word interval by setting the counter to the binary value 11010, subsequent word intervals during rotation of the Memory Drum are initiated after each thirtieth clock pulse, in the absence of the index pulse, because the binary counter is automatically set to the value 11010 at the end of each word interval.

TRANSFER SECTION

Read-write amplifiers

Figure 50:
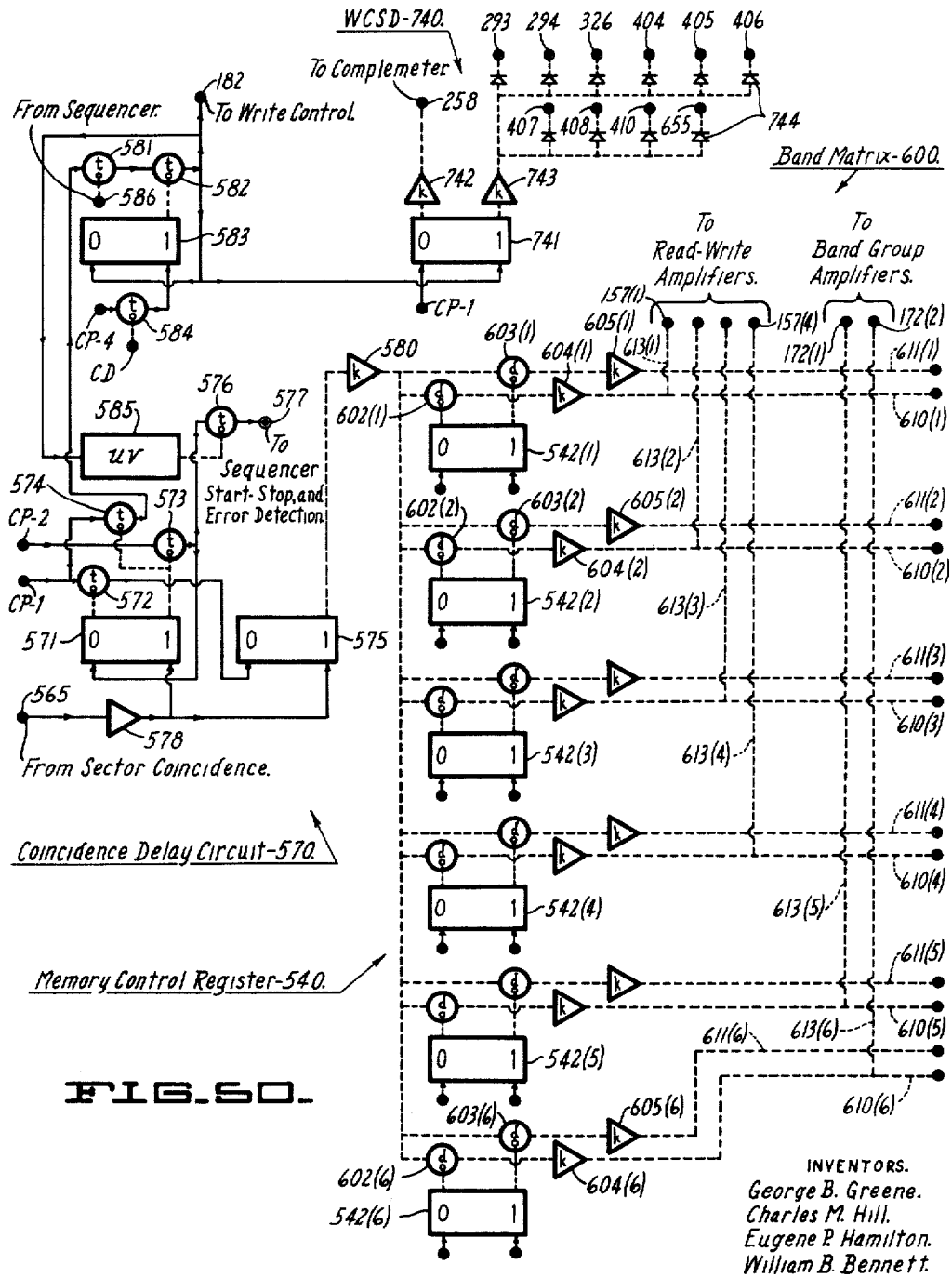
Fig. 50 is a block diagram showing the Coincidence Delay Circuit, the Write Code Supplementary Distributor, and the Band Matrix.

Each of the previously described Read-Write Heads 110(0) to 110(63) (Figs. 32 and 33) receives its writing signal from a respective Read-Write Amplifier 150(0) to 150(63), an example of which is shown in Fig. 36. Each end of the magnetizing coil 113 of the Read-Write Head 110 is connected to the anode of a respective triode "and" gate 151(0) or 151(1), shown as the two sections of a twin triode. Both gates 151(0) and 151(1) are normally closed, the grid of each gate being connected through a respective resistor 152(0) or 152(1) to a common bias lead 155. Lead 155 is connected through a series of four diodes 156(1) to 156(4) and a corresponding series of input terminals 157(1) to 157(4) to the Band Matrix 600 (Fig. 50). Diodes 156 constitute a part of the Band Matrix, but are shown, for convenience, with the Read-Write Amplifier in Fig. 36. Lead 155 is also connected through a resistor 158 and an input terminal 159 to one of the four Band Group Amplifiers 170 (Fig. 37). It will hereinafter be shown that when a particular Read-Write Amplifier has been selected by the Band Matrix, all four of its input terminals 157(1) to 157(4) (Figs. 36 and 50), and its input terminal 159 are at a relatively high potential, and that at all other times at least one terminal 157 or 159 is at a relatively low potential. Therefore, lead 155 is at a relatively low potential at all times except when there has been a selection of the band with which the particular Read-Write Amplifier 150 cooperates. When that band has been selected, the lead 155 is at a relatively high potential, thereby arming both gates 151(0) and 151(1).

After a band has been selected, thereby arming its related gates 151(0) and 151(1), each of a series of information signals is applied to the grid of one gate or the other, according to the values of the successive digits in the word which is to be written in Memory. In order to write one or more successive digits 0, a relatively high potential is applied through a terminal 153(0) and a diode 154(0) to the grid of section 151(0), causing that section to conduct, and thereby causing anode current to flow from +B through the lefthand section of winding 113. Similarly, for each 1 that is to be written, a relatively high potential is applied through a terminal 153(1) and a diode 154(1) to the grid of section 151(1), causing that section to conduct and thereby causing anode current to flow from +B through the righthand section of winding 113. The writing potentials applied to terminals 153(0) and 153(1) are received from the Write Control Circuit 180 (Fig. 38), hereinafter described.

Except during a writing operation, the magnetic pattern on each Information Band of Memory continuously energizes the winding 113 (Fig. 34) on its related Read-Write Head 110. The signals induced on winding 113 in this manner are capacitively coupled from one end of winding 113 to the grid input of a class A triode amplifier 162 (Fig. 36). The anode output of amplifier 162 is capacitively coupled to the grid input of a cathode follower 164 which is normally biased well below conduction, its grid being connected through a resistor 165 to the previously described bias lead 155. When the proper band has been selected, and lead 155 is therefore at its high potential, cathode follower 164 is biased to conduction, and the signals applied to its grid input from amplifier 162 are transmitted through its cathode and a terminal 166 to the Interpreter (Fig. 39).

Band group amplifiers

The two levels of voltage which are applied to input terminal 159 (Fig. 36) of each Read-Write Amplifier 160 are generated by a Band Group Amplifier 170(0) to 170(3), one of which is shown in Fig. 37. A gate 171, comprising a triode 174, is armed through a pair of terminals 172(1) and 172(2) and a pair of diodes 173(1) and 173(2). Diodes 173, like diodes 156, constitute a part of the Band Matrix (Fig. 50), but are shown, for convenience, with the Band Group Amplifiers in Fig. 37. Terminals 172(1) and 172(2) are normally at a relatively low potential to maintain gate 171 closed. When the proper group of bands is selected, in the manner hereinafter described, both terminals 172(1) and 172(2) are at a relatively high potential, and tube 174 is biased to conduction for producing a negative pulse at its anode. The negative pulse is capacitively coupled to the input of a normally conducting amplifier 175, thereby producing a positive pulse output which is resistively coupled to the inputs of a pair of cathode followers 177 and 178. Cathode followers 177 and 178 have a common cathode resistor 179 and a common cathode output which is connected through the terminal 159 to sixteen of the Read-Write Amplifiers 159(0) to 159(63). Therefore, when a group of bands is selected, there is a potential rise at the output terminal 159 of the related Band Group Amplifiers 170 for partially arming sixteen of the Read-Write Amplifiers 150 (Fig. 36).

Write control circuit

The writing signals that are applied to terminals 153(0) and 153(1) of each Read-Write Amplifier 150 are generated in the Write Control Circuit 180, shown in Fig. 38. The Write Control Circuit receives all 0's and 1's pulses which appear on the Transfer Busses, and during the Write Code, gates these pulses to a pulse shaping circuit, the output of which is transmitted to each of the Read-Write Amplifiers 150.

The Write Control Circuit comprises a first flip-flop 181 which normally stands at 0, each CP-1 being applied to its reset input. During the Write Code, a pulse is applied to the set input of flip-flop 181 thorugh a terminal 182 from the Coincidence Delay Circuit (Fig. 50), thereby setting flip-flop 181 (Fig. 38) to 1. The 1 side output terminal of flip-flop 181 arms a pair of gates 183 and 184 through a cathode follower 185. The 0's Transfer Bus is connected to the input of gate 183 and the 1's Transfer Bus is connected to the input of gate 184. The output of gate 183 is connected to the reset input of a second flip-flop 190. The output of gate 184 is connected to the set input of flip-flop 190. The 0 side and 1 side output terminals of flip-flop 190 are connected through respective cathode followers 191(0) and 191(1) to the inputs of a pair of gates 192(0) and 192(1), both of which gates are armed by the 1 side output terminal of flip-flop 181 through cathode follower 185. The output of gate 192(0) is connected through a cathode follower 193(0) to the 0's input terminal 153(0) of each Read-Write Amplifier 150(0) to 150(63). Similarly, the output of gate 192(1) is connected through a cathode follower 193(1) to the 1's input terminal 153(1) of each Read-Write Ampilfier. Therefore, during the Write Code, the 0's and 1's pulses of a word from the Transfer Busses are transmitted through gates 183 and 184, respectively, setting or resetting flip-flop 190 in accordance with the values represented by the pulses. The resulting 0's and 1's outputs of flip-flop 190 are transmitted through cathode followers 191, gates 192 and cathode followers 193 to the 0's and 1's inputs 153 of all sixty-four of the Read-Write Amplifiers 150, and the selected Read-Write Amplifier drives its related Read-Write Head to write the word in Memory as hereinbefore described. At the beginning of each word interval, CP–1 resets both flip-flops 181 and 190 to 0, thereby preparing these flip-flops for the receipt of a next word from the Transfer Busses, and closing gates 183, 184, 192(0) and 192(1).

Interpreter

It has been shown that a change from 0 to 1, or vice versa, as between successive digital values in a Memory band, is represented by a reversal of magnetic state from one region of saturation to the other. It has also been shown that the signal output from a Read-Write Head comprises the derivative of the written signal, i.e., a positive pulse when and only when there is a change from 0 to 1 as between the digits stored in two consecutive cells of the related Memory band, and a negative pulse when and only when there is a similar change from 1 to 0. However, it has been shown that words on the Transfer Busses appear in the form of one pulse for each digit 0 or 1, rather than one pulse for each change in value. The Interpreter is provided for receiving the first form of signals from Memory, and for converting them to equivalent signals of the second form for transmission to other circuits through the Transfer Busses.

If uniform signals are available from Memory, the converting process may be performed quite simply. Such uniform signals are available, for example, when the Memory band which is being read contains a regular pattern such as alternate 0's and 1's. However, each Information Band of Memory contains randomly arranged 0's and 1's, and it has been found that a positive output pulse from a Read-Write Amplifier may have any of the shapes shown in Fig. 39A, and that a negative pulse may be similarly shaped although opposite in polarity. Each of the five pulses shown in Fig. 39A represents a change in the recorded value at a time corresponding to the center one of the three clock pulses shown. It will be seen that value pulses III, IV and V are of such duration that they might be mistaken as having occurred in coincidence with the first or third clock pulse, rather than the second clock pulse, thereby erroneously changing the value of the output word from Memory. Pulses II to V might be accurately interpreted by detecting only the top part of each pulse, i.e., only that part of the pulse which occurs entirely between the first and third clock pulses. It will be seen, however, that pulse I, which is a type that occurs at the output of a Read-Write Amplifier when the value in the related Memory band is alternating between 0's and 1's, is of relatively low amplitude and would not be detected at all if only the tops of the pulses were detected. Therefore, means must be provided for interpreting all of the possible shapes of output pulses from the Read-Write Amplifiers, and for converting them to uniform and properly timed pulses. The Interpreter 200, which is shown in Fig. 39, performs the necessary shaping and timing functions, as follows.

The output terminal 166 of each Read-Write Amplifier 150(0) to 150(63) (Fig. 36) is connected to an input lead 204 (Fig. 39) of the Interpreter 200. It is recalled that information signals are transmitted from the output terminal 166 of only one of the Read-Write Amplifiers 150(0) to 150(63) at a time, i.e., from the one Read- Write Amplifier which corresponds to the selected band of Memory. It is further recalled that when a band of Memory is selected, the normally nonconducting cathode follower 164 (Fig. 36) of the related Read-Write Amplifier is biased to conduction. Therefore, the potential of the output terminal 166 of one of the Read-Write Amplifiers is raised at the time the band is selected, and tends to introduce a strong spurious signal into the Interpreter through terminal 166 at this time. The spurious signal is prevented in the following manner. A read control flip-flop 201 (Fig. 39) normally stands at 0, each CP-1 being applied to its reset input. The 0 side output terminal of flip flop 201 is connected to the input lead 204 through a cathode follower 202 which has a cathode impedance in common with all of the sixty-four cathode followers 164 (Fig. 36). Therefore, while flip-flop 201 (Fig. 39) stands at 0, lead 204 is always at a relatively high potential, and when a band is selected, thereby causing a cathode follower 164 to conduct, there is substantially no potential rise on lead 204. After the band has been selected, and the related cathode follower 164 (Fig. 36) has begun conducting, flip-flop 201 (Fig. 39) is set to 1 for cutting off cathode follower 202. Each CP-3 is applied to the input of a gate 205, the output of which is connected to the set input of flip-flop 201. Gate 205 is armed through the Code Distributor (Fig. 53) during each reading operation, and the next CP-3 sets flip-flop 201 (Fig. 39) to 1. The arming terminal of gate 205, as well as the arming terminal of each other gate that is controlled by the Code Distributor, is designated "CD."

The input lead 204 of the Interpreter is connected to the input of a phase inverter 208. A typical read signal is shown at the input of phase inverter 208, and comprises a leading negative pulse and a trailing positive pulse. The negative pulse indicates a change from 0 to 1 of the digit value in the selected Memory band, and the positive pulse indicates a subsequent change from 1 to 0 of that value, one or more digits later. Although a change of digit value from 0 to 1 has previously been described as producing a positive pulse output from a Read-Write Head 110 (Fig. 34), amplifier 162 of each Read-Write Amplifier 150(0) to 150(63) (Fig. 36) inverts the reading signal, and cathode follower 164 does not re-invert the signal; therefore, a negative pulse at the input of the Interpreter indicates a change in digit value from 0 to 1.

The inverted output from phase inverter 208 (Fig. 39) is transmitted through an amplifier 209 which again inverts the signal to produce a positive pulse for each change in value from 1 to 0. The uninverted output from phase inverter 208 is transmitted through an amplifier 229 which inverts its input signal to produce a positive pulse output for each change in the band value from 0 to 1. The output of amplifier 209 is employed for controlling the transmission of pulses to the 0's Transfer Bus, and the output of amplifier 229 is employed for controlling the transmission of pulses to the 1's Transfer Bus. The circuit for transmitting pulses to the 0's Transfer Bus is substantially identical to the circuit for transmitting pulses to the 1's Transfer Bus, and only the former will be described in detail.

The output of amplifier 209 is connected to the inputs of two Schmidt triggers 211 and 212. Trigger 211 is biased to respond to only that portion of each positive input pulse which has an amplitude higher than lines "a" in Fig. 39A, while trigger 212 (see also Fig. 39) is biased to respond to that portion of each positive pulse lying above lines "b" in Fig. 39A. Therefore, if a positive input pulse is higher in amplitude than line "a," trigger 211 produces a positive output pulse having a width equal to the width of that portion of the input pulse which lies above line "a." Trigger 212 produces a positive square output pulse having a width equal to the width of each positive input pulse at line "b." The pulse output from trigger 211 arms a gate 213, and the pulse output from trigger 212 arms a gate 214.

Clock pulses are received from output terminal 215 of the Clock Pulse Generator 120 (Fig. 35), and are transmitted through a delay line 216 (Fig. 39) to the input of gate 213. It is desirable for each clock pulse to interrogate gate 213 at substantially the middle of each output pulse from trigger 211. To accomplish this, there must be taken into consideration an inherent delay of each reading signal in the Read-Write Amplifiers 150 (Figs. 32 and 36) and in the input section of the Interpreter. Therefore, delay line 216 (Fig. 39) is provided for delaying each clock pulse long enough to make it coincide substantially with the center of the corresponding output pulse from trigger 211.

The output of delay line 216 is also transmitted through an amplifier 217 and a delay line 218, the purpose of which will be hereinafter described, to the input of gate 214 and to the input of a gate 220 which is controlled by the 1 side of a flip-flop 221. Flip-flop 221 normally stands at 0, each CP-2 being applied to its reset input. The output of gate 213 is connected to the reset input of flip-flop 221, and the output of gate 214 is connected to the set input of flip-flop 221. The output of gate 220 is connected to the reset input of flip-flop 221 and to the reset input of a flip-flop 223 which normally stands at 0, each CP-3 being applied to its reset input. Gates 213 and 214 and flip-flop 221 are employed for selecting the one clock pulse corresponding to the center of each information pulse which represents a change in band value from 1 to 0. Gate 220 is employed for transmitting the succeeding clock pulse to the reset input of flip-flop 223, which then controls the transmission of succeeding OP's to the 0's Transfer Bus until the band value changes frcm 0 to 1.

It is recalled that the input signals to the Interpreter are delayed part of a digit interval by the Read-Write Amplifiers, so that each input signal to the Interpreter is part of a digit interval behind its corresponding clock pulse. An additional delay of a full digit interval occurs in the Interpreter before flip-flop 223 is reset to 0 as described above. Therefore, reset pulses applied to flip-flop 223 are delayed more than one, and less than two digit intervals. By employing OP's for reading out flip-flop 223, as described above, the reading signals are delayed exactly two digit intervals, and the word pulse transmission to the 0's Transfer Bus is two full digit intervals behind the corresponding clock pulses. To compensate for this delay, words are written in Memory two full digit intervals ahead of their corresponding clock pulses, in a manner hereinafter described; therefore, the output from the Interpreter 200 is correctly timed with the OP trains from the Clock Pulse Distributor 130 (Fig. 35).

The 1 side output terminal of the previously described read control flip-flop 201 (Fig. 39) arms a gate 207. Each CP-4 (which is synchronous with the sign digit pulse on the 1's Transfer Bus) and each train of OP's are applied to the input of gate 207, the output of which is connected to the inputs of a pair of gates 224 and 225. Gate 224 is armed by the 0 side of flip-flop 223 and has its output connected through an amplifier 226 to the 0's Transfer Bus. Gate 225 is armed by the 1 side of flip-flop 223 and has its output connected through an amplifier 227 to the 1's Transfer Bus.

The operation of the 0's section of the Interpreter will be described with reference to the five possible shapes of pulses which may be applied to the inputs of Schmidt triggers 211 and 212. Information pulse I (Fig. 39A) is a thin pulse of low amplitude. Therefore, trigger 211 (see also Fig. 39) does not respond to this pulse, but trigger 212 does respond and produces a square output pulse which arms gate 214, gate 213 remaining closed. The clock pulse preceding the center of the information pulse, hereinafter referred to as the "first" of the three clock pulses related to each information pulse, is blocked by gates 213, 214 and 220. The second clock pulse, i.e., that clock pulse which is substantially coincident with the center of the information pulse, is transmitted through the armed gate 214 for setting flip-flop 221 to 1, thereby arming gate 220. Although flip-flop 221 is set to 1 by the second clock pulse, arming gate 220, the flip-flop requires a finite time for switching; therefore, the second clock pulse is blocked by gate 220. The third clock pulse is transmitted through that gate, resetting flip-flop 221 to 0 for closing gate 220, and resetting flip-flop 223 to 0 if the latter does not already stand at 0. Therefore, subsequent OP's from the output of gate 207 are transmitted through gate 224 and amplifier 226 to the 0's Transfer Bus until flip-flop 223 is set to 1 in a manner hereinafter described.

Information pulse II is of short duration and high amplitude, and energizes both Schmidt triggers 211 and 212, thereby arming gates 213 and 214. However, neither of these gates is armed at the time it receives the first of the three related clock pulses, and that clock pulse is blocked by both gates 213 and 214 and by gate 220. The second clock pulse is first transmitted through gate 213 to the reset input of flip-flop 221 which, however, already stands at 0. The second clock pulse is delayed by delay line 218 and then transmitted through gate 214 for setting flip-flop 221 to 1 and arming gate 220. By the time the third clock pulse is applied to gates 213 and 214, both of these gates are closed. However, the third clock pulse is transmitted through gate 220, resetting flip-flop 221 to 0 for closing gate 220, and resetting flip-flop 223 to 0 if the latter is not already reset. Thereafter, OP's from the output of gate 207 are transmitted through gate 224 and amplifier 226 to the 0's Transfer Bus until such time as flip-flop 223 is set to 1.

Information pulse III is of long duration and high amplitude. It rises above both potential levels "b" and "a" after the first and before the second clock pulse, then falls below level "a" between the second and third clock pulses, and finally falls below level "b" after the third clock pulse. Therefore, pulse III energizes Schmidt trigger 211 to produce an output pulse having a width which encompasses only the second of the three clock pulses, and energizes Schmidt trigger 212 to produce an output pulse having a width which encompasses both the second and third clock pulses. The first of the three related clock pulses is blocked by gates 213, 214 and 220. The second clock pulse is transmitted through gate 213 to the reset input of flip-flop 221 which, however, already stands at 0. The second clock pulse is thereafter transmitted through gate 214 to the set input of flip-flop 221, thereby setting the latter to 1 and arming gate 220. The second clock pulse is blocked by gate 220 due to the inherent switching time of flip-flop 221. The third clock pulse is blocked by gate 213, but is transmitted through gate 220 to the reset inputs of flip-flops 221 and 223, as hereinbefore described. The third clock pulse is also transmitted through gate 214 to the set input of flip-flop 221. The pulses simultaneously applied to the reset and set inputs of flip-flop 221 operate as a symmetrical input and reverse flip-flop 221 to its 0 state, thereby closing gate 220. Subsequent OP's from gate 207 are thereafter transmitted through gate 224 and amplifier 226 to the 0's Transfer Bus until such time as flip-flop 223 is set to 1.

Information pulse IV is also of long duration and high amplitude. It rises to potential level "b" before the first of the three related clock pulses, then rises above level "a" before the second clock pulse, and finally falls below both levels "a" and "b" before the third clock pulse. Information pulse IV therefore energizes Schmidt trigger 211 to produce an output pulse having a width which encompasses only the second clock pulse, and energizes Schmidt trigger 212 for producing an output pulse having a width which encompasses both the first and second clock pulses. The first clock pulse is blocked by gates 213 and 220, but is transmitted through gate 214, setting flip-flop 221 to its 1 state for arming gate 220. The second clock pulse is transmitted through gate 213, resetting flip-flop 221 to 0 for closing gate 220. The second clock pulse is also transmitted through gate 214 for setting flip-flop 221 back to 1 and arming gate 220. Delay line 218 causes sufficient time to elapse after application of the pulse from gate 214 to the set input of flip-flop 221 and before application of the pulse from gate 213 to the reset input of flip-flop 221 for permitting the latter to be completely reset to 0 before the second clock pulse interrogates gate 220. Therefore, although the second clock pulse is transmitted through gate 214 for setting flip-flop 221 to 1, that clock pulse is blocked by gate 220 due to the inherent switching time of flip-flop 221. The third clock pulse is blocked by both gates 213 and 214, but is transmitted through gate 220 to the reset input of flip-flop 221, thereby closing gate 220. The output pulse from gate 220 is also transmitted to the reset input of flip-flop 223, causing subsequent OP's to be transmitted to the 0's Transfer Bus in the manner hereinbefore described.

Information pulse V is of long duration and high amplitude. It rises above potential level "b" prior to the first of the three related clock pulses, then rises above level "a" prior to the second clock pulse, then falls below level "a" prior to the third clock pulse, and finally falls below level "b" subsequent to the third clock pulse. Information pulse V therefore energizes Schmidt trigger 211 to produce an output pulse having a width which encompasses only the second of the three related clock pulses, and energizes Schmidt trigger 212 for producing an output pulse which has a width encompassing all three of the related clock pulses. The first clock pulse is blocked by gates 213 and 220, but is transmitted through gate 214, setting flip-flop 221 to 1 for arming gate 220. The second clock pulse is transmitted through gate 213 for resetting flip-flop 221 to 0. The second clock pulse, after passing through delay line 218, is blocked by gate 220, but is transmitted through gate 214, setting flip-flop 221 to 1 and arming gate 220. The third clock pulse is blocked by gate 213 but is transmitted simultaneously through gates 214 and 220 to apply both a set and a reset pulse to flip-flop 221, thereby reversing the latter to 0 in the manner hereinbefore described. The pulse output from gate 220 also resets flip-flop 223 to 0; therefore, subsequent OP's are transmitted to the 0's Transfer Bus until such time as flip-flop 223 is set to 1.

Flip-flop 223 is set to 1 in response to each pulse from the Read-Write Amplifiers which signifies a change in the band value from 0 to 1. The circuit for setting flip-flop 223 to 1 is substantially identical to the circuit previously described for resetting that flip-flop to 0, and includes a pair of Schmidt triggers 231 and 232 which are biased, respectively, to respond to that part of an information pulse which lies above potential levels "a" and "b". The output of the previously described amplifier 229 is connected to the inputs of both Schmidt triggers 231 and 232, it being recalled that the output of amplifier 229 is a positive pulse for each information signal indicating a change from 0 to 1 of the band digit. The clock pulse ouput from delay line 216 is applied to a gate 233 which is armed by the output of trigger 231, and the output of delay line 218 is applied to the input of a gate 234 which is armed by the output of trigger 232. The output of gate 233 is connected to the reset input of a flip-flop 241 and the output of gate 234 is connected to the set input of flip-flop 241. Each CP-2 is applied to the reset input of flip-flop 241, thereby maintaining the latter normally reset to 0. The clock pulse output from delay line 218 is also applied to the input of a gate 240 which is armed by the 1 side output terminal of flip-flop 241. The output of gate 240 is connected to the reset input of flip-flop 241 and to the set input of flip-flop 223.

Each information pulse representing a change from 0 to 1 of the band digit is operated upon by triggers 231 and 232, flip-flop 241, and gates 233, 234 and 240 in the manner hereinbefore described, and sets flip-flop 223 to 1; therefore, subsequent OP's from the output of gate 207 are transmitted through gate 225 and amplifier 227 to the 1's Transfer Bus until the next change in the value of the band digit causes flip-flop 223 to be reset to 0.

In summary, the Interpreter identifies the proper time position of each information pulse and then employs that pulse for controlling the transmission of subsequent 0's or 1's pulses to the Memory Busses until a next information pulse is received. Briefly, the time position of each information pulse is identified by detecting the amplitude of the pulse during each digit interval embraced by the pulse. If the pulse has more than a predetermined amplitude during a first digit interval, its timing is conditionally identified with the clock pulse occurring during that digit interval. If the information pulse is subsequently found to have more than a second and higher predetermined amplitude during a second digit interval, the first identification is ignored, and the pulse is re-identified with the next clock pulse. If the information pulse does not have the higher minimum amplitude during the second digit interval, the first identification is retained. It will be seen that the above principle of multiple sampling of a signal can be extended to testing for "n" minimum amplitudes during corresponding "n" successive digit intervals, and ultimately identifying the timing of the information pulse with the clock pulse occurring during the digit interval in which the greatest amplitude is detected.

ARITHMETIC SECTION

Complementer

Figure 40:
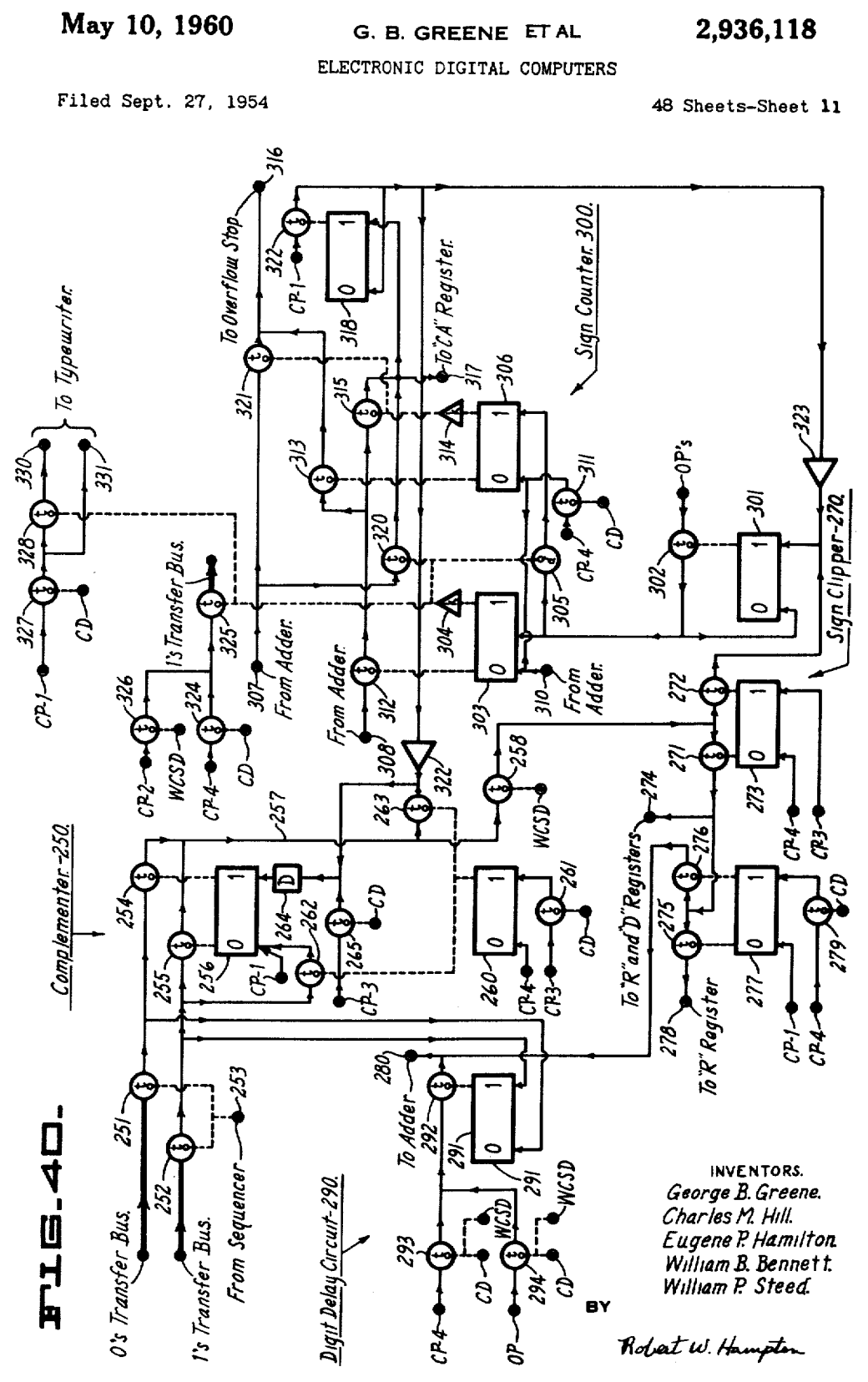

The Complementer, which is shown in Fig. 40, receives words through the Transfer Busses (see also Fig. 32), either from Memory or from the "A" Register. The Complementer then transmits each word to the Sign Clipper, either in its original form or as a 1's complement, according to the sign of the word, and according to the operation which is to be performed. The 1's complement of an "n" digit binary word is found by subtracting the word from another "n" digit word comprising all 1's, i.e., by changing each 0 to 1 and each 1 to 0.

Referring to Fig. 40, the 0's Transfer Bus is connected to the input of a gate 251, and the 1's Transfer Bus is connected to the input of a gate 252. Gates 251 and 252 are both normally armed through a terminal 253 from the Sequencer (Fig. 51), but are both closed during Phase 1 of any code in order to prevent a command word, which is on the Transfer Busses, from entering the Complementer. The output of gate 251 (Fig. 40) is connected to the input of a gate 254, and the output of gate 252 is connected to the input of a gate 255. Gates 254 and 255 are controlled by the respective 1 and 0 sides of a flip-flop 256 which is normally set to 0, each CP-1 being applied to its reset input.

When flip-flop 256 stands at 0, 1's pulses of a word from the output of gate 252 are transmitted through gate 255 to a lead 257, but 0's pulses are blocked by gate 254. Therefore, the word is represented on lead 257 merely by 1's pulses, each 0 digit of the word being represented on that lead by the absence of a pulse during the related digit interval. When flip-flop 256 stands at 1, 1's pulses from the output of gate 252 are blocked at gate 255, but 0's pulses from the output of gate 251 are transmitted through gate 254 to lead 257 where they appear as 1's pulses, and the word is thereby complemented. Lead 257 is connected to the input of a Complementer output gate 258, the output of which is connected to an input of the Sign Clipper 270 (see also Fig. 32), hereinafter described. Gate 258 is normally armed by the WCSD, hereinafter described; therefore, words that enter the Complementer are normally transmitted to the Sign Clipper.

Means for setting flip-flop 256 to its 1 state will be described hereinafter. It is noted at this point, however, that if flip-flop 256 is set to 1 for conditioning gates 254 and 255 to complement a next input word from the Transfer Busses, it is set to 1 prior to the first digit of the next input word but subsequent to the CP–4 which precedes that word. It is recalled that the plus or minus sign digit of each word on the Transfer Busses is represented by a pulse on the 0's or 1's Transfer Bus, respectively, preceding the first digit of a word and substantially synchronous with the CP–4 preceding that word. Therefore, if the sign of the input word is plus, a pulse which is coincident with CP–4 passes through gate 251 and is blocked by gate 254, but if the sign of the input word is minus, a pulse which is coincident with CP–4 appears on the 1's Transfer Bus and is passed through gates 252 and 255 before flip-flop 256 is set to 1 for closing gate 255.

The 0 or 1 state of flip-flop 256 is controlled by a circuit comprising a flip-flop 260 which normally stands at 0, each CP–4 being applied to its reset input. CP–3 may be applied to the set input of flip-flop 260 through a Complementer sense gate 261 which is armed during both the Add and Subtract Codes by the Code Distributor. The 1 side output terminal of flip-flop 260 arms a pair of gates 262 and 263. The output of gate 252 is connected to the input of gate 262, and the output of gate 262 is connected to the reset input of flip-flop 256. The outputs of both gates 254 and 255 are applied to the input of gate 263, and the output of gate 263 is connected through a delay line 264 to the set input of flip-flop 256. CP–3 may be applied to the set input of flip-flop 256 through a Complementer set gate 265 and delay line 264. Gate 265 is armed by the Code Distributor during subtraction operations but not during addition operations. The foregoing circuit controls flip-flop 256, and therefore gates 254 and 255, for complementing or not complementing a word, and for transmitting or not transmitting its sign digit to the Sign Clipper 270, according to the sign of the operand and according to whether the operand is being added or subtracted. There are four possible cases, as follows.

First, a positive operand may be added, in which case the operand is not complemented and its sign digit is not transmitted to the Sign Clipper. Since the operation is addition, the Complementer sense gate 261 is armed, but the Complementer set gate 265 is closed. Therefore, CP–3 sets flip-flop 260 to 1 through gate 261, arming gates 262 and 263. The plus sign of the operand is indicated by a pulse (coincident with CP–4) at the input of the normally closed gate 254. Since flip-flop 256 normally stands at 0, gate 254 is closed, and no sign pulse is transmitted through lead 257 and gate 258 to the Sign Clipper 270, or through lead 257, gate 263 and delay line 264 to the set input of flip-flop 256. The CP–4 which is coincident with the sign pulse of the operand resets flip-flop 260, thereby closing gates 262 and 263. The 1's pulses of the operand are then transmitted through gate 255, lead 257, and gate 258 to the Sign Clipper.

Second, a positive operand may be subtracted, in which case the operand is complemented, and its sign digit is transmitted to the Sign Clipper. Since the operation is subtraction, both gates 261 and 265 are armed; CP–3 therefore passes through gate 261, setting flip-flop 260 to 1, and passes through gate 265 and delay line 264, setting flip-flop 256 to 1. The sign pulse (which is coincident with CP-4) from the output of gate 251, is transmitted through gate 254, lead 257, and gate 258 to the Sign Clipper. The sign pulse is also transmitted through lead 257, gate 263 and delay line 264 to the set input of flip-flop 256, which already stands at 1. CP–4 resets flip-flop 260 to 0, closing gates 262 and 263. The 0's pulses of the operand are then transmitted through gate 254, thereby complementing the operand.

Third, a negative operand may be added, in which case the operand is complemented, and its sign digit is transmitted to the Sign Clipper. Since the operation is addition, gate 261 is armed, but gate 265 is closed. Therefore, CP–3 sets flip-flop 260 to 1, arming gates 262 and 263. The minus sign pulse, which is received from the output of gate 252, is transmitted through the normally armed gate 255, and through lead 257 and gate 258 to the Sign Clipper. The sign pulse from the output of gate 255 is also transmitted through gate 263 and delay line 264 to the set input of flip-flop 256, thereby setting the latter to 1 for arming gate 254 and for closing gate 255. Delay line 264 permits the sign pulse from gate 262 to reset flip-flop 256 to 0 before the same pulse sets flip-flop 256 back to 1. CP–4 resets flip-flop 260 to 0, closing gate 262 and 263. The 0's pulses of the operand are then transmitted through gate 254, thereby complementing the operand.

Fourth, a negative operand may be subtracted, in which case the operand is not complemented, and its sign digit is not transmitted to the Sign Clipper. Since the operation is subtraction, both gates 261 and 262 are armed and transmit CP–3 for setting the respective flip-flops 260 and 256 to 1. The minus sign pulse, which is received from the output of gate 252, is blocked by gate 255, and the sign pulse is not transmitted through lead 257 and gate 258 to the Sign Clipper. However, the sign pulse is transmitted through gate 262 to the reset input of flip-flop 256, resetting that flip-flop to 0 for arming gate 255 and for closing gate 254. CP–4 resets flip-flop 260 to 0, thereby closing gates 262 and 263. The 1's pulses of the operand are then transmitted through gate 255, and the operand is not complemented.

*Sign clipper*

Each sign digit and its related word from the output of gate 258 are transmitted to the Sign Clipper 270 (see also Fig. 32), which, in turn, transmits the sign digit to the Sign Counter 300, and then transmits the word digits to either the "R" Register 420, the "D" Register 450, or the Adder 350.

The output of gate 258 is connected to the input of each of two gates 271 and 272 that are armed, respectively, by the 0 and 1 sides of a normally reset flip-flop 273. Flip-flop 273 is set to 1 by each CP–3; therefore, the sign digit, which is applied to the inputs of gates 271 and 272 coincident with CP–4, passes through gate 272. The output of gate 271 is connected through a terminal 274 to an input of the "R" Register and to an input of the "D" Register, and the output of gate 272 is connected to the Sign Counter, hereinafter described. Flip-flop 273 is reset to 0 by each CP–4, thereby closing gate 272 and arming gate 271. However, the inherent time delay in the reversing of flip-flop 273 permits the sign digit, which is coincident with CP–4, to pass through gate 272 before that gate is closed. Since CP–4 resets flip-flop 273 to 0, gate 271 is thereafter armed and the word digits are transmitted through that gate.

Figure 41:
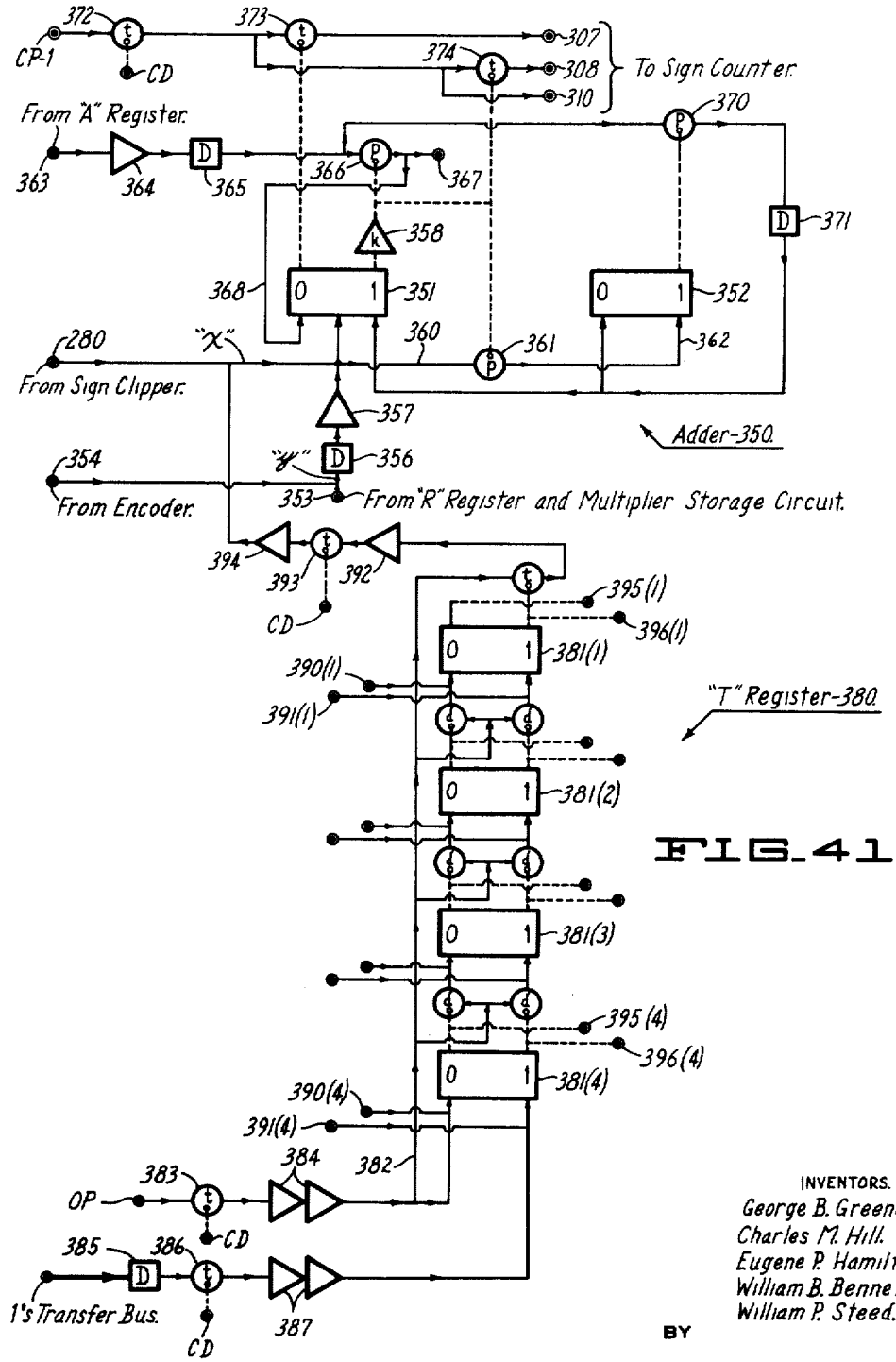
Fig. 41 is a block diagram showing the Adder and the "T" Register.

The output of gate 271, in addition to being connected to terminal 274, is also connected to the inputs of a pair of gates 275 and 276. Gates 275 and 276 are armed by the respective 0 and 1 sides of a flip-flop 277 that is normally set to 0, each CP–1 being applied to its reset input. Therefore, gate 275 is normally armed and transmits the 1's pulses from the output of gate 271 through a terminal 278 to a second input of the "R" Register. Flip-flop 277 may be set to 1 by CP–4 through a Sign Clipper output control gate 279 that is armed by the Code Distributor. When flip-flop 277 has been set to 1, the 1's pulses from the output of gate 271 are transmitted through gate 276, the ouput of which is connected through a terminal 280 to the "x" input of the Adder (Fig. 41).

*Digit delay circuit*

During the Write Code, for reasons previously explained, it is necessary to correct an erroneous right shift of an operand by delaying the latter while it is being recirculated from the "A" Register (Fig. 32) through the Transfer Busses, and back into the "A" Register. For this purpose, the outputs of gates 251 and 252 (Fig. 40) are connected to the reset and set inputs, respectively, of a flip-flop 291 in the Digit Delay Circuit 290. Therefore, the state of flip-flop 291 "follows" the 0's or 1's pulses which are transmitted through gates 251 and 252. The 1 side of flip-flop 291 arms a gate 292, the output of which is connected through the terminal 280 to the "x" input of the Adder (see also Fig. 32). CP–4 is applied to the input of gate 292 through a first readout gate 293, and OP's are applied to the input of gate 292 through a second readout gate 294. Gates 293 and 294 are armed either by the Code Distributor or by the WCSD. It is recalled that each OP is substantially synchronous with its corresponding word pulse on the Transfer Busses; therefore, each OP from the output of gate 294 is applied to the input of gate 292 at the same time that the corresponding word pulse is applied through gate 251 or gate 252 to the reset or set input terminal of flip-flop 291. Since a finite time is required for reversing a flip-flop, each OP applied to the input of gate 292 is blocked or transmitted by that gate in accordance with the previous word pulse, rather than with the corresponding word pulse, and each output pulse from gate 292 through terminal 280 is delayed one digit interval relative to the word pulse from which it was derived. Therefore, flip-flop 291 and gate 292 constitute an extra register stage that may be inserted in series with the Adder and the "A" Register, by arming gates 293 and 294. The specific use of the Digit Delay Circuit during the Write Code will be described in detail in relation to that code.

The Digit Delay Circuit is also employed during a roundoff operation. It will be shown, in the descriptions of the computer codes, that if the first "n" digits of a word standing in the "A" Register are to be rounded off, the first "n" digits of the word remain in the "A" Register and the (n+1)st digit of that word is shifted from the "A" Register through Transfer Busses, the Complementer and the Sign Clipper into the "R" Register. It is recalled that the state of the Digit Delay flip-flop 291 is determined by the value of the digit most recently transmitted from the Transfer Busses through gate 251 or gate 252. Therefore, after the (n+1)st digit of a word has been shifted into the "R" Register in preparation for rounding off the word, flip-flop 291 stands at 0 or 1, according to the value of that digit. CP–4 is then passed through gate 293, which is armed by the Code Distributor during a roundoff operation, and is applied to the input of gate 292. If gate 292 is armed, indicating that the last digit transmitted to the "R" Register was a 1, an operand comprising a digit 1 is transmitted to the Adder. If gate 292 is not armed, no digit is transmitted to the Adder on CP–4, and this condition represents the entry of a 0 operand into the Adder. During the following OP train, as will be shown hereinafter, the word standing in the "A" Register is entered into the Adder as a second operand, and is combined with the roundoff digit 0 or 1 standing in the Adder.

*Sign counter*

IN GENERAL

In response to each minus operand that is being added, and in response to each positive operand that is being subtracted, the Sign Counter 300 (Fig. 32) receives a sign pulse from the output of the Sign Clipper gate 272 (Fig. 40), as hereinbefore described. The sign pulses, which are coincident with CP–4, are delayed 1 digit interval in the Sign Counter (see also Fig. 32) and are then counted. The total number of minus signs (0, 1 or 2) in each pair of operands is thereafter identified by a corresponding count standing in the Sign Counter. During the Add, Subtract and Compare Codes, the condition of the Sign Counter, along with an overflow or non-overflow condition of the Adder, is detected for controlling energization of the Overflow Stop Circuit if the capacity of the "A" Register has been exceeded, or to condition the Complementer for complementing the result, if this should be required. Also, during the Compare Code, if the result of a subtraction is negative, i.e., if the subtraction is "unsuccessful," it is necessary to add 1 to the count standing in the "CA" Register.

DELAYED SIGN COUNT

Referring again to Fig. 40, the sign pulse output from gate 272 is transmitted to the input of a delay flip-flop 301 that normally stands at 0. The 1 side output terminal of flip-flop 301 arms a gate 302. OP's are applied to the input of gate 302, the output of which is connected to the reset input of flip-flop 301 and to the symmetrical input of a first stage Sign Counter flip-flop 303. Therefore, each sign pulse from gate 272 sets flip-flop 301 to 1, arming gate 302. The first OP of the succeeding train is transmitted through gate 302 for reversing the state of flip-flop 303 and for resetting flip-flop 301 to 0, thereby closing gate 302. The 1 side output terminal of flip-flop 303 arms a gate 305 through a cathode follower 304. The output of gate 302 is connected to the input of gate 305, and the output of gate 305 is connected to the set input of a second stage Sign Counter flip-flop 306, which normally stands at 0. Therefore, if flip-flop 303 has been set to 1 in response to a first sign digit, gate 305 is armed. If a second sign digit is transmitted to the Sign Counter, a second pulse passes through gate 302, resetting flip-flop 303 to 0, and passes through gate 305, setting flip-flop 306 to 1. From the foregoing, it is seen that flip-flop 301 and gate 302 delay the counting of each sign digit one digit interval, and that the final collective state of flip-flops 303 and 306 indicates the number of sign digits (0, 1 or 2) transmitted to the Sign Counter in relation to each pair of operands. If both flip-flops 303 and 306 remain reset to 1, no sign digits were received; if flip-flop 303 stands set to 1 and flip-flop 306 stands set to 0, one sign digit was received; and if flip-flop 303 stands set to 0 and flip-flop 306 stands set to 1, two sign digits were received. The reasons for delaying each sign count one digit interval will be explained hereinafter.

OVERFLOW AND NON-OVERFLOW INPUT

After the Sign Counter has counted the 0, 1 or 2 sign digits related to a pair of operands, it receives a pulse from the Adder (Fig. 41), coincident with the next CP-1, either at a terminal 307 (Fig. 40) indicating a non-overflow condition of the Adder, or at a terminal 308 indicating an overflow condition of the Adder. Simultaneously with the overflow or non-overflow pulse, a further pulse is received from the Adder at a terminal 310 for resetting flip-flops 303 and 306 to 0 in preparation for a next counting operation. Flip-flops 303 and 306 may also be reset to 0 by CP-4 applied through a reset gate 311 that is armed by the Code Distributor.

Figure 47:
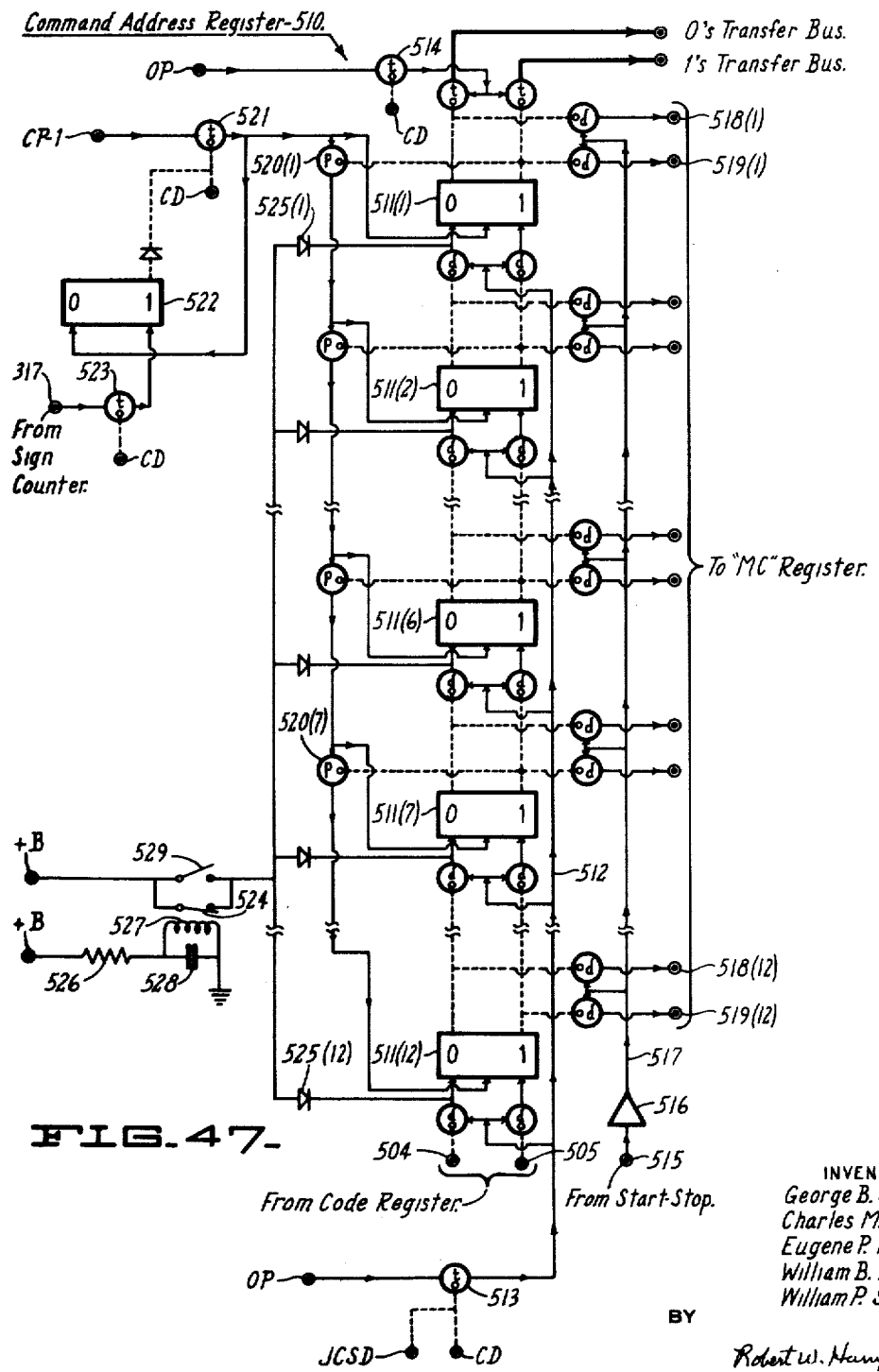
Fig. 47 is a block diagram of the "CA" Register.
Figure 56:
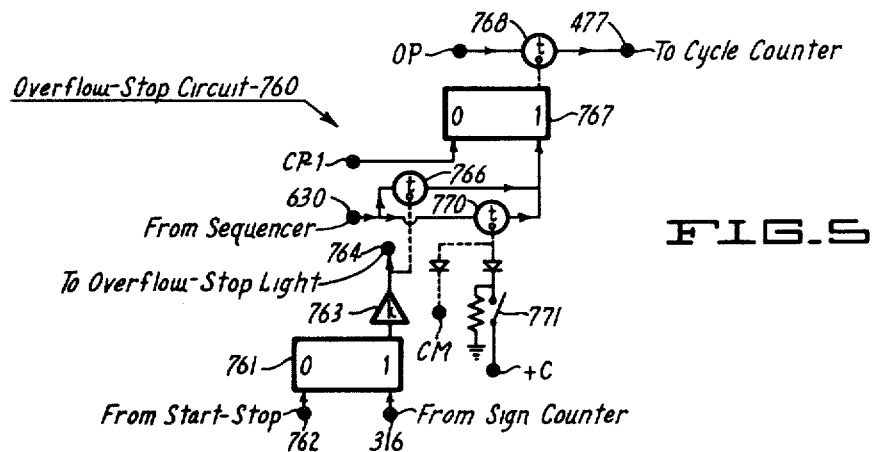
Fig. 56 is a block diagram of the Overflow Stop Circuit.

Terminal 308 is connected to the input of a gate 312 that is armed by the 0 side of flip-flop 303. The output of gate 312 is connected to the inputs of a pair of gates 313 and 315. Gate 313 is armed by the 0 side of flip-flop 306; and gate 315 is armed through a cathode follower 314 by the 1 side of flip-flop 306. The output of gate 313 is connected through a terminal 316 to the Overflow Stop Circuit 750 (Fig. 56). The output of gate 315 (Fig. 40) is connected through a terminal 317 to an extra-count input of the "CA" Register 510 (Fig. 47). The output of gate 315 (Fig. 40) is also connected to the set input of a flip-flop 318 that normally stands at 0. Flip-flop 318, if set to 1, causes the next word (the result of the two operands) to be complemented, as hereinafter described.

The non-overflow input terminal 307 is connected to the inputs of a pair of gates 320 and 321. Gate 320 is armed through cathode follower 304 by the 1 side of flip-flop 303, and gate 321 is armed through cathode follower 314 by the 1 side of flip-flop 306. The output of gate 320 is connected to the set input of flip-flop 318 and to terminal 317, and the output of gate 321 is connected to terminal 316. The operation of the foregoing circuit will be described in relation to each of the three possible states of the Sign Counter (following a count of 0, 1 or 2 sign digits), and in relation to either the overflow or the non-overflow condition of the Adder.

SIGN COUNT OF 0

The first case occurs when the signs of a pair of operands are such that flip-flops 303 and 306 both stand at 0, i.e., when no sign digits have been counted. This indicates either that two positive operands were added, or that a negative operand was subtracted from a positive operand; either case is equivalent to the addition of two positive operands. A non-overflow condition of the Adder indicates that the capacity of the "A" Register has not been exceeded, and the Overflow Stop Circuit must not be energized. Also, the result can only be positive and must not be complemented. If the Compare Code is in progress, a pulse must not be transmitted to the "CA" Register for advancing its count, because the subtraction that occurred in such a case was "successful." The non-overflow pulse, which is received at terminal 307, is blocked by both of the closed gates 320 and 321. Therefore, the Overflow Stop Circuit is not energized; flip-flop 318 remains reset to 0 so that the result is not complemented; and no pulse is transmitted through terminal 317 for increasing the count standing in the "CA" Register.

If, however, both flip-flops 303 and 306 stand at 0, but the Adder stands in an overflow condition, the Overflow Stop Circuit must be energized. The result, in such a case, must not be complemented and the count in the "CA" Register must not be increased. The overflow pulse received at terminal 308 is transmitted through the armed gates 312 and 313, and through terminal 316 to the Overflow Stop Circuit. The output pulse from gate 312 is blocked by gate 315; therefore, flip-flop 318 remains reset to 0, and the result is not complemented. Also no extra-count pulse is transmitted through terminal 317 to the "CA" Register.

SIGN COUNT OF 1

The second case occurs when the signs of a pair of operands are such that flip-flop 303 stands at 1 and flop-flop 306 stands at 0. This indicates either that a negative operand was added to a positive operand or that a positive operand was subtracted from a positive operand. Since either of these cases may be considered as the subtraction of a positive operand from a positive operand, it is impossible to exceed the capacity of the "A" Register. But since one of the operands must be complemented in either of the above cases, a positive result is represented by the overflow condition of the Adder, thereby indicating the necessity for adding a "fugitive digit." The fugitive digit is added during an automatic recycling of the result through the Adder and back into the "A" Register, in the manner hereinafter described in relation to the Add, Subtract and Compare Codes. Therefore, the overflow condition of the Adder indicates that the result must not be complemented, and further indicates, if the Compare Code is in progress, that the count standing in the "CA" Register must not be increased, since the subtraction was "successful." Accordingly, an overflow pulse from terminal 308 is blocked by the closed gate 312; therefore, no pulse is transmitted through either terminal 316 or terminal 317, and flip-flop 318 remains reset to 0.

If the Adder stands in a non-overflow condition when flip-flops 303 and 306 stand at 1 and 0, respectively, this indicates that a larger number was subtracted from a smaller, and that the result must be complemented. Since the subtraction was "unsuccessful," an extra-count pulse must be transmitted to the "CA" Register. However, it has been shown that the capacity of the "A" Register cannot be exceeded when the sign count totals 1; therefore the Overflow Stop Circuit must not be energized. A non-overflow pulse from terminal 307 is transmitted through gate 320 to the set input of flip-flop 318, thereby conditioning the latter for causing the result to be complemented, and a pulse is transmitted to the "CA" Register through terminal 317. However, the non-overflow pulse is blocked by the closed gate 321, and no pulse is transmitted to the Overflow Stop Circuit through terminal 316.

SIGN COUNT OF 2

The third and final case occurs when the signs of a pair of operands are such that flip-flop 303 stand at 0 and flip-flop 306 stands at 1. This indicates either that two negative operands were added or that a positive operand was subtracted from a negative operand. Either of these cases may be considered as the addition of two negative operands, and since both operands must therefore be complemented, the non-overflow condition of the Adder represents the addition of two large negative operands, indicating that the capacity of the "A" Register has been exceeded and that the Overflow Stop Circuit must be energized. In such case, it is unnecessary to complement the result or to transmit an extra-count pulse to the "CA" Register. A non-overflow pulse from terminal 307 is blocked by the closed gate 320, and no pulse is transmitted to the "CA" Register through terminal 317 or to the set input of flip-flop 318. However, the pulse from terminal 307 is transmitted through the armed gate 321 and terminal 316 to the Overflow Stop Circuit.

If the Adder stands in an overflow condition when flip-flops 303 and 306 stand at 0 and 1, respectively, this indicates that the capacity of the "A" Register has not been exceeded. However, since both operands were negative, the result is negative and must be complemented. Also, since the result is negative, the subtraction was "unsuccessful," and an extra-count pulse must be transmitted to the "CA" Register. Accordingly, an overflow pulse through terminal 308 is transmitted through gates 312 and 315 for setting flip-flop 318 to 1, and for transmitting an extra-count pulse to the "CA" Register through terminal 317. The output of gate 312 is blocked by the closed gate 313, and no pulse is transmitted to the Overflow Stop Circuit through terminal 316.

Although a reset pulse is applied to flip-flops 303 and 306 through terminal 310 at the same time the non-overflow pulse or overflow pulse is received through terminal 307 or terminal 308, respectively, the inherent switching time of flip-flops 303 and 306 permits the non-overflow or overflow pulse to pass through gates 315, 320 or 321, as described above, before these gates are closed by the resetting of flip-flops 303 and 306.

RESULT COMPLEMENTING CONTROL

It is recalled that flip-flop 318 is employed for causing the result of the two operands to be complemented. If flip-flop 318 has been set to 1, in the manner described above, it arms a gate 322. Each CP-1 is applied to the input of gate 322, and the output of that gate is connected to the reset input of flip-flop 318. The output of gate 322 is also connected to the set input of the Complementer flip-flop 256 through an amplifier 322 and delay line 264. Therefore, the first CP-1 which occurs after flip-flop 318 is set to 1 passes through gate 322 for resetting flip-flop 318 to 0, closing gate 322. The CP-1 which passes through gate 322 also sets flip-flop 256 to 1, thereby conditioning the latter for complementing the result word, which is recycled through the Complementer during the next word interval, as hereinafter described.

If flip-flop 318 has been set to 1, indicating that the result value standing in the "A" Register is negative, it is necessary to indicate the negative sign of that operand by storing a count of 1 in the Sign Counter. Therefore, the output of gate 322 is also connected through an amplifier 323 to the set input of the delay flip-flop 301, and the CP-1 which is transmitted through gate 322 sets the delay flip-flop 301 to 1, initiating the entry of a count of 1 into flip-flop 303.

SIGN DIGIT READOUT

When the contents of the "A" Register (Fig. 32) are to be recycled through the Complementer and Adder as an operand, such recycling is performed in response to an OP train, as hereinafter described. The operand sign which stands in the Sign Counter may be transmitted to the Transfer Busses in response to the CP-4 preceding the OP train. For this purpose, CP-4 is transmitted through a readout gate 324 (Fig. 40) that is armed by the Code Distributor. The output pulse from gate 324 is transmitted to the input of a gate 325 that is armed by the 1 side of flip-flop 303 through cathode follower 304. The output of gate 325 is connected to the 1's Transfer Bus. If flip-flop 303 stands at 1, indicating that the operand sign is minus, gate 325 is armed and the output pulse from gate 324 is transmitted through gate 325 to the 1's Transfer Bus, it being recalled that a minus sign in transfer is represented by a digit 1.

It is recalled that during a writing operation, each digit of the word standing in the "A" Register is written in Memory two digit intervals ahead of its corresponding OP, and that the sign digit is therefore written coincident with CP-2, rather than CP-4. Therefore, when a word standing in the "A" Register is written in Memory, its sign digit, if it is minus, must be applied to the 1's Transfer Bus coincident with CP-2. For this purpose, CP-2 may be transmitted through a readout gate 326 that is armed during the Write Code by the WCSD, and through gate 325, if flip-flop 303 stands at 1, to the 1's Transfer Bus.

TYPEWRITER CONTROL AND SIGN

When a word standing in the "A" Register is to be typed out, it is necessary to transmit to the Typewriter 900 (Fig. 32) a sign signal, if the word which is to be typed out has a minus sign, and a type signal, regardless of the sign of that word. For this purpose, CP-1 is transmitted through a Typewriter control gate 327 (Fig. 40) that is armed by the Code Distributor, to the input of a gate 328 that is armed by the 1 side of flip-flop 303. The output of gate 328 is connected through a sign input terminal 330 of the Typewriter (see also Fig. 32). The output of gate 327 is connected through a Typewriter input terminal 331 which, when energized, indicates that a word is to be typed out. Therefore, when a word is to be typed out, CP-1 is transmitted to the Typewriter through gate 327 and terminal 331, regardless of the sign of the word standing in the "A" Register. If the sign of that word is minus, the output of gate 327 is also transmitted to the Typewriter through gate 328 and terminal 330.

Adder

The Adder is provided for additively combining a pair of operands, one or both of which may have been complemented, as previously described.

Referring to Fig. 41, the Adder 350 comprises, basically an additive two-stage binary counter. Each stage includes a respective flip-flop 351 and 352. The set, or 1, state of either flip-flop 351 or 352 represents the digit 1, whereas the reset, or 0, state of either flip-flop represents the digit 0. Flip-flop 351 is adapted to receive at its symmetrical input, from two leads designated "x" and "y,"

respectively, positive pulses representing the 1's of the "x" and "y" operands. The "x" operand may be received either from the Sign Clipper output terminal 280 (Fig. 40), or from the "T" Register 380 (Fig. 41), hereinafter described. Operands that are applied to the "y" lead are received either through a terminal 353 from the "R" Register and the Multiplier Storage Circuit (Fig. 42), or from the Encoder 800 (Fig. 32) through a terminal 354. Operands on the "y" lead are entered into the Adder (Fig. 41) through a delay line 356 and an amplifier 357. The delay line 356 is provided for slightly delaying any pulse from the "y" input, thereby preventing interference between simultaneous pulses on both the "x" and "y" inputs.

During an adding operation in a given denominational column, flip-flop stage 351 may receive either no pulse or one pulse from each of the "x" and "y" inputs. Each operand pulse reverses flip-flop 351; therefore, before any input pulses, or after two input pulses, flip-flop 351 stands at 0, representing a sum of 0, whereas after one input pulse, flip-flop 351 stands at 1, representing a sum of 1.

A carry input to flip-flop 352 occurs if flip-flop 351 stands at 1 when it receives an operand pulse from either input. A gate 361 is armed, through a cathode follower 358, by the 1 side of flip-flop 351. Each "x" or "y" input pulse is applied to the input of gate 361 through a lead 360, and an output lead 362 from gate 361 is connected to the 1's input of flip-flop 352, although lead 362 may be connected to the symmetrical input of flip-flop 352 without affecting the circuit operation. If flip-flop 351 stands at 1 when a pulse is received from either the "x" or "y" input, flip-flop 351 is reset to 0 and flip-flop 352 is set to 1, either by a set pulse or by a symmetrical input pulse, thereby representing a carry resulting from adding a 1 to a 1 stored in flip-flop 351. The inherent switching time of flip-flop 351 is sufficient to permit the input pulse to pass through gate 361 before flip-flop 351 is reset to 0 for closing that gate. It will be seen that after an ordinal pair of operand digits are received from the "x" and "y" inputs, the Adder assumes a stable condition wherein the state of flip-flop 351 represents the sum digit of 0 or 1, and the state of flip-flop 352 represents the absence or presence of a carry digit of 1.

Figure 42:
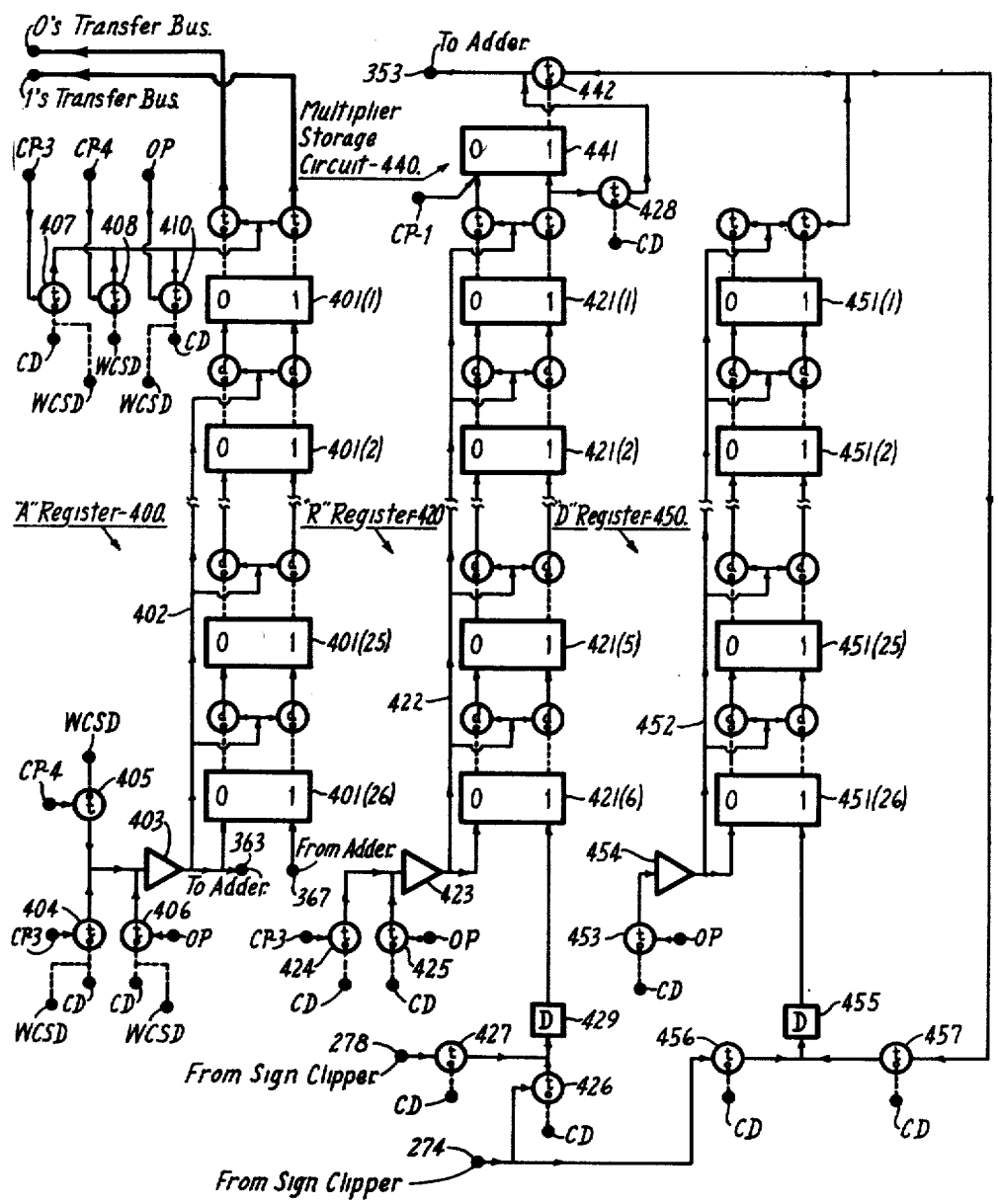
Fig. 42 is a block diagram showing the "A," "R" and "D" Registers and the Multiplier Storage Circuit.

A readout pulse is employed for detecting and reading out the sum digit in flip-flop 351 resulting from the receipt of each pair of operand digits. The detection and readout of each sum digit must be delayed until the Adder has reached a stable condition following the receipt of the operand digits. The delayed readout is accomplished as follows. Readout pulses are received by the Adder through an input terminal 363 from the "A" Register (Fig. 42), and are transmitted through an amplifier 364 (Fig. 41) and a delay line 365 to the input of a gate 366 which is armed by the 1 side of flip-flop 351 through cathode follower 358. The output of gate 366 is connected to an output terminal 367, which constitutes the 1's input terminal to the "A" Register (Fig. 42). It will be seen that a given readout pulse is passed through gate 366 (Fig. 41) if and only if flip-flop 351 stands at 1 in response to the corresponding pair of operand digits; therefore, each pulse on terminal 367 represents a sum digit of 1 in the corresponding column. After a sum digit of 1 in flip-flop 351 has been detected and read out, as described above, the sum digit is then removed from flip-flop 351 in preparation for shifting the next columnar pair of operand digits into the Adder. For this purpose, a lead 368, which connects the output of gate 366 to the reset input of flip-flop 351, receives any sum digit of 1 pulse that passes through gate 366, and employs that pulse for resetting flip-flop 351 to 0.

After a carry digit of 1 has been stored in flip-flop 352, in the manner previously described, it will be seen that the carry digit must be shifted into flip-flop 351 in order to be properly combined with the next pair of operand digits applied to flip-flop 351. Also, flip-flop 352 must be reset to 0 in preparation for receiving a possible carry digit during the addition of the next pair of operand digits. The column shifting is performed by each readout pulse from terminal 363, as follows. After being delayed by delay line 365, each readout pulse is not only applied to the input of gate 366, but is also applied to the input of a gate 370. Gate 370 is armed by the 1 state of flip-flop 352, i.e., gate 370 is armed when a carry digit of 1 is stored in flip-flop 352. The output of gate 370 is applied through a delay line 371 to the reset input of flip-flop 352, and to the set input of flip-flop 351, thereby effectively shifting the carry digit of 1 from flip-flop 352 to flip-flop 351. Thus, if a carry digit of 1 has been stored in the Adder from the previous column, it is represented by the 1 state of flip-flop 351 when the next pair of operand digits are applied to the Adder. Delay line 371 is provided for preventing interference at flip-flop 351 between the respective outputs of gates 366 and 370. If both of these gates are armed when a readout pulse is applied to them, the output of gate 366 first resets flip-flop 351 to 0 before the output from gate 371 sets that flip-flop back to 1.

Flip-flop 351 is also employed for controlling the transmission of CP–1 to the previously described Sign Counter (Fig. 40) for indicating the overflow or non-overflow condition of the Adder following an addition or subtraction operation. Each CP–1 is applied to the input of an overflow test gate 372 (Fig. 41) which is armed by the Code Distributor. The output of gate 372 is connected to the inputs of a pair of gates 373 and 374 which are armed by the 0 and 1 sides of flip-flop 351, respectively. The outputs of gates 373 and 374 are connected to the respective input terminals 307 and 308 of the Sign Counter (see also Fig. 40). The output of gate 372 is also connected directly to the input terminal 310 of the Sign Counter. Therefore, if flip-flop 351 stands at 0 following an addition or subtraction operation, the CP–1 from the output of gate 372 is transmitted through gate 373 and terminal 307 to the non-overflow input of the Sign Counter. However, if flip-flop 351 stands at 1 following an addition or subtraction operation, the CP–1 from the output of gate 372 is transmitted through gate 374 and terminal 308 to the overflow input of the Sign Counter. Each CP–1 which passes through gate 372 is also transmitted directly through terminal 310 to the Sign Counter for resetting the latter, as hereinbefore described.

"T" Register

The previously-mentioned "T" Register 380 comprises a four-stage shift register of the type described in relation to Fig. 30. The four flip-flop stages 381(1) to 381(4) (Fig. 41) are shown with the input stage, i.e., the most significant stage, at the bottom of the figure. OP's are applied to the serial shift bus 382 through a shift gate 383 which is armed by the Code Distributor, and a two-stage amplifier 384. The "T" Register is adapted to receive a serial input from the 1's Transfer Bus through a delay line 385, an input gate 386 which is armed through the Code Distributor, and a two-stage amplifier 387. The "T" Register is also adapted to receive a four-digit parallel input from the Typewriter 900 (Fig. 32). For this purpose, the reset input of each stage is connected to a respective input terminal 390(1) to 390(4) (Fig. 41) and the set input of each stage is connected to a respective input terminal 391(1) to 391(4). A serial 1's output from the "T" Register is transmitted from stage 381(1) through an amplifier 392, an output gate 393 which is armed by the Code Distributor, and an amplifier 394, to the "x" input of the Adder. The "T" Register also has a parallel output to the Typewriter. For this purpose, the 0 side of each stage is connected to a respective output terminal 395(1) to 395(4), and the 1 side of each stage is connected to a respective output terminal 396(1) to 396(4).

Arithmetic registers

IN GENERAL

The arithmetic registers, i.e., the "A" Register 400, the "R" Register 420, and the "D" Register 450, are shown in Figs. 32 and 42. Each of these registers comprises a twenty-six stage shift register of the type shown in Fig. 30, but which is adapted only for serial shifting and not for parallel shifting.

"A" REGISTER

The "A" Register stages (Fig. 42) are designated 401(1) to 401(26), the input, or most significant stage 401(26) being shown at the bottom of the figure. The 1's input the "A" Register is received through the output terminal 367 from the Adder. A serial shift bus 402 of the "A" Register receives shift pulses through an amplifier 403 from any of three sources, viz; (1) CP-3 applied through a shift gate 404 that is armed either by the Code Distributor or by the WCSD; (2) CP-4 applied through a shift gate 405 that is armed by the WCSD; or (3) OP's applied through a shift gate 406 that is armed either by the Code Distributor or by the WCSD. The output pulses from amplifier 403 are transmitted not only to the shift bus 402, but also to the reset input of stage 401(26), and through the terminal 363 to the readout input of the Adder. Since the Adder output is connected only to the "A" Register input, it is desirable that no output be produced from the Adder unless it can be shifted into the "A" Register; therefore, the Adder receives readout pulses only when the "A" Register receives shift pulses.

In the "A" Register, the shift bus 402 does not operate the serial shift gates which are associated with stage 401(1); instead, digits are independently shifted out of that stage and into the 0's and 1's Transfer Busses by shift pulses from any of three sources, viz; (1) CP-3 applied through an output gate 407 that is armed either by the Code Distributor or by the WCSD; (2) CP-4 applied through an output gate 408 that is armed by the WCSD; or (3) OP's applied through an output gate 410 that is armed either by the Code Distributor or by the WCSD.

"R" REGISTER

The "R" Register stages are designated 421(1) to 421(26), the input stage 421(26) being shown at the bottom of the figure. The 1's input to the "R" Register is received through a delay line 429 from either of two sources, viz: (1) from the Sign Clipper output terminal 274 (see also Fig. 40) through an input gate 426; or (2) from the Sign Clipper output 278 through an input gate 427. Both gates 426 and 427 are armed by the Code Distributor. Shift pulses are received by a serial shift bus 422 through an amplifier 423 from either of two sources, viz: (1) CP-3 applied through a shift gate 424; or (2) OP's applied through a shift gate 425. Both gates 424 and 425 are armed by the Code Distributor. The 1's output of stage 421(1) of the "R" Register is transmitted through an output gate 428 to the "y" input terminal 353 of the Adder (Fig. 41). Gate 428 (Fig. 42) is armed by the Code Distributor.

"D" REGISTER

The "D" Register stages are designated 451(1) to 451(26), the most significant stage being shown at the bottom of the drawing. Shift pulses are received by a "D" Register shift bus from OP's applied through a shift gate 453 and an amplifier 454. Gate 453 is armed by the Code Distributor. The 1's input to stage 451(26) of the "D" Register is received through a delay line 455 from either of two sources, viz: (1) from the Sign Clipper output terminal 274 (Fig. 40) through an input gate 456 (Fig. 42); or (2) from the 1's output of stage 451(1) of the "D" Register through a recirculation gate 457. Gates 456 and 457 are armed by the Code Distributor. The 1's output of stage 451(1) is transmitted, as hereinafter described, to the input of the Multiplier Storage Circuit 440 (see also Fig. 32), and is also transmitted to the input of the recirculation gate 457 in the "D" Register.

Multiplier storage circuit

During each word interval of a multiplication, the multiplier digit that stands in the least significant stage of the "R" Register, i.e, stage 421(1), is shifted from that stage into the Multiplier Storage Circuit 440 which then causes entry of the multiplicand (standing in the "D" Register 450) into the "y" input of the Adder if and only if the shifted multiplier digit is a 1.

The 0's and 1's outputs of the serial shift gates in stage 421(1) of the "R" Register are connected, respectively, to the reset and set inputs of a multiplier storage flip-flop 441 which normally stands at 0, each CP-1 being applied to its reset input. The 1 side output terminal of flip-flop 441 arms a gate 442. The input to gate 442 is received from the 1's output of the least significant stage of the "D" Register, i.e., stage 451(1), and when flip-flop 441 stands at 1, the 1's output of the "D" Register is transmitted through gate 442 to the "y" input terminal 353 of the Adder (Fig. 41).

ADDRESS SECTION

Code register

Figure 43:
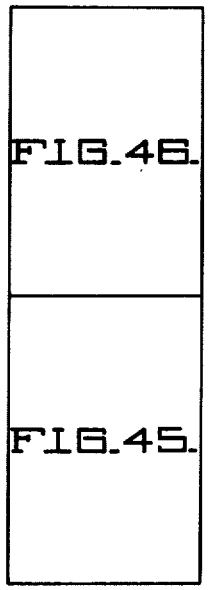
Figure 45:
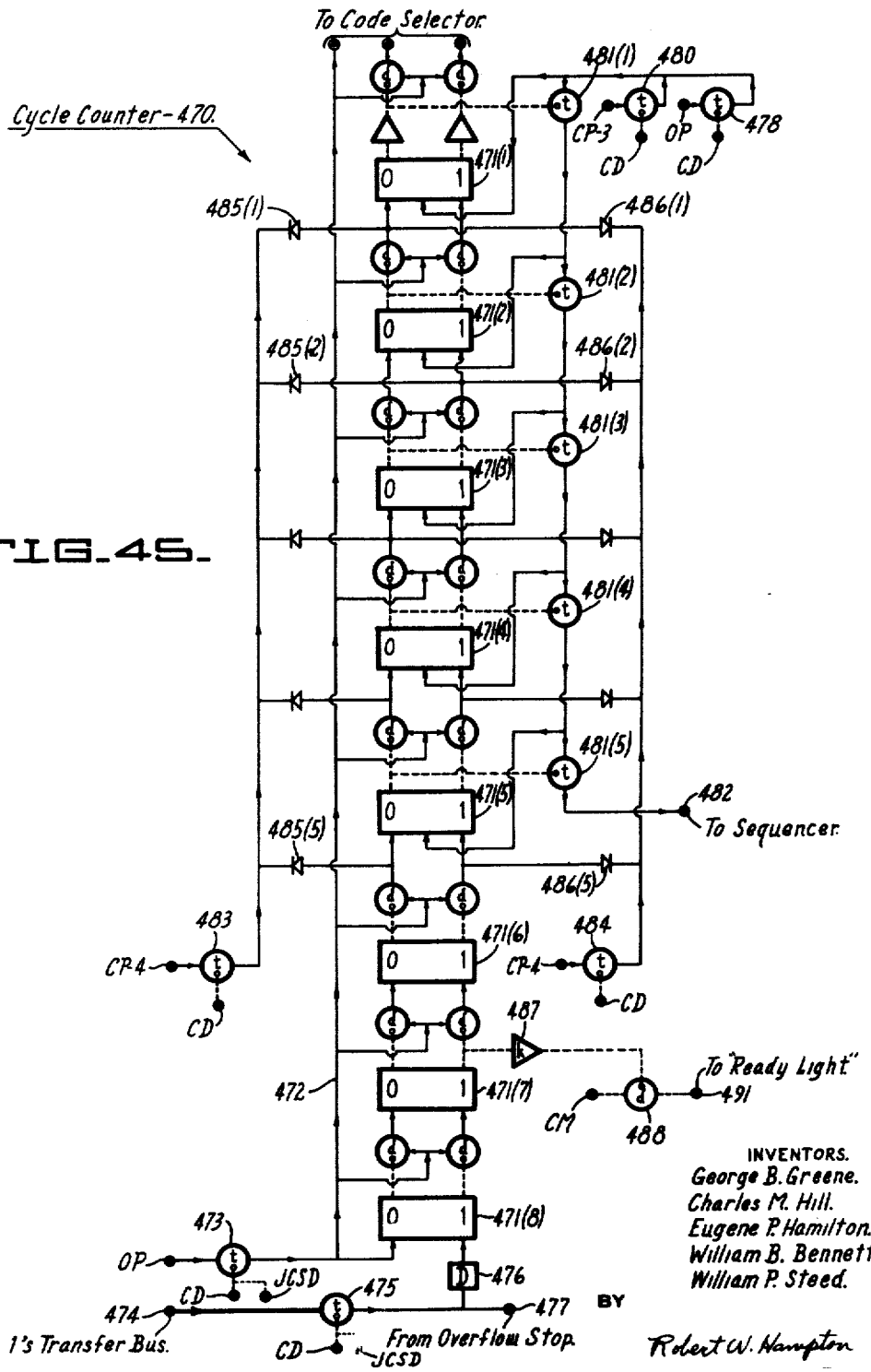
Figs. 45 and 46 are joined to show the entire Code Register.
Figure 46:
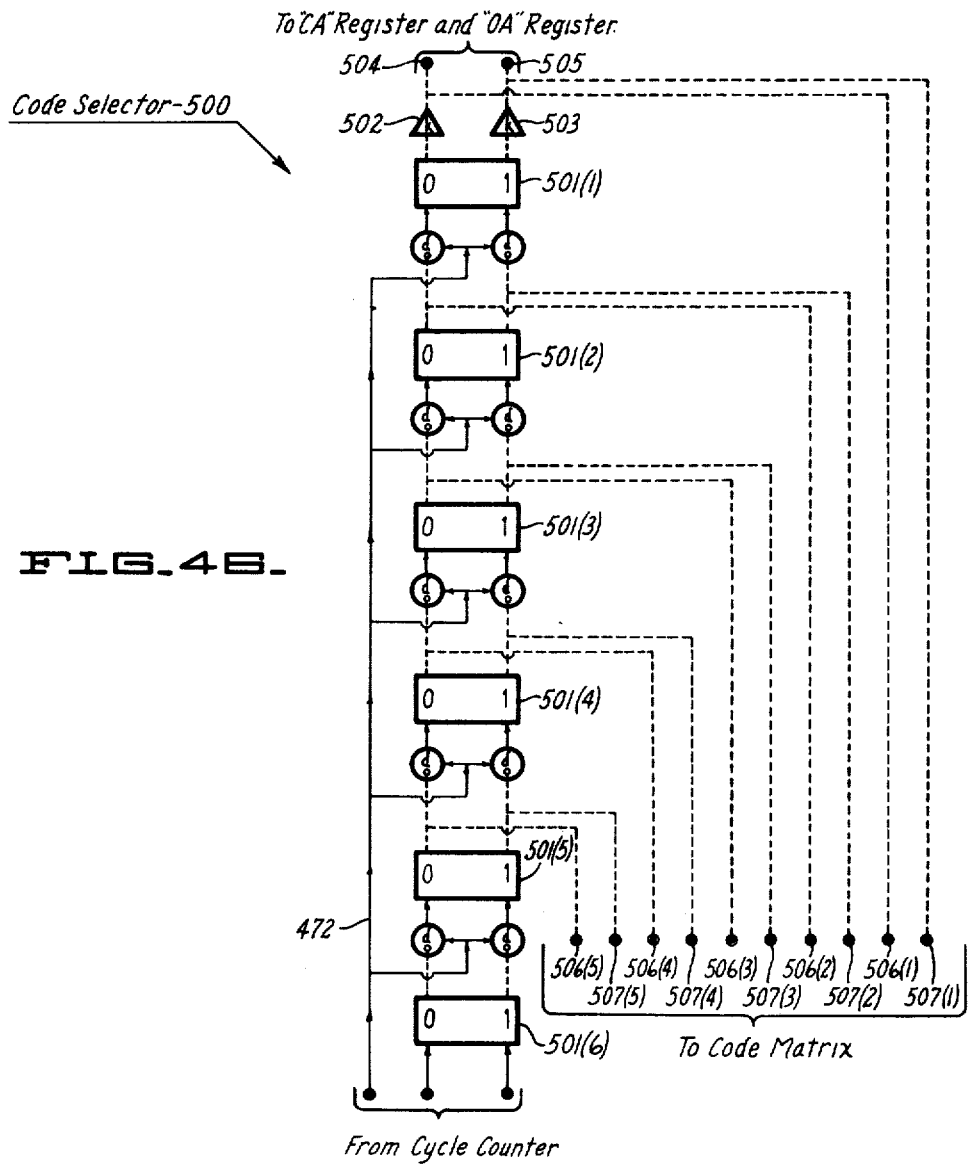

Fig. 43 illustrates the orientation of Figs. 45 and 46 for showing the entire Code Register. In the following description of the Code Register, Figs. 45 and 46 will be considered as a unit.

Figure 48:
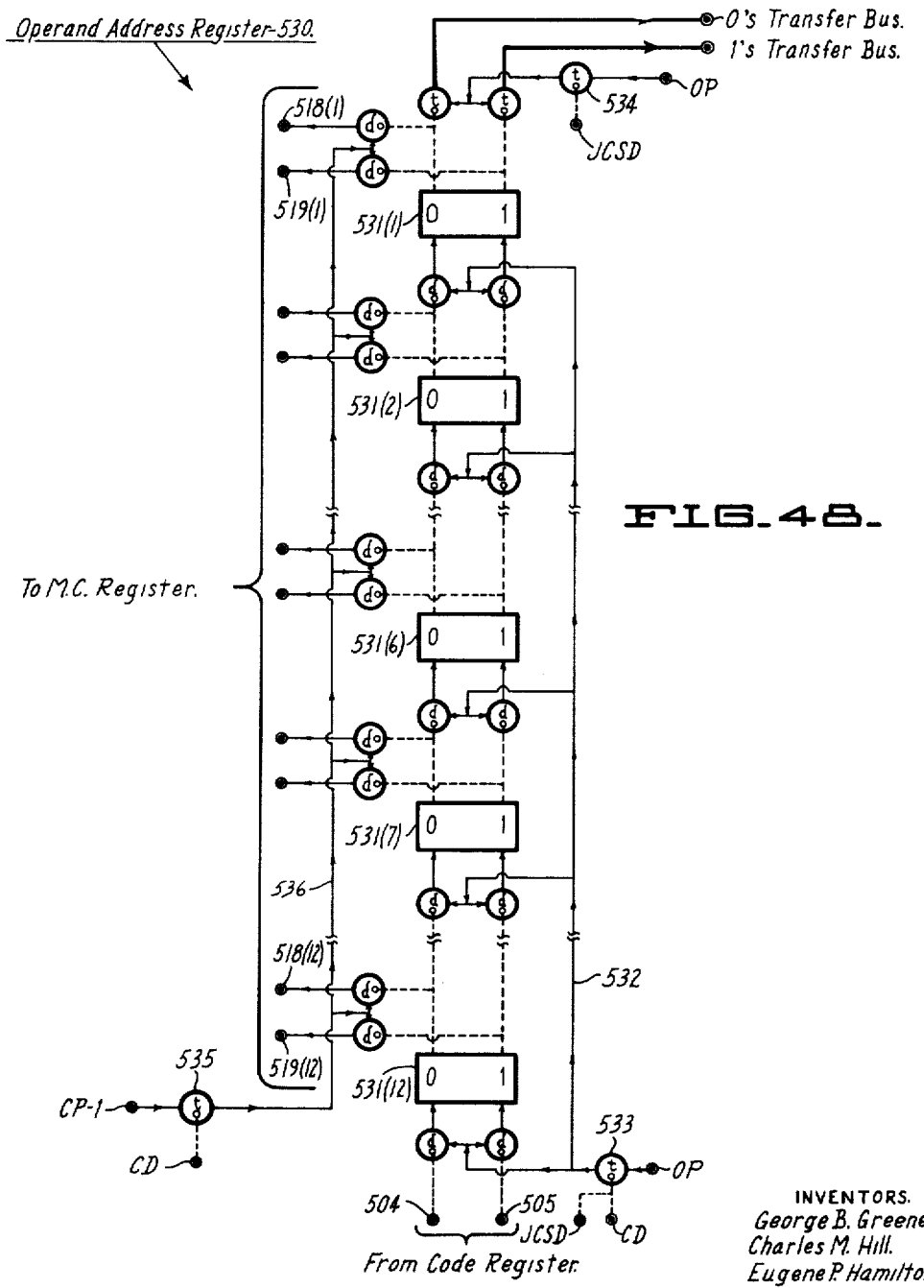
Fig. 48 is a block diagram of the "OA" Register.

The Code Register is primarily associated with the Program Section; therefore, its component units, the Cycle Counter 470 and Code Selector 500, will be described hereinafter in relation to the Program Section. However, as employed in the Address Section, the Code Register may be considered as comprising a continuous fourteen-stage shift register which is of the type previously described, but which is adapted only for serial shifting and not for parallel shifting. The eight most significant stages (Fig. 45) of the Code Register are included in the Cycle Counter 470 and are designated 471(1) and 471(8); the six least significant stages (Fig. 46) are included in the Code Selector and are designated 501(1) to 501(6). OP's for serial shifting the Code Register are applied to a shift bus 472 through a shift gate 473 which is armed either by the Code Distributor or by the JCSD. Words may be shifted serially into the Code Register from the 1's Transfer Bus through an output terminal 474, an input gate 475 which is armed either by the Code Distributor or by the JCSD, a delay line 476, and the set input of stage 471(8). A word of all 1's may also be shifted serially into the Code Register through an input terminal 477 from the Overflow Stop Circuit 760 (Fig. 56) and through delay line 476 (Fig. 45). The 0's and 1's output terminals of stage 501(1) (Fig. 46) are connected through respective cathode followers 502 and 503 and terminals 504 and 505 to the respective 0's and 1's input terminals of both the "CA" Register 510 (Fig. 47) and the "OA" Register 530 (Fig. 48).

Command address register

Figure 49:
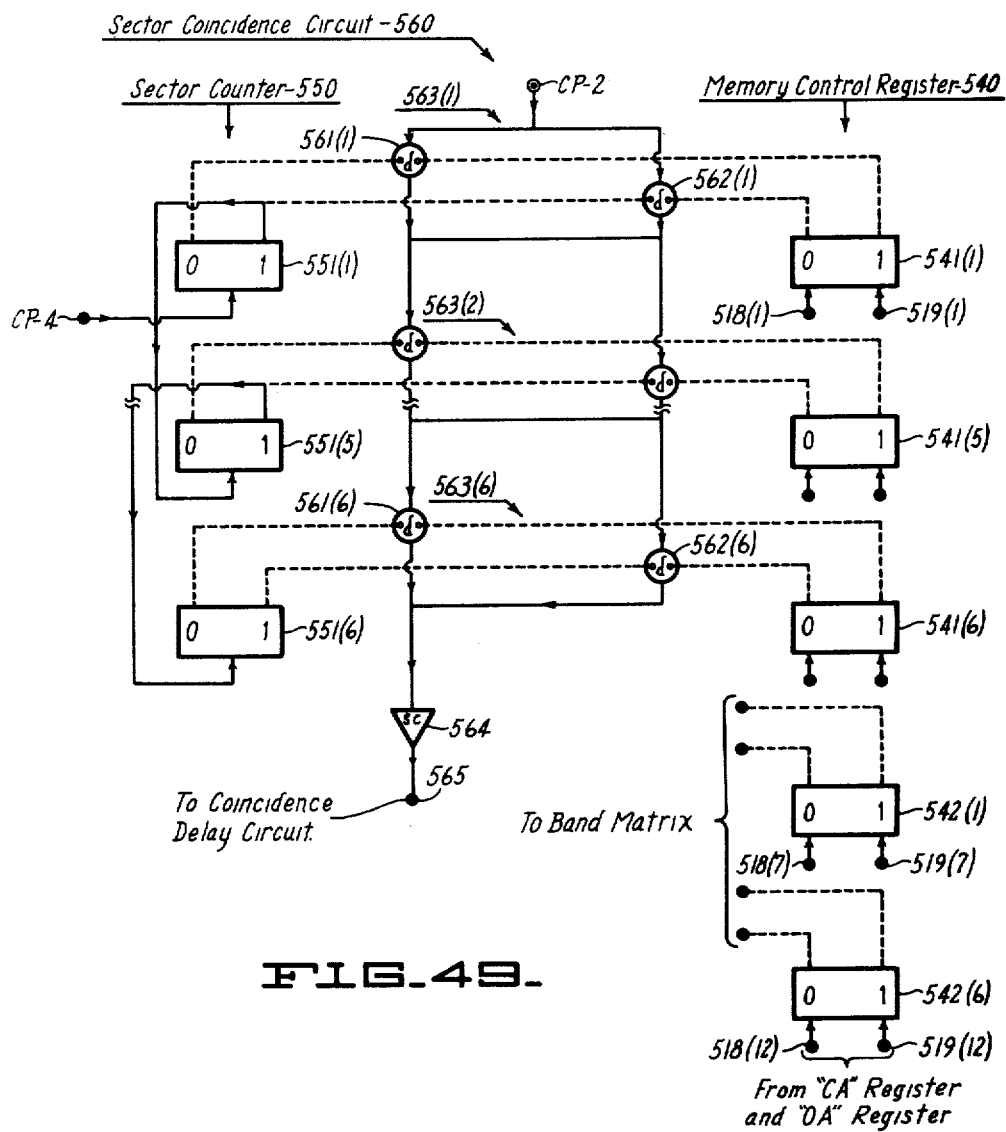
Fig. 49 is a block diagram showing the "MC" Register, the Sector Counter, and the Sector Coincidence Circuit.

The "CA" Register 510, shown in Fig. 47, is provided for receiving, storing, and increasing by unity, addresses of the various commands that are employed during operation of the computer, and comprises a twelve-stage shift register adapted for both serial and parallel shifting. The stages are designated 511(1) to 511(12), respectively, the most significant stage being shown at the bottom of the figure. 0's and 1's pulses are applied to the input stage 511(12) through the respective Code Register output terminals 504 and 505 (see also Fig. 46). OP's are applied to a serial shift bus 512 through a serial shift gate 513 that is armed either by the Code Distributor or by the JCSD. OP's for serially shifting out of stage 511(1) are separately applied through an output gate 514 that is armed by the Code Distributor. The outputs of the 0's and 1's serial shift gates from stage 511(1) are connected to the respective 0's and 1's Transfer Busses. For parallel shifting from all stages, the "Start" pulse from the Sequencer (Fig. 51) is applied through a terminal 515 (Fig. 47) and an amplifier 516 to a parallel shift bus 517. The 0's and 1's outputs of the parallel shift gates are applied through respective terminals 518(1) to 518(12) and 519(1) to 519(12) to corresponding ordinal inputs of the "MC" Register 540 (Fig. 49).

Means are provided for adding 1 to the count standing in the "CA" Register, for setting up the address of a next command. For this purpose, the "CA" Register stages are arranged not only as a shifting register but also as a binary counter. The 1 side of each stage arms a respective carry gate 520(1) to 520(11) (Fig. 47). CP–1 may be applied through a normal count gate 521 to the input of carry gate 520(1), which is associated with the least significant stage of the "CA" Register. The output of carry gate 520(1) is connected to the symmetrical input of stage 511(2), and to the input of carry gate 520(2). Similarly, the outputs of carry gates 502(2) to 520(11) are connected to the symmetrical inputs of the respective stages 511(3) to 511(12), the outputs of carry gates 520(2) to 520(10) are connected to the inputs of the respective carry gates 520(3) to 520(11). It will be apparent that stages 511 and gates 520 form an additive binary counter of the type previously described in relation to the Adder (Fig. 41), and that any count standing in stages 511 (Fig. 47) is increased by unity in response to each CP–1 which is transmitted through gate 521. Gate 521 may be armed either by the Code Distributor or by the 1 side of a flip-flop 522. Flip-flop 522 normally stands at 0, each CP–1 from the output of gate 521 being applied to its reset input. The previously described output terminal 317 of the Sign Counter 300 (Fig. 40) is connected to the set input of flip-flop 522 (Fig. 47) through an extra-count gate 523 which is armed by the Code Distributor. If gate 523 is armed, and a pulse appears at terminal 317, thereby indicating that an extra count of 1 is to be entered into the "CA" Register during the Compare Code, flip-flop 522 is set to 1 for arming gate 521. The next CP–1 is transmitted through gate 521, adding 1 to the count standing in the "CA" Register, and resetting flip-flop 522 to 0 for closing gate 521.

Means are also provided for automatically resetting all stages of the "CA" Register to 0 when the computer power supply is turned on, and for selectively resetting all of these stages to 0 at any time during the computer operation. A first switch 524 normally stands closed when the computer power supply is off, and connects a power terminal +B to the reset input of each stage 511(1) to 511(12) through a respective diode 525(1) to 525(12). Therefore, when +B power is turned on, each stage of the "CA" Register is reset to 0. In order to thereafter remove the +B voltage from the "CA" Register stages the following means are provided for automatically opening switch 524 after a short time delay. The +B supply is connected through a resistor 526 to one end of a relay coil 527, the other end of which is grounded. A capacitor 528 is connected in series with resistor 526 between +B and ground, and is connected in parallel with coil 527. When the +B supply is turned on, capacitor 528 is charged at a rate which is determined by the values of capacitor 528 and resistor 526. When capacitor 528 has been charged to a predetermined potential level, the current flow through coil 527 becomes sufficient for operating the relay. Switch 524 is opened by the relay and therefore remains open as long as +B is supplied to the relay, thereby removing +B from the reset inputs of "CA" Register stages. A manually operated switch 529 is connected in parallel with switch 524 and is normally open. By momentarily closing switch 529, the computer operator is able to reset all stages of the "CA" Register to 0 at any desired time during computer operation.

*Operand address register*

The "OA" Register 530, shown in Fig. 48, is provided primarily for storing addresses of various operands that are involved in a computer operation, and comprises a twelve-stage shift register adapted for both serial and parallel shifting. The "OA" Register stages are designated 531(1) to 531(12), the most significant stages being shown at the bottom of the figure. 0's and 1's pulses are applied to the input stage 531(12) through the respective Code Register output terminals 504 and 505 (see also Fig. 46). OP's are applied to a serial shift bus 532 through a serial shift gate 533 that is armed either by the Code Distributor or by the JCSD. OP's for serial shifting from stage 531(1) of the "OA" Register to the Transfer Busses are separately applied through an output gate 534 that is armed by the JCSD. Parallel shifting is performed in response to CP–1 applied to the parallel shift bus 536 through a parallel shift gate 535 that is armed by the Code Distributor. The parallel output of the "OA" Register is transmitted to the previously mentioned input terminal 518 and 519 of the "MC" Register (Fig. 49).

*Memory control register*

The "MC" Register 540, which is shown in Fig. 49, is employed for receiving command addresses from the "CA" Register (see also Fig. 32) and operand address from the "OA" Register, and for cooperating with the Sector Counter, the Sector Coincidence Circuit, and the Band Matrix for locating the corresponding commands or operands in Memory. The "MC" Register comprises a first set of six ip-flop stages 541(1) to 541(6) (only three of which are shown) and a second set of six flip-flop stages 542(1) to 542(6) (only two of which are shown). Each of the twelve stages 541 and 542 of the "MC" Register corresponds to, and cooperates with, a respective stage 511 of the "CA" Register (Fig. 47), and a respective stage 531 of the "OA" Register (Fig. 48). The reset and set inputs of each stage of the "MC" Register are connected to the respective 0's and 1's output terminals 518 and 519 of the parallel shift gates in both the "CA" and "OA" Registers. Although the "MC" Register is referred to as a "register," its various stages are not interconnected, and the digits that they receive from the "CA" and "OA" Registers are never transmitted elsewhere. These digits are employed merely for setting or resetting the "MC" Register stages to partially control the Sector Coincidence Circuit 560 (Fig. 49) and the Band Matrix 600 (Fig. 50), as hereinafter described, and are then replaced by the next set of digits that are transferred to the "MC" Register. The six stages 541(1) to 541(6) (Fig. 49) cooperate with the Sector Counter 550, and the six stages 542(1) and 542(6) cooperate with the Band Matrix 600 (Fig. 50).

*Sector counter*

The Sector Counter 550 (Fig. 49) is provided for cooperating with the "MC" Register (see also Fig. 32) and the Sector Coincidence Circuit to locate the Memory Sectors wherein commands or addresses are stored. The Sector Counter comprises a six-stage binary counter of the type shown in Fig. 31. The stages of the Sector Counter are designated 551(1) to 551(6) (Fig. 49), respectively, the most significant stage being shown at the bottom of the figure, rather than at the top of the figure as in Fig. 31. Each CP–4 is employed for adding 1 to the count which stands in the Sector Counter, and for that purpose, is applied to the symmetrical input of the least significant stage, i.e., stage 551(1) (Fig. 49) of the counter. Therefore, a 1 is added to the count standing in the Sector Counter when each sector of Memory passes its related Read-Write Head, and the total count indicates which sector is currently cooperating with each Read-Write Head.

*Sector coincidence circuit*

The Sector Coincidence Circuit (Fig. 32) cooperates with the "MC" Register and the Sector Counter for generating an SC pulse when the count in the Sector Counter matches the sector number standing in the six least significant stages of the "MC" Register. Each stage 551(1) to 551(6) of the Sector Counter 550 (Fig. 49) cooperates with a corresponding stage 541(1) to 541(6) of the "MC" Register, and with a corresponding pair of "and" gates 561(1) to 561(6) and 562(1) to 562(6), to form a respective coincidence gate 563(1) to 563(6) of the type described in relation to Fig. 26. Each CP–2 is applied to the input of coincidence gate 563(1) (Fig. 49), the output of which is connected to the input of coincidence gate 563(2). Similarly the outputs of coincidence gates 563(2) to 563(5) are connected to the inputs of coincidence gates 563(3) to 563(6), respectively. The output pulse from coincidence gate 563(6) constitutes the source of the previously-mentioned SC pulse, which is transmitted through a sector coincidence amplifier 564 (of the type described in relation to Fig. 28) and through a terminal 565 (Fig. 49) to the Coincidence Delay Circuit 570 (Fig. 50). Therefore, the CP–2 input to coincidence gate 563(1) (Fig. 49) is transmitted through each of the successive coincidence gates, the sector coincidence amplifier 564, and terminal 565 to the Coincidence Delay Circuit (Fig. 50) when and only when the digit standing in each stage 551 (Fig. 49) of the Sector Counter is identical to the digit standing in the corresponding stage 541 of the "MC" Register.

*Coincidence delay circuit*

Each SC pulse output from the Sector Coincidence Circuit 560 (Fig. 49) is received by the Coincidence Delay Circuit 570 (Fig. 50) where it is employed for (1) partially energizing the Band Matrix 600, and (2) transmitting a delayed SC pulse to the Sequencer 620 (Fig. 51), the Start-Stop Circuit 660, and the Error Detection Circuit 780 (Fig. 57), all of which are shown in interrelation in Fig. 32. It is recalled that the SC pulse is delayed before transmission to the Sequencer in order to prevent initiation of a reading or writing operation before the Band Matrix is fully energized.

Figure 57:
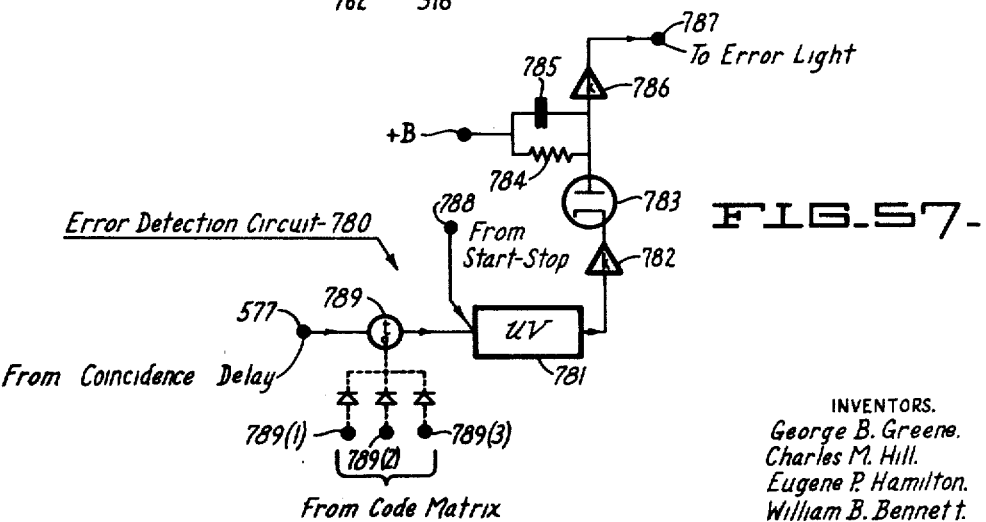
Fig. 57 is a block diagram of the Error Detection Circuit.

Referring to Fig. 50, the Coincidence Delay Circuit 570 includes a flip-flop 571, the 0 side of which arms a gate 572, and the 1 side of which arms a pair of gates 573 and 574. Each CP–1 is applied to the inputs of gates 572 and 574, and each CP–2 is applied to the input of gate 573. The output of gate 572 is connected to the reset input of a flip-flop 575. The output of gate 573 is connected to the reset input of flip-flop 571 and to the input of a normally armed gate 576. The output of gate 576 is connected through a terminal 577 to the Sequencer (Fig. 51), the Start-Stop Circuit, and the Error Detection Circuit (Fig. 57). The output of gate 574 (Fig. 50) is connected to the input of a normally closed gate 581 that is armed by the Sequencer (Fig. 51) through a terminal 586 (Fig. 50). The output of gate 581 is connected to the input of a normally closed gate 582 that is armed by the 1 side of a flip-flop 583, hereinafter described.

The SC pulse is received from the output terminal 565 of the Sector Coincidence Circuit 560, and is transmitted through an amplifier 578 to the set inputs of flip-flops 571 and 575. The 1 side output terminal of flip-flop 575 is connected through a cathode follower 580 to the Band Matrix 600 for partially energizing the latter when flip-flop 575 stands at 1. Flip-flop 571 normally stands at 0, maintaining gate 572 armed and gates 573 and 574 closed. Therefore, each CP–1 is normally transmitted through gate 572 to the reset input of flip-flop 575, thereby maintaining the latter flip-flop reset to 0 and maintaining the Band Matrix de-energized. Each CP–1 is normally blocked by gate 574 and each CP–2 is normally blocked by gate 573.

When an SC pulse is received at terminal 565 and transmitted through amplifier 578, it sets flip-flops 571 and 575 to 1. This raises the potential of the 1 side output terminal of flip-flop 575 to immediately start energizing the Band Matrix 600 through cathode follower 580, as hereinafter described, and it closes gate 572 and arms gates 573 and 574. After one word interval has elapsed, the next CP–1 is blocked by gate 572 but is transmitted through gate 574 to the input of gate 581, hereinafter described. The following CP–2 is transmitted through gate 573, the normally open gate 576, and terminal 577 to the Sequencer (Fig. 51), the Start-Stop Circuit (Fig. 57), and the Error Detection Circuit, and constitutes the delayed SC pulse.

During certain computer operations, hereinafter described, it is desired that all delayed SC pulses be blocked from the Sequencer for a predetermined period of time to prevent premature initiation of a control phase. During these operations, a write control gate 584 (Fig. 50) is armed by the Code Distributor. CP–4 is applied to the input of gate 584, the output of which is connected to the set input of a normally reset flip-flop 583. The CP–4 through gate 584 sets flip-flop 583 to 1, thereby arming gate 582. The output of gate 582 is connected to (1) the reset input of flip-flop 583, (2) the set input of a flip-flop 741 in the WCSD, hereinafter described, (3) the input terminal 182 of the previously described Write Control Circuit (Fig. 38), and (4) the input of a univibrator 585 (Fig. 50) in the Coincidence Delay Circuit. The output of univibrator 585 is connected to the arming terminal of gate 576 and normally maintains that gate armed. When it is desired to block the delayed SC pulse from the Sequencer, gate 584 is armed by the Code Distributor, and the next CP–4 is transmitted through that gate to set flip-flop 583 to 1, arming gate 582. If gate 581 has been armed by the Sequencer when the next SC pulse sets flip-flop 571 to 1, the CP–1 following the next word interval is transmitted through gates 574, 581 and 582 to the input of univibrator 585, causing that univibrator to assume its astable state for a predetermined period of time, and closing gate 576 during that time. Therefore, the CP–2 that is transmitted through gate 573 to the input of gate 576, is blocked by the latter gate and is not transmitted to the Sequencer. The output pulse from gate 582 also resets flip-flop 583, closing gate 582, and is transmitted through terminal 182 to the Write Control Circuit (Fig. 38) for enabling the latter, as hereinbefore described. Finally, the output pulse from gate 582 (Fig. 50) sets the WCSD flip-flop 741 to 1, thereby energizing the WCSD, as hereinafter described.

*Band matrix*

The Band Matrix (Fig. 32) cooperates with the "MC" Register and the Coincidence Delay Circuit, during a reading or writing operation, for partially arming a selected Read-Write Amplifier in each of the four groups of Read-Write Amplifiers, and for energizing a selected Band Group Amplifier.

It will be recalled that stages 542(1) to 542(6) of the "MC" Register 540 (Figs. 49 and 50) contain a six-digit binary value corresponding to the number of the selected Memory band. The 0 side of each stage 542(1) to 542(6) arms a respective gate 602(1) to 602(6), and the 1 side of each of these stages arms a respective gate 603(1) to 603(6). The output of cathode follower 580 in the Coincidence Delay Circuit 570 is connected to the input of each gate 602 and 603. The output of each gate 602(1) and 602(6) is connected through a respective cathode follower 604(1) to 604(6) to a respective Band Matrix input lead, or "row" 610(1) to 610(6), and the output of each gate 603(1) to 603(6) is connected through a respective cathode follower 605(1) to 605(6)

to a respective row 611(1) to 611(6). Each stage 542 which stands at 0 arms its related gate 602, while each stage which stands at 1 arms its related gate 603. When flip-flop 575 of the Coincidence Delay Circuit 570 stands at 1, following the receipts of an SC pulse, the output potential of a cathode follower 580 is relatively high; therefore, the output potential of each armed gate 602 or 603 is relatively high, and the potential of its related row 610 or 611 is also relatively high.

The first four stages of the "MC" Register, i.e., stages 542(1) to 542(4), are employed for selecting one of the Read-Write Amplifiers 150 (Fig. 36) in each of the previously described four groups of Read-Write Amplifiers. The input terminal 157(1) of each Read-Write Amplifier is connected through a respective Band Matrix output lead, or "column" 613(1) (Fig. 50) to one of the rows 610(1) or 611(1). Similarly, each input terminal 157(2) to 157(4) of each Read-Write Amplifier is connected to a respective row in each pair of rows 610(2) and 611(2) to 610(4) and 611(4), respectively. In accordance with the binary system, there are sixteen possible combinations of digits 0 and 1 that may stand in the four stages 542(1) to 542(4) of the "MC" Register. In Fig. 50, the terminals 157(1) to 157(4) for only one of the Read-Write Amplifiers 150 are shown, and these are connected through columns 613(1) to 613(4) to rows 610(1) to 610(4), respectively. It is to be understood that three additional Read-Write Amplifiers receive inputs from the same set of Band Matrix rows, and that four Read-Write Amplifiers receive inputs from each of the remaining fifteen combinations of rows 610(1) to 610(4) and 611(1) to 611(4). Therefore, for each combination of digits 0 or 1 standing in stages 542(1) to 542(4), one row in each of the four pairs of rows 610(1) and 611(1) to 610(4) and 611(4) is at a relatively high potential, so that one Read-Write Amplifier 150 in each of the four groups of Read-Write Amplifiers has all of its input terminals 157(1) to 157(4) at a relatively high potential and is "selected" in the manner hereinbefore described.

The last two "MC" Register stages, i.e., stages 542(5) and 542(6) (Fig. 50) are employed for selecting one of the four Band Group Amplifiers 170(0) to 170(3) (Fig. 37). The input terminal 172(1) to each Band Group Amplifier 170 is connected through a respective column 613(5) to one of the rows 610(5) or 611(5) (Fig. 50), and the input terminal 172(2) (Fig. 37) to each Band Group Amplifier is connected through a respective column 613(6) to one of the rows 610(6) or 611(6) (Fig. 50). In accordance with the binary system, the two stages 542(5) and 542(6) may contain four combinations of digits 0 and 1. For each possible combination of digits 0 or 1 in stages 542(5) and 542(6), a unique pair of the rows 610(5), 611(5), 610(6) and 611(6) are at a relatively high potential. In Fig. 50, the terminals 172(1) and 172(2) for only one of the Band Group Amplifiers 170 are shown, and these are connected through columns 613(5) and 613(6) to the rows 610(5) and 610(6), respectively. Each of the three remaining combinations of the four rows 619(5), 611(5), 619(6) and 611(6) is employed for selecting a respective one of the three remaining Band Group Amplifiers. Therefore, only one of the four Band Group Amplifiers has both of its input leads 172(1) and 172(2) (Fig. 37) at a relatively high potential, and is "selected."

When flip-flop 575 (Fig. 50) of the Coincidence Delay Circuit 570 is reset to 0, the output of cathode follower 580 falls to a relatively low potential, thereby de-energizing the Band Matrix, and in turn, disabling all of the Read-Write Amplifiers 150 (Fig. 36), and all of the Band Group Amplifiers 170 (Fig. 37).

PROGRAM SECTION

Cycle counter

The Cycle Counter 470 (Fig. 45), in addition to being employed in the Address Section as previously described, is also employed in the Program Section for controlling the duration of certain recycling operations in the Arithmetic Section.

Figure 51:
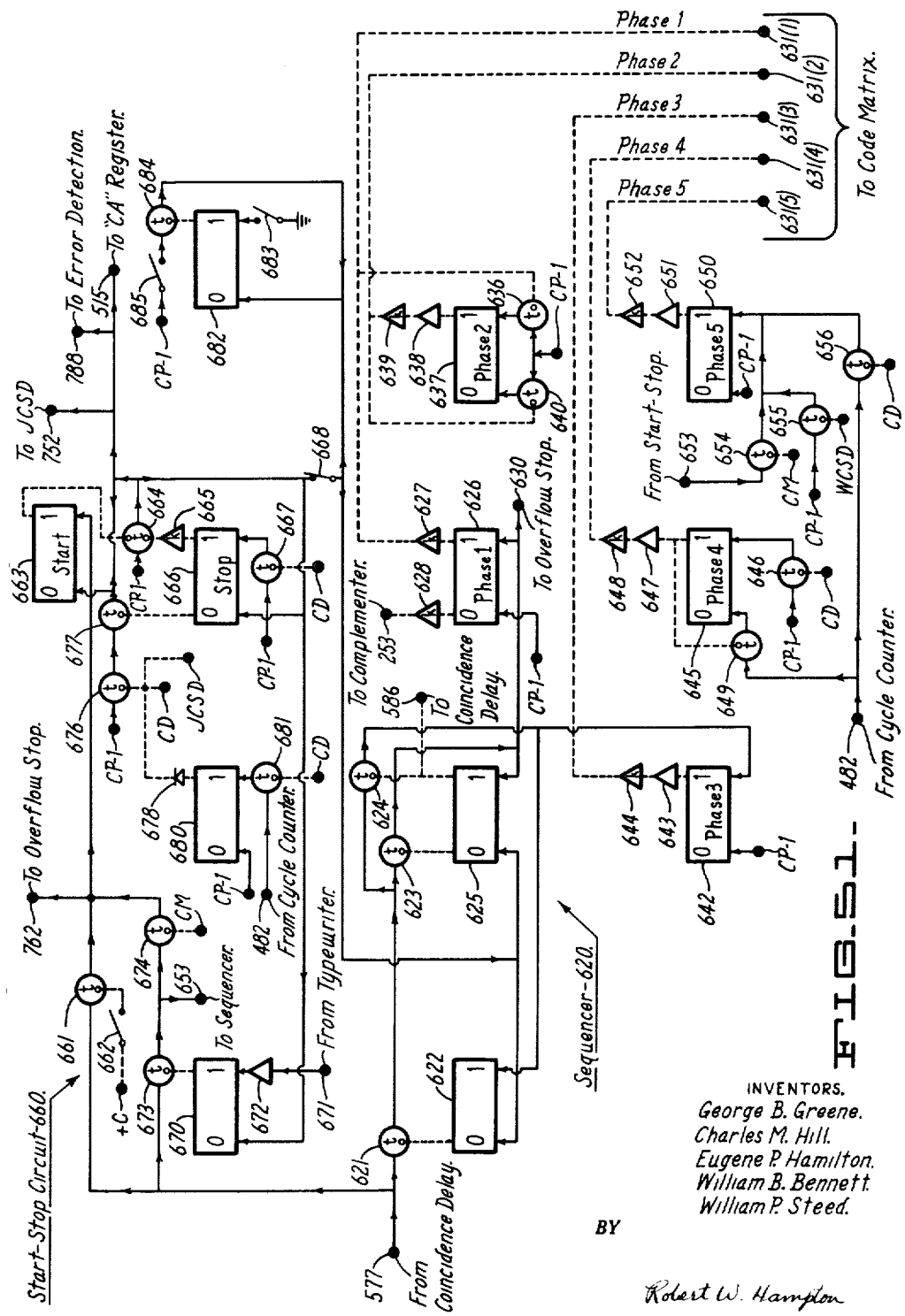
Fig. 51 is a block diagram showing the Sequencer and the Start-Stop Circuit.

It is recalled that a command comprises twenty-six digits, that the first twelve digits of the command are shifted into the "CA" Register (Fig. 32) or the "OA" Register, and that the next six digits are shifted into the Code Selector. The remaining eight digits of the command are shifted into the eight Cycle Counter stages 471(1) to 471(8) (Fig. 45). The five least significant stages of the Cycle Counter, i.e., stages 471(1) to 471(5), are arranged not only as five stages of the previously described Code Register, but also as a subtractive binary counter. A five-digit count standing in stages 471(1) to 471(5) may be reduced by unity in response to each of a series of counting pulses. The counting pulses may comprise OP's which are applied through a count gate 478, or CP-3's which are applied through a count gate 480. Both gates 478 and 480 are armed by the Code Distributor. The counting pulse output from gate 478 or gate 480 is applied to the symmetrical input of stage 471(1), and to the input of a carry gate 481(1) that is armed by the 0 side of stage 471(1). The 0 side of each stage 471(2) to 471(5) also arms a respective carry gate 481(2) to 481(5). The output of each carry gate 481(1) to 481(4) is connected to the symmetrical input of the next stage 471(2) to 471(5) and to the input of the next carry gate 481(2) to 481(5). The output of carry gate 481(5) is connected through an output terminal 482 to the Sequencer and to the Start-Stop Circuit (Fig. 51). It will be seen that if stage 471(1) (Fig. 45) stands at 0 when a counting pulse is transmitted through gate 478 or gate 480, the carry gate 481(1) is armed and transmits the counting pulse to stage 471(2) and to carry gate 481(2). The counting pulse also sets stage 471(1) to 1. The pulse transmitted to stage 471(2) when stage 471(1) stands at 0 constitutes a negative carry pulse. Similarly, each stage 471(2) to 471(4) which stands at 0 when it receives a carry pulse from the preceding stage transmits the pulse to the next stage. Therefore, each counting pulse introduced into stages 471(1) to 471(5) subtracts 1 from the count standing in those stages, and when a counting pulse is received after all stages 471(1) to 475(5) stand at 0, the pulse is transmitted through all of the carry gates 481(1) to 481(5) to the Sequencer (Fig. 51).

If stages 471(1) to 471(5) (Fig. 45 initially contain all 0's, they may be preset to the binary equivalent of either of the decimal values 2 or 26, by applying CP–4 through a 2-set gate 483 or a 26-set gate 484, respectively. Both gates 483 and 484 are armed by the Code Distributor. The output of gate 483 is connected through a respective diode 485(1) and 485(3) to 485(5) to the reset input of each stage 471(1) and 471(3) to 471(5), and through a diode 485(2) to the set input of stage 471(2). Therefore, stages 471(1) to 471(5) may be preset through gate 483 to the binary value 00010, which is equivalent to the decimal value 2. The output of gate 484 is connected through a respective diode 486(1) and 486(3) to the reset input of each stage 471(1) and 471(3) and through a respective diode 486(2), 486(4) and 486(5) to the set input of each stage 471(2), 471(4) and 471(5). Therefore, stages 471(1) to 471(5) may be preset through gate 484 to the binary value 11010, which is equivalent to the decimal value 26. The specific reasons for presetting the Cycle Counter to either of the above values will be described hereinafter in relation to the codes in which such values are employed. It will be understood that all eight stages of the Cycle Counter may be employed in the subtractive counting circuit, thereby permitting a total count of $2^8$, but for the purposes of the present computer, five stages are sufficient because a count larger than $2^5$ is never required. It will also be understood that the Cycle Counter stages, instead of being arranged as a subtractive counter, may be arranged as an additive counter of the type employed in the "CA" Register, in which case the complement of each counting value 2 or 26, rather than the actual counting value, is preset into stages 471(1) and 471(5) in a manner similar to that described above.

Stage 471(7) is employed, during the Alternate Type In Code, hereinafter described, to indicate that a predetermined cyclic time has occurred in a "loading" operation, such as typing data into the computer. The 1's output terminal of stage 471(7) arms a Ready Light gate 488 through a cathode follower 487. The input to gate 488 is received from the Code Matrix (Fig. 52) during the Alternate Type In Code, and the output of gate 488 (Fig. 45) is connected through a terminal 491 to a Ready Light on the Typewriter 900 (Fig. 32). Therefore, if stage 471(7) (Fig. 45) stands at 1, the Ready Light is turned on when the Code Matrix is energized during the Alternate Type In Code, as hereinafter described.

Code selector

After a command has been shifted into the "CA" Register and the Code Register, the Code Selector 500 (Fig. 46) contains a six-digit binary value which is employed to select a desired computer code. In the present invention, the number of codes which are employed does not exceed 32; therefore, only stage 501(1) to 501(5) are employed for selecting the code, stage 501(6) being available for extending the number of codes up to 64. The 0 side output terminal of each stage 501(1) to 501(5) is connected through a respective terminal 506(1) to 506(5) to a respective input terminal in the Code Matrix (Fig. 52), hereinafter described. Similarly, the 1 side output terminal of each stage 501(1) to 501(5) (Fig. 46) is connected through a respective terminal 507(1) to 507(5) to a respective input terminal in the Code Matrix. Therefore, according to the value which stands in stages 501, various combinations of terminals 506 and 507 are at a relatively high potential for energizing the Code Matrix and thereby select the computer operation which is to be performed.

Sequencer

The Sequencer 620, which is shown in Fig. 51, is provided primarily for initiating such ones of the five control phases as are called for by the various codes. A cycle of at least three control phases occurs during each code, and is initiated in response to delayed SC pulses from the Start-Stop Circuit, hereinafter described.

Figure 52:
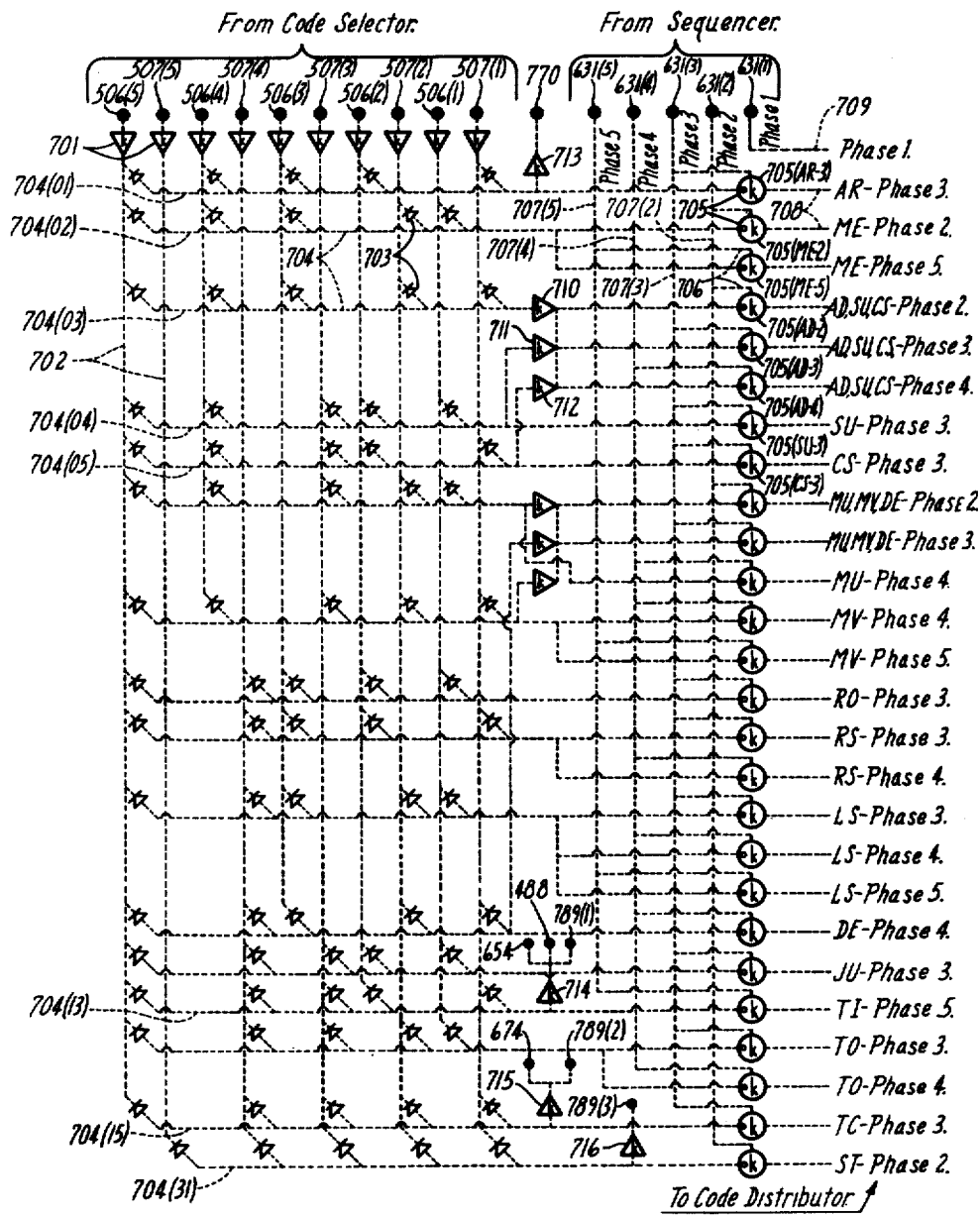
Figs. 52, 53 and 54 are joined to show the entire Code Matrix and Code Distributor.

Referring to Fig. 51, the delayed SC pulse that is generated when a command is located in Memory, is received by the Sequence from the output terminal 577 of the Coincidence Delay Circuit 570 (Fig. 50), and initiates Phase 1 in the following manner. Terminal 577 (Fig. 51) is connected to the input of a gate 621 that is armed by the 0 state of a normally reset flip-flop 622. The output of gate 621 is connected to the input of a gate 623 that is armed by the 0 state of a normally reset flip-flop 625. The output of gate 623 is connected to the set input of flip-flop 625. The output of gate 623 is also connected to the set input of a flip-flop 626 that normally stands at 0, each CP-1 being applied to its reset input. The 1 side output terminal of flip-flop 626 is connected through a cathode follower 627 and an output terminal 631(1) to an input of the Code Matrix (Fig. 52). Phase 1 occurs, as hereinafter described, during such time as flip-flop 626 (Fig. 51) stands at 1, raising the potential at terminal 631(1). Therefore, the delayer SC pulse that is transmitted from terminal 577 through the normally open gates 621 and 623 to the set input of flip-flop 626 initiates Phase 1. The next CP-1 following the previously described delayed SC pulse resets flip-flop 626 to 0, terminates Phase 1, which therefore has a duration of one word interval.

The 0 side output terminal of flip-flop 626 is connected through a cathode follower 628 to the arming terminal 253 for the normally open gates 251 and 252 of the Complementer 250 (Fig. 40). Since flip-flop 626 (Fig. 51) stands at 1 during Phase 1, gates 251 and 252 are closed during Phase 1, as previously described.

The delayed SC pulse which is transmitted through gates 621 and 623 to the set input of flip-flop 626 is also transmitted to the Overflow Stop Circuit 760 (Fig. 56) through an output terminal 630, for reasons hereinafter described.

Phase 2 is initiated automatically at the termination of Phase 1, and, like Phase 1, has a duration of one word interval. The 1 side output of flip-flop 626 (Fig. 51), in addition to controlling Phase 1 through output terminal 631(1), also arms a gate 636 in series with the set input to a normally reset flip-flop 637. CP-1 is applied to the input of gate 636; therefore, flip-flop 637, which normally stands at 0, is set to 1 by the same CP-1 which terminates Phase 1. The 1 side output terminal of flip-flop 637 controls Phase 2 through a normally conducting amplifier 638, a cathode follower 639, and an output terminal 631(2) that is connected to an input of the Code Matrix. During the time that flip-flop 637 stands at 1, amplifier 638 is cut off and the potential at terminal 631(2) is relatively high, thereby establishing Phase 2 in the manner hereinafter described. The 1 side output terminal of flip-flop 637, in addition to controlling Phase 2, also arms a Phase 2 termination gate 640 in series with the reset input to flip-flop 637. Each CP-1 is applied to the input of gate 640; therefore, flip-flop 637 is reset to 0 by the first CP-1 following the initiation of Phase 2, and limits the duration of Phase 2 to one word interval.

Phase 3 is initiated in response to the second delayed SC pulse during a computer operation, i.e., in response to the delayed SC pulse that is generated for locating an operand in Memory. It is recalled that the first delayed SC pulse (which was transmitted through gate 623) set flip-flop 625 to 1, thereby closing gate 623. When flip-flop 625 was set to 1, it also armed a gate 624 that is controlled by its 1 side. The output of gate 624 is connected to the set input of flip-flop 622; therefore, the second delayed SC pulse from the output of gate 621 is transmitted through gate 624 to the set input of flip-flop 622, setting the latter to 1 for closing gate 621. This prevents subsequent delayed SC pulses from interrogating gates 623 and 624 until flip-flop 622 is reset to 0, as hereinafter described. The output of gate 624 is also connected to the set input of a flip-flop 642 which normally stands at 0, each CP-1 being applied to its reset input. The 1 side output terminal of flip-flop 642 controls Phase 3 through an amplifier 643, a cathode follower 644 and an output terminal 631(3) which is connected to the Code Matrix. The relatively high potential of terminal 631(3) while flip-flop 642 stands at 1 establishes Phase 3, and this control phase is terminated by the next CP-1 which resets flip-flop 642 to 0.

The 1 side output terminal of flip-flop 625 is connected to the arming terminal 586 of the previously described gate 581 in the Coincidence Delay Circuit 570 (Fig. 50); therefore, gate 581 is armed from the beginning of Phase 1 until flip-flop 625 (Fig. 51) is reset to 0 in the manner hereinafter described.

Phase 4 is controlled by a flip-flop 645 which normally stands at 0. Each CP-1 is applied to the input of a Phase 4 control gate 646 which is armed by the Code Distributor during Phase 3 of certain codes. If the code which is in progress requires Phase 4, gate 646 is armed during Phase 3, and the CP-1 which terminates Phase 3 also sets flip-flop 645 to 1, thereby establishing Phase 4 through an amplifier 647, a cathode follower 648 and a terminal 631(4) which is connected to the Code Matrix. The 1 side output terminal of flip-flop 645 also arms a Phase 4 termination gate 649, the input of which is connected to the Cycle Counter output terminal 482 (see also Fig. 45). Therefore, after Phase 4 has been initiated by setting flip-flop 645 to 1, it is terminated by the output pulse from the Cycle Counter, and has a duration which depends upon the value previously set into the Cycle Counter.

Phase 5 is controlled by a flip-flop 650 that normally stands at 0, each CP-1 being applied to its reset input. The 1 side output terminal of flip-flop 650 is connected through an amplifier 651, a cathode follower 652 and an output terminal 631(5) to an input of the Code Matrix. When flip-flop 650 is set to 1, the potential at terminal 631(5) rises to establish Phase 5. Flip-flop 650 may be set to 1 by any of three means, viz: (1) by a pulse from the Start-Stop Circuit 660, hereinafter described, through a terminal 653 and a first Phase 5 control gate 654 that is armed by the Code Matrix throughout the Type In Code; (2) by CP-1 applied through a second Phase 5 control gate 655 that is armed by the WCSD; or (3) by the output pulse from the Cycle Counter through terminal 482 and a third Phase 5 control gate 656 that is armed by the Code Distributor. After Phase 5 is initiated, by setting flip-flop 650 to 1 as described above, the next CP-1 resets flip-flop 650 to 0, thereby terminating Phase 5.

It has been shown that flip-flop 622 normally stands at 0, and that gate 621 therefore is normally armed for transmitting delayed SC pulses to gates 623 and 624. It has also been shown, however, that the delayed SC pulse which is transmitted through gate 624 for initiating Phase 3 sets flip-flop 622 to 1, thereby closing gate 621 for preventing further SC pulses from being applied to gates 623 and 624. Flip-flop 622 remains set to 1 until the beginning of the next computer operation, at which time it is reset to 0 by the Start-Stop Circuit 660.

*Start-stop circuit*

A first function of the Start-Stop Circuit 660 (Fig. 51) is to reset the Sequencer to its initial condition in preparation for each computer operation. The delayed SC pulses that are received through terminal 577 of the Sequencer, in addition to being applied to the input of gate 621, are also applied to the input of a normally closed gate 661 in the Start-Stop Circuit. The arming terminal of gate 661 may be connected through a normally open "Start" switch 662 and a terminal +C connected to a suitable source of arming potential. The Start switch 662 may be located on a control panel, or on the Typewriter 900 (Fig. 32). When switch 662 (Fig. 51) is closed, gate 661 is armed and the next delayed SC pulse on terminal 577 is transmitted through gate 661 and a terminal 762 to the Overflow Stop Circuit 760 (Fig. 56), hereinafter described, and to the set input of a "Start" flip-flop 663 (Fig. 51) that normally stands at 0.

Figure 55:
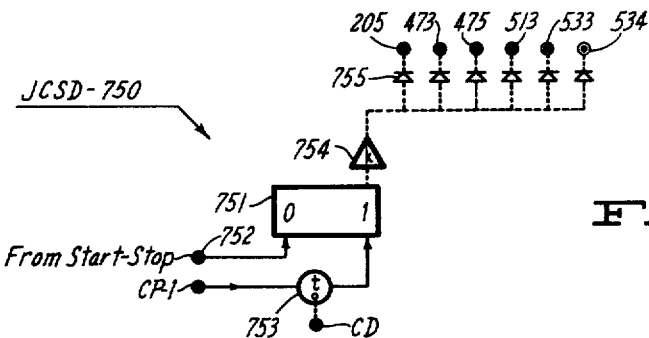
Fig. 55 is a block diagram of the Jump Code Supplementary Distributor.

The 1 side output terminal of flip-flop 663 partially arms an "and" gate 664, the other arming terminal of which is connected through a cathode follower 665 to the 1 side output terminal of a "Stop" flip-flop 666. Flip-flop 666 normally stands at 0 during an operation of the computer. However, during a stopping operation, CP-1 is applied to the set input of flip-flop 666 through a stop gate 667 that is armed by the Code Distributor, and when the computer is stopped, flip-flop 666 stands at 1 to partially arm gate 664. Therefore, when the Start switch is closed at the beginning of a computer operation, flip-flop 666 already stands at 1, partially arming gate 664, and the first delayed SC pulse that passes through gate 661 sets flip-flop 663 to 1, thereby fully arming gate 664. Each CP-1 is applied to the input of gate 664, the output of which is connected to the reset inputs of flip-flops 663 and 666, and through a normally closed "Single-Cycle" switch 668 to the reset inputs of flip-flops 622 and 625 of the Sequencer. Therefore, the first CP-1 following the arming of gate 664 is transmitted through that gate and constitutes the previously described "Start" pulse. The Start pulse resets flip-flops 622 and 625 to 0, thereby preparing the Sequencer for initiating Phases 1 and 2 during the next computer operation, and it closes gate 664 by resetting the Start and Stop flip-flops to 0, thereby conditioning the Start-Stop Circuit for automatic recycling of the computer. The Start pulse from gate 664 is also transmitted to the parallel shift input terminal 515 of the "CA" Register (Fig. 47) for shifting the contents of that register into an "MC" Register in preparation for locating the next command in Memory. In addition, the Start pulse is transmitted to the JCSD through a terminal 752 (Figs. 51 and 55) and to the Error Detection Circuit (Figs. 51 and 57) through a terminal 788, for reasons hereinafter described.

A second means is provided to generate a Start pulse for performing the functions described above. A normally reset flip-flop 670 may be set to 1 by a "Ready" pulse from the Typewriter 900 (Fig. 32) or other input device, the Ready pulse being applied through a terminal 671 (Fig. 51) and an amplifier 672 to the set input of flip-flop 670. The 1 side output terminal of flip-flop 670 arms a ready gate 673, the input of which receives delayed SC pulses from terminal 577. The output of gate 673 is connected to the input of a type control gate 674 which is armed by the Code Matrix throughout the Type Control Code. The output of gate 674 is connected to the set input of the Start flip-flop 663. Therefore, during the Type Control Code, after a Ready pulse is received from the Typewriter to set flip-flop 670 to 1, the next delayed SC pulse from terminal 577 is transmitted through gates 673 and 674 and sets the Start flip-flop 663 to 1. This completes the arming of gate 664 in the manner hereinbefore described, and the next CP-1 is transmitted through gate 664 as a Start pulse. The output of gate 664 is also connected to the reset input of flip-flop 670; therefore, the Start pulse resets flip-flop 670 to 0, closing gate 673 and preventing subsequent SC pulses from being transmitted through that gate. The single SC pulse from the output of gate 673 is transmitted through terminal 653 to the input of the previously described Phase 5 control gate 654 in the Sequencer. Therefore, the output pulse from gate 673 initiates Phase 5 when gate 654 is armed.

Start pulses may be generated in response to certain ones of the codes during automatic recycling of the computer. Each CP-1 is applied to the input of a start gate 676, the output of which is connected to the input of a gate 677. Gate 676 may be armed by the Code Distributor, by the JCSD, or through a diode 678 by the 1 side output terminal of a flip-flop 680, hereinafter described. Gate 677 is armed by the 0 side of the Stop flip-flop 666 which, it is recalled, normally stands at 0 during a computer operation. The output of gate 677 is joined to the output of gate 644; therefore, any output pulse from gate 677 constitutes a Start pulse and performs all of the previously described functions of the Start pulse. During automatic recycling of the computer, gate 676 may be armed during the final control phase of a code. In such case, the next CP-1 is transmitted through gates 676 and 677 and constitutes a Start pulse.

Flip-flop 680 is provided for arming gate 676 at the end of Phase 4 of an operation. A pulse from the Cycle Counter 570 (Fig. 45) through a terminal 482, indicating the terminaiton of Phase 4, is applied to the input of a start control gate 681 (Fig. 51) that is armed by the Code Distributor. The output of gate 681 is connected to the set input of flip-flop 680 which normally stands at 0, each CP-1 being applied to its reset input. The output terminal of flip-flop 680 is connected through diode 678 to the arming input of gate 676, as previously described. Therefore, if gate 681 has been armed by the Code Distributor, a pulse from the Cycle Counter (see also Fig. 45) through terminal 482, signifying the termination of Phase 3, is transmitted through gate 681 to the set input of flip-flop 680, arming gate 676. The next CP-1 is transmitted through gates 676 and 677, and constitutes a Start pulse. The next CP-1 resets flip-flop 680, closing gate 676.

Means are provided for enabling single-cycle operation of the computer. During single-cycle operation, the

55 operation may be started either through operation of the Start switch 662 or in response to the Ready pulse from terminal 671, as previously described. However, the Single-Cycle switch 668 is opened for single-cycle operation, and the Start pulse output from gate 664 or gate 677 is unable to reset flip-flops 622 and 625 for enabling initiation of the control phases. During single-cycle operation, therefore, flip-flops 622 and 625 are reset under manual control, and when they are subsequently set to 1 during the operation of the cycle, they remain in that state until again reset under manual control. Consequently, only one series of control phases is carried out in response to each manually initiated cycle. A normally reset single-cycle flip-flop 682 may be set to 1 by manually closing a switch 683 which grounds the set input of the flip-flop. Switch 683 is reopened manually after flip-flop 682 is set to 1. The 1 side output terminal of flip-flop 682 arms a gate 684, the input terminal of which is connectable, through a normally open switch 685, to a CP-1 input terminal. After switch 683 has been closed and reopened, switch 685 is closed manually. The next CP-1 is transmitted through gate 684, the output of which is connected to the reset input of the single-cycle flip-flop 682 and to the reset inputs of the Sequencer flip-flops 622, and 625. Therefore, after the seriatim closing of switches 683 and 685, the next CP-1 resets flip-flop 682 to 0, thereby closing gate 684, and conditions flip-flops 622 and 625 for one cycle of operation. During that cycle of operation, flip-flops 622 and 625 are set to 1, as previously described, but they are not subsequently reset to 0 by the next Start pulse from the output of gate 664 or gate 677, since switch 668 is open.

*Code matrix*

Figure 44:
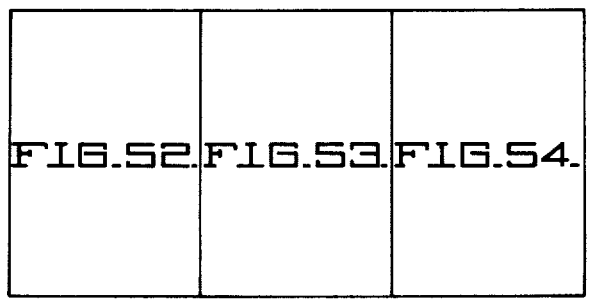
Figure 53:
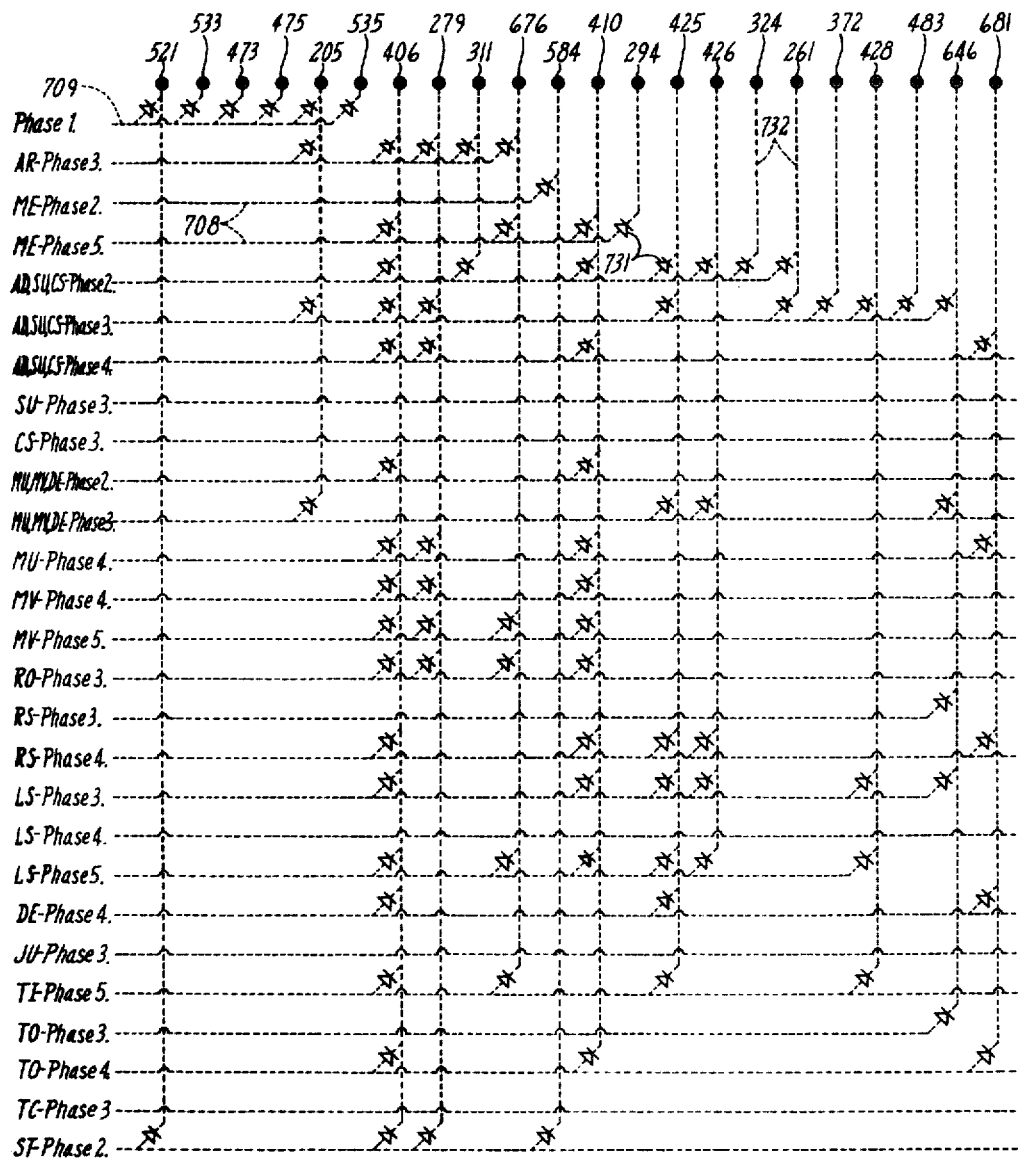
Figure 54:
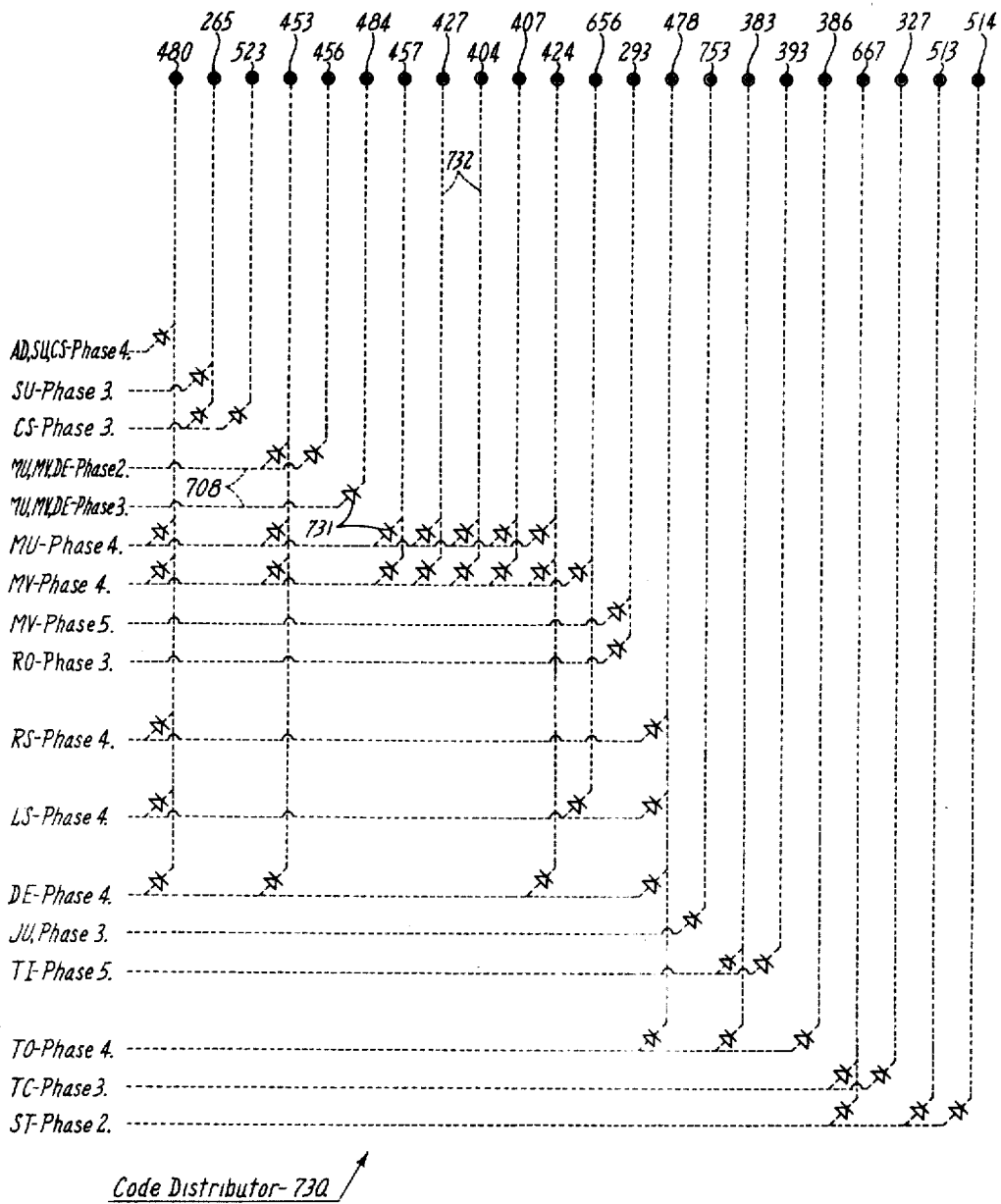

Fig. 44 illustrates the manner in which Figs. 52, 53 and 54 are oriented to show the entire Code Matrix 700 and Code Distributor 730. The Code Matrix and Code Distributor are employed for detecting each code standing in the Code Selector 500 (Fig. 46), and for arming various sets of gates throughout the computer during each control phase which is initiated by the Sequencer 620 (Fig. 51).

The Code Matrix includes a diode matrix which resolves each of a plurality of multidigit inputs from the Code Selector into a single output signal. The Code Matrix also includes a gating matrix which combines the output of the diode matrix with the control phase output of the Sequencer to produce a respective control signal for each phase of each code. Referring to Figs. 46 and 52, each of the Code Selector output terminals 506(1) to 506(5) and 507(1) to 507(5) is connected through a respective cathode follower 701 to a respective Code Matrix input lead 702. Various sets of the Code Matrix input leads are connected through diodes 703 to a series of Code Matrix "rows" 704(01) to 704(15) and 704(31). The arrangement is such that one and only one row 704 is connected through diodes 703, and through a combination of input leads 702 to all of the terminals 506 and 507 which are at a relatively high potential when a specific code representation stands in the Code Selector. For example, row 704(01) is connected through a respective diode 703 to each of the five input leads 702 which is connected through a cathode follower 701 to one of the following terminals: 507(1), 506(2), 506(3), 506(4) and 506(5). Therefore, when stage 501(1) of the Code Selector stands at 1, and stages 501(2) to 501(5) stand at 0, the conditions of these stages collectively represent the binary value 00001. In such case, each of the above-named set of Code Selector output terminals is at a relatively high potential, whereas each of the remaining output terminals from the Code Selector is at a relatively low potential, and the Code Matrix row 704(01) is at a high potential. It is noted that when the value 00001 stands in the Code Selector, each row except 704(1) is connected through one or more diodes 703, input leads 704, and cathode followers 701 to an input terminal 506 or 507 which is at a low potential; therefore, each row except row 704(01) is at a low potential. Each of the sixteen codes which are described in relation to the present invention is set up in response to the high potential of a respective row 704. With the exception of the Stop Code, the Code Selector values assigned to the various codes are arbitrary and are described, for convenience, as comprising the binary values 00001 and through 01111. The value employed for the Stop Code is 11111, the reasons for which will be hereinafter described.

Each Code Matrix row 704 arms one or more cathode follower gates 705 of the type shown in Fig. 11. If a code calls for only one control phase, other than Phase 1, its related row 704 (Fig. 52) arms a single gate 705 whereas if it calls for two or more control phases, other than Phase 1 its related row 704 arms a corresponding number of gates 705. Since only one row 704 is at a high potential while a specific code value stands in the Code Selector, only the gate or gates 705 which terminate the one high-potential row are armed during that code.

Each gate 705 receives its input signal from one of the four Sequencer output terminals 631(2) to 631(5), through which the respective Phases 2 to 5 are initiated. The signal input to each gate 705 is connected through a respective lead 706 to one of four leads 707(2) to 707(5), which are designated "columns." Each column 707(2) to 707(5) is connected to a respective one of the four output terminals 631(2) to 631(5) from the Sequencer. Therefore, when a terminal 631 (2) to 631(5) is at a relatively high potential during its related Phase 2 to 5, as hereinbefore described, the armed gate 705 which connected to the related column 707(2) to 707(5) produces an output signal during that control phase. A respective output lead 708 from each gate 705 is connected to the Code Distributor (Fig. 53), as hereinafter described. Since each code employs Phase 1, terminal 631(1), (Fig. 52), which controls Phase 1, is connected directly to the Code Distributor through a lead 709, and is not connected to any of the cathode follower gates 705. It is therefore seen that lead 709 is at a high potential during Phase 1 of each code, and that each lead 708 is at a high potential during one of the remaining control phases, if and only if its related code value stands in the Code Selector.

Hereinafter, a particular cathode follower gate 705 will be identified by the reference numeral 705 followed by the abbreviation of the related code and the number of the related control phase. For example, the topmost gate 705 is related to the Read (AR) Code during Phase 3, and is identified as gate 705(AR-3).

As previously noted, a given row 704 may arm more than one gate 705. This is required when the related code requires more than one control phase, in addition to Phase 1. For example, the Write (ME) Code requires Phases 2 and 5. Therefore, row 704(02), through which the Write Code is selected, arms two cathode follower gates 705, viz: 705(ME-2) and 705(ME-5). Gate 705(ME-2) receives its input signal, during Phase 2, from terminal 631(2) through column 707(2) and the related lead 706. Gate 705(ME-5) receives its input signal, during Phase 5, from terminal 631(5) through column 707(5) and the related lead 706. Therefore, although row 704(02) is energized during the entire time that the Code Selector contains the value 00010, corresponding to the Write (ME) Code, thereby arming both gates 705(ME-2) and 705(ME-5), an output signal from each of these gates occurs only during its related control phase, i.e., Phase 2 and Phase 5, respectively.

Some of the codes "overlap," in the sense that they call for the arming of the same set of computer gates during one or more of the control phases. For example, the Add (AD), Subtract (SU), and Compare (CS) Codes each call for arming the same sets of gates during Phases 2, 3 and 4. Accordingly, row 704(05), corresponding to the Add Code, arms three gates 705(AD-2), 705 (AD-3) and 705(AD-4) through a cathode follower 710. Similarly, row 704(04), corresponding to the Subtract Code, arms the same three gates 705(AD-2), 705 (AD-3) and 705(AD-4) through a cathode follower 711, and row 704(05), a corresponding to the Compare Code, arms the same three gates 705 through a cathode follower 712. Cathode followers 710, 711 and 712 have a common cathode impedance. The Subtract Code requires additional gates to be armed during Phase 3; therefore, its related row 704(04), in addition to arming the three previously-mentioned gates 705 through cathode follower 711, also arms a further gate 705(SU-3). Similarly, the Compare Code requires additional gates to be armed during Phase 3; therefore, row 704(05) also arms a separate gate 705(CS-3).

During the Read (AR), Type In (TI), Type Control (TC) and Stop (ST) Codes, it is desirable to have certain gates armed during all control phases of the code, i.e., during the entire time the code value stands in the Code Selector. Accordingly, any gate which is to be armed all throughout one of these codes has its arming terminal connected to the corresponding Code Matrix row 704(01), 704(13), 704(15), or 704(31) through a respective cathode follower 713, 714, 715 or 716. Output terminals from cathode followers 713 to 716 are numbered to correspond to the various computer gates which are armed through these cathode followers, and which are described along with the circuits wherein they are located.

*Code distributor*

The Code Distributor 730, shown in Figs. 53 and 54, receives its input from the output of the Code Matrix 700 (Fig. 52), and during each phase of each code, it arms the appropriate set of gates throughout the computer. Referring to Figs. 53 and 54, the Code Matrix output lead 709, which is associated with Phase 1 of all codes, and the Code Matrix output leads 708, which are associated with the remaining phases of the various codes, constitute input leads to the Code Distributor. Each lead 708 or 709 is connected through one or more diodes 731 and a corresponding number of output leads 732 to a corresponding number of arming terminals for gates that are located in various sections of the computer. Each arming terminal shown in Figs. 53 and 54 is identified by the reference numeral of the gate to which it is connected, the specific gates being described along with the computer circuits wherein they are located. Therefore, when a particular lead 708 or 709 is at a high potential, as previously described, it arms each gate to which it is connected through a diode 731 and an output lead 732.

*Write code supplementary distributor*

The WCSD 740 (Fig. 50) is effective, during Phase 3 of the Write (ME) and Stop (ST) Codes, to arm a supplementary set of gates throughout the computer, independently of the Code Matrix and Code Distributor. It is recalled that the Code Distributor becomes effective, during Phase 3, in coincidence with CP-2. For reasons hereinafter described, it is necessary to initiate Phase 3 of the Write and Stop Codes on CP-1, and the WCSD, which is energized on CP-1, is therefore employed during these codes for distributing the necessary gate arming potentials.

Referring to Fig. 50, it is recalled that the output of gate 582 in the Coincidence Delay Circuit 570 is connected to the set input of a flip-flop 741 in the WCSD 740. It is further recalled that during the Write and Stop Codes, a pulse is transmitted through gate 582 for setting flip-flop 741 to 1 coincident with the CP-1 immediately preceding the SC pulse which initiates Phase 3. At all other times, flip-flop 741 stands at 0, each CP-1 being applied to its reset input. The 0 side output terminal of flip-flop 741 is connected through a cathode follower 742 to the arming terminal of the Complementer output gate 258 (Fig. 40). Therefore, gate 258 is normally armed, but is closed throughout Phase 3 of the Write and Stop Codes, thereby preventing words from being transmitted from the Complementer output during Phase 3, for reasons hereinafter explained. The 1 side output terminal of flip-flop 741 (Fig. 50) is connected through a cathode follower 743 and a series of diodes 744 to the arming terminals of a corresponding series of gates throughout the computer. Each of these arming terminals is identified by the reference numeral applied to its related gate, which is described along with the computer circuit wherein the gate is located. Therefore, during Phase 3 of the Write and Stop Codes, a supplementary set of gates is armed by the WCSD. The CP-1 following Phase 3 resets flip-flop 741 to 0, thereby closing all of the gates which are armed by the WCSD, and re-arming gate 258 (Fig. 40) in the Complementer.

*Jump code supplementary distributor*

It is recalled that during the Jump (JU) Code, a value is shifted from the "OA" Register (Fig. 32) through the Code Register and into the "CA" Register. Therefore, the Jump Code value is shifted out of the Code Register while the Jump Code is still in progress. The JCSD 750 (Fig. 55), is effective during the Jump Code to arm a supplementary set of gates independently of any change that occurs in the Code Distributor or Code Matrix. The JCSD comprises a flip-flop 751 which normally stands at 0, each Start pulse from the Start-Stop Circuit 660 (Fig. 51) being applied to its reset input through the previously-described terminal 752. Each CP-1 is applied to the input of a jump control gate 753 (Fig. 55) the output of which is connected to the set input of flip-flop 751. Gate 753 is armed by the Code Distributor during Phase 3 of the Jump Code; therefore, at the end of Phase 3, CP-1 sets flip-flop 751 to 1. The 1 side output terminal of flip-flop 751 is connected through a cathode follower 754 and a series of diodes 755 to the arming terminals of a corresponding series of gates throughout the computer. These arming terminals are identified by the reference numerals applied to their related gates, the gates being described along with the various computer circuits in which they are located. After flip-flop 751 has been set to 1, the next Start pulse from the Start-Stop Circuit resets flip-flop 751 to 0 through terminal 752, thereby closing all of the gates that are armed by the JCSD.

*Overflow stop circuit*

When an overflow condition of the "A" Register 400 (Fig. 42) is interpreted by the Sign Counter 300 (Fig. 40) to require stopping the computer, the Overflow Stop Circuit 760, shown in Fig. 56, performs two functions, viz: (1) it produces an output signal for turning on an "Overflow Stop Light"; and (2) it causes a command word of all 1's to be shifted into the Code Selector 500 (Fig. 46) and the Cycle Counter 470 (Fig. 45), for setting up the Stop Code, hereinafter described.

Referring to Fig. 56, the Overflow Stop Circuit 760 includes a flip-flop 761. Each delayed SC pulse from the output of gate 661 or gate 674 in the Start-Stop Circuit 660 (Fig. 51) is applied to the reset input of flip-flop 761 (Fig. 56) through the previously-described terminal 762, and maintains flip-flop 761 normally reset to 0. Each signal from the output terminal 316 of the Sign Counter 300 (Fig. 40), indicating that the computer is to be stopped due to an overflow condition, is applied to the set input of flip-flop 761 (Fig. 56), and sets the latter to 1. The 1 side output terminal of flip-flop 761 is connected through a cathode follower 763 and a terminal 764 to the Overflow Stop Light (not shown) for turning on the latter when flip-flop 761 stands at 1. The 1 side output terminal of flip-flop 761 also arms a gate 766 through a cathode follower 763. The output terminal 630 of the Sequencer 620 (Fig. 51) is connected to the input of gate 766 (Fig. 56); therefore, gate 766 is interrogated each time Phase 1 is initiated by the Sequencer. The output of gate 766 is connected to the set input of a flip-flop 767 which normally stands at 0, each CP-1 being applied to its reset input. The 1 side output terminal of flip-flop 767 arms a gate 768. OP's are applied to the input of gate 768 and the output of that gate is connected to the 1's input terminal 477 of the Cycle Counter 470 (Fig. 45). Therefore, if flip-flop 761 (Fig. 56) has been set to 1, due to an overflow condition requiring the computer to be stopped, a pulse at terminal 630 is transmitted through gate 766 and sets flip-flop 767 to 1 when the Sequencer initiates the next Phase 1, and the following train of twenty-six OP's is transmitted through gate 768 to the 1's input of the Cycle Counter 470 (Fig. 45), thereby setting up the Stop (ST) Code, as hereinafter described.

Means are also provided for transmitting a command of all 1's through terminal 477 in response to manually stopping the computer. Each pulse from terminal 630 (Fig. 56) of the Sequencer is also applied to the input of an "and" gate 770, the output of which is connected to the set input of flip-flop 767. Gate 770 has two arming terminals, one of which is armed by the Code Matrix during each Read (AR) Code, and the other of which is armed by a suitable source +C of bias potential through a normally open "Stop" switch 771 which may be located, for example, at the Typewriter 900 (Fig. 32). When switch 771 (Fig. 56) is closed, gate 770 is armed during the next Read Code, and the following pulse from terminal 630, when the Sequencer initiates Phase 1 of any code that follows the Read Code, is transmitted through gate 770 and sets flip-flop 767 to 1, thereby arming gate 768. The next train of twenty-six OP's is transmitted through gate 768 and terminal 777 in the manner hereinbefore described.

Error detection circuit

During most of the computer operations, the Error Detection Circuit 780 (Fig. 32) is adapted for turning on an "Error Light" if the Start-Stop Circuit fails to produce a Start pulse, and during all other computer operations, it is adapted to turn on the Error Light if the Coincidence Delay Circuit fails to produce a delayed SC pulse.

Referring to Fig. 57, the Error Detection Circuit 780 comprises a univibrator 781 which normally stands in its stable state of operation, and which produces a negative pulse each time it is reversed to its astable state of operation. The output of univibrator 781 is connected through a cathode follower 782 to the cathode of a normally nonconducting diode 783. The anode of diode 783 is connected through a resistor 784, in parallel with a capacitor 785, to a source +B of positive potential. The anode of diode 783 is also connected through a cathode follower 786 and a terminal 787 to the Error Light (not shown). If diode 783 becomes nonconducting, capacitor 785 is discharged through resistor 784, and +B potential is applied through cathode follower 786 to terminal 787, thereby turning on the Error Light. However, each time univibrator 781 is reversed to its astable state, its negative output pulse is transmitted through cathode follower 782 to the cathode of diode 783, thereby causing the latter to conduct and charge capacitor 785. Therefore, if univibrator 781 fails to be reversed to its astable state for a sufficient period of time, capacitor 785 becomes discharged and the Error Light is turned on. Each Start pulse from the previously-described output terminal 788 of the Start-Stop Circuit (Fig. 51) is applied to the input of univibrator 781 (Fig. 57) and reverses the latter to its astable state, thereby preventing the Error Light from being turned on.

The time constant of the circuit comprising resistor 784 and capacitor 785 is such that the Error Light is not turned on if each Start pulse is generated by the Start-Stop Circuit as previously described.

During the Type In (TI), Type Control (TC), and Stop (ST) Codes, the Start pulse is sometimes not generated by the Start-Stop Circuit during normal computer operation. Therefore, means are provided for maintaining the Error Light off in the absence of the Start pulse during these codes. Each delayed SC pulse from the output terminal 577 of the Coincidence Delay Circuit 579 (Fig. 50) is applied to the input of a gate 789 (Fig. 57), the output of which is connected to the input of univibrator 781. Gate 789 is armed by the Code Matrix throughout the Type In, Type Control, and Stop Codes. Therefore, each delayed SC pulse that occurs during any of the above codes is transmitted through gate 789 and reverses univibrator 781 to its astable state, and prevents the Error Light from being turned on, as hereinbefore described.

CODES

In general

The codes, or computer operations, will be described with general reference to the overall block diagram of Fig. 32, and with specific reference to Figs. 58 to 80, inclusive, each of which is based on Fig. 32, but shows the block representations of only those circuits employed during the related control phase or phases of a particular code. The circuit units which are not employed during the operation to which a drawing refers are shown in light outline, either singly or in groups, in order to properly orient the drawing with the overall block diagram in Fig. 32. Each gate that is armed by the Code Distributor or Code Matrix during a particular control phase, and each principal input gate to a circuit that is employed during that phase, is designated along with the block symbol of the circuit in the related drawing. The descriptions of the various codes will be more readily understood by also referring to the previously described drawings (in Figs. 33 to 57, inclusive) of the individual circuit units employed.

It is recalled that Phase 1 is initiated during each code, and is employed as the first control phase of each code; Phases 2 and 3 are initiated during each code but are not always employed; and Phases 4 and 5 are initiated during only selected codes. Therefore, Phase 1 will be described without reference to any particular code, and the remaining control phases will be described only in relation to those codes during which they are employed.

Phase 1 (all codes)

Figure 58:
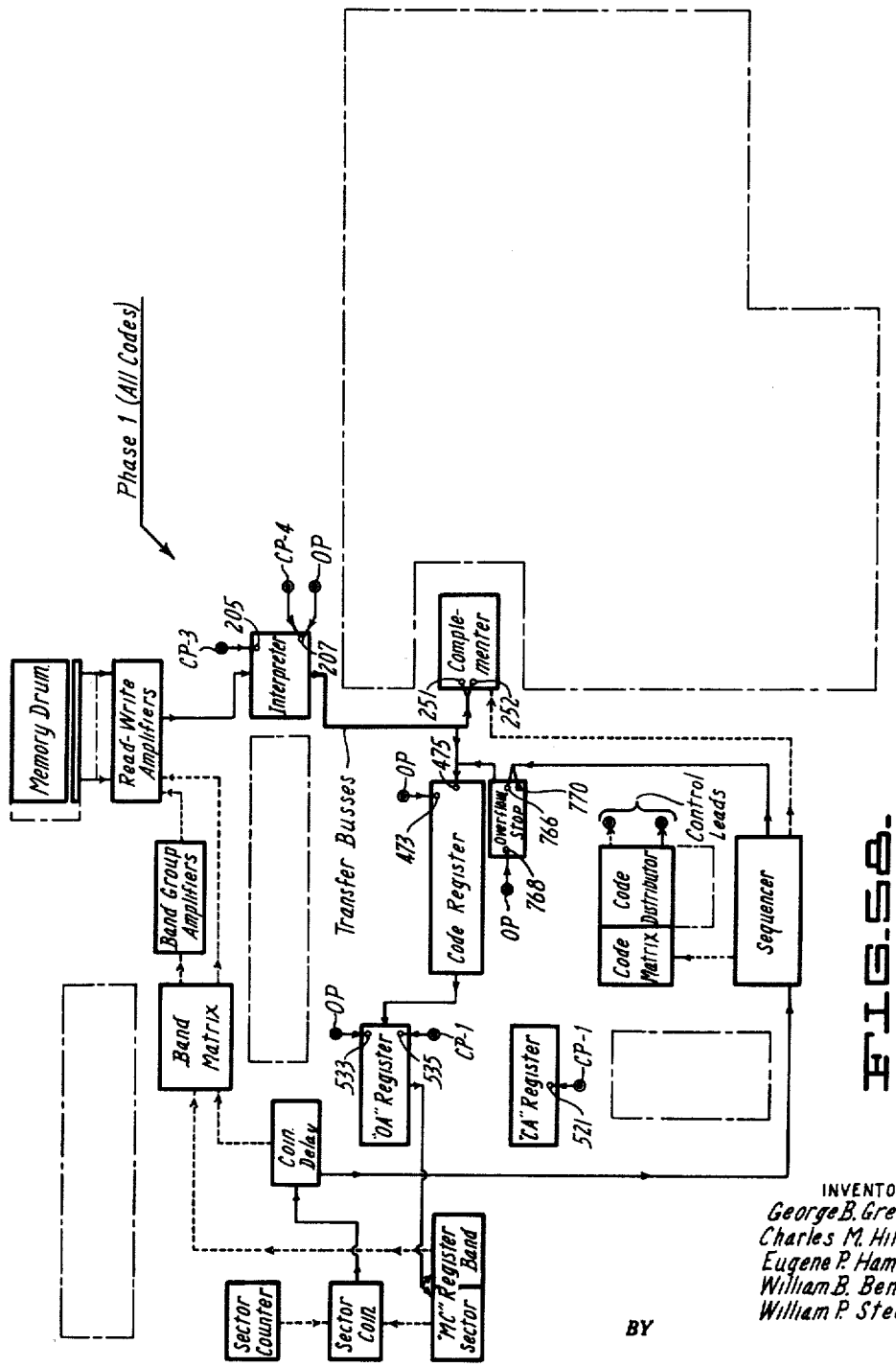
Fig. 58 is a partial block diagram of the computer illustrating the flow of information and control signals during Phase 1 of all codes.

Phase 1 is employed primarily for transferring a command from Memory into the "OA" Register and the Code Register. Referring to Fig. 58, it is recalled that a Start pulse, which may be generated either by manual control, or automatically at the end of a preceding code, shifts the address of the next command from the "CA" Register into the "MC" Register, whereupon the Address Section of the computer begins the process of locating the Memory address where the command is stored. The Sector Counter and Sector Coincidence Circuit cooperate with the sector section of the "MC" Register for enabling the Sector Coincidence Circuit to generate an SC pulse one word interval before the selected Memory sector passes its related Read-Write Head. The SC pulse is transmitted to the Coincidence Delay Circuit where it is delayed one word interval and then transmitted to the Sequencer, coincident with CP-2, for initiating Phase 1.

During the one word interval of delay, the Coincidence Delay Circuit cooperates with the band section of the "MC" Register to energize the Band Matrix which, in turn, energizes the selected Band Group Amplifier. The Band Matrix and the selected Band Group Amplifier cooperate to arm the selected Read-Write Amplifier which immediately begins transmitting reading signals to the Interpreter, the latter being disabled until a reading operation is initiated by the Sequencer.

When Phase 1 is initiated by the Sequencer, the latter transmits a control signal through the Code Matrix and the Code Distributor for arming the following gates:

The read control gate 205 in the Interpreter;
The Code Register shift gate 473;
The Code Register input gate 475;
The "CA" Register normal count gate 521;
The "OA" Register serial shift gate 533; and
The "OA" Register parallel shift gate 535.

After Phase 1 is initated, the first CP–3 passes through gate 205 in the Interpreter for arming the read gate 207. CP–4 and the following OP train then pass through gate 207, and the command from the selected address of Memory is transmitted from the Interpreter through the Transfer Busses and into the Code Register and the "OA" Register. The command is also applied to the normally open input of the Complementer, but the Sequencer maintains the input gates 251 and 252 of the Complementer closed throughout Phase 1.

When the Sequencer initiates Phate 1, it transmits a pulse to the input of gate 766 in the Overflow Stop Circuit to test for an overflow condition. If the Overflow Stop Circuit has been enabled, due to an overflow condition that requires the computer to be stopped, gate 766 is armed and passes the input pulse from the Sequencer for arming the Overflow Stop output gate 768. The next train of OP's, i.e., the train of OP's generated during Phase 1, passes through gate 768, and is transmitted to the 1's input of the Code Register, thereby entering a command of twenty-six 1's into the Code Register and the "OA" Register. If the command of twenty-six 1's from the Overflow Stop Circuit is applied to the Code Register input simultaneously with a different command from Memory, the twenty-six 1's are entered into the Code Register, because each 1 applied to the Code Register input is represented by the presence of a pulse, and each 0 is represented merely by the absence of a pulse (see also Fig. 45).

Following the OP train, CP–1 is applied to the Sequencer for terminating Phase 1 and initiating Phase 2. CP–1 is also transmitted through gate 521 for adding 1 to the command address count standing in the "CA" Register, and through gate 535 for parallel shifting the operand address from the "OA" Register into the "MC" Register.

*Read (AR) code*

IN GENERAL

The Read Code is employed primarily for transferring an operand from Memory into the "A" Register during Phase 3, but is also employed for enabling the Overflow Stop Circuit during Phase 1 of the first code following the Read Code, if the computer is being stopped under manual control.

PHASE 3

Figure 59:
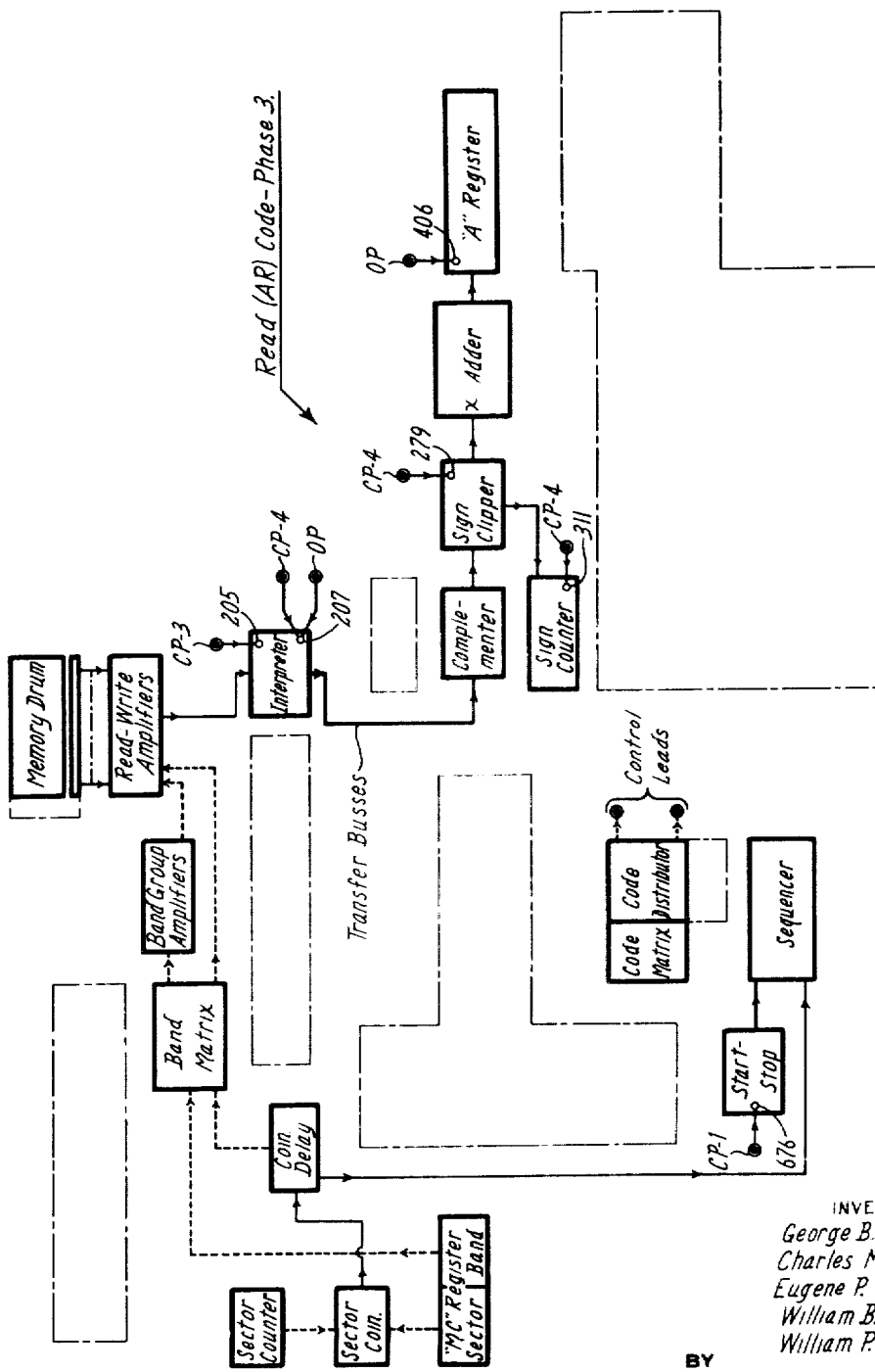
Fig. 59 is a partial block diagram of the computer illustrating Phase 3 of the Read Code.

Referring to Fig. 59, when the address of an operand is received by the "MC" Register, the band section of that register partially energizes the Band Matrix. When sector coincidence of the operand is found in the Sector Coincidence Circuit, under joint control of the Sector Counter and the sector section of the "MC" Register, an SC pulse is transmitted to the Coincidence Delay Circuit which cooperates with the "MC" Register for energizing the Band Matrix. The Band Matrix energizes the selected Band Group Amplifier and cooperates with the latter for arming the selected Read-Write Amplifier. The Coincidence Delay Circuit, after one word interval, transmits the delayed SC pulse to the Sequencer for initiating Phase 3.

During Phase 3, the Code Distributor arms the following gates:

The read control gate 205 in the Interpreter;
The Sign Clipper output control gate 279;
The Sign Counter reset gate 311;
The "A" Register OP shift gate 406; and
The start gate 676 in the Start-Stop Circuit.

After the Sequencer initiates Phase 3 in response to the delayed SC pulse on CP–2, CP–3 passes through gate 205 for arming the read gate 207. CP–4 passes through gate 207 for transmitting the sign digit of the selected operand through the Transfer Busses, the Complementer and the Sign Clipper into the Sign Counter. CP–4 also passes through gate 279 for switching the Sign Clipper output to the "x" input of the Adder and through gate 311 for resetting the Sign Counter to a 0 count. The following OP train passes through gates 207 and 406 for reading the selected operand out of Memory and transmitting it through the Transfer Busses, the Complementer, and the Sign Clipper, and the Adder into the "A" Register. The following CP–1, which terminates Phase 1, is also transmitted through gate 676 of the Start-Stop Circuit for generating a next Start pulse.

MANUAL STOP

Referring back to Fig. 58, if the computer is being stopped under manual control, gate 770 of the Overflow Stop Circuit is armed by the Code Matrix during the entire Read Code. When Phase 1 of the next code, i.e., any code that follows the Read Code is initiated in the Sequencer, the latter transmits a test pulse through gate 770 into the Overflow Stop Circuit fo renabling that circuit. The succeeding train of OP's is transmitted by the Overflow Stop Circuit to the 1's input of the Code Register for setting up the Stop Code, as hereinbefore described.

*Write (ME) code*

IN GENERAL

The Write Code, which is provided for writing the contents of the "A" Register in Memory, employs Phases 1, 2, 3 and 5. During Phase 1 (Fig. 58), previously described, a command that includes the Write Code is transferred from Memory into the Code Register and the "OA" Register. During Phase 2, the WCSD is energized to initiate Phase 3, and during Phase 3, the WCSD arms the appropriate gates for transferring a word from the "A" Register into a selected address of Memory, as well as back into the "A" Register. During Phase 5, the word that has been recirculated into the "A" Register, and therefore stands right shifted one binary place, as previously described, is again recirculated into the "A" Register for correcting the right shift.

PHASE 2

During Phase 2 (Fig. 60), which starts on CP–1, the Code Distributor arms only the write control gate 584 in the Coincidence Delay Circuit. The following CP–4 is transmitted through gate 584 for arming the write gate 582. The next CP–1 passes through gate 640 in the Sequencer and terminates Phase 2, but gate 582 remains armed.

It is recalled that during Phase 1, a selected address is transferred from Memory into the "OA" Register, and at the end of Phase 1, this address is parallel shifted into the "MC" Register which then cooperates with other circuits of the Address Section for locating the selected address. In the case of the Write Code, the selected address comprises the position in Memory where the contents of the "A" Register are to be written. When sector coincidence has been found, an SC pulse is transmitted from the Sector Coincidence Circuit to the Coincidence Delay Circuit, and during the next word interval, the band section of the "MC" Register, the Coincidence Delay Circuit, the Band Matrix and the selected Band Group Amplifier cooperate to arm the selected Read-Write Amplifier in preparation for a writing operation. It is also recalled that gate 581 in the Coincidence Delay Circuit remains armed by the Sequencer following the initiation of each Phase 1. Therefore, the CP-1 preceding the next delayed SC pulse passes through gates 581 and 582, and the Coincidence Delay Circuit thereupon transmits a pulse to the WCSD for initiating Phase 3, and transmits a pulse to the Write Control Circuit for energizing the latter. The delayed SC pulse, which occurs on CP-2, initiates Phase 3 in the Sequencer, and the latter energizes the Code Matrix and Code Distributor as usual. However, the Code Distributor does not arm any gates during Phase 3 of the White Code, the WCSD being the only active distributor at that time.

PHASE 3

During Phase 3, the WCSD arms the following gates:

The Sign Counter CP-2 readout gate 326;
The "A" Register CP-3 shift gate 404;
The "A" Register CP-4 shift gate 405;
The "A" Register OP shift gate 406;
The "A" Register CP-3 output gate 407;
The "A" Register CP-4 output gate 408;
The "A" Register OP output gate 410;
The Digit Delay Circuit CP-4 readout gate 293;
The Digit Delay Circuit OP readout gate 294; and
The Phase 5 control gate 655 in the Sequencer.

It is recalled that during a writing operation, each digit of the word standing in the "A" Register is written in Memory two digit intervals ahead of its corresponding OP; therefore, the sign digit, which stands in the Sign Counter, is written coincident with CP-2, rather than with its corresponding CP-4. Accordingly, the first CP-2 following the initiation of Phase 3, passes through gate 326 in the Sign Counter for causing the sign digit of the operand to be transmitted through the Transfer Busses, the Write Control Circuit, and the selected Read-Write Amplifier into Memory. Since the sign digit must be written on CP-2, the Code Distributor, which is energized on CP-2 in response to a delayed SC pulse transmitted to the Sequencer, would be unable to arm gate 326 of the Sign Counter prior to CP-2. Therefore, the primary reason for employing the WCSD during the Write Code is to arm gate 326 on CP-1 rather than on CP-2. The following CP-3 passes through gates 404 and 407 in the "A" Register, CP-4 passes through gates 405 and 408, and the OP train passes through gates 406 and 410, for shifting the operand from the "A" Register through the Memory Busses, the Write Control Circuit, and the selected Read-Write Amplifier into the selected address of Memory. The operand is also transmitted into the Complementer, but the normally open output gate 258 of the Complementer is closed by the WCSD during Phase 3, and prevents the operand from being transmitted from the Complementer into the Sign Clipper. CP-4 and the OP train also pass through gates 293 and 294, respectively, in the Digit Delay Circuit for shifting the successive operand digits into the "x" input of the Adder. The first operand digit, which is shifted from the "A" Register to the Transfer busses on CP-3, is therefore shifted through the Adder and into the "A" Register in response to CP-4, and the succeeding operand digits are shifted through the Adder and into the "A" Register in response to the first twenty-five OP's. The twenty-sixth OP right shifts the word in the "A" Register one extra binary place, but this overshift is corrected during Phase 5, hereinafter described. The following CP-1, which terminates Phase 3, is also transmitted through gate 655 of the Sequencer for initiating Phase 5.

PHASE 5

During Phase 5 (Fig. 61), the Code Distributor arms the following gates:

The "A" Register OP shift gate 406;
The "A" Register OP output gate 410;
The Digit Delay Circuit OP readout gate 294; and
The start gate 676 in the Start-Stop Circuit.

The first OP train following the initiation of Phase 5 passes through gates 406, 410 and 294, and the word which stands in the "A" Register is shifted from the output of the "A" Register onto the Transfer busses, and through the Complementer input, the Digit Delay Circuit and the Adder back into the "A" Register. Since only the twenty-six OP's are employed for shifting, and the combined Digit Delay Circuit and "A" Register constitute a twenty-seven stage register, the word is left-shifted by one binary place, thereby correcting the undesired right shift which occurred during Phase 3. The following CP-1, which terminates Phase 5, is also transmitted through gate 676 of the Start-Stop Circuit for generating a Start pulse.

*Add (AD) code*

IN GENERAL

The Add Code, which is provided for adding an "x" operand (from a selected address in Memory) to a "y" operand (standing in the "A" Register), employs Phases 1, 2, 3 and 4. During Phase 1 (Fig. 58), previously described, a command that includes the Add Code is transferred from Memory into the Code Register and the "OA" Register, the address of the "x" operand being entered into the "OA" Register. During Phase 2, the "y" operand standing in the "A" Register is transferred into the "R" Register. During Phase 3, the "x" operand is entered into the Adder from Memory, the "y" operand is entered into the Adder from the "R" Register, and the result is entered into the "A" Register. During Phase 4, the result word in the "A" Register is circulated twice through the Complementer and back into the "A" Register, the first time for adding a "fugitive digit" to the result, if necessary, and the second time for complementing the result, if necessary.

PHASE 2

During Phase 2 (Fig. 62), the Code Distributor arms the following gates:

The Complementer sense gate 261;
The Sign Counter reset gate 311;
The Sign Counter CP-4 readout gate 324;
The "A" Register OP shift gate 406;
The "A" Register OP output gate 410;
The "R" Register OP shift gate 425; and
The "R" Register input gate 426.

It is recalled that Phase 2 is initiated by CP-1 in response to the termination of Phase 1. Referring to Fig. 62, the first CP-3 following the initiation of Phase 2 passes through gate 261 to condition the Complementer for receiving an additive operand. CP-4 passes through gate 311, clearing the Sign Counter in preparation for receiving the sign digit from the Sign Clipper. CP-4 also passes through gate 324 in the Sign Counter, and if the sign of the operand standing in the "A" Register is minus, the Sign Counter transmits a sign digit through the 1's Transfer Bus into the Complementer, conditioning the latter for a complementing operation. If the sign digit and the operation are such as to require the sign digit to be counted, the sign digit is transmitted from the Complementer through the Sign Clipper and back to the Sign Counter.

The following OP train passes through gates 406 and 410 in the "A" Register, and through gate 425 in the "R" Register. Therefore, in response to the OP train, the word standing in the "A" Register is shifted through the Transfer Busses, the Complementer, the Sign Clipper, and gate 426 into the "R" Register. The following CP-1 passes through gate 640 in the Sequencer for terminating Phase 2.

PHASE 3

Phase 3 (Fig. 63) is initiated by the Sequencer in response to the delayed SC pulse that is generated when the address of the "x" operand is located. The various units of the Address Section that are employed in locating the address of the "x" operand are not shown in Fig. 63, because these units operate in the manner previously described in relation to Phase 3 of the Read Code.

During Phase 3, the Code Distributor arms the following gates:

The read control gate 205 in the Interpreter;
The Complementer sense gate 261;
The Sign Clipper output control gate 279;
The 2-set gate 483 in the Cycle Counter;
The "A" Register OP shift gate 406;
The "R" Register OP shift gate 425;
The "R" Register output gate 428;
The overflow test gate 372 in the Adder; and
The Phase 4 control gate 646 in the Sequencer.

The first CP–3 following the initiation of Phase 3 passes through gate 205 in the Interpreter for arming the read gate 207. CP–3 also passes through gate 261 for conditioning the Complementer to receive an additive operand. CP–4 is transmitted through gate 279 for switching the Sign Clipper word output to the "x" input of the Adder, and through gate 483 for setting the five counting stages of the Cycle Counter to the binary value 00010 (equivalent to the decimal value 2) in preparation for limiting the duration of Phase 4, hereinafter described. CP–4 also passes through the read gate 207 for transmitting the sign digit of the "x" operand from the Interpreter through the Transfer Busses and into the Complementer. The sign digit conditions the Complementer for receiving a positive or a negative operand, as the case may be, and is then routed through the Sign Clipper into the Sign Counter. The following OP train passes through gate 207 for transmitting the "x" operand from the Interpreter through the Complementer and the Sign Clipper into the "x" input of the Adder. While the word from Memory is being entered into the Adder as an "x" operand, the OP train passes through gate 425 and shifts the word standing in the "R" Register through gate 428 into the "y" input of the Adder. The OP train also passes through gate 406 for shifting the sum digits from the Adder into the "A" Register.

The following CP–1, which terminates Phase 3, also passes through gate 372 and causes the Adder to transmit either an overflow signal or a non-overflow signal, along with a reset signal, to the Sign Counter. If the result must be complemented, the Adder sets the Sign Counter accordingly, and if the computer must be stopped due to an overflow, the Sign Counter sets the Overflow Stop Circuit accordingly. CP–1 is also transmitted through gate 646 in the Sequencer for initiating Phase 4.

PHASE 4

During Phase 4 (Fig. 64), the Code Distributor arms the following gates:

The Cycle Counter CP–3 count gate 480;
The Sign Clipper output control gate 279;
The "A" Register OP shift gate 406;
The "A" Register OP output gate 410; and
The start control gate 681 in the Start-Stop Circuit.

It is recalled that during Phase 3, the Cycle Counter was set to the binary equivalent of the decimal value 2. The first CP–3 during Phase 4 is transmitted through gate 480 and decreases the Cycle Counter value to 1. CP–4 is transmitted through gate 279 for switching the Sign Clipper word output to the "x" input of the Adder. The following OP train passes through gates 406 and 410 and shifts the result word from the "A" Register through the Transfer Busses, the Complementer, the Sign Clipper, the Adder, and back into the "A" Register, thereby combining the result word with any overflow, or "fugitive" digit remaining in the Adder.

It is also recalled that the Sign Counter was set, during Phase 3, according to whether or not the result word should be complemented. The CP–1 following the first OP train in Phase 4 is applied to the input of gate 322 in the Sign Counter, and the latter sets the Complementer if the result word should be complemented. The next CP–3 is again transmitted through gate 480, and decreases the value standing in the Cycle Counter from 1 to 0. CP–4 is again transmitted through gate 279 of the Sign Clipper for switching the Sign Clipper word output to the "x" input of the Adder. The second OP train again circulates the word standing in the "A" Register through the Transfer Busses, the Complementer, the Sign Clipper, the Adder, and back into the "A" Register. If the Complementer stands set, the result word is complemented. The CP–3 which follows the second OP train is transmitted through gate 480 and finds the value 0 standing in the Cycle Counter; therefore, the Cycle Counter transmits a pulse through gate 681 of the Stop-Start Circuit for arming the start gate 676. The output pulse from the Cycle Counter is also transmitted through gate 649 in the Sequencer for terminating Phase 4. The next CP–1 passes through gate 676 for generating a Start pulse.

Subtract (SU) code

The Subtract Code, which employs Phases 1, 2, 3 and 4, is provided for subtracting an "x" operand that is stored at a known address in Memory, from a "y" operand that stands in the "A" Register. Phases 1, 2 and 4 are identical to those previously described in relation to the Add Code, and illustrated in Figs. 58, 62 and 64, respectively. Phase 3, which is illustrated in Fig. 65, is identical to Phase 3 of the Add Code (Fig. 63) except that the Code Distributor arms one additional gate, viz: the Complementer set gate 265. The first CP–3 following initiation of Phase 3 therefore passes through both gate 265 and the previously described Complementer sense gate 261, and conditions the Complementer for receiving a subtractive operand.

Compare (CS) code

Figure 66:
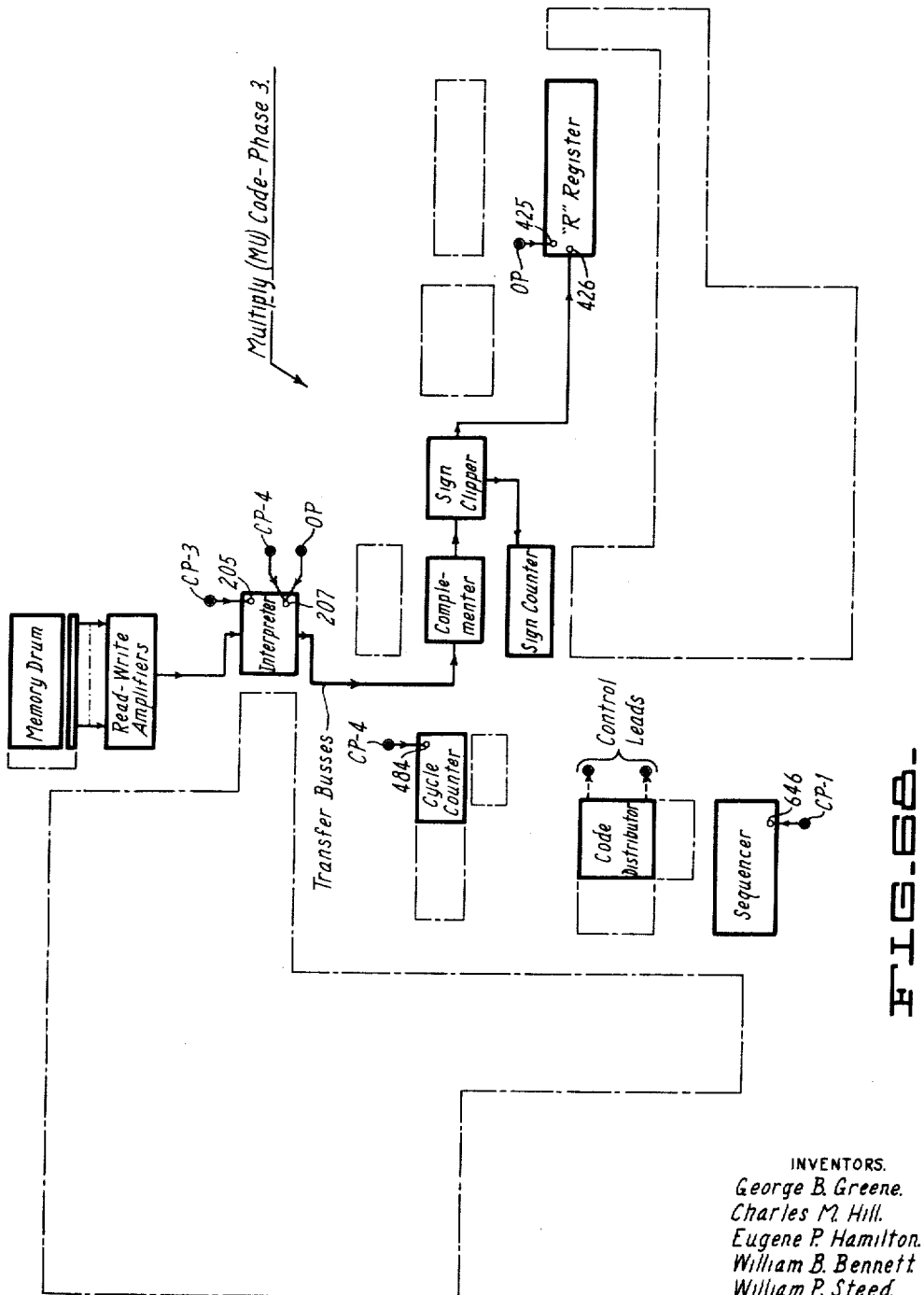
Fig. 66 is a partial block diagram of the computer illustrating Phase 3 of the Compare Code.
Figure 70:
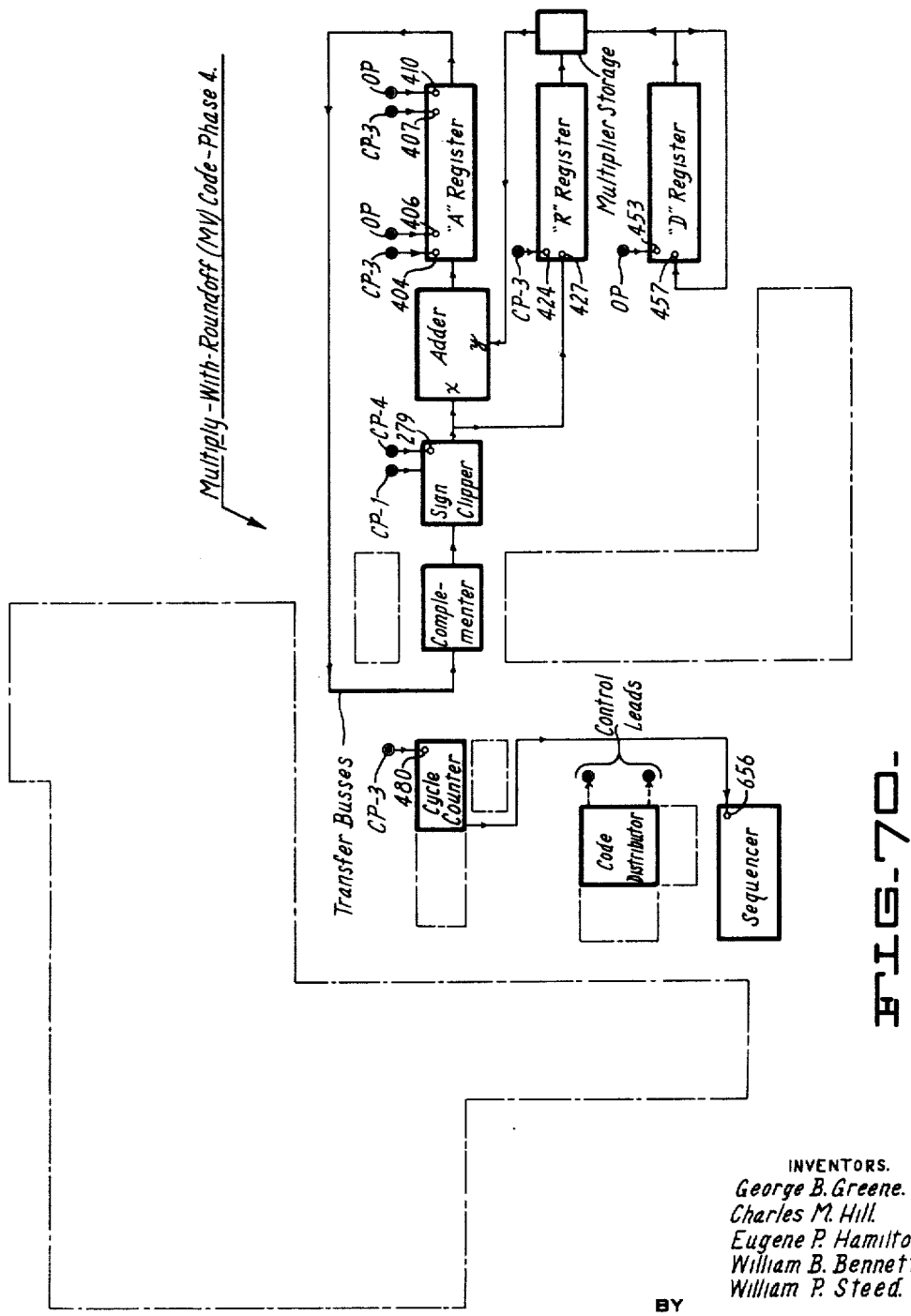
Fig. 70 is a partial block diagram of the computer illustrating Phase 4 of the Multiply-With-Roundoff Code.

The Compare Code, which employs Phases 1, 2, 3 and 4, is provided for comparing an intermediate result in a computer program with a predetermined value or with a second result, where the latter value or result is stored at a known address in Memory. The comparison is made by subtracting one of the words from the other. The results of the comparison subtraction are used to make a decision of continuing the program with either the next consecutive command or the command following it. Phases 1, 2 and 4 are identical to those of the Add Code (Figs. 58, 62 and 64, respectively). Phase 3, which is illustrated in Fig. 66, is identical to Phase 3 of the Subtract Code (Fig. 65), except that the Code Distributor also arms the extra-count gate 523 in the "CA" Register. Therefore, when CP–1 passes through the overflow sense gate 372 in the Adder for generating an overflow or a non-overflow signal, which is transmitted to the Sign Counter as previously described, the Sign Counter thereupon transmits an extra-count signal to the "CA" Register if the previous subtraction was "unsuccessful," i.e., if the subtraction result was negative. The extra-count signal passes through gate 523 in the "CA" Register and causes the count gate 521 in that register to be armed. The next CP–1 passes through gate 521 for adding 1 to the count standing in the "CA" Register; therefore, one command in the computer program is omitted in accordance with the results of the comparison operation.

Multiply (MU) code

IN GENERAL

The Multiply Code, which employs Phases 1, 2, 3 and 4, is provided for obtaining the product of a multiplicand standing in the "A" Register and a multiplier that is stored at a selected address in Memory. During Phase 1 (Fig. 58), previously described, a command which includes the Multiply Code is transferred from Memory into the Code Register and the "OA" Register. The Code Register receives the Multiply Code, and the "OA" Register receives the address of the multiplier. During Phase 2, the word standing in the "A" Register is transferred to the "D" Register. During Phase 3, the multiplier word is transferred from the selected Memory address to the "R" Register, and the Cycle Counter is preset for subsequently determining the duration of Phase 4. During Phase 4, the multiplicand, which now stands in the "D" Register, is multiplied by successive digits of the multiplier in the "R" Register. The twenty-six least significant digits of the product are shifted into the "R" Register, and the twenty-six most significant digits of the product are shifted into the "A" Register.

PHASE 2

During Phase 2 (Fig. 67), the Code Distributor arms the following gates:

The "A" Register OP shift gate 406;
The "A" Register OP output gate 410;
The "D" Register OP shift gate 453; and
The "D" Register input gate 456.

The first OP train following the initiation of Phase 2 shifts the multiplicand from the "A" Register through the Transfer Busses, the Complementer, and the Sign Clipper into the "D" Register. The sign digit of the multiplicand remains in the Sign Counter. The following CP-1 is transmitted through gate 640 in the Sequencer for terminating Phase 2.

PHASE 3

During Phase 3 (Fig. 68), which is initiated on CP-2 in response to a delayed SC pulse, the Code Distributor arms the following gates:

The read control gate 205 in the Interpreter;
The "R" Register OP shift gate 425;
The "R" Register input gate 426;
The 26-set gate 484 in the Cycle Counter; and
The Phase 4 control gate 646 in the Sequencer.

The first CP-3 following the initiation of Phase 3 passes through gate 205 in the Interpreter for arming the read gate 207. CP-4 passes through gate 207 for transmitting the sign digit of the multiplier through the Transfer Busses, the Complementer and the Sign Clipper into the Sign Counter. CP-4 also passes through gate 484 for setting the five counting stages of the Cycle Counter to the binary value 11010, equivalent to the decimal value 26. The following OP train passes through gate 207 in the Interpreter and gate 425 in the "R" Register for transmitting the multiplier through the Transfer Busses, the Complementer, the Sign Clipper and gate 426 into the "R" Register. The next CP-1, which terminates Phase 3, is also transmitted through gate 646 in the Sequencer for initiating Phase 4.

PHASE 4

During Phase 4 (Fig. 69), the Code Distributor arms the following gates:

The Cycle Counter CP-3 count gate 480;
The "A" Register CP-3 shift gate 404;
The "A" Register OP shift gate 406;
The "A" Register CP-3 output gate 407;
The "A" Register OP output gate 410;
The "R" Register CP-3 shift gate 424;
The "R" Register input gate 427;
The "D" Register OP shift gate 453;
The "D" Register recirculation gate 457;
The Sign Clipper output control gate 279; and
The start control gate 681 in the Start-Stop Circuit.

The first CP-3 following the initiation of Phase 4 passes through gate 480 for subtracting 1 from the value standing in the Cycle Counter. CP-3 also passes through gates 404 and 407 for shifting the least significant digit of the "A" Register word (which currently comprises all 0's) through the Transfer Busses, the Complementer, the Sign Clipper and gate 427 into the "R" Register. CP-3 also passes through gate 424 for shifting the least significant digit of the multiplier from the "R" Register into the Multiplier Storage Circuit. CP-4 passes through gate 279 for switching the Sign Clipper output to the "x" input of the Adder. The following OP train passes through gates 406 and 410 in the "A" Register and through gate 453 in the "D" Register, and shifts the "A" Register word through the Transfer Busses, the Complementer and the Sign Clipper into the "x" input of the Adder. If the multiplier digit that was shifted into the Multiplier Storage Circuit is a 1, the multiplicand is shifted from the "D" Register through the Multiplier Storage Circuit into the "y" input of the Adder, but if the shifted multiplier digit is a 0, the multiplicand is blocked by the Multiplier Storage Circuit. Regardless of the value of the shifted multiplier digit, the multiplicand from the output of the "D" Register is shifted through gate 457 back into the input of the same register, and at the end of the OP train, stands in its original ordinal position in the "D" Register. The CP-1 following the first OP train in Phase 4 is applied to the Sign Clipper for switching the output of that unit to the input of the "R" Register.

Starting with the next CP-3, the previously described cycle is repeated twenty-six times, during which the multiplicand standing in the "D" Register is multiplied by each successive digit of the multiplier standing in the "R" Register. During each cycle, the "R" Register receives a respective one of the twenty-six least significant digits of the product. The CP-3 which follows the twenty-sixth multiplication cycle is transmitted through gate 480 of the Cycle Counter and finds the value 00000 standing in the Cycle Counter. Therefore, the Cycle Counter transmits a pulse through gate 649 of the Sequencer for terminating Phase 4, and transmits a pulse through gate 681 of the Start-Stop Circuit for arming the start gate 676. The final CP-3, which is transmitted through gate 480 of the Cycle Counter, is also transmitted through gates 404 and 407 in the "A" Register, and through gate 424 in the "R" Register for shifting one additional digit of the "A" Register contents through the Transfer Busses, the Complementer, the Sign Clipper and gate 427 into the "R" Register. This shift also transfers into the "A" Register any overflow digit standing in the Adder; thereafter, the twenty-six most significant digits of the product stand in the "A" Register. The next CP-1 passes through gate 676 in the Start-Stop Circuit for generating a Start pulse.

Multiply-with roundoff (MV) code

IN GENERAL

The MV Code, which employs Phases 1, 2, 3, 4 and 5, is an alternate Multiply Code during which the twenty-six most significant digits of the product (standing in the "A" Register) are rounded off in accordance with the twenty-seventh digit of the product (the most significant digit in the "R" Register). Phases 1 to 3 are identical to those previously described in relation to the Multiply Code (Figs. 58, 67 and 68). Phase 4 of the MV Code (Fig. 70) is identical to Phase 4 of the MU Code (Fig. 69), except for the operation of two gates. First, the start control gate 681 in the Start-Stop Circuit is armed by the Code Distributor during Phase 4 of the MU Code but not during Phase 4 of the MV Code. Therefore, during the MV Code, the output pulse from the Cycle Counter, after twenty-six word intervals, does not enable the Start-Stop Circuit for generating a Start pulse in response to the next CP–1. Second, the Phase 5 control gate 656 (Fig. 70) in the Sequencer is armed by the Code Distributor during Phase 4 of the MV Code, and the output pulse from the Cycle Counter after the twenty-sixth word interval is therefore transmitted through gate 656 for initiating Phase 5 simultaneously with the termination of Phase 4.

PHASE 5

During Phase 5 (Fig. 71), the single digit standing in the Digit Delay Circuit, i.e., the same digit that stands in the most significant stage of the "R" Register, is entered into the Adder as a first operand, and the twenty-six most significant digits of the product (standing in the "A" Register) are entered into the Adder as a second operand for rounding off the contents of the "A" Register. The Code Distributor arms the following gates:

The CP–4 readout gate 293 in the Digit Delay Circuit;
The Sign Clipper output control gate 279;
The "A" Register OP shift gate 406;
The "A" Register OP output gate 410; and
The start gate 676 in the Start-Stop Circuit.

The first CP–4 following the initiation of Phase 5 passes through gate 293 for transmitting the single digit standing in the Digit Delay Circuit into the "x" input of the Adder. CP–4 also passes through gate 279 for switching the Sign Clipper output to the "x" input of the Adder. The OP train following CP–4 passes through gates 406 and 410, and shifts the contents of the "A" Register through the Transfer Busses, the Complementer and the Sign Clipper into the "x" input of the Adder, where the "A" Register word is additively combined with the digit previously entered from the Digit Delay Circuit. The result is shifted back into the "A" Register. The next CP–1, which terminates Phase 5, is also transmitted through gate 676 in the Start-Stop Circuit for generating a Start pulse.

Roundoff (RO) code

The Roundoff Code employs Phases 1 and 3, and is provided for rounding off an "n" digit word if, during the Right Shift and Left Shift Codes for example, hereinafter described, the (n+1)st digit of the word has been transmitted through the Transfer Busses, the Complementer and the Sign Clipper into the "R" Register, and the first "n" digits of the word stand in the "A" Register. During Phase 1 (Fig. 58), previously described, a command that includes the Roundoff Code is transmitted from Memory into the "OA" Register and the Code Register. Phase 3 of the Roundoff Code is identical to Phase 5 of the MV Code previously described in relation to Fig. 71.

Right shift (RS) code

IN GENERAL

The Right Shift Code, which employs Phases 1, 3 and 4, is provided for right-shifting the contents of the "A" Register by a predetermined number of binary places. During Phase 1 (Fig. 58), previously described, a command that includes the Right Shift Code is transferred from Memory into the "OA" Register and the Code Register. The last eight digits of the command i.e., those digits that are entered into the Cycle Counter, contain a counting value equal to the number of binary places through which the contents of the "A" Register are to be right-shifted. During Phase 3, the Sequencer is enabled for subsequently initiating Phase 4. During Phase 4, the contents of the "A" Register are right-shifted the required number of binary places. The digits that are shifted out of the "A" Register are transmitted to the "R" Register, and the "R" Register contents are right-shifted a corresponding number of binary places.

PHASE 3

During Phase 3, the Code Distributor arms only the Phase 4 control gate 646 in the Sequencer. The CP–1 which terminates Phase 3 also passes through gate 646 for initiating Phase 4.

PHASE 4

During Phase 4, the Code Distributor arms the following gates:

The CP–3 count gate 480 in the Cycle Counter;
The OP count gate 478 in the Cycle Counter;
The "A" Register OP shift gate 406;
The "A" Register OP output gate 410;
The "R" Register OP shift gate 425;
The "R" Register input gate 426; and
The start control gate 681 in the Start-Stop Circuit.

The first CP–3 following the initiation of Phase 4 passes through gate 480 and subtracts 1 from the count standing in the Cycle Counter. The following OP train passes through gates 406 and 410 in the "A" Register, and through gate 425 in the "R" Register, and shifts the contents of the "A" Register to the right. Each digit that is shifted out of the "A" Register is transmitted through the Transfer Busses, the Complementer, the Sign Clipper and gate 426 into the "R" Register. Each OP also passes through gate 478, further decreasing the count standing in the Cycle Counter, and when that count has been reduced to 0, the next OP is transmitted by the Cycle Counter through gate 649 in the Sequencer for terminating Phase 4. For example, if a right shift of three binary places has been coded, the first CP–3 which through gate 480 reduces the count standing in the Cycle Counter from 3 to 2, and the first two OP's further reduce the count to 0. The third OP is transmitted through the Cycle Counter to the Sequencer for terminating Phase 4. Therefore, before Phase 4 is terminated, three OP's pass through gates 406 and 410 of the "A" Register, and through gate 425 of the "R" Register, and three digits are shifted out of the "A" Register and into the "R" Register. The output pulse from the Cycle Counter to the Sequencer for terminating Phase 4 also passes through gate 681 of the Start-Stop Circuit for arming the start gate 676. The first CP–1 following the OP train passes through gate 676 for generating a next Start pulse.

Left shift (LS) code

IN GENERAL

The Left Shift Code, which is provided for left-shifting a fifty-two-digit word "s" binary places, employs Phases 1, 3, 4 and 5. It is recalled that the registers employed in the present invention are not adapted for left-shifting directly; therefore, an "n" digit word which is to be effectively left-shifted "s" binary places in recircuited through its register by right-shifting it n—s places, i.e., in response to n—s shift pulses. The Left Shift Code is therefore provided for right-shifting a fifty-two-digit word 52—s binary places. Before the shifting operation, the twenty-six most significant digits of the word stand in the "A" Register, and the remaining digits stand in the "R" Register.

During Phase 1 (Fig. 58), previously described, a command that includes the Left Shift Code is transferred from Memory into the Code Register and "OA" Register. The eight most significant digits of the command, i.e., those digits that are entered into the Cycle Counter, include a counting value equal to "s," the number of binary places through which a word is to be left-shifted. During Phase 3, an initial right shift of twenty-six binary places is performed, reducing the required number of right shifts to 52—26—s places, or 26—s places. During Phase 4, the first "s" pulses in a group of twenty-six OP shift pulses are "discarded," but the No. "s" pulse of the train is employed for initiating Phase 5. During Phase 5, the remaining 26—s OP's of the train are employed for performing the remaining 26—s places of right shift.

PHASE 3

During Phase 3 (Fig. 73), the Code Distributor arms the following gates:

The "A" Register OP shift gate 406;
The "A" Register OP output gate 410;
The "R" Register OP shift gate 425;
The "R" Register input gate 426;
The "R" Register output gate 428; and
The Phase 4 control gate 646 in the Sequencer.

The first OP train following the initiation of Phase 3 passes through gates 406 and 410 in the "A" Register, and through gate 425 in the "R" Register, thereby shifting the contents of the "A" Register through the Transfer Busses, the Complementer and the Sign Clipper into the "R" Register, and shifting the contents of the "R" Register into the "y" input of the Adder, and through the Adder back into the "A" Register. The next CP–1, which terminates Phase 3, is also transmitted through gate 646 in the Sequence for initiating Phase 4.

PHASE 4

During Phase 4, the Code Distributor arms the following gates:

The CP–3 count gate 480 in the Cycle Counter;
The OP count gate 478 in the Cycle Counter; and
The Phase 5 control gate 656 in the Sequencer.

The first CP–3 following the initiation of Phase 4 passes through gate 480, and subtracts 1 from the count of "s" standing in the Cycle Counter. The first $s-1$ OP's in the following train are transmitted through gate 478 for reducing to 0 the count of $s-1$ standing in the Cycle Counter. The No. "s" OP finds a count of 0 standing in the Cycle Counter and therefore causes that circuit to transmit a pulse through gate 649 of the Sequencer for terminating Phase 4, and through gate 656 of the Sequencer for initiating Phase 5.

PHASE 5

During Phase 5, the Code Distributor arms the following gates:

The "A" Register OP shift gate 406;
The "A" Register OP output gate 410;
The "R" Register OP shift gate 425;
The "R" Register input gate 426;
The "R" Register output gate 428; and
The start gate 676 in the Start-Stop Circuit.

Since Phase 5 is initiated in response to the No. "s" pulse in an OP train, the remaining 26—s OP's are transmitted through gates 406 and 410 in the "A" Register, and through gate 425 in the "R" Register, thereby shifting the 26—s least significant digits of the "A" Register through the Transfer Busses, the Complementer and the Sign Clipper into the "R" Register, and the 26—s least significant digits of the "R" Register into the "y" input of the Adder, and through the Adder into the "A" Register. The following CP–1, which terminates Phase 5, also passes through gate 676 of the Start-Stop Circuit for generating a next Start pulse.

Delete (DE) code

IN GENERAL

The Delete Code, which employs Phases 1, 2, 3 and 4, is provided for deleting any digit 1 that may appear in one or more predetermined binary places of the word standing in the "A" Register. During Phase 1 (Fig. 58), previously described, a command that includes the Delete Code is transferred from Memory into the Code Register and the "OA" Register. The Code Register receives the Delete Code, and the "OA" Register receives the address of a "delete word." The delete word comprises twenty-six digits, and includes a 0 in each binary place where a digit 1 is to be deleted (if it exists) from the word standing in the "A" Register. Phases 2 and 3 are identical to those previously described in relation to the Multiply Code (Figs. 67 and 68). During Phase 2, the word standing in the "A" Register is transferred to the "D" Register. During Phase 3, the delete word is transferred from Memory into the "R" Register, and the Cycle Counter is preset for subsequently determining the duration of Phase 4. During Phase 4, each successive digit of the delete word (now standing in the "R" Register) is shifted into the Multiplier Storage Circuit, and each successive digit of the "D" Register word is shifted through the Multiplier Storage Circuit and the Adder into the "A" Register, if the corresponding digit of the delete word is a 1.

PHASE 4

During Phase 4 (Fig. 75), the Code Distributor arms the following gates:

The CP–3 count gate 480 in the Cycle Counter;
The OP count gate 478 in the Cycle Counter;
The "A" Register OP shift gate 406;
The "R" Register CP–3 shift gate 424;
The "R" Register OP shift gate 425;
The "D" Register OP shift gate 453; and
The start control gate 681 in the Start-Stop Circuit.

It is recalled that during Phase 3 of the Multiply Code, which is identical to Phase 3 of the Delete Code, the binary equivalent of the decimal count 26 was set into the Cycle Counter. The first CP–3 following the initiation of Phase 4 passes through gate 480 for subtracting 1 from that count. The first twenty-five OP's in the following train are transmitted through gate 478 and reduce the count to 0; therefore, the twenty-sixth OP in the train finds a count of 0 standing in the Cycle Counter and causes that circuit to transmit a pulse through gate 649 in the Sequencer for terminating Phase 4, and through gate 681 in the Start-Stop Circuit for arming the start gate 676. The next CP–1 passes through gate 676 for generating a Start pulse. Thus, the count standing in the Cycle Counter limits the duration of Phase 4 to twenty-six word intervals, during which the deleting operation is performed, as follows.

The first CP–3 following the initiation of Phase 4 passes through gate 424 in the "R" Register and shifts the least significant "R" Register digit into the Multiplier Storage Circuit. The first OP in the following train passes through gate 453 in the "D" Register and transmits the least significant "D" Register digit to the input of the Multiplier Storage Circuit. If a digit 1 was shifted into the Multiplier Storage Circuit in response to CP–3, i.e., if the least significant digit of the delete word is a 1, then the corresponding "D" Register digit 0 or 1 is transmitted through the Multiplier Storage Circuit into the "y" input of the Adder. On the other hand, if the least significant digit of the delete word is a 0, a 0 is entered into the "y" input of the Adder regardless of the value of the corresponding "D" Register digit. Each OP is also transmitted through gate 406 for shifting the successive Adder output digits into the "A" Register. The first OP, which transmits a first digit out of the "D" Register and into the "A" Register, is also transmitted through gate 425 of the "R" Register for shifting the second digit of the delete word into the Multiplier Storage Circuit. Similarly, in response to each succeeding OP in the train, the above described deleting operation occurs, and the word that is shifted into the "A" Register contains a 0 in each binary place where it originally contained a 0, but if the corresponding digit in the delete word is a 0, it also contains a 0 in each binary place where it originally contained a 1.

Jump (JU) code

IN GENERAL

It is recalled that in normal operations of the computer, consecutive commands are found in consecutive addresses of Memory. The Jump Code, which employs Phases 1, 3 and 4, is provided for entering into the "CA" Register a non-consecutive command address. During Phase 1 (Fig. 58), previously described, a command which includes the Jump Code is transferred from Memory into the Code Register and the "OA" Register. The twelve digits which are entered into the "OA" Register constitute the address of the next command. During Phase 3, the JCSD is energized for initiating Phase 4. During Phase 4, the JCSD arms the appropriate gates throughout the computer for shifting the contents of the "OA" Register, i.e., the new command address, through the Transfer Busses and the Code Register into the "CA" Register.

PHASE 3

During Phase 3 (Fig. 76), the Code Distributor arms only the jump control gate 753 in the JCSD. The following CP–1, which terminates Phase 3, is also transmitted through gate 753 for energizing the JCSD.

PHASE 4

During Phase 4 (Fig. 76), the JCSD arms the following gates:

The "OA" Register serial shift gate 533;
The "OA" Register serial output gate 534;
The "CA" Register serial shift gate 513;
The Code Register OP shift gate 473;
The Code Register input gate 475; and
The start gate 676 in the Start-Stop Circuit.

After the JCSD is energized, the first OP train is transmitted through gate 513 in the "CA" Register, through gates 533 and 534 in the "OA" Register, and through gate 473 in the Code Register, thereby shifting the contents of the "OA" Register through the Transfer Busses, gate 475, and the Code Register into the "CA" Register. The following CP–1 passes through gate 676 in the Start-Stop Circuit for generating a next Start pulse. The Start pulse is transmitted to the JCSD for de-energizing the latter to terminate Phase 4.

Type in (TI) code

IN GENERAL

The Type In Code, which employs Phases 1 and 5, is provided for transferring the binary equivalent of a selected decimal digit from the Typewriter through the "T" Register and into the "$x$" input of the Adder, where it is combined with a "$y$" operand comprising a word standing in the "R" Register. During Phase 1 (Fig. 58), previously described, a command which includes the Type In Code is transferred from Memory into the "OA" Register and the Code Register. The Code Selector (Fig. 77) immediately energizes the Code Matrix, which thereupon arms the following gates during the entire Type In Code:

The Phase 5 control gate 654 in the Sequencer; and
The error gate 789 in the Error Detection Circuit.

The Code Matrix also partially arms the Ready Light gate 488 in the Cycle Counter during the entire Type In Code. The functions of gates 488, 654 and 789 will be described hereinafter. After Phase 1 is terminated, the binary equivalent of a decimal digit is transmitted from the Typewriter to the "T" Register. During Phase 5, the contents of the "T" and "R" Registers are combined in the Adder, and the result is entered into the "A" Register.

PHASE 5

After Phase 1 of the Type In Code, no further computer operation occurs until the binary equivalent of the typed decimal digit is transmitted from the Typewriter into the "T" Register. When this occurs, the Typewriter transmits a Ready pulse to the Start-Stop Circuit for arming the Ready gate 673. The next delayed SC pulse from the Coincidence Delay Circuit passes through gate 673 in the Start-Stop Circuit and is transmitted through gate 654 in the Sequencer for initiating Phase 5. During Phase 5 (Fig. 77), the Code Distributor arms the following gates:

The "T" Register serial shift gate 383;
The "T" Register output gate 393;
The "A" Register OP shift gate 406;
The "R" Register OP shift gate 425;
The "R" Register output gate 428; and
The start gate 676 in the Start-Stop Circuit.

The first OP train following the initiation of Phase 5 passes through gate 383 and shifts the binary word, now standing in the "T" Register, through the output gate 393 of that register and into the "$x$" input of the Adder. The OP train also passes through gate 425 and shifts the "R" Register word through gate 428 and into the "$y$" input of the Adder. Finally, the OP train passes through gate 406 for shifting the result word from the Adder into the "A" Register. The next CP–1 passes through gate 676 in the Start-Stop Circuit for generating a Start pulse.

Alternate type in code

The Alternate Type In Code is identical to the Type In Code previously described, except that it additionally provides for turning on the Ready Light when a command that includes the Alternate Type In Code is transferred from Memory into the "OA" Register and the Code Register, thereby indicating that the computer is ready to receive a special typewriter input, hereinafter described in relation to the Director Subroutine.

The command that calls for the Alternate Type In Code contains a digit 1 in its second most significant binary place, where a digit 0 ordinarily appears. Therefore, when the eight most significant digits of the command are entered into the Cycle Counter, the digit 1 is entered into stage 471(7) of the Cycle Counter (see also Fig. 45). When the Type In Code is entered into the Code Selector, the latter immediately energizes the Code Matrix, which thereupon partially arms gate 488 as previously described. Thus, when the digit 1 stands in stage 471(1) of the Cycle Counter, and the Type In Code stands in the Code Selector, gate 488 is fully armed and the Ready Light is turned on.

Type out (TO) code

IN GENERAL

The Type Out Code, which employs Phases 1, 3 and 4, is provided for shifting the four least significant "A" Register digits into the "T" Register in preparation for the Type Control Code, hereinafter described, during which the decimal or other equivalent of the four digits is typed. During Phase 1 (Fig. 58), previously described, a command that includes the Type Out Code is transferred from Memory into the Code Register and the "QA" Register. The command digits that are entered into the five counting stages of the Cycle Counter comprise a binary counting value 00011, equivalent to the decimal value 3. This counting value is employed for limiting the duration of Phase 4, as hereinafter described. During Phase 3, the Sequencer is enabled for subsequently initiating Phase 4. During Phase 4, the contents of the "A" Register are shifted through the Transfer Busses and into the "T" Register, and the Cycle Counter limits the shifting operation to four binary places.

PHASE 3

During Phase 3 (Fig. 78), the Code Distributor arms only the Phase 4 control gate 646 in the Sequencer. The next CP–1 passes through gate 646 for initiating Phase 4.

PHASE 4

During Phase 4, the Code Distributor arms the following gates:

The OP count gate 478 in the Cycle Counter;
The "A" Register OP shift gate 406;
The "A" Register OP output gate 410;
The "T" Register serial shift gate 383;
The "T" Register serial input gate 386; and
The start control gate 681 in the Start-Stop Circuit.

Each OP in the first train following the initiation of Phase 4 passes through gate 478 and subtracts 1 from the count of 3 standing in the Cycle Counter. Therefore, the fourth OP through gate 478 finds a count of 0 standing in the Cycle Counter, and the latter circuit thereupon transmits a pulse through gate 649 in the Sequencer for terminating Phase 4. The four OP's that occur during Phase 4 pass through gates 406 and 410 in the "A" Register, and through gate 383 in the "T" Register, and shift the four least significant "A" Register digits through the Transfer Busses and gate 386 into the "T" Register. The output pulse from the Cycle Counter, which terminates Phase 4, also passes through gate 681 in the Start-Stop Circuit for arming the start gate 676. The next CP–1 passes through gate 676 for generating a Start pulse.

Type control (TC) code

IN GENERAL

The Type Control Code employs Phases 1 and 3, and is provided for transmitting the binary representation of an item of information such as a single decimal digit, from the "T" Register to the Typewriter. The Type Control Code always follows the Type Out Code, during which it is recalled that the binary representation is transferred from the "A" Register into the "T" Register. During Phase 1 (Fig. 58), previously described, a command that includes the Type Control Code is transferred from Memory into the "OA" Register and Code Register. The Code Selector immediately energizes the Code Matrix which thereafter arms the following gates throughout the Type Control Code:

The type control gate 674 in the Start-Stop Circuit; and
The error gate 789 in the Error Detection Circuit.

During Phase 3, the binary representation that stands in the "T" Register is sensed by the Typewriter for typing the represented item of information.

PHASE 3

During Phase 3 (Fig. 79), the Code Distributor arms the following gates:

The typewriter control gate 327 in the Sign Counter; and
The stop gate 667 in the Start-Stop Circuit.

The CP–1 that terminates Phase 3 also passes through gate 327 of the Sign Counter for transmitting two signals to the Typewriter. The first signal indicates, if such is the case, that a minus sign is associated with a word containing the item of information which is to be typed out. The second signal causes the Typewriter to type out the item of information whose binary representation stands in the "T" Register. The CP–1 that terminates Phase 3 also passes through gate 667 for partially arming the start gate 664 in the Start-Stop Circuit. When the Typewriter has typed out the single item of information, it transmits a Ready pulse to the Start-Stop Circuit for arming the start control gate 673. The next delayed SC pulse from the Coincidence Delay Circuit passes through gates 673 and 674, fully arming gate 664. The following CP–1 passes through gate 664, thereby generating a Start pulse and closing gates 664 and 673.

Throughout the Type Control Code, each delayed SC pulse from the Coincidence Delay Circuit passes through gate 789 in the Error Detection Circuit for maintaining the Error Light turned off.

Stop (ST) code

IN GENERAL

The Stop Code employs Phases 1, 2 and 3, and is provided for stopping the computer, for transferring the contents of the "CA" Register first into the "A" Register and then into Memory, for clearing the "CA" Register in preparation for restarting the computer, and for enabling the computer to be restarted for a next operation. During Phase 1 (Fig. 58), previously described, either a command of twenty-six 1's is shifted from the overflow Stop Circuit into the "OA" Register and the Code Register, or a normal command that includes the Stop Code is transferred into those registers from Memory. The Code Selector immediately energizes the Code Matrix which thereafter arms the error gate 789 in the Error Detection Circuit, throughout the Stop Code. During Phase 2 (Fig. 80), the contents of the "CA" Register are transferred into the "A" Register, and the Coincidence Delay Circuit is enabled for subsequently energizing the WCSD to initiate Phase 3. During Phase 3, the contents of the "A" Register are transferred to Memory, as previously described in relation to Phase 3 of the Write Code.

PHASE 2

During Phase 2, the Code Distributor arms the following gates:

The Sign Clipper output control gate 279;
The write control gate 584 in the Coincidence Delay Circuit;
The "CA" Register serial shift gate 513;
The "CA" Register serial output gate 514;
The "CA" Register normal count gate 521;
The "A" Register OP shift gate 406; and
The stop gate 667 in the Start-Stop Circuit.

The first CP–4 following the initiation of Phase 2 passes through gate 279 for switching the Sign Clipper output to the "x" input of the Adder, and passes through gate 584 in the Coincidence Delay Circuit for arming the write gate 582. The following OP train passes through gates 513 and 514 in the "CA" Register, and through gate 406 in the "A" Register for shifting the contents of the "CA" Register through the Transfer Busses, the Complementer, the Sign Clipper and the Adder, into the "A" Register. Although the Code Register is not shifted, its output stage stands at 1 and causes a series of 1's to be shifted into the "CA" Register when the word standing in the "CA" Register is shifted onto the Transfer Busses (see Figs. 46 and 47). The CP–1 following the OP train passes through gate 521 (Fig. 80) for adding 1 to the count of all 1's standing in the "CA" Register, thereby producing a count of all 0's in that register in preparation for restarting the computer. CP–1 also passes through gate 667 in the Start-Stop Circuit for enabling the latter to generate a Start pulse when the computer is subsequently restarted. It is recalled that in response to the initiation of Phase 1 of any code, the Sequencer arms gate 581 in the Coincidence Delay Circuit. Therefore, the CP–1 preceding the next delayed SC pulse passes through gates 581 and 582 to the WCSD, energizing the latter to initiate Phase 3, and energizing the Write Control Circuit.

During Phase 3, the WCSD arms the same set of gates that it arms during Phase 3 of the Write Code, previously described. The writing operation occurs as described in relation to the Write Code, thereby transferring the contents of the "A" Register into the selected address of Memory. It is recalled, however, that the WCSD arms the Phase 5 control gate 655 in the Sequencer during Phase 3 of the Write Code. Although gate 655 is also armed during Phase 3 of the Stop Code, and Phase 5 is therefore initiated by the Sequencer, the Code Distributor does not arm any gates during Phase 5 of the Stop Code, and nothing occurs during that control phase. Since Phase 5 is not employed during the Stop Code, the contents of the "A" Register, having been written in Memory and recirculated into the "A" Register, stand right-shifted one binary place, as previously described. Following the Stop Code, however, the contents of the "A" Register are not employed as an operand, but are merely replaced by any operand transferred into that register, and the right shift does not need to be corrected as it is during Phase 5 of the Write Code.

Director subroutine

It will be apparent that the codes described in relation to Figs. 58 to 80 may be employed serially in various combinations for performing numerous data processing operations. The computer may be programmed by entering into consecutive Memory addresses the successive commands that are employed in a processing operation. It has been found, however, that certain computer programs are so frequently used that it is desirable to permanently store them in Memory. Such permanently stored programs are designated "subroutines," and include such processing operations as the loading or unloading of plural order decimal numbers.

The commands comprising each permanently stored subroutine are stored in a plurality of consecutive Memory addresses. The present invention includes means for selectively setting up the starting address of each of a plurality of subroutines, in response to the typing of a respective single digit. The process of carrying out such selection is designated the "Director Subroutine," and the digit corresponding to each selectable subroutine is designated a "director" digit.

In the following description of the Director Subroutine, references are made to various Memory addresses. These addresses are set forth merely as examples, and numerous equivalent sets of addresses will be apparent to those skilled in the art. For convenience of description, the designation of each address is in terms of decimally numbered bands and sectors, it being understood that the actual selection process employs the equivalent binary representations. Each address is expressed in the form "b/s," where "b" is a band number and "s" is a sector number. A command is therefore expressed in the form "C b/s," where "C" is a code abbreviation.

Referring to Fig. 32, it is recalled that when operation of the computer is started, the "CA" Register contains the address 0/0; therefore the first command is found at that address. Accordingly, the first command of the Director Subroutine is permanently stored at address 0/0, and comprises the command AR 0/63 (read the contents of band 0, sector 63 and transfer them into the "A" Register). A word comprising all 0's is permanently stored at address 0/63; therefore, in response to the command AR 0/63, the "A" Register is cleared.

During the AR Code, the command address in the "CA" Register is increased to 0/1, as hereinbefore described, and the second command of the Director Subroutine is found at that address. The command that is permanently stored at address 0/1 is AD 0/63. Therefore, the all-0's word in the "A" Register is transferred to the "R" Register, and is added to the all-0's word from address 0/63. Finally, the result of all 0's is entered into the "A" Register; thus, the "A" and "R" Registers are both cleared.

The command address in the "CA" Register is again increased by unity, and the next command, which includes the Alternate Type In (TI) Code, is found at address 0/2. During the Alternate TI Code, a single digit is manually typed when the Ready Light comes on, and this digit is transmitted through the "T" Register into the "A" Register, as previously described. The single typed digit constitutes the director digit and may have any value 0–9.

The next command is found at address 0/3 and is the command AD 0/54. During the AD Code, the "A" Register contents (comprising only the director digit) are transferred into the "R" Register and are then combined with the word stored at address 0/54. The word permanently stored at address 0/54 comprises the command JU 0/6; therefore, the result word that is entered into the "A" Register during the AD Code is JU 0/(6+d) where "d" is the director digit.

The next command, which is found at address 0/4, is ME 4/0, and causes the "A" Register contents, i.e., the word JU 0/(6+d), to be written at address 4/0.

The next command, which is found at address 0/5, is JU 4/0, and causes the contents of address 4/0, i.e., the command JU 0/(6+d), to be entered into the "OA" Register and the Code Register. This constitutes the final command of the Director Subroutine. The Jump Code in the Code Register causes the address 0/(6+d) to be transferred from the "OA" Register to the "CA" Register; therefore, the next command is found at an address 0/6 to 0/15, depending on the value of the director digit "d." At each address 0/6 to 0/15, there is permanently stored a command including the Jump (JU) Code, which directs the computer to the starting address of a respective permanently stored subroutine. The final command of each such subroutine is JU 0/0, which directs the computer back to address 0/0 for restarting the Director Subroutine.

We claim:

1. In a computer adapted to perform any of a plurality of operations, the combination of: a cyclically and continuously moving memory unit having a plurality of address positions, with each address position adapted to receive, store and transmit manifestations of plural digit words; a device for receiving signal trains representing plural digit words corresponding to command for performing said operations; means for entering a signal train, representing a selected operation, into said receiving device; a sequencer adapted to produce a series of time-spaced signals representative of successive phases of an operation; means operable, subsequent to entry of said last-named signal train into said receiving device, for initiating operation of said sequencer; a main control means normally controlled jointly by said receiving device and said sequencer for initiating a phase of an operation; writing circuits including a writing transducer disposed at a fixed writing locus relative to said memory unit, said writing circuits being operable, upon energization thereof, for entering a manifestation of a selected word into a selected address position of the memory unit; an alternate control device adapted upon energization thereof for energizing said writing circuits; address circuits operable, in response to the occurrence of a predetermined space relationship between said writing transducer and a selected address position of said memory unit, for energizing said alternate control device when the latter has been enabled; means for entering a manifestation of said selected address position into the address circuits; and means operable, upon receipt by said receiving device of a signal train representing a predetermined command, for enabling said alternate control device and for disabling said main control means.

2. In a computer adapted to perform a plurality of logical operations, the combination of: a memory unit having a plurality of addresses, each address being adapted to receive and store manifestations of plural digit words; means for entering into selected addresses manifestations of plural digit words representing commands, each command including a first group of digit manifestations which represent a memory address, and a second group of digit manifestations which represent an operation; first and second address-receiving registers; means for entering into said first address-receiving register a manifestation of the memory address where a selected command is stored; an operation-receiving register; means controlled by said first address-receiving register for transferring the first group of digit manifestations of said selected command from the memory unit to the second address-receiving register and the second group of digit manifestations of said selected command from the memory unit to the operation-receiving register; operation initiating means operable, in response to the receipt of a command manifestation by said second address-receiving register and said operation receiving register, for initiating the corresponding operation; means for detecting the occurrence of a predetermined event during said initiated operation; a circuit connected to said detecting means for generating a manifestation of a plural digit stop command in response to a signal generated upon the detection of said event, said stop command including a first group of digit manifestations representing a predetermined memory address, and a second group of digit manifestations representing a stop operation; means for transferring said first group of digit-manifestations of the stop command from the generating circuit to the second address-receiving register, and said second group of digit manifestations of the stop command from the generating circuit to the operation-receiving register; and means operable, in response to a signal generated upon receipt of said stop command manifestation by the second address-receiving register and the operation-receiving register, for transferring a manifestation of the contents of said first address-receiving register to the memory address represented by the contents of the second address-receiving register.

3. The combination defined in claim 2, with: a circuit operable, in response to a signal generated upon receipt of said stop command manifestation by the second address-receiving register and the operation-receiving register, for inhibiting said operation initiating means.

4. In a computer adapted to perform a plurality of operations, the combination of: a memory unit; means for storing in said memory unit plural-digit commands corresponding to said operations; a command receiving device; means for transferring a series of selected plural-digit commands from said memory unit to said receiving device; a stop switch; means including said receiving device for generating operation control signals in accordance with each command transferred to said receiving device; a plural-digit stop-command generating circuit including enabling means operable upon the concurrent receipt of signals from (1) said stop switch and (2) said means for generating operation control signals; means operable for transmitting signals to said stop-command generating circuit from said stop switch and from said means for generating operation control signals; means connecting said stop-command generating circuit to the command receiving device for transferring the stop command to said receiving device; and means for stopping operation of the computer in response to a predetermined one of said operation control signals upon receipt of said stop command by said receiving device.

5. In a computer adapted to perform a plurality of operations the combination of: a memory unit; means for storing in said memory unit plural-digit commands corresponding to said operations; a command receiving device; means for transferring plural-digit commands from said memory unit to said receiving device in a selected sequence; means including said receiving device, for generating a control signal on at least one of a plurality of control-signal lines in response to receipt of each of said plural digit commands; a stop switch; a sequencer operable to generate a plurality of time-spaced signals on a plurality of output lines, the signal on each of said lines providing means for executing one of a plurality of phases in an operation; means operable for initiating operation of said sequencer prior to the transfer of a plural-digit command to said receiving device; a stop command generating circuit for generating a plural-digit stop command in response to the joint receipt of signals from (1) said stop switch, (2) a predetermined one of said control-signal lines and (3) a predetermined one of said sequencer output lines; means for transmitting said stop command to said receiving device; means responsive to the receipt of said stop command by said receiving device for generating a signal on one of said control signal lines for stopping the operation of the computer.

6. In a computer adapted to perform a plurality of arithmetic operations, the combination of: a memory unit; means for storing in said memory unit plural-digit commands corresponding to said operations; a command receiving device; means for transferring a series of selected plural-digit commands from the memory unit to said receiving device; means, including said receiving device, for initiating an operation in response to the receipt of the corresponding plural-digit command by said receiving device; an adder operable, in response to entry therein of a pair of operands, for additively combining said operands to produce a sum; means operable, during one of said arithmetic operations, for entering a pair of operands into said adder; means connected to the adder for detecting the production of a sum greater than a predetermined value and for generating a signal thereupon; a stop circuit connected to the detecting means and operable, in response to said signal, for generating a plural-digit stop command; means connecting the stop circuit to the command receiving device for transferring the stop command to said receiving device; and means for stopping operation of the computer in response to the receipt of the stop command by the receiving device.

7. In a computer adapted to perform a plurality of arithmetic operations, the combination of: a memory unit; means for storing in said memory unit plural-digit commands corresponding to said operations; a command receiving device; means for transferring a series of selected plural-digit commands from the memory unit to said receiving device; means, including said receiving device, for initiating an operation in response to the receipt of the corresponding plural-digit command by said receiving device; an adder operable, in response to entry therein of a pair of operands, for additively combining said operands to produce a sum; means operable, during one of said arithmetic operations, for entering a pair of operands into said adder; means connected to the adder for detecting the production of a sum greater than a predetermined value and for generating a signal thereupon; a stop circuit connected to the detecting means and operable, in joint response to said signal and to a signal generated upon the initiation of a next operation, for generating a plural digit stop command; means connecting the stop circuit to the command receiving device for transferring the stop command to said receiving device; and means for stopping operation of the computer in response to the receipt of the stop command by the receiving device.

8. In a computer adapted to left shift an "$n$" digit number "$s$" places, by right shifting said number "$n-s$" places, the combination of: an "$n$" stage operand register; means for entering an "$n$" digit number into said operand register; a plural-stage command register; selectively operable means for entering a plural-digit command corresponding to a left shift operation into said command register; means including a first part of the command register operable in response to the receipt of said command for connecting the output of said operand register to the input thereof; a second part of said command register for receiving the digital representation of the value of "$s$"; means for transmitting to said second part of said command register a pulse train containing "$n$" pulses; means including said second part of the command register for counting pulses and for generating a signal upon receiving "$s$" of said "$n$" pulses; means operable upon receipt of said signal for transmitting the remaining "$n-s$" of said "$n$" pulses to a circuit for right shifting the contents of said operand register "$n-s$" places.

9. In the combination defined in claim 8, means for selectively predetermining the value of "$s$."

10. In a computer adapted to perform any of a plurality of logical operations, the combination of: a memory unit; means for storing in said memory unit manifestations of plural digit words representing commands to perform said operations; a plural stage register, means for transmitting a serial train of signals, representing a selected command word, from said memory unit to the input of said register; means including said register for generating a plural-element signal in accordance with the contents thereof; a sequencer adapted to produce a series of time-spaced signals representative of successive phases of an operation; means operable, subsequent to storage of the selected command in said register for initiating operation of said sequencer; a main control device operable upon concurrent receipt of signals from said register and from said sequencer for generating operation control signals; means operable, upon the selection of a predetermined operation, for entering a new command representation into said register; an alternate control device; and means operable in response to a predetermined one of said operation control signals for transferring control of said predetermined operation from said main control device to said alternate control device.

11. In a computer as defined in claim 2 and comprising: a starting circuit; means for producing a starting signal; means for transmitting said starting signal from said producing means to said starting circuit for enablement thereof: means operable in response to receipt of said starting signal by said starting circuit for enabling said operation initiating means; means operable upon the enablement of said operation initiating means for disabling said starting circuit; and means operable, in response to a signal generated upon receipt of said stop command manifestations by the second address-receiving register and operation-receiving register, for re-enabling said starting circuit.

References Cited in the file of this patent

UNITED STATES PATENTS

| | | |
|---|---|---|
| 2,502,360 | Williams | Mar. 28, 1950 |
| 2,542,644 | Edson | Feb. 20, 1951 |
| 2,577,475 | Miller | Dec. 4, 1951 |
| 2,617,931 | Trousdale | Nov. 11, 1952 |
| 2,635,229 | Gloess | Apr. 14, 1953 |
| 2,636,672 | Hamilton | Apr. 28, 1953 |
| 2,638,542 | Fleming | May 12, 1953 |
| 2,653,231 | Cooke-Yarborough | Sept. 22, 1953 |
| 2,679,638 | Bensky et al. | May 25, 1954 |
| 2,680,239 | Daniels | June 1, 1954 |
| 2,686,632 | Wilkinson | Aug. 17, 1954 |
| 2,700,502 | Hamilton | Jan. 25, 1955 |
| 2,700,503 | Crosman | Jan. 25, 1955 |
| 2,701,095 | Stibitz | Feb. 1, 1955 |
| 2,749,037 | Stibitz | June 5, 1956 |
| 2,800,277 | Williams | July 23, 1957 |
| 2,817,477 | Williams | Dec. 24, 1957 |
| 2,846,142 | Strachey et al. | Aug. 5, 1958 |

FOREIGN PATENTS

| | | |
|---|---|---|
| 526,068 | Belgium | Feb. 15, 1954 |

(Corresponding to Australian Patent 167,102)

| | | |
|---|---|---|
| 1,033,166 | France | Apr. 1, 1953 |
| 1,039,700 | France | May 20, 1953 |
| 1,056,750 | France | Oct. 21, 1953 |
| 1,084,147 | France | June 30, 1954 |

(Corresponding to British Patent 749,836)

| | | |
|---|---|---|
| 703,593 | Great Britain | Feb. 3, 1954 |

OTHER REFERENCES

"24 Digit Parallel Computer With Magnetic Drum Memory," by ERA, 1949, vol. I, pages 1 to 12; vol. II, Fig. 3.2–2; 3.5–2; 3.5–6 and 3.3–9; vol. I, pages 32–38, 42–46.

A Functional Description of the Edvac, volume II, pages 2–7 to 2–9; 2–11 to 2–22 and Figs. 104–2LD–5; 104–2LD–8; 104–3LD–2; 104–6LC–1; 104–6LB–6; November 1949.

Wilkes et al.: "Microprogramming and the Design of the Control Circuits in an Electronic Digital Computer," Proceedings of the Cambridge Philosophical Society, v.49, part II, pages 230–238, April 1953.

"System Organization of the Dyseac," National Bureau of Standards Report #2893, August 1953, pages 1–22 and Fig. 1.

"SEAC," Proc. of IRE., October 1953, pages 1300–1312.